United States Patent
Papadopoulos et al.

(10) Patent No.: US 12,442,038 B2
(45) Date of Patent: *Oct. 14, 2025

(54) METHODS AND MATERIALS FOR ASSESSING NUCLEIC ACIDS

(71) Applicant: The Johns Hopkins University, Baltimore, MD (US)

(72) Inventors: Nickolas Papadopoulos, Towson, MD (US); Kenneth W. Kinzler, Frankford, DE (US); Bert Vogelstein, Baltimore, MD (US); Joshua David Cohen, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/899,799

(22) Filed: Sep. 27, 2024

(65) Prior Publication Data

US 2025/0019755 A1     Jan. 16, 2025

Related U.S. Application Data

(63) Continuation of application No. 17/174,838, filed on Feb. 12, 2021.

(60) Provisional application No. 62/977,066, filed on Feb. 14, 2020.

(51) Int. Cl.
*C12Q 1/6855* (2018.01)
*C12Q 1/6876* (2018.01)

(52) U.S. Cl.
CPC ......... *C12Q 1/6855* (2013.01); *C12Q 1/6876* (2013.01); *C12Q 2563/185* (2013.01)

(58) Field of Classification Search
None
See application file for complete search history.

(56) References Cited

U.S. PATENT DOCUMENTS

| | | | |
|---|---|---|---|
| 5,750,341 A | 5/1998 | Macevicz |
| 6,090,935 A | 7/2000 | Breivik et al. |
| 6,156,504 A | 12/2000 | Gocke et al. |
| 6,248,521 B1 | 6/2001 | Van Ness et al. |
| 6,306,597 B1 | 10/2001 | Macevicz |
| 6,361,940 B1 | 3/2002 | Van Ness et al. |
| 6,514,736 B1 | 2/2003 | Erlich et al. |
| 6,576,420 B1 | 6/2003 | Carson et al. |
| 6,686,157 B2 | 2/2004 | Ward et al. |
| 6,746,845 B2 | 6/2004 | Kinzler et al. |
| 6,815,212 B2 | 11/2004 | Ness et al. |
| 6,890,764 B2 | 5/2005 | Chee et al. |
| 6,942,968 B1 | 9/2005 | Dickinson et al. |
| 6,977,153 B2 | 12/2005 | Kumar et al. |
| 7,056,660 B1 | 6/2006 | Diehl et al. |
| 7,060,431 B2 | 6/2006 | Chee et al. |
| 7,115,400 B1 | 10/2006 | Adessi et al. |
| 7,211,390 B2 | 5/2007 | Rothberg et al. |
| 7,232,656 B2 | 6/2007 | Balsubramanian et al. |
| 7,264,929 B2 | 9/2007 | Rothberg et al. |
| 7,323,305 B2 | 1/2008 | Leamon et al. |
| 7,323,310 B2 | 1/2008 | Peters et al. |
| 7,499,806 B2 | 3/2009 | Kermani et al. |
| 7,682,790 B2 | 3/2010 | Hollander et al. |
| 7,683,035 B1 | 3/2010 | Erbacher et al. |
| 7,700,286 B2 | 4/2010 | Stroun et al. |
| 7,702,468 B2 | 4/2010 | Chinitz et al. |
| 7,704,687 B2 | 4/2010 | Wang et al. |
| 7,745,125 B2 | 6/2010 | Gelfand et al. |
| 7,754,429 B2 | 7/2010 | Rigatti et al. |
| 7,776,531 B1 | 8/2010 | Black et al. |
| 7,811,759 B2 | 10/2010 | Han |
| 7,899,626 B2 | 3/2011 | Kruglyak et al. |
| 7,901,897 B2 | 3/2011 | Stuelpnagel et al. |
| 7,948,015 B2 | 5/2011 | Rothberg et al. |
| 7,957,913 B2 | 6/2011 | Chinitz et al. |
| 7,977,108 B2 | 7/2011 | Newhouse et al. |
| 8,021,888 B2 | 9/2011 | Mohammed et al. |
| 8,026,053 B2 | 9/2011 | Samuels et al. |
| 8,043,834 B2 | 10/2011 | Abarzua et al. |
| 8,076,074 B2 | 12/2011 | Mohammed |
| 8,093,063 B2 | 1/2012 | Albitar |
| 8,150,626 B2 | 4/2012 | Fan et al. |
| 8,190,373 B2 | 5/2012 | Huang et al. |
| 8,288,103 B2 | 10/2012 | Oliphant et al. |
| 8,343,718 B2 | 1/2013 | Van Der Werf et al. |
| 8,372,637 B2 | 2/2013 | Hollander |

(Continued)

FOREIGN PATENT DOCUMENTS

| | | |
|---|---|---|
| CN | 1360059 | 7/2002 |
| CN | 102241772 | 11/2011 |

(Continued)

OTHER PUBLICATIONS

Barennes et al., "Benchmarking of T cell receptor repertoire profiling methods reveals large systematic biases," Nat. Biotechnol., Feb. 2021, 39(2):236-245.

(Continued)

*Primary Examiner* — Samuel C Woolwine
*Assistant Examiner* — Carolyn L Greene
(74) *Attorney, Agent, or Firm* — Fish & Richardson P.C.

(57) ABSTRACT

Provided herein are systems, kits, compositions and methods for sequencing library preparation and sequencing workflow (e.g., for the identification of mutations). In certain embodiments, provides herein systems and methods to identically barcode both strands of templates, and PCR-based enrichment of each strand that does not require hybridization capture.

19 Claims, 27 Drawing Sheets

Specification includes a Sequence Listing.

(56) References Cited

U.S. PATENT DOCUMENTS

| | | |
|---|---|---|
| 8,481,292 B2 | 7/2013 | Casbon et al. |
| 8,492,089 B2 | 7/2013 | Owen et al. |
| 8,658,572 B2 | 2/2014 | Albert et al. |
| 8,728,732 B2 | 5/2014 | Preston et al. |
| 8,741,630 B2 | 6/2014 | Dickinson et al. |
| 8,765,419 B2 | 7/2014 | Hirschbein et al. |
| 8,822,158 B2 | 9/2014 | Froehlich et al. |
| 8,865,410 B2 | 10/2014 | Shendure et al. |
| 8,871,687 B2 | 10/2014 | Strom |
| 8,877,436 B2 | 11/2014 | Eder et al. |
| 8,911,942 B2 | 12/2014 | Mohammed et al. |
| 8,962,250 B2 | 2/2015 | Stanley |
| 9,012,149 B2 | 4/2015 | Kim et al. |
| 9,029,103 B2 | 5/2015 | Rigatti et al. |
| 9,045,796 B2 | 6/2015 | Gunderson et al. |
| 9,051,606 B2 | 6/2015 | Liu et al. |
| 9,074,206 B2 | 7/2015 | Wu et al. |
| 9,085,798 B2 | 7/2015 | Chee et al. |
| 9,115,410 B2 | 8/2015 | Nazarenko et al. |
| 9,163,283 B2 | 10/2015 | Chee et al. |
| 9,222,134 B2 | 12/2015 | Mann |
| 9,228,234 B2 | 1/2016 | Rabinowitz et al. |
| 9,233,125 B2 | 1/2016 | Davila et al. |
| 9,238,832 B2 | 1/2016 | Will et al. |
| 9,279,146 B2 | 3/2016 | Gupta et al. |
| 9,340,830 B2 | 5/2016 | Lipson et al. |
| 9,382,581 B2 | 7/2016 | Froehner et al. |
| 9,389,234 B2 | 7/2016 | Von Hoff et al. |
| 9,399,794 B2 | 7/2016 | Liu |
| 9,404,156 B2 | 8/2016 | Hicks et al. |
| 9,410,206 B2 | 8/2016 | Hoon et al. |
| 9,410,956 B1 | 8/2016 | Cheng |
| 9,422,593 B2 | 8/2016 | Rothmann et al. |
| 9,424,392 B2 | 8/2016 | Rabinowitz et al. |
| 9,441,267 B2 | 9/2016 | Gunderson et al. |
| 9,453,258 B2 | 9/2016 | Kain et al. |
| 9,476,095 B2 | 10/2016 | Vogelstein et al. |
| 9,487,823 B2 | 11/2016 | Lasken et al. |
| 9,546,399 B2 | 1/2017 | Amorese et al. |
| 9,546,404 B2 | 1/2017 | Sanders et al. |
| 9,556,491 B2 | 1/2017 | Hoon |
| 9,567,640 B2 | 2/2017 | Hoon |
| 9,574,234 B2 | 2/2017 | Straus et al. |
| 9,587,273 B2 | 3/2017 | Stuelpnagel et al. |
| 9,593,366 B2 | 3/2017 | Nazarenko et al. |
| 9,598,731 B2 | 3/2017 | Talasaz |
| 9,670,530 B2 | 6/2017 | Kostem et al. |
| 9,689,047 B2 | 6/2017 | O'Neil et al. |
| 9,702,004 B2 | 7/2017 | Van Eijk et al. |
| 9,708,655 B2 | 7/2017 | Mandell et al. |
| 9,745,632 B2 | 8/2017 | Parr et al. |
| 9,760,530 B2 | 9/2017 | Harsha et al. |
| 9,783,847 B2 | 10/2017 | Chee |
| 9,783,854 B2 | 10/2017 | Sanders et al. |
| 9,792,403 B2 | 10/2017 | Sun et al. |
| 9,797,000 B2 | 10/2017 | Lowe et al. |
| 9,816,139 B2 | 11/2017 | Breen |
| 9,828,672 B2 | 11/2017 | Varadarajan et al. |
| 9,834,822 B2 | 12/2017 | Talasaz et al. |
| 9,873,908 B2 | 1/2018 | Gupta et al. |
| 9,879,312 B2 | 1/2018 | Steemers et al. |
| 9,902,992 B2 | 2/2018 | Talasaz et al. |
| 9,914,973 B2 | 3/2018 | Cheng |
| 9,920,366 B2 | 3/2018 | Eltoukhy et al. |
| 9,944,924 B2 | 4/2018 | Rigatti et al. |
| 9,957,570 B2 | 5/2018 | Mori et al. |
| 9,965,585 B2 | 5/2018 | Lo et al. |
| 9,992,598 B2 | 6/2018 | Reiche |
| 10,011,826 B2 | 7/2018 | Hollander et al. |
| 10,011,870 B2 | 7/2018 | Zimmermann et al. |
| 10,017,759 B2 | 7/2018 | Kaper et al. |
| 10,023,904 B2 | 7/2018 | Jaen et al. |
| 10,023,917 B2 | 7/2018 | Buettner et al. |
| 10,041,127 B2 | 8/2018 | Talasaz |
| 10,102,337 B2 | 10/2018 | Scolnick et al. |
| 10,113,199 B2 | 10/2018 | Morin et al. |
| 10,208,338 B2 | 2/2019 | Makarov et al. |
| 10,227,652 B2 | 3/2019 | Rabinowitz et al. |
| 10,240,202 B2 | 3/2019 | Rabinowitz et al. |
| 10,266,893 B2 | 4/2019 | Rabinowitz et al. |
| 10,388,403 B2 | 8/2019 | Rava et al. |
| 10,422,006 B2 | 9/2019 | Samuels et al. |
| 10,457,995 B2 | 10/2019 | Talasaz |
| 10,494,678 B2 | 12/2019 | Talasaz |
| 10,501,793 B2 | 12/2019 | Chee et al. |
| 10,501,810 B2 | 12/2019 | Talasaz |
| 10,522,242 B2 | 12/2019 | Rabinowitz et al. |
| 10,526,658 B2 | 1/2020 | Babiarz et al. |
| 10,538,759 B2 | 1/2020 | Stuelpnagel et al. |
| 10,538,814 B2 | 1/2020 | Babiarz et al. |
| 10,557,172 B2 | 2/2020 | Babiarz et al. |
| 10,577,601 B2 | 3/2020 | Shendure et al. |
| 10,590,482 B2 | 3/2020 | Ryan et al. |
| 10,597,653 B2 | 3/2020 | Sabot et al. |
| 10,619,214 B2 | 4/2020 | Lo et al. |
| 10,704,085 B2 | 7/2020 | Talasaz et al. |
| 10,704,086 B2 | 7/2020 | Talasaz et al. |
| 10,704,105 B2 | 7/2020 | Samuels et al. |
| 10,704,108 B2 | 7/2020 | Vogelstein et al. |
| 10,731,220 B2 | 8/2020 | Babiarz et al. |
| 10,732,220 B2 | 8/2020 | Tamura et al. |
| 10,783,364 B2 | 9/2020 | Gao |
| 10,787,713 B2 | 9/2020 | Samuels et al. |
| 10,801,063 B2 | 10/2020 | Eltoukhy et al. |
| 10,822,663 B2 | 11/2020 | Talasaz |
| 10,894,987 B2 | 1/2021 | Vogelstein et al. |
| 11,180,803 B2 | 11/2021 | Vogelstein et al. |
| 2002/0160404 A1 | 10/2002 | Dietmaier et al. |
| 2003/0148335 A1 | 8/2003 | Shen et al. |
| 2005/0136405 A1 | 6/2005 | Linder et al. |
| 2005/0153313 A1 | 7/2005 | Endege et al. |
| 2005/0244847 A1 | 11/2005 | Domanico et al. |
| 2006/0127918 A1 | 6/2006 | Mohammed et al. |
| 2006/0263789 A1 | 11/2006 | Kincaid |
| 2006/0292576 A1 | 12/2006 | Albitar et al. |
| 2007/0020640 A1 | 1/2007 | McCloskey |
| 2007/0269805 A1 | 11/2007 | Hogers |
| 2008/0160580 A1 | 7/2008 | Adessi et al. |
| 2008/0286795 A1 | 11/2008 | Kawashima et al. |
| 2009/0088328 A1 | 4/2009 | Mohammed et al. |
| 2009/0105081 A1 | 4/2009 | Rodesch et al. |
| 2009/0215062 A1 | 8/2009 | Lee |
| 2009/0233802 A1 | 9/2009 | Bignell |
| 2009/0298187 A1 | 12/2009 | Nazarenko et al. |
| 2010/0041048 A1 | 2/2010 | Diehl et al. |
| 2010/0069263 A1 | 3/2010 | Shendure et al. |
| 2010/0113758 A1 | 5/2010 | Wilmer et al. |
| 2010/0127186 A1 | 5/2010 | Bykanov et al. |
| 2010/0129874 A1 | 5/2010 | Mitra et al. |
| 2010/0248991 A1 | 9/2010 | Roesler et al. |
| 2010/0273219 A1 | 10/2010 | May et al. |
| 2011/0152111 A1 | 6/2011 | Fan et al. |
| 2011/0217309 A1 | 9/2011 | Buck et al. |
| 2011/0319415 A1 | 12/2011 | Thomas et al. |
| 2012/0010091 A1 | 1/2012 | Linnarson |
| 2012/0033207 A1 | 2/2012 | Faidi et al. |
| 2012/0156753 A1 | 6/2012 | Jendrisak et al. |
| 2012/0225428 A1 | 9/2012 | Beck et al. |
| 2013/0059741 A1 | 3/2013 | Weiner |
| 2013/0266938 A1 | 10/2013 | Will |
| 2014/0011199 A1 | 1/2014 | Speiser et al. |
| 2014/0038837 A1 | 2/2014 | Fung et al. |
| 2014/0050788 A1 | 2/2014 | Daniel et al. |
| 2014/0066317 A1 | 3/2014 | Talasaz |
| 2014/0128270 A1 | 5/2014 | Nakao |
| 2014/0271635 A1 | 9/2014 | Brogdon et al. |
| 2014/0287404 A1 | 9/2014 | Huang et al. |
| 2014/0336996 A1 | 11/2014 | Sun et al. |
| 2014/0364323 A1 | 12/2014 | Fan et al. |
| 2015/0011416 A1 | 1/2015 | Lei et al. |
| 2015/0024948 A1 | 1/2015 | Dugas et al. |
| 2015/0044687 A1 | 2/2015 | Schmitt et al. |
| 2015/0051085 A1 | 2/2015 | Vogelstein et al. |
| 2015/0087535 A1 | 3/2015 | Patel |

(56) References Cited

U.S. PATENT DOCUMENTS

| | | |
|---|---|---|
| 2015/0093756 A1 | 4/2015 | Wolff et al. |
| 2015/0176071 A1 | 6/2015 | Fisher et al. |
| 2015/0197787 A1 | 7/2015 | Welder et al. |
| 2015/0225775 A1 | 8/2015 | Satya |
| 2015/0252415 A1 | 9/2015 | Vogelstein et al. |
| 2015/0275267 A1 | 10/2015 | O'Neil et al. |
| 2015/0307947 A1 | 10/2015 | Basu et al. |
| 2015/0324519 A1 | 11/2015 | Liu |
| 2015/0360193 A1 | 12/2015 | Fan et al. |
| 2016/0017320 A1 | 1/2016 | Wang et al. |
| 2016/0026758 A1 | 1/2016 | Jabara et al. |
| 2016/0046986 A1 | 2/2016 | Eltoukhy et al. |
| 2016/0048564 A1 | 2/2016 | Bassett, Jr. et al. |
| 2016/0092630 A1 | 3/2016 | Chen et al. |
| 2016/0194404 A1 | 7/2016 | June et al. |
| 2016/0194691 A1 | 7/2016 | Powell et al. |
| 2016/0251704 A1 | 9/2016 | Talasaz et al. |
| 2016/0273049 A1 | 9/2016 | Velculescu et al. |
| 2016/0281154 A1 | 9/2016 | So et al. |
| 2016/0319345 A1 | 11/2016 | Gnerre et al. |
| 2016/0374330 A1 | 12/2016 | Grolz |
| 2017/0009287 A1 | 1/2017 | Brastaad et al. |
| 2017/0039328 A1 | 2/2017 | Kathleen et al. |
| 2017/0051347 A1 | 2/2017 | Vogelstein et al. |
| 2017/0058332 A1 | 3/2017 | Kermani et al. |
| 2017/0061072 A1 | 3/2017 | Kermani et al. |
| 2017/0088887 A1 | 3/2017 | Makarov et al. |
| 2017/0101676 A1 | 4/2017 | Teng et al. |
| 2017/0137876 A1 | 5/2017 | Rigatti et al. |
| 2017/0141793 A1 | 5/2017 | Straus et al. |
| 2017/0165289 A1 | 6/2017 | Minomi et al. |
| 2017/0175197 A1 | 6/2017 | Gatalica et al. |
| 2017/0183742 A1 | 6/2017 | Thierry et al. |
| 2017/0240972 A1 | 8/2017 | Mokhtari et al. |
| 2017/0240973 A1 | 8/2017 | Eltoukhy et al. |
| 2017/0260590 A1 | 9/2017 | Eltoukhy et al. |
| 2017/0314081 A1 | 11/2017 | Gutin et al. |
| 2017/0316149 A1 | 11/2017 | Maston |
| 2017/0356030 A1 | 12/2017 | Boyanov et al. |
| 2017/0356053 A1 | 12/2017 | Otto et al. |
| 2018/0002738 A1 | 1/2018 | Wang et al. |
| 2018/0002749 A1 | 1/2018 | Larson et al. |
| 2018/0016640 A1 | 1/2018 | Xu et al. |
| 2018/0022664 A1 | 1/2018 | Yao et al. |
| 2018/0023119 A1 | 1/2018 | Adey et al. |
| 2018/0037950 A1 | 2/2018 | Gunderson et al. |
| 2018/0051329 A1 | 2/2018 | Elzinga |
| 2018/0087105 A1 | 3/2018 | Larson et al. |
| 2018/0095969 A1 | 4/2018 | Jung et al. |
| 2018/0100859 A1 | 4/2018 | Cardone et al. |
| 2018/0119216 A1 | 5/2018 | Jamshidi et al. |
| 2018/0120291 A1 | 5/2018 | Eltoukhy et al. |
| 2018/0135044 A1 | 5/2018 | Sausen et al. |
| 2018/0135103 A1 | 5/2018 | Furlan et al. |
| 2018/0141020 A1 | 5/2018 | Gunderson et al. |
| 2018/0142304 A1 | 5/2018 | Sanders et al. |
| 2018/0148716 A1 | 5/2018 | Heitz et al. |
| 2018/0155705 A1 | 6/2018 | Wolf et al. |
| 2018/0155774 A1 | 6/2018 | Gunderson et al. |
| 2018/0163201 A1 | 6/2018 | Larson |
| 2018/0171337 A1 | 6/2018 | O'Neil et al. |
| 2018/0195131 A1 | 7/2018 | Mortimer |
| 2018/0201974 A1 | 7/2018 | Fraser |
| 2018/0201992 A1 | 7/2018 | Wu et al. |
| 2018/0203974 A1 | 7/2018 | Venn |
| 2018/0208999 A1 | 7/2018 | Lo et al. |
| 2018/0258490 A1 | 9/2018 | Wang |
| 2019/0206510 A1 | 7/2019 | Jiang et al. |
| 2019/0218605 A1 | 7/2019 | Makarov et al. |
| 2019/0256924 A1 | 8/2019 | Vogelstein et al. |
| 2019/0287654 A1 | 9/2019 | Curtis et al. |
| 2019/0376137 A1 | 12/2019 | Vogelstein et al. |
| 2020/0013482 A1 | 1/2020 | Sikora |
| 2020/0131561 A1 | 4/2020 | Kennedy et al. |
| 2020/0131568 A1 | 4/2020 | Talasz et al. |
| 2020/0157636 A1 | 5/2020 | Velculescu et al. |
| 2020/0377956 A1 | 12/2020 | Vogelstein et al. |
| 2021/0017937 A1 | 1/2021 | Kashima et al. |
| 2021/0254153 A1 | 8/2021 | Vogelstein et al. |
| 2021/0277467 A1 | 9/2021 | Vogelstein et al. |
| 2021/0277468 A1 | 9/2021 | Vogelstein et al. |
| 2021/0285027 A1 | 9/2021 | Lowman et al. |
| 2024/0352518 A1 | 10/2024 | Vogelstein et al. |

FOREIGN PATENT DOCUMENTS

| | | |
|---|---|---|
| EP | 1910560 | 12/2010 |
| EP | 3443119 | 2/2019 |
| EP | 3177740 | 1/2021 |
| WO | WO 2001023618 | 4/2001 |
| WO | WO 2002012897 | 2/2002 |
| WO | WO 2002016649 | 2/2002 |
| WO | WO 2002059355 | 8/2002 |
| WO | WO 2002099982 | 12/2002 |
| WO | WO 2008030186 | 3/2008 |
| WO | WO 2008118877 | 10/2008 |
| WO | WO 2009152928 | 12/2009 |
| WO | WO 2010028098 | 3/2010 |
| WO | WO 2010126614 | 11/2010 |
| WO | WO 2010127186 | 11/2010 |
| WO | WO 2010141955 | 12/2010 |
| WO | WO 2012038839 | 3/2012 |
| WO | WO 2012092336 | 7/2012 |
| WO | WO 2012142213 | 10/2012 |
| WO | WO 2013113816 | 8/2013 |
| WO | WO 2013134261 | 9/2013 |
| WO | WO 2013142389 A1 | 9/2013 |
| WO | WO 2013148496 | 10/2013 |
| WO | WO 2013169339 | 11/2013 |
| WO | WO 2014183078 | 11/2014 |
| WO | WO 2015198074 | 12/2015 |
| WO | WO 2016130704 | 8/2016 |
| WO | WO 2016134136 | 8/2016 |
| WO | WO 2016135300 | 9/2016 |
| WO | WO 2016140974 | 9/2016 |
| WO | WO 2016141169 | 9/2016 |
| WO | WO 2016170147 | 10/2016 |
| WO | WO 2016181128 | 11/2016 |
| WO | WO 2016193490 | 12/2016 |
| WO | WO 2017019456 | 2/2017 |
| WO | WO 2017027653 | 2/2017 |
| WO | WO 2017032808 | 3/2017 |
| WO | WO 2017053915 | 3/2017 |
| WO | WO 2017085321 | 5/2017 |
| WO | WO 2017123316 | 7/2017 |
| WO | WO 2017127741 | 7/2017 |
| WO | WO 2017132276 | 8/2017 |
| WO | WO 2017132438 | 8/2017 |
| WO | WO 2017136603 | 8/2017 |
| WO | WO 2017151524 | 9/2017 |
| WO | WO 2017181134 | 10/2017 |
| WO | WO 2017181146 | 10/2017 |
| WO | WO 2017181202 | 10/2017 |
| WO | WO 2017197027 | 11/2017 |
| WO | WO 2017201315 | 11/2017 |
| WO | WO 2017205686 | 11/2017 |
| WO | WO 2017218512 | 12/2017 |
| WO | WO 2018009723 | 1/2018 |
| WO | WO 2018013598 | 1/2018 |
| WO | WO 2018057770 | 3/2018 |
| WO | WO 2018064229 | 4/2018 |
| WO | WO 2018064629 | 4/2018 |
| WO | WO 2018068014 | 4/2018 |
| WO | WO 2018077847 | 5/2018 |
| WO | WO 2018081130 | 5/2018 |
| WO | WO 2018085862 | 5/2018 |
| WO | WO 2018093744 | 5/2018 |
| WO | WO 2018093780 | 5/2018 |
| WO | WO 2018111872 | 6/2018 |
| WO | WO 2018119399 | 6/2018 |
| WO | WO 2018119438 | 6/2018 |
| WO | WO 2018119452 | 6/2018 |
| WO | WO 2018125892 | 7/2018 |
| WO | WO 2018136416 | 7/2018 |

(56) References Cited

FOREIGN PATENT DOCUMENTS

| WO | WO 2018137826 | | 8/2018 |
|---|---|---|---|
| WO | WO 2018140695 | | 8/2018 |
| WO | WO 2018175202 | | 9/2018 |
| WO | WO 2018175997 | | 9/2018 |
| WO | WO 2018177847 | | 10/2018 |
| WO | WO 2018204657 | | 11/2018 |
| WO | WO 2018218113 | | 11/2018 |
| WO | WO 2019204208 | A1 | 10/2019 |
| WO | WO 2020014693 | A1 | 1/2020 |
| WO | WO 2020021119 | | 1/2020 |
| WO | WO 2021053008 | | 3/2021 |
| WO | WO 2021163546 | | 8/2021 |
| WO | WO 2022018055 | | 1/2022 |

OTHER PUBLICATIONS

Bolotin et al., "MIXCR: software for comprehensive adaptive immunity profiling," Nat. Methods., May 2015, 12(5):380-381.

Brüggemann et al., "Standardized next-generation sequencing of immunoglobulin and T-cell receptor gene recombinations for MRD marker identification in acute lymphoblastic leukaemia; a EuroClonality-NGS validation study," Leukemia, Sep. 2019, 33(9):2241-2253.

Carlson et al., "Using synthetic templates to design an unbiased multiplex PCR assay," Nat. Commun., Oct. 25, 2013, 4(1):2680, 9 pages.

Cavagna et al., "Capture-based Next-Generation Sequencing Improves the Identification of Immunoglobulin/T-Cell Receptor Clonal Markers and Gene Mutations in Adult Acute Lymphoblastic Leukemia Patients Lacking Molecular Probes," Cancers, Jun. 9, 2020, 12(6):1505, 24 pages.

Chabon et al., "Integrating genomic features for non-invasive early lung cancer detection," Nature, Apr. 9, 2020, 580(7802):245-251.

Dou et al., "Accurate detection of mosaic variants in sequencing data without matched controls," Nat. Biotechnol., Mar. 2020, 38(3):314-319.

Eugster et al., "Measuring T cell receptor and T cell gene expression diversity in antigen-responsive human CD4+ T cells," J. Immunol. Methods, Dec. 31, 2013, 400:13-22.

Freeman et al., "Profiling the T-cell receptor beta-chain repertoire by massively parallel sequencing," Genome Res., Oct. 2009, 19(10):1817-1824.

Hoang et al., "Genome-wide quantification of rare somatic mutations in normal human tissues using massively parallel sequencing," Proc. Natl. Acad. Sci. USA, Aug. 30, 2016, 113(35):9846-9851.

Kebschull et al., "Sources of PCR-induced distortions in high-throughput sequencing data sets," Nucleic Acids Res., Dec. 2, 2015, 43(21):e143, 15 pages.

Knecht et al., "Quality control and quantification in IG/TR next-generation sequencing marker identification: protocols and bioinformatic functionalities by EuroClonality-NGS," Leukemia, Sep. 2019, 33(9):2254-2265.

Komkov et al., "High-throughput sequencing of T-cell receptor alpha chain clonal rearrangements at the DNA level in lymphoid malignancies," Br. J. Haematol., Mar. 2020, 188(5):723-731.

Linnemann et al., "High-throughput identification of antigen-specific TCRs by TCR gene capture," Nat. Med., Nov. 2013, 19(11):1534-1541.

Ma et al., "Immune Repertoire Sequencing Using Molecular Identifiers Enables Accurate Clonality Discovery and Clone Size Quantification," Front. Immunol., Feb. 2018, 9:33, 11 pages.

Mamedov et al., "Preparing unbiased T-cell receptor and antibody cDNA libraries for the deep next generation sequencing profiling," Front. Immunol., Dec. 23, 2013, 4:456, 10 pages.

Meynert et al., "Quantifying single nucleotide variant detection sensitivity in exome sequencing," BMC Bioinformatics, Dec. 2013, 14:195, 10 pages.

Montagne et al., "Ultra-efficient sequencing of T Cell receptor repertoires reveals shared responses in muscle from patients with Myositis," EBioMedicine, Sep. 2020, 59:102972, 13 pages.

Oakes et al., "Quantitative Characterization of the T Cell Receptor Repertoire of Naïve and Memory Subsets Using an Integrated Experimental and Computational Pipeline Which Is Robust, Economical, and Versatile," Front. Immunol., Oct. 12, 2017, 8:1267, 17 pages.

Razavi et al., "High-intensity sequencing reveals the sources of plasma circulating cell-free DNA variants," Nat. Med., Dec. 2019, 25(12):1928-1937.

Robins et al., "Comprehensive assessment of T-cell receptor beta-chain diversity in alphabeta T cells," Blood, Nov. 5, 2009, 114(19):4099-4107.

Scheijen et al., "Next-generation sequencing of immunoglobulin gene rearrangements for clonality assessment: a technical feasibility study by EuroClonality-NGS," Leukemia, Sep. 2019, 33(9):2227-2240.

Shugay et al., "Towards error-free profiling of immune repertoires," Nat. Methods, Jun. 2014, 11(6):653-655.

Shugay et al., "VDJtools: Unifying Post-analysis of T Cell Receptor Repertoires," PLoS Comput. Biol., Nov. 25, 2015, 11(11):e1004503, 16 pages.

Springer et al., "A multimodality test to guide the management of patients with a pancreatic cyst," Sci. Transl. Med., Jul. 17, 2019, 11(501):eaav4772, 15 pages.

Wang et al., "High throughput sequencing reveals a complex pattern of dynamic interrelationships among human T cell subsets," Proc. Natl. Acad. Sci. USA, Jan. 26, 2010, 107(4):1518-1523.

Weinstein et al., "High-throughput sequencing of the zebrafish antibody repertoire," Science, May 8, 2009, 324(5928):807-810.

Zhang et al., "IMonitor: A Robust Pipeline for TCR and BCR Repertoire Analysis," Genetics, Oct. 2015, 201(2):459-472.

"Consensus sequence" (online) Oct. 4, 2011 <https://en.wikipedia.org/w/index.php?title=Consensus_sequence&oldid=423354064>.

"Nextera XT DNA Sample Preparation Guide," Illumina, Oct. 1, 2012 (Oct. 1, 2012), Part# 15031942, Rev. C, pp. 1-48. Retrieved from the Internet:<http://cmore.soest.hawaii.edu/summercourse/2015/documents/Metagenomics_06-22/nextera_xt_sample_preparation_guide_15031942_c.pdf> on Sep. 19, 2010 (Sep. 19, 2010).

"Polymerase chain reaction" (online) 2011, <https://web.archive.org/web/20110203140027/https:en.wikipedia.org/wiki/Polymerase>.

Abbosh et al., "Phylogenetic ctDNA analysis depicts early-stage lung cancer evolution", Nature 545: 446-451, 2017.

Abdel-Rahman, "Denosumab versus zoledronic acid to prevent aromatase inhibitors-associated fractures in postmenopausal early breast cancer; a mixed treatment meta-analysis.", Expert Rev Anticancer Ther 16(8): 885-91, 2016.

ACOG Practice Bulletin. Clinical Management Guidelines for Obstetrician-Gynecologists. No. 60, Mar. 2005. "Pregestational diabetes mellitus.", Obstet Gynecol 1 05, 675-685, 2005.

Affymetrix Human Genome U133 Plus 2.0 Array, Public on Nov. 7, 2003, Gene Expression Omnibus URL: https://www.ncbi.nlm.nih.gov/geo/query/acc.cgi?acc=GPL570> [Retrieved from the internet Jun. 7, 2018].

Agus et al., "Targeting ligand-activated ErbB2 signaling inhibits breast and prostate tumor growth", Cancer Cell 2: 127-137, 2002.

Albert et al., "Direct selection of human genomic loci by microarray hybridization", Nat. Methods 4: 903-905, 2007.

Albertini et al., "In vivo somatic mutations in humans: measurement and analysis.", Annu Rev Genet 24: 305-326, 1990.

AlHilli et al., "Incidence and factors associated with synchronous ovarian and endometrial cancer: a population-based case-control study.", Gynecologic oncology 125: 109-113, 2012.

Alizadeh et al., "The Lymphochip: A Specialized cDNA Microarray for the Genomic-scale Analysis of Gene Expression in Normal and Malignant Lymphocytes," Cold Spring Harbor Symposia on Quantitative Biology, 1999, vol. LXIV:71-78.

Allegra et al., "American Society of Clinical Oncology provisional clinical opinion: testing for KRAS gene mutations in patients with metastatic colorectal carcinoma to predict response to anti-epidermal growth factor receptor monoclonal antibody therapy.", J. Clin. Oncol. 27: 2091-2096, 2009.

(56) References Cited

OTHER PUBLICATIONS

Allen et al., "Multi-institutional Validation Study of the American Joint Commission on Cancer (8th Edition) Changes for T and N Staging in Patients With Pancreatic Adenocarcinoma.", Ann Surg 265(1): 185-191, 2017.
Allory et al., "Telomerase Reverse Transcriptase Promoter Mutations in Bladder Cancer: High Frequency Across Stages, Detection in Urine, and Lack of Association with Outcome", Eur Urol., 2014, 65:360-366.
Al-Shannsi et al., "Molecular spectrum of KRAS, NRAS, BRAF, PIK3CA, TP53, and APC somatic gene mutations In Arab patients with colorectal cancer: determination of frequency and distribution pattern," Journal of Gastrointestinal Oncology, 2016, 7(6):882-902.
Alvarez et al., "Widespread Hypomethylation Occurs Early and Synergizes with Gene Amplification during Esophageal Carcinogenesis", PLOS Genetics, vol. 7, issue 3, e1001356, 1-14 pages, 2011.
Alvarez-Chaver et al., "Proteomics for discovery of candidate colorectal cancer biomarkers", World J. Gastroenterol. 20(14): 3804-3824, 2014.
American Cancer Society, "Can ovarian cancer be found early?", (Available at http://www.cancer.org/Cancer/OvarianCancer/DetailedGuide/ovariancancer-detection), 4 pages, 2017.
American College of Obstetricians and Gynecologists, ACOG Committee Opinion: No. 280, Dec. 2002. "The role of the generalist obstetrician-gynecologist in the early detection of ovarian cancer.", Obstet Gynecol 100, 1413-1416, 2002.
Andre et al., "Improved overall survival with oxaliplatin, fluorouracil, and leucovorin as adjuvant treatment in stage II or III colon cancer in the MOSAIC trial.", J Clin Oncol., 2009, 27(19):3109-3116.
Anglesio et al., "Cancer-Associated Mutations in Endometriosis without Cancer", N Engl J Med 376: 1835-1848, 2017.
Ansari et al., "Relationship between tumour size and outcome in pancreatic ductal adenocarcinoma", Br J Surg., 2017, 104(5): 600-607.
Antoni et al., "Bladder Cancer Incidence and Mortality: A Global Overview and Recent Trends.", Eur Urol, 2017, 71(1):96-108.
Araten et al., A quantitative measurement of the human somatic mutation rate., Cancer Res 65: 8111-8117, 2005.
Arbyn et al., "European Guidelines for Quality Assurance in Cervical Cancer Screening. Second edition—summary document.", Ann Oncol 21, 448-458 2010.
Arnold et al., "Global burden of cancer attributable to high body-mass index in 2012: a population-based study.", The Lancet. Oncology 16, 36-46, 2015.
Audeh et al., "Oral poly(ADP-ribose) polymerase inhibitor olaparib in patients with BRCA1 or BRCA2 mutations and recurrent ovarian cancer: a proof-of-concept trial.", Lancet 376: 245-251, 2010.
Australian Office Action in Australian Application No. 2017203206, dated Jan. 23, 2018, 4 pages.
Awada et al., "An open-label, dose-escalation study to evaluate the safety and pharmacokinetics of CEP-9722 (a PARP-1 and PARP-2 inhibitor) in combination with gemcitabine and cisplatin in patients with advanced solid tumors", Anticancer Drugs 27(4): 342-8, 2016.
Baard et al., Diagnostic dilemmas in patients with upper tract urothelial carcinoma., Nat Rev Urol, 14(3), 181-191, 2017.
Baehner, "The analytical validation of the Oncotype DX Recurrence Score assay", Ecancermedicalscience 10: 675, 2016.
Bahuva et al., "Morphologic abnormalities are poorly predictive of visceral pain in chronic pancreatitis.", Pancreas 42(1): 6-10, 2013.
Bainbridge et al., "Whole exome capture in solution with 3 Gbp of data" Genome Biology, 11(6): R62, 2010.
Balmain et al., "A model for RAS mutation patterns in cancers: finding the sweet spot.," Nature Reviews, 2018, 18:767-777.
Bandiera et al., "Cancer antigen 125, human epididymis 4, kallikrein 6, osteopontin and soluble mesothelin-related peptide immunocomplexed with immunoglobulin Min epithelial ovarian cancer diagnosis.", Clinical chemistry and laboratory medicine, 51, 1815-1824, 2013.
Bang et al., "Trastuzumab in combination with chemotherapy versus chemotherapy alone for treatment of HER2-positive advanced gastric or gastro-oesophageal junction cancer (ToGA): a phase 3, open-label, randomised controlled trial", Lancet 376: 687-697, 2010.
Bansal et al., "Low- and high-grade bladder cancer appraisal via serum-based proteomics approach.", Clin Chim Acta 436: 97-103, 2014.
Bardelli et al., "Liquid Biopsies, What We Do Not Know (Yet)", Cell Press, 31, 172-179, 2017.
Baretton et al., "Interphase Cytogenetic Analysis of Prostatic Carcinomas by Use of Nonisotopic in Situ Hybridization", Cancer Research 54, 4472-4480, 1994.
Barkan et al., "The Paris System for Reporting Urinary Cytology: The Quest to Develop a Standardized Terminology.", Adv Anat Pathol 23:193-201, 2016.
Barnes, "The fidelity of Taq polymerase catalyzing PCR is improved by an N-terminal deletion", Gene 112:29-35, 1992.
Barollo et al., "Prevalence, tumorigenic role, and biochemical implications of rare BRAF alterations", Thyroid: offical journal of the american thyroid association 24, 809-819, 2014.
Barroso-Sousa et al., "Clinical Development of the CDK4/6 Inhibitors Ribociclib and Abemaciclib in Breast Cancer", Breast Care 11(3): 167-173, 2016.
Barrow et al., "Cumulative lifetime incidence of extracolonic cancers in Lynch syndrome: a report of 121 families with proven mutations.", Clin. Genet. 75, 141-149, 2009.
Baselga et al., "Pertuzumab plus Trastuzumab plus Docetaxel for Metastatic Breast Cancer", N Engl J Med 366: 109-119, 2012.
Bashashati et al., "Distinct evolutionary trajectories of primary high-grade serous ovarian cancers revealed through spatial mutational profiling.", The Journal of pathology, 231: 21-34, 2013.
Bast et al., "A radioimmunoassay using a monoclonal antibody to monitor the course of epithelial ovarian cancer", The New England journal of medicine 309, 883-887, 1983.
Beddowes et al., "Predicting treatment resistance and relapse through circulating DNA.", Breast 34(Suppl 1): S31-S35, 2017.
Beers et al., "Array-CGH and breast cancer," Breast Cancer Res., 2006, 8(3):210, 10 pages.
Bell et al., "A simple way to treat PCR products prior to sequencing using ExoSAP-IT" BioTechniques, 2008.
Bell et al., "Integrated genomic analyses of ovarian carcinoma.", Nature 474, 609-615, 2011.
Benson et al., "Colon Cancer, Version 1.2017", NCCN, vol. 15, No. 3, 370-398, 2017.
Beroukhim et al., "Assessing the significance of chromosomal aberrations in cancer: Methodology and application to glioma", Proceedings of the National Academy of Sciences, 104: 20007-20012, 2007.
Bertone et al., "Design optimization methods for genomic DNA tiling arrays", Genome Res 16(2): 271-281, 2006.
Bertotti et al., "The genomic landscape of response to EGFR blockade in colorectal cancer.", Nature, 526: 263-7, 2015.
Bettegowda et al. "Detection of circulating tumor DNA in early- and late-stage human malignancies," Sci Transl Med, 2014, 6(224):1-25.
Biankin et al., "Pancreatic cancer genomes reveal aberrations in axon guidance pathway genes.", Nature 491(7424): 399-405, 2012.
Bielas et al., "Quantification of random genomic mutations.", Nat. Methods, 2: 285-290, 2005.
Binladen et al., "The Use of Coded PCR Primers Enables High-Throughput Sequencing of Multiple Homolog Amplification Products by 454 Parallel Sequencing" PLoS One, 9 pages, Feb. 14, 2007.
Boland et al., "Clinical next generation sequencing to identify actionable aberrations in a phase I program," Oncotarget, 2015, 6(24):20099-20110.
Bowtell et al., "Rethinking ovarian cancer II: reducing mortality from high-grade serous ovarian cancer.", Nature reviews Cancer, 15: 668-79, 2015.
Boyd et al., "Measurement and clinical monitoring of human lymphocyte clonality by massively parallel VDJ pyrosequencing.", Science Trans lat. Med., vol. 1, 12ra23, Supplementary material, pp. 1-30, 2009.
Bozic et al., "Evolutionary dynamics of cancer in response to targeted combination therapy", Elife 2: e00747, 2013.

(56) References Cited

OTHER PUBLICATIONS

Brahmer et al., "Safety and activity of anti-PD-L1 antibody in patients with advanced cancer.", N Engl J Med, 366(26): 2455-65, 2012.

Bray et al., "Global estimates of cancer prevalence for 27sites in the adult population in 2008.", Int. J. Cancer, 2012.

Bristow et al., "Survival effect of maximal cytoreductive surgery for advanced ovarian carcinoma during the platinum era: a meta-analysis." J. Clin. Oncol. 20, 1248-1259, 2002.

Burris et al., "Phase I trial of novel kinesin spindle protein (KSP) inhibitor SB-715992 IV days 1, 8, 15 q 28 days", J. Clin. Oncol. 22: 128, 2004.

Buys et al., "Ovarian cancer screening in the Prostate, Lung, Colorectal and Ovarian (PLCO) cancer screening trial: findings from the initial screen of a randomized trial", American journal of obstetrics and gynecology 193, 1630-1639, 2005.

Buys et al., Effect of screening on ovarian cancer mortality: the Prostate, Lung, Colorectal and Ovarian (PLCO) Cancer Screening Randomized Controlled Trial. JAMA 305. 2295-2303, 2011.

Byron et al., "FGFR2 mutations are rare across histologic subtypes of ovarian cancer," Gynecologic Oncology 117, 125-129, 2010.

Calvez-Kelm et al., "KRAS mutations in blood circulating cell-free DNA: a pancreatic cancer case-control", Oncotarget, vol. 7, No. 48, 2016.

Camidge et al., "A phase I safety, tolerability, and pharmacokinetic study of enzastaurin combined with capecitabine in patients with advanced solid tumors", Anticancer Drugs 19: 77-84, 2008.

Campbell et al., "No difference in stem cell somatic mutation between the background mucosa of right- and left-sided sporadic colorectal carcinomas.", J Pathol 186: 31-35, 1998.

Cancer Genome Atlas Research Network, "Comprehensive molecular characterization of urothelial bladder carcinoma.", Nature 507: 315-322, 2014.

Cancer Genome Atlas Research, "Integrated genomic analyses of ovarian carcinoma.", Nature 474: 609-615, 2011.

Cancer.gov [online], "NCI Dictionary of Cancer Terms, Definition of Biomarker," available on or before Apr. 5, 2018, [retrieved on Feb. 26, 2020], retrieved from: URL<https://www.cancer.gov/publications/dictionaries/cancer-terms/def/biomarker>, 1 page.

Capello et al., "Sequential Validation of Blood-Based Protein Biomarker Candidates for Early-Stage Pancreatic Cancer.", J Natl Cancer Inst 109(4), 2017.

Carlson et al., "Screening for ovarian cancer.", Ann. Intern. Med. 121, 124-132, 1994.

Casbon et al., "A method for counting PCR template molecules with application to next-generation sequencing," Nucleic Acids Research, 1-8, 2011.

Cass et al., BRCA-mutation-associated fallopian tube carcinoma: a distinct clinical phenotype? Obstetrics and Gynecology 106: 1327-34, 2005.

Castelo-Branco et al., "Methylation of the TERT promoter and risk stratification of childhood brain tumours: an integrative genomic and molecular study," Lancet Oncol., 2013, 14(6):534-542.

Chai et al., Field effect in cancer-an update. Ann Clin Lab Sci 39: 331-337, 2009.

Chan et al., "Size Distributions of Maternal and Fetal DNA in Maternal Plasma", Clinical chemistry 50: 88-92, 2004.

Chan, "Consolidated guidelines on the use of antiretroviral drugs for treating and preventing HIV infection Recommendations for a public health approach", Second Edition, Book, 2016.

Chang et al., "CARs: Synthetic Immunoreceptors for Cancer Therapy and Beyond", Trends Mol Med 23(5): 430-450, 2017.

Chang et al., "The clinical utility of endoscopic ultrasound-guided fine-needle aspiration in the diagnosis and staging of pancreatic carcinoma.", Gastrointestinal endoscopy 45, 387-393, 1997.

Chari et al., "Probability of pancreatic cancer following diabetes: a population based study". Gastroenterology 129(2): 504-511, 2005.

Chen et al., "Aristolochic acid-associated urothelial cancer in Taiwan", Proc Natl Acad Sci US A, 109(21): 8241-8246, 2012.

Chen et al., "CAR T-cell intrinsic PD-1 checkpoint blockade: A two-in-one approach for solid tumor immunotherapy", Oncoimmunology 6(2): e1273302, 2016.

Chen, "Immune checkpoint inhibitors for nonsmall cell lung cancer treatment", J. Chin Med Assoc 80(1): 7-14, 2017.

Cheng et al., "Molecular genetic analysis of ovarian serous cystadenomas", Laboratory investigation; a journal of technical methods and pathology 84, 778-784, 2004.

Cheng et al., "TERT Promoter Mutations Occur Frequently in Urothelial Papilloma and Papillary Urothelial Neoplasm of Low Malignant Potential.", Eur Urol 71 :497-498, 2017.

Chetverina et al., "Molecular colony diagnostics: detection and quantitation of viral nucleic acids by in-gel PCR.", Biotechniques 33: 150-152, 154, 156, 2002.

Cheung et al., "High frequency of PIK3R1 and PIK3R2 mutations in endometrial cancer elucidates a novel mechanism for regulation of PTEN protein stability.", Cancer Discov 1, 170-185, 2011.

Chinese Office Action issued Mar. 3, 2017 in Chinese Application No. 201380068411.8, 19 pages.

Chiu et al., "Noninvasive prenatal diagnosis of fetal chromosomal aneuploidy by massively parallel genomic sequencing of DNA in maternal plasma", Proc Natl Acad Sci US A 105: 20458-20463, 2008.

Christensen et al., "Functional ovarian cysts in premenopausal and gynecologically healthy women", Contraception 66, 153-157, 2002.

Chu et al., "Phase I trial of novel kinesin spindle protein (KSP) inhibitor SB-715992 IV Q 21 days," J. Clin. Oncol., 2004, 22:14S, abstr 2078.

Chung et al., "A whole-genome mouse BAC microarray with 1-Mb resolution for analysis of DNA copy number changes by array comparative genomic hybridization.", Genome Res. 14(1): 188-196, 2004.

Clarke-Pearson, "Clinical Practice, Screening for ovarian cancer.", N Engl J Med., 361(2): 170-177, 2009.

Cobb et al., "Adenocarcinoma of Mullerian origin: review of pathogenesis, molecular biology, and emerging treatment paradigms" Gynecologic Oncology Research and Practice, May 12, 2015 (online), vol. 5, pp. 1-16.

Cohen et al., "Combined circulating tumor DNA and protein biomarker-based liquid biopsy for the earlier detection of pancreatic cancers", PNAS, vol. 114, No. 38, 10202-10207, 2017.

Cohen et al., "Detection and localization of surgically resectable cancers with a multi-analyte blood test", Science, 359(6378): 926-930, 2018.

Cohen et al., "Detection of low-frequency DNA variants by targeted sequencing of the Watson and Crick strands," Nature Biotechnology, May 3, 2021, 39(10):1220-1227.

Cole et al., "Working paper No. 3 Somatic mutant frequency, mutation rates and mutational spectra in the human population in vivo", Mutat Res 304: 33-105, 1994.

Color Hereditary Cancer Test, "A pathogenic mutation was identified in the BRCA1 gene," tm Clinical Grade testing (www.color.com), 2015, 1-12.

Conner et al., "Outcome of unexpected adnexal neoplasia discovered during risk reduction salpingo-oophorectomy in women with germ-line BRCA1 or BRCA2 mutations.", Gynecol Oncol 132: 280-6, 2014.

Coombs et al., "Therapy-Related Clonal Hematopoiesis in Patients with Non-hematologic Cancers Is Common and Associated with Adverse Clinical Outcomes", Cell Stem Cell 21(3): 374-382, 2017.

Cooper et al., "Endometrial sampling techniques in the diagnosis of abnormal uterine bleeding.", Obstet Gynecol Clin North Am 27, 235-244, 2000.

Corona et al., "CDK4/6 inhibitors in HER2-positive breast cancer", Cri Rev Oncol Hematol 112: 208-214, 2017.

Cortes et al., "Support-Vector Networks", Machine learning 20: 273-297, 1995.

Costello et al., "Discovery and characterization of artifactual mutations in deep coverage targeted capture sequencing data due to oxidative DNA damage during sample preparation.", Nucleic acids research 41: e67, 2013.

(56) References Cited

OTHER PUBLICATIONS

Cowan et al., "Detection of TERT promoter mutations in primary adenocarcinoma of the urinary bladder.", Hum Pathol., 53: 8-13, 2016.
Craig et al., "Identification of genetic variants using bar-coded multiplexed sequencing.", Nat Methods 5: 887-893, 2008.
Cree et al., "The evidence base for circulating tumour DNA blood-based biomarkers for the early detection of cancer: a systematic mapping review", BMC Cancer, 17: 697, 1-17, 2017.
Cruz et al., "Absence of BRAF and NRAS mutations in uveal melanoma", Cancer research 63, 5761-5766, 2003.
Cunningham et al., Cetuximab Monotherapy and Cetuximab plus Irinotecan in Irinotecan-Refractory Metastatic Colorectal Cancer, N. Engl. J. Med., 2004, 351(4):337-345.
Cypris et al., "Chicken or Egg: Is Clonal Hematopoiesis Primarily Caused by Genetic or Epigenetic Aberrations?," Front. Genet., 2019, 10:785.
D'Souza et al., "Tumor characterization by ultrasound-release of multiple protein and microRNA biomarkers, preclinical and clinical evidence", PLOS One, 1-17 pp. 2018.
Dalma-Weiszhausz et al., "The affymetrix GeneChip platform: an overview.", Methods Enzymol. 410: 3-28, 2006.
Darragh et al., "Tumor Detection by Imaging Proteolytic Activity", Cancer Res 70: 1505-12, 2010.
Davies et al., "Mutations of the BRAF gene in human cancer", Nature 417, 949-954, 2002.
Davis et al., "Diagnosis, evaluation and follow-up of asymptomatic microhematuria (AMH) in adults: AUA guideline.", J Urol 188: 2473-2481, 2012.
Dawson et al., "Analysis of Circulating Tumor DNA to Monitor Metastatic Breast Cancer", N Engl J Med 368(13): 1199-1209, 2013.
De Boer et al., "An in vitro assay for frameshift mutations: hotspots for deletions of 1 bp by Klenow-fragment polymerase share a consensus DNA sequence.", Genetics 118: 181-191, 1988.
De Vos et al., "Novel PMS2 Pseudogenes Can Conceal Recessive Mutations Causing a Distinctive Childhood Cancer Syndrome", American journal of human genetic, 74: 954-964, 2004.
Demeure et al., "Whole-genome Sequencing of an Aggressive BRAF Wild-type Papillary Thyroid Cancer Identified EML4-ALK Translocation as a Therapeutic Target", World J Surg., 38: 1296-305, 2014.
Demirol et al., "Effect of endometrioma cystectomy on IVF outcome: a prospective randomized study", Reproductive biomedicine online 12, 639-643, 2006.
DeRisi et al., "Use of a cDNA microarray to analyse gene expression patterns in human cancer.", Nat. Genet. 14: 457-460, 1996.
DeSimone et al., "Rate of pathology from atypical glandular cell Pap tests classified by the Bethesda 2001 nomenclature.", Obstet Gynecol 107, 1285-1291, 2006.
Di Renzo et al., "Expression of the Met/Hepatocyte Growth Factor Receptor in Human Pancreatic Cancer", Cancer Res 55(5): 1129-1138, 1995.
Di Renzo et al., "Overexpression and amplification of the met/HGF receptor gene during the progression of colorectal cancer.", Clin Cancer Res 1(2): 147-154, 1995.
Diehl et al., "Analysis of mutations in DNA isolated from plasma and stool of colorectal cancer patients." Gastroenterology 135: 489-498, 2008.
Diehl et al., "Detection and quantification of mutations in the plasma of patients with colorectal tumors", Proceedings of the National Academy of Sciences of the United States of America, 102: 16368-16373, 2005.
Dimashkieh et al., "Evaluation of UroVysion and Cytology for Bladder Cancer Detection", Cancer Cytopathol 121: 591-597, 2013.
Dinkelspiel et al., "Long-term mortality among women with epithelial ovarian cancer.", Gynecologic oncology 138: 421-8, 2015.
Dizon et al., "A Phase II Evaluation of Belinostat and Carboplatin in the Treatment of Recurrent or Persistent Platinum-Resistant Ovarian, Fallopian Tube, or Primary Peritoneal Carcinoma: A Gynecologic Oncology Group Study", Gynecol. Oncol. 125(2): 367-371, 2012.
Dizon et al., "Phase II Activity of Belinostat (PXD-101), Carboplatin, and Paclitaxel in Women With Previously Treated Ovarian Cancer", Int J. Gynecol. Cancer 23(3): 533-539, 2012.
Dohm et al., "Substantial biases in ultrashort read data sets from high-throughput DNA sequencing.", Nucleic Acids Res 36:e105, 2008.
Dokianakis et al., "Ras gene activation in malignant cells of human ovarian carcinoma peritoneal fluids," Clin & Exp. Metastasis, 1999, 17(4):293-297.
Dong et al., "Combining markers with and without the limit of detection.", Stat Med 33(8): 1307-1320, 2014.
Douville et al., "Assessing aneuploidy with repetitive element sequencing.," bioRxiv, 2019, 660258.
Douville et al., "Detection of aneuploidy in patients with cancer through amplification of long interspersed nucleotide elements (LINEs)", PNAS, vol. 115, No. 8, 1871-1876, 2018.
Dressman et al., "Transforming single DNA molecules into fluorescent magnetic particles for detection and enumeration of genetic variations," Proc Natl Acad Sci US A 100(15): 8817-8822, 2003.
Drevis et al., "Phase I Clinical Study of AZD2171, an Oral Vascular Endothelial Growth Factor Signaling Inhibitor, in Patients With Advanced Solid Tumors", 25: 3045-2054, 2007.
Druley et al., "Quantification of rare allelic variants from pooled genomic DNA.", Nat Methods 6: 263-265, 2009.
Duke et al., "Transvaginal aspiration of ovarian cysts: long-term follow-up", Cardiovascular and interventional radiology 29, 401-405, 2006.
Durbin et al., "A map of human genome variation from population-scale sequencing.", Nature 467:1061-1073, 2010.
Dy et al., "Long-Term Survivors of Metastatic Colorectal Cancer Treated with Systemic Chemotherapy Alone: A North Central Cancer Treatment Group Review of 3811 Patients, N0144", Clin Colorectal Cancer 8(2): 88-93, 2009.
Eastman et al., "Maternal viral genotypic zidovudine resistance and infrequent failure of zidovudine therapy to prevent perinatal transmission of human immunodeficiency virus type 1 in pediatric AIDS Clinical Trials Group Protocol 076.", J Infect Dis 177:557-564, 1998.
Eberle et al., "Immunoguided laser assisted microdissection techniques for DNA methylation analysis of archival tissue specimens.", The Journal of molecular diagnostics: JMD 12: 394-401, 2010.
Eckert et al., "Genomics of Ovarian Cancer Progression Reveals Diverse Metastatic Trajectories Including Intraepithelial Metastasis to the Fallopian Tube," Cancer Discov., 2016, 6(12):1342-1351.
Eckert et al., "High fidelity DNA synthesis by the Thermus aquaticus DNA polymerase.", Nucleic Acids Res 18: 3739-3744, 1990.
Egawa et al., "Clinicopathological aspects of small pancreatic cancer. Pancreas", 28(3): 235-240, 2004.
Ehab et al., "Profile of palbociclib in the treatment of metastatic breast cancer", Breast Cancer 8: 83-91, 2016.
Eid et al., "Real-time DNA sequencing from single polymerase molecules", Science 323: 133-138, 2009.
Eliassen et al., "Urinary Estrogens and Estrogen Metabolites and Subsequent Risk of Breast Cancer among Premenopausal Women", Cancer Research, vol. 72, issue 3, 696-706, 2012.
Ellinger et al., "Epigenetic biomarkers in the blood of patients with urological malignancies", Expert Rev Mal Diagn 15: 505-516, 2015.
Ellis et al., "Immune Checkpoint Inhibitors for Patients With Advanced NoneSmall-Cell Lung Cancer: A Systematic Review", Clin Lung Cancer pii: S1525-7304(17)30043-8, 2017.
Elmasry et al., "Genetic mutations in gynaecological cancers," Reviews in Gynaecology and Perinatal Practice, vol. 6, No. 3-4, pp. 115-125, 2006.
Eloubeidi et al., "Endoscopic ultrasound-guided fine needle aspiration biopsy of patients with suspected pancreatic cancer: diagnostic accuracy and acute and 30-day complications.", The American journal of gastroenterology 98, 2663-2668, 2003.

(56) References Cited

OTHER PUBLICATIONS

El-Tanani et al., "The regulation and role of osteopontin in malignant transformation and cancer.", Cytokine Growth Factor Rev 17(6): 463-474, 2006.
Elzek et al., "Proteomics of ovarian cancer: functional insights and clinical applications", Cancer Metastasis Rev., 34(1): 83-96, 2015.
Erickson et al., "Detection of somatic TP53 mutations in tampons of patients with high-grade serous ovarian cancer.", Obstetrics and gynecology 124, 881-885, 2014.
Erlich et al., "Alta-Cyclic: a self-optimizing base caller for next-generation sequencing.", Nat Methods 5: 679-682, 2008.
Ernani et al., "Agilent's SureSelect Target Enrichment System: Brining Cost and Process Efficiency to Next-Generation Sequencing," Agilent Technologies—Product Notes, pp. 1-8, 2009.
Ethier et al., "Bone Modifier Use as Adjuvant Therapy for Early Breast Cancer", Curr Oncol Rep 19(3): 15, 2017.
European Office Action issued in related European Application No. 13851273.6, dated Apr. 19, 2017, 8 pages.
European Search Report issued in European Application No. 21173115.3, dated Oct. 12, 2021, 9 pages.
Extended European Search Report in Application No. 18193794.7, dated Dec. 19, 2018, 7 pages.
Extended European Search Report issued in related European Application No. 12772013.4, dated Sep. 17, 2014, 6 pages.
Extended European Search Report issued in related European Application No. 13851273.6, dated Jun. 1, 2016, 14 pages.
Extended European Search Report issued in related European Application No. 17154750.8, dated Aug. 17, 2017, 16 pages.
Extended Search Report in European Appln. No. 21753424.7, mailed on Feb. 12, 2024, 10 pages.
Faias et al., "Clinical Impact of KRAS and GNAS Analysis Added to CEA and Cytology in Pancreatic Cystic Fluid Obtained by EUS-FNA", Digestive Diseases and Sciences, vol. 63, No. 9, pp. 2351-2361, 2018.
Falchook et al., "Methylation and histone deacetylase inhibition in combination with platinum treatment in patients with advanced malignancies", Investig. New Drugs 31(5): 1192-1200, 2013.
Falconer et al., "Ovarian cancer risk after salpingectomy: a nationwide population-based study.", J. Natl. Cancer Inst., 107, vol. 2, 2015.
Falzoi et al., "Multiplex genotyping of CYP3A4, CYP3A5, CYP2C9 and CYP2C19 SNPs using MALDI-TOF mass spectrometry", Pharmacogenomics 11: 559-571, 2010.
Fan et al., "Noninvasive diagnosis of fetal aneuploidy by shotgun sequencing DNA from maternal blood.", Proc Natl Acad Sci US A 105: 16266-16271, 2008.
Ferlay et al., "Cancer incidence and mortality patterns in Europe: estimates for 40 countries in 2012.", European Journal of cancer 49: 1374-403, 2013.
Finn et al., "Palbociclib and Letrozole in Advanced Breast Cancer", N Eng J Med 375: 1925-1936, 2016.
Fishman et al., "The role of ultrasound evaluation in the detection of early-stage epithelial ovarian cancer.", Am J Obstet Gynecol 192, 1214-1221; discussion 1221-1212, 2005.
Fong et al., "Inhibition of poly(ADP-ribose) polymerase in tumors from BRCA mutation carriers.", N Engl J Med 361: 123-134, 2009.
Forbes et al., "COSMIC: mining complete cancer genomes in the Catalogue of Somatic Mutations in Cancer.", Nucleic Acids Res 39, D945-950, 2011.
Forbes et al., "COSMIC: somatic cancer genetics at high-resolution", Nucleic Acids Res 45: D777-D783, 2017.
Forshew et al., "Noninvasive identification and monitoring of cancer mutations by targeted deep sequencing of plasma DNA", Sci Transl Med; 4: 136ra68, 2012.
Fradet et al., "Performance characteristics of a new monoclonal antibody test for bladder cancer: ImmunoCyt trade mark.", Can J Urol 4: 400-405, 1997 Abstract.
Friedman et al., "Regularization Paths for Generalized Linear Models via Coordinate Descent", Journal of Statistical Software 33 :74862, 22 pages, 2010.
Frokjaer et al., "Fibrosis, atrophy, and ductal pathology in chronic pancreatitis are associated with pancreatic function but independent of symptoms.", Pancreas 42(7): 1182-1187, 2013.
Frossard et al., "Performance of endosonography-guided fine needle aspiration and biopsy in the diagnosis of pancreatic cystic lesions", The american journal of gastroenterology 98, 1516-1524, 2003.
Fu et al., "Phase 1b-2a study to reverse platinum resistance through use of a hypomethylating agent, azacitidine, in patients with platinum-resistant or platinum-refractory epithelial ovarian cancer.", Cancer 117(8): 1661-1669, 2011.
Fujiwara et al., "Evaluation of Matrix Metalloproteinase-2 (MMP-2) Activity with Film in situ Zymography for Improved Cytological Diagnosis of Breast Tumors", Breast cancer 13: 272-8, 2006.
Fukagawa et al., "MicroRNA-135a-3p as a promising biomarker and nucleic acid therapeutic agent for ovarian cancer", Cancer Science, 108, 886-896, 2017.
Fullwood et al., "Next-generation DNA sequencing of paired-end tags (PET) for transcriptome and genome analyses" Genome Research, 19: 521-532, 2009.
Gam, "Breast cancer and protein biomarkers", World J. Exp. Med. 2(5): 86-91, 2012.
Gangi et al., "Metabolomic profile in pancreatic cancer patients: a consensus based approach to identify highly discriminating metabolites", Oncotarget, 7(5):5815-5829, 2016.
Gardner et al., "Evaluation of a 27-gene inherited cancer panel across 630 consecutive patients referred for testing in a clinical diagnostic laboratory," Hereditary Cancer in Clinical Practice, 2018, 16(1):1-10.
Gasi et al., "Overexpression of Full-Length ETVI Transcripts in Clinical Prostate Cancer Due to Gene Translocation", PLOS One, vol. 6, issue 1, e16332, 7 pages, 2011.
Gaspari et al. "Fetal ovarian cysts: an early manifestation of McCune-Albright syndrome?," Prenatal Diagnosis, 2012, 32:859-863.
Geier et al., "Clinical evaluation of atypical glandular cells of undetermined significance.", Am. J. Obstet Gynecol. 184, 64-69, 2001.
Geldenhuys et al., "Sensitivity and specificity of the Pap smear for glandular lesions of the cervix and endometrium.", Acta cytologica 51, 4 7-50, 2007.
Gelmon et al., "Olaparib in patients with recurrent high-grade serous or poorly differentiated ovarian carcinoma or triple-negative breast cancer: a phase 2, multicentre, open-label, non-randomised study", Lancet Oncol. 12: 852-61, 2011.
GenBank Accession No. NM_ 006218, "*Homo sapiens* phosphatidylinositol-4,5-bisphosphate 3-kinase catalytic subunit alpha (PIK3CA), mRNA," Feb. 16, 2020, 7 pages.
GenBank Accession No. NM_ 058197, "*Homo sapiens* cyclin dependent kinase inhibitor 2A (CDKN2A), transcript variant 3, mRNA," Dec. 29, 2019, 5 pages.
GenBank Accession No. NM_000546, "*Homo sapiens* tumor protein p53 (TP53), transcript variant 1, mRNA," Feb. 13, 2020, 11 pages.
GenBank Accession No. NM_001126112, "*Homo sapiens* tumor protein p53 (TP53), transcript variant 2, mRNA," Dec. 28, 2019, 11 pages.
GenBank Accession No. NM_001126113, "*Homo sapiens* tumor protein p53 (TP53), transcript variant 4, mRNA," Dec. 8, 2019, 6 pages.
GenBank Accession No. NM_001126114, "*Homo sapiens* tumor protein p53 (TP53), transcript variant 3, mRNA," Dec. 29, 2019, 9 pages.
GenBank Accession No. NM_001276761, "*Homo sapiens* tumor protein p53 (TP53), transcript variant 2, mRNA," Dec. 23, 2019, 5 pages.
GenBank Accession No. NM000077, "*Homo sapiens* cyclin dependent kinase inhibitor 2A (CDKN2A), transcript variant 1, mRNA", dated Oct. 21, 2018, 7 pages.
GenBank Accession No. NM000142, "*Homo sapiens* fibroblast growth factor receptor 3 (FGFR3), transcript variant 1, mRNA", dated Dec. 23, 2018, 8 pages.

(56) References Cited

OTHER PUBLICATIONS

GenBank Accession No. NM000245, "*Homo sapiens* MET proto-oncogene, receptor tyrosine kinase (MET), transcript variant 2, mRNA", dated Jan. 13, 2019, 7 pages.
GenBank Accession No. NM000551, "*Homo sapiens* von Hippel-Lindau tumor suppressor (VHL), transcript variant 1, mRNA", dated Dec. 23, 2018, 7 pages.
GenBank Accession No. NM001005862, "*Homo sapiens* erb-b2 receptor tyrosine kinase 2 (ERBB2), transcript variant 2, mRNA", dated Jan. 13, 2019, 8 pages.
GenBank Accession No. NM001127500, "*Homo sapiens* MET proto-oncogene, receptor tyrosine kinase (MET), transcript variant 1, mRNA", dated Jan. 13, 2019, 7 pages.
GenBank Accession No. NM001130442, "*Homo sapiens* HRas proto-oncogene, GTPase (HRAS), transcript variant 3, mRNA", dated Dec. 23, 2018, 5 pages.
GenBank Accession No. NM001163213, "*Homo sapiens* fibroblast growth factor receptor 3 (FGFR3), transcript variant 3, mRNA", dated Dec. 23, 2018, 7 pages.
GenBank Accession No. NM001195132, "*Homo sapiens* cyclin dependent kinase inhibitor 2A (CDKN2A), transcript variant 5, mRNA", dated Oct. 21, 2018, 7 pages.
GenBank Accession No. NM001289936, "*Homo sapiens* erb-b2 receptor tyrosine kinase 2 (ERBB2), transcript variant 3, mRNA", dated Jan. 13, 2019, 8 pages.
GenBank Accession No. NM001289937, "*Homo sapiens* erb-b2 receptor tyrosine kinase 2 (ERBB2), transcript variant 4, mRNA", dated Jan. 13, 2019, 8 pages.
GenBank Accession No. NM001289938, "*Homo sapiens* erb-b2 receptor tyrosine kinase 2 (ERBB2), transcript variant 5, mRNA", dated Jan. 13, 2019, 6 pages.
GenBank Accession No. NM001318054, "*Homo sapiens* HRas proto-oncogene, GTPase (HRAS), transcript variant 4, mRNA", dated Dec. 23, 2018, 5 pages.
GenBank Accession No. NM001324401, "*Homo sapiens* MET proto-oncogene, receptor tyrosine kinase (MET), transcript variant 3, mRNA", dated Jan. 13, 2019, 5 pages.
GenBank Accession No. NM001324402, "*Homo sapiens* MET proto-oncogene, receptor tyrosine kinase (MET), transcript variant 4, mRNA", dated Jan. 13, 2019, 6 pages.
GenBank Accession No. NM001354723, "*Homo sapiens* von Hippel-Lindau tumor suppressor (VHL), transcript variant 3, mRNA", dated Dec. 23, 2018, 4 pages.
GenBank Accession No. NM001354809, "*Homo sapiens* fibroblast growth factor receptor 3 (FGFR3), transcript variant 4, mRNA", dated Dec. 23, 2018, 6 pages.
GenBank Accession No. NM001354810, "*Homo sapiens* fibroblast growth factor receptor 3 (FGFR3), transcript variant 5, mRNA", dated Dec. 23, 2018, 6 pages.
GenBank Accession No. NM003482, "*Homo sapiens* lysine methyltransferase 2D (KMT2D), mRNA", dated Jan. 13, 2019, 21 pages.
GenBank Accession No. NM004448, "*Homo sapiens* erb-b2 receptor tyrosine kinase 2 (ERBB2), transcript variant 1, mRNA", dated Jan. 13, 2019, 10 pages.
GenBank Accession No. NM004985, "*Homo sapiens* KRAS proto-oncogene, GTPase (KRAS), transcript variant b, mRNA", dated Jan. 13, 2019, 7 pages.
GenBank Accession No. NM005343, "*Homo sapiens* HRas proto-oncogene, GTPase (HRAS), transcript variant 1, mRNA", dated Dec. 29, 2018, 5 pages.
GenBank Accession No. NM022965, "*Homo sapiens* fibroblast growth factor receptor 3 (FGFR3), transcript variant 2, mRNA", dated Dec. 23, 2018, 6 pages.
GenBank Accession No. NM033360, "*Homo sapiens* KRAS proto-oncogene, GTPase (KRAS), transcript variant a, mRNA", dated Jan. 13, 2019, 8 pages.
GenBank Accession No. NM058195, "*Homo sapiens* cyclin dependent kinase inhibitor 2A (CDKN2A), transcript variant 4, mRNA", dated Aug. 4, 2018, 6 pages.
GenBank Accession No. NM058196, "*Homo sapiens* cyclin-dependent kinase inhibitor 2A (melanoma, p16, inhibits CDK4) (CDKN2A), transcript variant 2, mRNA", dated Dec. 21, 2003, 19 pages.
GenBank Accession No. NM176795, "*Homo sapiens* HRas proto-oncogene, GTPase (HRAS), transcript variant 2, mRNA", dated Dec. 23, 2018, 5 pages.
GenBank Accession No. NM198156, "*Homo sapiens* von Hippel-Lindau tumor suppressor (VHL), transcript variant 2, mRNA", dated Dec. 23, 2018, 7 pages.
GenBank Release Note v. 220, p. 1 (Jun. 2017).
Geng et al., "Function and clinical significance of circRNAs in solid tumors", Journal of Hematology and Oncology, 11; 98, 20 pages, 2018.
Genovese et al., "Clonal hematopoiesis and blood-cancer risk inferred from blood DNA sequence.", N Engl J Med 371(26): 2477-2487, 2014.
Gerlinger et al., "Intratumor heterogeneity and branched evolution revealed by multiregion sequencing.", N Engl J Med 366, 883-892, 2012.
Ghosh et al., "Quantifying the sensitivities of EGF receptor (EGFR) tyrosine kinase inhibitors in drug resistant non-small cell lung cancer (NSCLC) cells using hydrogel-based peptide array.", Biosensors & Bioelectronics 26: 424-31, 2010.
Giacona et al., "Cell-free DNA in human blood plasma: length measurements in patients with pancreatic cancer and healthy controls.", Pancreas 17: 89-97, 1998.
Gilbert et al., "Assessment of symptomatic women for early diagnosis of ovarian cancer: results from the prospective DOVE pilot project.", The Lancet. Oncology 13, 285-291, 2012.
Giligan et al., "American Society of Clinical Oncology Clinical Practice Guideline on uses of serum tumor markers in adult males with germ cell tumors.", J. Clin. Oncol. 28: 3388-3404, 2010.
Giraldez et al., "Droplet Digital PCR for Absolute Quantification of Extracellular MicroRNAs in Plasma and Serum: Quantification of the Cancer Biomarker hsa-miR-141.", Methods Mol. Biol., 1768: 459-74, 2018.
Gomez et al., "Efficacy and safety of lapatinib as first-line therapy for ErbB2-amplified locally advanced or metastatic breast cancer.", J Clin Oncol 26: 2999-3005, 2008.
Gong et al., "Efficacy and safety of everolimus in Chinese metastatic HR positive, HER2 negative breast cancer patients: a real-world retrospective study", Oncotarget, 8(35): 59810-59822, 2017.
Gonzalez-Pons "Colorectal Cancer Biomarkers: Where Are We Now?", Biomed. Res. Int. 2015: 149014, 2015.
Goodison et al., "A multi-analyte assay for the non-invasive detection of bladder cancer.", PLoS One, 7: e47469, 2012.
Gopalakrishna et al., "Anticipatory Positive Urine Tests for Bladder Cancer.", Ann Surg Oncol., 24: 1747-1753, 2017.
Gore et al., "Somatic coding mutations in human induced pluripotent stem cells.", Nature 471: 63-67, 2011.
Grisham et al., "BRAF mutation is associated with early stage disease and improved outcome in patients with low-grade serous ovarian cancer", Cancer 119, 548-554, 2013.
Grist et al., "In vivo human somatic mutation: frequency and spectrum with age.", Mutat Res 266: 189-196, 1992.
Grollman et al., "Aristolochic acid nephropathy: Harbinger of a global iatrogenic disease.", Environ Mal Mutagen, 54(1): 1-7, 2013.
Gruenberger et al., "Bevacizumab, Capecitabine, and Oxaliplatin As Neoadjuvant Therapy for Patients With Potentially Curable Metastatic Colorectal Cancer", J. Clin. Oncol. 26: 1830-1835, 2008.
Gudmundsson et al. "Genome-Wide Association and Replication Studies Identify Four Variants Associated with Prostate Cancer Susceptibility," Nat. Genet. 2009 41:1122-6.
Guetschow et al., "Detection of prolactin inducible protein mRNA, a biomarker for breast cancer metastasis, using a molecular beacon-based assay.", Anal. Bioanaly. Chem., 404: 399-406, 2012.
Gunderson et al., "Oncologic and reproductive outcomes with progestin therapy in women with endometrial hyperplasia and grade 1 adenocarcinoma: a systematic review," Gynecol Oncol 125, 477-482, 2012.

(56) References Cited

OTHER PUBLICATIONS

Haber et al. "Blood-based analyses of cancer: circulating tumor cells and circulating tumor DNA," Cancer Discov, 2014, 4(6):650-661.
Hajdinjak, "UroVysion FISH test for detecting urothelial cancers: meta-analysis of diagnostic accuracy and comparison with urinary cytology testing.", Urol Oncol 26: 646-651, 2008.
Halama et al., "Nesting of colon and ovarian cancer cells in the endothelial niche is associated with alterations in glycan and lipid metabolism", Scientific Reports, 7:39999, 10 pages, 2017.
Hall et al., "Linkage of Early-Onset Familial Breast Cancer to Chromosome 17q21", Science 250: 1684-1689, 1990.
Hamanishi et al., "Safety and Antitumor Activity of Anti-PD-1 Antibody, Nivolumab, in Patients With Platinum-Resistant Ovarian Cancer.", J. Clin. Oncol. 33(34): 4015-4022, 2015.
Hamilton et al., "The Molecular Basis of Turcot's Syndrome", The New England Journal of Medicine 332: 839-847, 1995.
Hamilton et al., "Uterine papillary serous and clear cell carcinomas predict for poorer survival compared to grade 3 endometrioid corpus cancers", British journal of cancer 94: 642-646, 2006.
Hannady et al., "Error-correcting barcoded primers for pyrosequencing hundreds of samples in multiplex," Nature Meth., 2007, 5:1-36.
Hannady et al., "Error-correcting barcoded primers for pyrosequencing hundreds of samples in multiplex," Nature Meth., 2007, 5:235-237.
Hare et al., "mTOR function and therapeutic targeting in breast cancer", Am J Cancer Res 7(3): 383-404, 2017.
Harris et al., "American Society of Clinical Oncology 2007 Update of Recommendations for the Use of Tumor Markers in Breast Cancer", J. Clin. Oncol. 25: 5287-5312, 2007.
Havrilesky et al., "Predictors of clinical outcomes in the laparoscopic management of adnexal masses.", Obstetrics and gynecology 102, 243-251, 2003.
He et al., "Heteroplasmic mitochondrial DNA mutations in normal and tumour cells.", Nature 464: 610-614, 2010.
He et al., "IgH gene rearrangements as plasma biomarkers in Non-Hodgkin's lymphoma patients.", Oncotarget 2, 178-185, 2011.
Hecht et al., "A randomized, double-blind, placebo-controlled, phase III study in patients (Pts) with metastatic adenocarcinoma of the colon or rectum receiving fifirst-line chemotherapy with oxaliplatin/5-flfluorouracil/leucovorin and PTK787/ZK 222584 or placebo (Confirm-1)", ASCO Annual Meeting Proceedings J. Clin. Oncol. 23: 16S, abstr. LBA3, 2005.
Heitzer et al., "Current and future perspectives of liquid biopsies in genomics-driven oncology", Nature Reviews Genetics, 2018, 20(2):71-88.
Hellmann et al., "Nivolumab plus ipilimumab as first-line treatment for advanced non-small-cell lung cancer (CheckMate 012): results of an open-label, phase 1, multicohort study", Lancet Oncol. 18(1): 31-41, 2017.
Hellstrom et al., "The HE4 (WFDC2) protein is a biomarker for ovarian carcinoma", Cancer research 63, 3695-3700, 2003.
Hennessy et al., "Ovarian cancer," Lancet, vol. 374, Oct. 17, 2009, 1373-82.
Henrique et al., "DNA hypomethylation in plasma as a cancer biomarker: when less is more?", Expert Rev. Mol. Diagn., 14: 419-22, 2014.
Henry et al., "Cancer biomarkers", Mol. Oncol. 6: 140-146, 2012.
Herbst et al., "Lung cancer.", N Engl J Med, 359(13): 1367-1380, 2008.
Herman et al., "Filter-based hybridization capture of subgenomes enables resequencing and copy-number detection.", Nat Methods 6: 507-510, 2009.
Hiatt et al., "Parallel, tag-directed assembly of locally derived short sequence reads.", Nat Methods, (7) 119-122, 2010.
Hiatt et al., "Single molecule molecular inversion probes for targeted, high-accuracy detection of low-frequency variation.", Genome research 23, 843-854, 2013.
Hilger et al., "Laparoscopic management of the adnexal mass.", Clinical obstetrics and gynecology 49, 535-548, 2006.

Hoang et al., "Mutational signature of aristolochic acid exposure as revealed by whole-exome sequencing", 2013 Science translational medicine 5:197ra102.
Hodges et al., "High definition profiling of mammalian DNA methylation by array capture and single molecule bisulfite sequencing," Genome Research, 19: 1593-1605, 2009.
Hoffmann et al., "DNA bar coding and pyrosequencing to identify rare HIV drug resistance mutations," Nucleic Acids Res., 2007, 35:13: e91 1-8.
Hogenbirk et al., "Defining chromosomal translocation risks in cancer", PNAS, E3649-E3656, 2016.
Hoque et al., "High-throughput molecular analysis of urine sediment for the detection of bladder cancer by high-density single-nucleotide polymorphism array.", Cancer Res 63: 5723-5726, 2003.
Horn et al., "TERT promoter mutations in familial and sporadic melanoma." Science 339: 959-961, 2013.
Hosein et al., "Evaluating the repair of DNA derived from formalin-fixed paraffin-embedded tissues prior to genomic profiling by SNP-CGH analysis", Lab. Invest., 93, 701-710, 2013.
Hosgood et al., "Mitochondrial DNA copy number and lung cancer risk in a prospective cohort study", Carcinogen., 31: 847-9, 2010.
Howlader et al., SEER Cancer Statistics Review, 1975-2009, National Cancer Institute Bethesda, MD, 2012.
Hsieh et al., "Prescription profile of potentially aristolochic acid containing Chinese herbal products: an analysis of National Health Insurance data in Taiwan between 1997 and 2003", Chin Med, 3:13, 6 pages, 2008.
Huang et al., "Comparison of Central HER2 Testing With Quantitative Total HER2 Expression and HER2 Homodimer Measurements Using a Novel Proximity-Based Assay", Am. J. Clin. Pathol. 134: 303-11, 2010.
Huang et al., "Highly recurrent TERT promoter mutations in human melanoma.", Science 339: 957-959, 2013.
Huang et al., "T-cell invigoration to tumour burden ratio associated with antiPD-1 response.", Nature 545(7652): 60-65, 2017.
Huber et al., "High-Resolution Liquid Chromatography of DNA Fragments on Non-Porous Poly(Styrene-Divinylbenzene) Particles," Nucleic Acids Res., 1993, 21:1061-6.
Hug et al., "Measurement of the number of molecules of a single mRNA species in a complex mRNA preparation," J. theor. Biol., 2003,221:615-624.
Hughes et al., "Expression profiling using microarrays fabricated by an ink-jet oligonucleotide synthesizer.", Nat. Biotechnol. 19(4): 342-347, 2001.
Hui et al., "Pembrolizumab as first-line therapy for patients with PD-L1-positive advanced non-small cell lung cancer: a phase 1 trial", Ann Oncol 28(4): 874-881, 2017.
Hun et al., "Systems approach to characterize the metabolism of liver cancer stem cells expressing CD133", Sci. Rep. 7: 45557, 2017.
Huntsman et al. "MLL2, the second human homolog of the *Drosophila trithorax* gene, maps to 19q13.1 and is amplified in solid tumor cell lines," Oncogene, 18, 7975-7984, 1999.
Hurst et al., "Comprehensive mutation analysis of the TERT promoter in bladder cancer and detection of mutations in voided urine.", Eur Urol 65: 367-369, 2014.
Hurwitz et al., "Bevacizumab plus Irinotecan, Fluorouracil, and Leucovorin for Metastatic Colorectal Cancer", N. Engl. J. Med. 350: 2335-2342, 2004.
Ikediobi et al., "Mutation analysis of 24 known cancer genes in the NCI-60 cell line set,", Molecular Cancer Therapeutics, 5(11), 2006.
Ikematsu et al., "Serum midkine levels are increased in patients with various types of carcinomas". Br J Cancer 83(6): 701-706, 2000.
Ingvarsson et al., "Detection of pancreatic cancer using antibody microarray-based serum protein profiling.", Proteomics 8: 2211-9, 2008.
Innis et al., "Protocols for functional genomics" PCR application, (1999).
Insinga et al., "Diagnoses and outcomes in cervical cancer screening: a population-based study.", Am. J. Obstet. Gynecol. 191, 105-113, 2004.

(56) References Cited

OTHER PUBLICATIONS

International Preliminary Report on Patentability in International Application No. PCT/US2021/017937, mailed on Aug. 25, 2022, 12 pages.
International Preliminary Report on Patentability in International Appln. No. PCT/US2012/033207, dated Oct. 15, 2013, 6 pages.
International Preliminary Report on Patentability in International Appln. No. PCT/US2018/022664, dated Sep. 24, 2019, 9 pages.
International Preliminary Report on Patentability in International Appln. No. PCT/US2022/40174, mailed on Feb. 13, 2024, 8 pages.
International Preliminary Report on Patentability in International Appln. No. PCT/US2023/012290, mailed Aug. 15, 2024, 8 pages.
International Preliminary Report on Patentability in PCT Appln. No. PCT/US2018/045669, dated Feb. 11, 2020, 7 pages.
International Preliminary Report on Patentability issued in PCT/US2013/065342. issued May 5, 2015, 7 pages.
International Search Report and Written Opinion for PCT/US2013/065342, mailed Apr. 1, 2014, 11 pages.
International Search Report and Written Opinion in Appl. No. PCT/US2018/22664, dated Jul. 23, 2018, 14 pages.
International Search Report and Written Opinion in International Application No. PCT/US2012/033207, dated Nov. 28, 2012.
International Search Report and Written Opinion in International Application No. PCT/US2016/046453, dated Nov. 1, 2016, 11 pages.
International Search Report and Written Opinion in International Application No. PCT/US2017/061447, Feb. 19, 2018, 10 pages.
International Search Report and Written Opinion in International Application No. PCT/US2018/030905, dated Oct. 2, 2018, 23 pages.
International Search Report and Written Opinion in International Application No. PCT/US2018/045669, dated Nov. 28, 2018, 15 pages.
International Search Report and Written Opinion in International Application No. PCT/US2019/017973, dated May 17, 2019, 7 pages.
International Search Report and Written Opinion in International Application No. PCT/US2020/014172, dated Apr. 30, 2020, 18 pages.
International Search Report and Written Opinion in International Appln. No. PCT/US2021/017937, dated Jul. 22, 2021, 17 pages.
International Search Report and Written Opinion in International Appln. No. PCT/US2022/40174, mailed Oct. 28, 2022, 10 pages.
International Search Report and Written Opinion in International Appln. No. PCT/US2023/012290, mailed May 16, 2023, 14 pages.
Invitation to Pay additional Fees in Appln. No. PCT/US2021/17937, dated May 24, 2021, 3 pages.
Irizarry et al., "Summaries of Affymetrix GeneChip probe level data", Nucleic Acids Res 31, 4 :e15, 2003.
Isakoff et al., "P3-16-05: A Phase II Trial Expansion Cohort of the PARP Inhibitor Veliparib (ABT888) and Temozolomide in BRCA1/2 Associated Metastatic Breast Cancer.", Cancer Res 71: P3-16-05, 2011.
Ishikawa et al., "Minute carcinoma of the pancreas measuring 1 cm or less in diameter—collective review of Japanese case reports.", Hepatogastroenterology 46(25): 8-15, 1999.
Jabara et al., "Accurate sampling and deep sequencing of the HIV-1 protease gene using a Primer ID.", Proceedings of the National Academy of Sciences of the United States of America 108, 20166-20171, 2011.
Jacobs et al., "Ovarian cancer screening and mortality in the UK Collaborative Trial of Ovarian Cancer Screening UKCTOCS): a randomised controlled trial.", Lancet 387: 945-956, 2016.
Jacobs et al., Sensitivity of transvaginal ultrasound screening for endometrial cancer in postmenopausal women: a case-control study within the UKCTOCS cohort. The Lancet. Oncology 12, 38-48, 2011.
Jahr et al., "DNA Fragments in the Blood Plasma of Cancer Patients: Quantitations and Evidence for Their Origin from Apoptotic and Necrotic Cells", Cancer Research 61: 1659-1665, 2001.

Jain et al., "Personalized Therapy of Cancer," Textbook of Personalized Medicine, 2015, Chapter 10, pp. 199-381.
Jaiswal et al., "Age-related clonal hematopoiesis associated with adverse outcomes.", N Engl J Med 371(26): 2488-2498, 2014.
Jasmine et al., "A Genome-Wide Study of Cytogenetic Changes in Colorectal Cancer Using SNP Microarrays: Opportunities for Future Personalized Treatment", PLoS One 7(2): e31968, 18 pages, 2012.
Jelakovic et al., "Aristolactam-DNA adducts are a biomarker of environmental exposure to aristolochic acid", Kidney Int. 81(6): 559-67, 2012.
Jiao et al., "DAXX/ATRX, Meni, and mTOR Pathway Genes Are Frequently Altered in Pancreatic Neuroendocrine Tumors", Science 331: 1199-1203, 2011.
Jones et al., "Comparative lesion sequencing provides insights into tumor evolution." Proceedings of the National Academy of Sciences of the United States of America 105: 4283-4288, 2008.
Jones et al., "Core signaling pathways in human pancreatic cancers revealed by global genomic analyses.", Science 321(5897): 1801-1806, 2008.
Jones et al., "Frequent mutations of chromatin remodeling gene ARIDIA in ovarian clear cell carcinoma.", Science 330, 228-231, 2010.
Jones et al., "Low-grade serous carcinomas of the ovary contain very few point mutations", The Journal of pathology 226, 413-420, 2012.
Jones et al., "Personalized genomic analyses for cancer mutation discovery and interpretation.", Science translational medicine, 7: 283ra53, 2015.
Jones et al., "The epigenomics of cancer.", Cell 128: 683-692, 2007.
Ju et al., "Origins and functional consequences of somatic mitochondrial DNA mutations in human cancer", eLife 3, 28 pages, 2014.
Jung et al., "Intron retention is a widespread mechanism of tumor-suppressor inactivation.", Nat Genet 47, 1242-1248, 2015.
Jung KW, et al. (2007) Clinicopathological aspects of 542 cases of pancreatic cancer: a special emphasis on small pancreatic cancer. J Korean Med Sci 22 Suppl:S79-85.
Kalinich et al., "An RNA-based signature enables high specificity detection of circulating tumor cells in hepatocellular carcinoma.", Proc Natl Acad Sci USA, 114(5): 1123-1128, 2017.
Kandoth et al., "Integrated genomic characterization of endometrial carcinoma.", Nature 497, 67-73, 2013.
Kandoth et al., "Mutational landscape and significance across 12 major cancer types", Nature 502: 333-339, 2013.
Kang et al., "Inverse correlation between RASSFIA hypermethylation, KRAS and BRAF mutations in cervical adenocarcinoma," Gynecology Oncology, 105, 662-666, 2007.
Karow, "Hopkins Team Develops method to Improve Rare Mutation Detection for Early Cancer Dx," Genomeweb, 3 pages, Jun. 1, 2011.
Karst et al., "Modeling high-grade serous ovarian carcinogenesis from the fallopian tube", Proc. Natl Acad Sci USA 108, 7547-7552, 2011.
Karst et al., "Ovarian cancer pathogenesis: a model in evolution.", Journal of oncology 932371, 13 pages, 2010.
Kato et al., "A new Packing for Separation of DNA Restriction Fragments by High Performance Liquid Chromatography," J. Biochem, 1984, 95:83-86.
Kauff et al., "Risk-reducing salpingo-oophorectomy in women with a BRCA1 or BRCA2 mutation.", The New England journal of medicine, 346: 1609-15, 2002.
Kaufman et al., "Olaparib monotherapy in patients with advanced cancer and a germline BRCA1/2 mutation.", J Clin. Oncol. 33: 244-250, 2015.
Kawauchi et al., "9p21 index as estimated by dual-color fluorescence in situ hybridization is useful to predict urothelial carcinoma recurrence in bladder washing cytology.", Hum Pathol 40: 1783-1789, 2009.
Kennedy et al., "Detecting ultralow-frequency mutations by Duplex Sequencing.", Nature protocols 9, 2586-2606, 2014.
Kennedy et al., "Somatic mutations in aging, cancer and neurodegeneration", Mech Ageing Dev 133: 118-126, 2012.
Keohavong et al., "Fidelity of DNA polymerases in DNA amplification.", Proc Natl Acad Sci U S A 86: 9253-9257, 1989.

(56) References Cited

OTHER PUBLICATIONS

Kesmodel et al., "Gastrointestinal Cancers Symposium: Multidisciplinary Approaches to the Prevention, Diagnosis, and Therapy of GI Cancers", 2007, abstr 234, 4 pages.
Keys et al., "Primer ID Informs Next-Generation Sequencing Platforms and Reveals Preexisting Drug Resistance Mutations in the HIV-1 Reverse Transcriptase Coding Domain.", AIDS Res Hum Retroviruses 31, 658-668, 2015.
Khadra et al., "A prospective analysis of 1,930 patients with hematuria to evaluate current diagnostic practice.", J Urol 163: 524-527, 2000.
Khalid et al., "Pancreatic cyst fluid DNA analysis in evaluating pancreatic cysts: a report of the PANDA study," Gastrointestinal Endoscopy, 2009, 69(6):1095-1102.
Kidd et al., "Developing a SNP panel for forensic identification of individuals", Forensic science international 164: 20-32, 2006.
Killela et al., "TERT promoter mutations occur frequently in gliomas and a subset of tumors derived from cells with low rates of self-renewal.", Proc Natl Acad Sci USA 110:6021-6026, 2013.
Kim et al., "Clinical usefulness of carbohydrate antigen 19-9 as a screening test for pancreatic cancer in an asymptomatic population.", J Gastroenterol Hepatol 19(2): 182-186. 2004.
Kim et al., "Impact of intraoperative rupture of the ovarian capsule on prognosis in patients with early-stage epithelial ovarian cancer: a meta-analysis.", European journal of surgical oncology: the journal of the European Society of Surgical Oncology and the British Association of Surgical Oncology 39, 279-289, 2013.
Kim et al., "Oligonucleotide microarray analysis of distinct gene expression patterns in colorectal cancer tissues harboring BRAF and K-ras mutations.", Carcinogenesis 27(3): 392-404, 2006.
Kinde et al., "Detection and quantification of rare mutations with massively parallel sequencing", Proceedings of the National Academy of Sciences of the United States of America 108, 9530-9535, 2011.
Kinde et al., "FAST-SeqS: a simple and efficient method for the detection of aneuploidy by massively parallel sequencing.", PloS One 7:e41162, 2012.
Kinde et al., "TERT promoter mutations occur early in urothelial neoplasia and are biomarkers of early disease and disease recurrence in urine.", Cancer Res 73 :7162-7167. 2013.
Kinde et al., 'Detection and quantification of rare mutations with massively parallel sequencing', PNAS, 2011, 108(23):9530-9535.
Kindelberger et al., "Intraepithelial carcinoma of the fimbria and pelvic serous carcinoma: Evidence for a causal relationship.", The American journal of surgical pathology 31: 161-9, 2007.
Kivioja et al., "Counting absolute numbers of molecules using unique molecular identifiers," Nature Methods, vol. 9, No. 1, pp. 72-74, 2011.
Kobayashi et al., "A randomized study of screening for ovarian cancer: a multi center study in Japan.", Int J Gynecol Cancer 18, 414-420, 2008.
Kodaz et al., Frequency of RAS Mutations (KRAS, NRAS, HRAS) in Human Solid Cancer, EJMO, 2017, 1(1):1-7.
Konecny et al., "Activity of the Dual Kinase Inhibitor Lapatinib (GW572016) against HER-2-Overexpressing and Trastuzumab-Treated Breast Cancer Cells", Cancer Res 66: 1630-1639, 2006.
Koopmann et al., "Evaluation of Osteopontin as Biomarker for Pancreatic Adenocarcinoma", Cancer Epidemiol Biomarkers Prev 13(3): 487-491, 2004.
Korpanty et al., "Biomarkers that currently affect clinical practice in lung cancer: EGFR, ALK, MET, ROS-1, and KRAS", Front Oncol. 4: 204, 2014.
Kosuri et al., "Scalable gene synthesis by selective amplification of DNA pools from high-fidelity microchips.", Nat Biotechnol 28: 1295-1299, 2010.
Kou et al., "Benefits and Challenges with Applying Unique Molecular Identifiers in Next Generation Sequencing to Detect Low Frequency Mutations", PLOS One., vol. 11, No. 1, p. e0146638, 2016.
Kozarewa et al., "Amplification-free Illumina sequencing-library preparation facilitates improved mapping and assembly of (G+C)-biased genomes", Nature Methods, vol. 6, No. 4, pp. 291-295, 2009.
Kozarewa et al., "Amplification-free library preparation for paired-end illumina sequencing", chapter 18, pp. 257-266, 2011.
Kraystberg et al., "Single molecule PCR in mtDNA mutational analysis: genuine mutations vs. damage bypass-derived artifacts" NIH Public Access Methods, 46(4): 269-273, 2008.
Kraystberg et al., "Single-molecule PCR: an artifact-free PCR approach for the analysis of somatic mutations" Expert Rev. Mol. Diagn. 5(5), 809-815, 2005.
Krimmel et al., "Ultra-deep sequencing detects ovarian cancer cells in peritoneal fluid and reveals somatic TP53 mutations in noncancerous tissues.", Proc Natl Acad Sci USA 113, 6005-6010, 2016.
Kristjansdottir et al., "Ovarian cyst fluid is a rich proteome resource for detection of new tumor biomarkers", Clinical Proteomics, vol. 9, internal pp. 1-9, 2012.
Kristjansdottir et al., "Potential tumor biomarkers identified in ovarian cyst fluid by quantitative proteomic analysis, iTRAQ.", Clinical proteomics 10, 4, 2013.
Kruger et al., "Numerical aberrations of chromosome 17 and the 9p2 1 locus are independent predictors of tumor recurrence in noninvasive transitional cell carcinoma of the urinary bladder.", Int J Oncol 23 :41-48, 2003.
Kuhn et al, "Identification of Molecular Pathway Aberrations in Uterine Serous Carcinoma by Genome-wide Analyses," Journal of the National Cancer Institute, vol. 104, No. 19, pp. 1503-1513, 2012.
Kuhn et al., "TP53 mutations in serous tubal intraepithelial carcinoma and concurrent pelvic high-grade serous carcinoma-evidence supporting the clonal relationship of the two lesions.", The Journal of pathology, 226: 421-6, 2012.
Kumar et al., "Application of microarray in breast cancer: An overview", J. Pharm. Bioallied Sci. 4(1): 21-26, 2012.
Kumar et al., "Association of mitochondrial copy number variation and T16189C polymorphism with colorectal cancer in North Indian population.", Tumor Biol, 39: 1010428317740296, 2017.
Kumar et al., "Cell-free mitochondrial DNA copy number variation in head and neck squamous cell carcinoma: A study of non-invasive biomarker from Northeast India.", Tumour Biol., 39: 1010428317736643, 2017.
Kumar et al., "Deep sequencing of multiple regions of glial tumors reveals spatial heterogeneity for mutations in clinically relevant genes.", Genome biology 15, 530, 2014.
Kumar et al., "Serum and Plasma Metabolomic Biomarkers for Lung Cancer", Bioinformation, 13(6); 202-208, 2017.
Kunkel, "The mutational specificity of DNA polymerase-beta during in vitro DNA synthesis.", J Biol Chem 260: 5787-5796, 1985.
Kuppusamy et al., "Proteins are potent biomarkers to detect colon cancer progression", Saudi Journal of Biological Sciences, 24, 1212-1221, 2017.
Kurman et al., "Molecular pathogenesis and extraovarian origin of epithelial ovarian cancer-Shilling the paradigm," Human Pathology, 42, 918-931, 2011.
Kurman et al., "The Dualistic Model of Ovarian Carcinogenesis: Revisited, Revised, and Expanded.", Am J Pathol 186, 733-747, 2016.
Kurman et al., "The origin and pathogenesis of epithelial ovarian cancer: a proposed unifying theory", The American journal of surgical pathology 34, 433-443, 2010.
Kwon et al., "Prophylactic salpingectomy and delayed pophorectomy as an alternative for BRCA mutation carriers.", Obstetrics and gynecology, 121:14-24, 2013.
Laddha et al., "Mutational Landscape of the Essential Autophagy Gene BECN1 in Human Cancers", Molecular cancer research 12: 485-490, 2014.
Laere et al., "cDNA Microarray Analysis of Inflammatory Breast Cancer Signatures", Methods Mol. Biol. 512: 71-98, 2009.
Lai et al., "Population-Based Case-Control Study of Chinese Herbal Products Containing Aristolochic Acid and Urinary Tract Cancer Risk", J Natl Cancer Inst, 102(3): 179-186, 2010.

(56) References Cited

OTHER PUBLICATIONS

Lalkhen et al., "Clinical tests: sensitivity and specificity", Continuing Education in Anaesthesia, Critical Care & Pain, vol. 8, No. 6, 221-223, 2008.
Langmead et al., "Fast gapped-read alignment with Bowtie 2", Nature Methods 9: 357-359, 2012.
Leary et al. "Detection of chromosomal alterations in the circulation of cancer patients with whole-genome sequencing," Sci Transl Med, 2012, 4(162):1-21.
Lee et al., "A candidate precursor to serous carcinoma that originates in the distal fallopian tube", The journal of pathology 211, 26-35, 2007.
Lee et al., "NGS-based deep bisulfite sequencing," MethodsX, Nov. 2015, 1-7.
Lee et al., "Quantification of kinase activity in cell lysates via photopatterned macroporous poly(ethylene glycol) hydrogel arrays in microfluidic channels", Biomed. Microdevices 14: 247-57, 2012.
Lennon et al., "Diagnostic and Therapeutic Response Markers.", Pancreatic Cancer, (Springer New York, New York, NY), pp. 675-701, 2010.
Lennon et al., "The Early Detection of Pancreatic Cancer: What Will It Take to Diagnose and Treat Curable Pancreatic Neoplasia?", Cancer Res 74(13): 3381-3389, 2014.
Levanon et al., "New insights into the pathogenesis of serous ovarian cancer and its clinical impact.", Journal of clinical oncology: official journal of the American Society of Clinical Oncology, 26: 5284-93, 2008.
Levey et al., "Definition and classification of chronic kidney disease: a position statement from Kidney Disease: Improving Global Outcomes (KDIGO).", Kidney Int. 67(6): 2089-100, 2005.
Levey et al., "Using Standardized Serum Creatinine Values in the Modification of Diet in Renal Disease Study Equation for Estimating Glomerular Filtration Rate", Ann Intern Med. 145(4): 247-54, 2006.
Levina et al., "Biological significance of prolactin in gynecologie cancers.", Cancer Res 69(12): 5226-5233, 2009.
Levine et al., "Management of asymptomatic ovarian and other adnexal cysts imaged at US: Society of Radiologists in Ultrasound Consensus Conference Statement", Radiology 256, 943-954, 2010.
Li et al., "DNA Methylation in Peripheral Blood: A Potential Biomarker for Cancer Molecular Epidemiology", J. Epidemiol, 22(5): 384-394, 2012.
Li et al., "Replacing PCR with COLD-PCR enriches variant DNA sequences and redefines the sensitivity of genetic testing", Nat Med 14: 579-584, 2008.
Li et al., "Significant Predictive Factors for Prognosis of Primary Upper Urinary Tract Cancer after Radical Nephroureterectomy in Taiwanese Patients", Eur Urol. 54(5): 1127-1134, 2008.
Li et al., "Toward better understanding of artifacts in variant calling from high-coverage samples.", Bioinformatics 30: 2843-2851, 2014.
Liaw et al., "Classification and Regression by random Forest", R news 2: 18-22, 2001.
Lin et al., "A molecular inversion probe assay for detecting alternative splicing", BMC Genomics 11: 712, 2010.
Lin et al., "Benefits and harms of prostate-specific antigen screening for prostate cancer: an evidence update for the U.S. Preventive Services Task Force.", Ann. Intern. Med. 149: 192-199, 2008.
Lin et al., "Increase sensitivity in detecting superficial, low grade bladder cancer by combination analysis of hypermethylation of E-cadherin, p16, p14, RASSFIA genes in urine.", Ural Oncol 28: 597-602, 2010.
Lin et al., "Thyroid cancer in the thyroid nodules evaluated by ultrasonography and fine-needle aspiration cytology", Thyroid: official journal of the american thyroid association 15, 708-717, 2005.
Lindor et al., Press, "Recommendations for the care of individuals with an inherited predisposition to Lynch syndrome: a systematic review.", JAMA 296, 1507-1517, 2006.
Linnarsson et al., "Recent advances in DNA sequencing methods—general principles of sample preparation", Experimental cell research., 316, 1339-1343, 2010.
Liotta et al., "The promise of proteomics.", Clin Adv Hematol Oncol 1(8): 460-462, 2003.
Liscia et al., "Prognostic significance of loss of heterozygosity at loci on chromosome 17p13.3-ter in sporadic breast cancer is evidence for a putative tumour suppressor gene", British Journal of Cancer, 80 (5/6) 821-826, 1999.
Liu et al., "Comparison of Next-Generation Sequencing Systems," Journal of Biomedicine and Biotechnology, 2012, 2012(251364) 11 pages.
Liu et al., "Detection of extremely rare alleles by bidirectional pyrophosphorolysis-activated polymerization allele-specific amplification (Bi-PAP-A): measurement of mutation load in mammalian tissues.", Biotechniques 36: 156-166, 2004.
Liu et al., "Digital quantification of gene methylation in stool DNA by emulsion-PCR coupled with hydrogel immobilized bead-array.", Biosens Bioelectron 92: 596-601, 2017.
Liu et al., "Sensitive and specific multi-cancer detection and localization using methylation signatures in cell-free DNA," Ann Oncol., Jun. 2020, 31(6):745-759.
Livrahi et al., "PARP inhibitors in the management of breast cancer: current data and future prospects.", BMC Medicine 13: 188, 2015.
Locker et al., "ASCO 2006 Update of Recommendations for the Use of Tumor Markers in Gastrointestinal Cancer ", J. Clin. Oncol. 24: 5313-5327, 2006.
Lodato et al., "Somatic mutation in single human neurons tracks developmental and transcriptional history.", Science 350, 94-98, 2015.
Lodes et al., "Detection of Cancer with Serum miRNAs on an Oligonucleotide Microarray", PLoS One 4(7): e6229, 2009.
Loh et al., "Ovarian response after laparoscopic ovarian cystectomy for endometriotic cysts in 132 monitored cycles", Fertility and sterility 72, 316-321, 1999.
Longacre et al., "Recommendations for the reporting of fallopian tube neoplasms.", Hum Pathol., 38: 1160-3, 2007.
Lotan et al., "Sensitivity and Specificity of Commonly Available Bladder Tumor Markers Versus Cytology: Results of a Comprehensive Literature Review and Meta-Analyses", Urology 61: 109-18, 2003.
Lou et al., "Biomarkers for Hepatocellular Carcinoma", Biomark Cancer, 9: 1-9, 2017.
Louseberg et al., "Safety, Efficacy, and Patient Acceptability of Everolimus in the Treatment of Breast Cancer.", Breast Cancer 10: 239-252, 2017.
Lowe et al., "Multiplex Sensing of Protease and Kinase Enzyme Activity via Orthogonal Coupling of Quantum Dot-Peptide Conjugates", ACS nano. 6: 851-7, 2012.
Luria et al., "Mutations of Bacteria from Virus Sensitivity to Virus Resistance.", Genetics 28: 491-511, 1943.
Mackay et al., "cDNA microarray analysis of genes associated with ERBB2 (HER2/neu) overexpression in human mammary luminal epithelial cells", Oncogene 22: 2680-2688, 2003.
Mackay et al., "Phase II trial of the histone deacetylase inhibitor belinostat in women with platinum resistant epithelial ovarian cancer and micropapillary (LMP) ovarian tumours.", Eur. J. Cancer 46(9): 1573-1579, 2010.
Madabhushi et al., "DNA damage and its links to neurodegeneration. ", Neuron 83, 266-282, 2014.
Makohon-Moore et al., "Limited heterogeneity of known driver gene mutations among the metastases of individual patients with pancreatic cancer", Nat Genet., 49(3): 358-366, 2017.
Malpica et al., "Grading ovarian serous carcinoma using a two-tier system," Am. J. Surg. Pathol. 28, 496-504, 2004.
Mao et al., "The Application of Single Nucleotide Polymorphism Microarrays in Cancer Research", Curr. Genomics 8(4): 219-228, 2007.
Mao, "Recent advances in the molecular diagnosis of lung cancer.", Oncogene, 21(45):6960-6969, 2002.
Maragh et al., "Evaluation of two mitochondrial DNA biomarkers for prostate cancer detection.", Cancer Biomark., 15: 763-73, 2015.
Marengo et al., "Biomarkers for pancreatic cancer: Recent achievements in proteomics and genomics through classical and multivariate statistical methods," World J. Gastroenterol, 20(37):13325-13342, Oct. 7, 2014 (Year: 2014).

(56) References Cited

OTHER PUBLICATIONS

Marques et al., "A typical glandular cells and cervical cancer: systematic review.", Rev Assoc Med Bras, 57:234-238, 2011.
Martinez et al., "Computational optimisation of targeted DNA sequencing for cancer detection," Sci. Rep., 2013, 3(3309):sertp03309 1-8.
Martinez-Onsurbe et al., "Aspiration cytology of 147 adnexal cysts with histologic correlation", Acta. Cytologica 45, 941-947, 2001.
Matei et al., "Epigenetic Resensitization to Platinum in Ovarian Cancer", Cancer Res. 72(9): 2197-2205, 2012.
Matzas et al., "High-fidelity gene synthesis by retrieval of sequence-verified DNA identified using high-throughput pyrosequencing.", Nat Biotechnol 28: 1291-1294, 2010.
Mayr et al., "KRAS and BRAF mutations in ovarian tumors: a comprehensive study of invasive carcinomas, borderline tumors and extraovarian implants", Gynecologie oncology 103, 883-887, 2006.
Mayrand et al., "Human papillomavirus DNA versus Papanicolaou screening tests for cervical cancer.", N. Engl. J. Med. 357, 1579-1588, 2007.
McAlpine et al., "Opportunistic salpingectomy: uptake, risks, and complications of a regional initiative for ovarian cancer prevention.", American journal of obstetrics and gynecology, 210:471 e1-11, 2014.
McCloskey et al., "Encoding PCR products with batch-stamps and barcodes", Biochem Genet 45: 761-767, 2007.
Mcdaniel et al., "Next-Generation Sequencing of Tubal Intraepithelial Carcinomas." JAMA oncology 1: 1128-32, 2015.
McMahon et al., "The HBV drug entecavir—effects on HIV-1 replication and resistance.", N Engl J Med 356: 2614-2621, 2007.
Medeiros et al., "The tubal fimbria is a preferred site for early adenocarcinoma in women with familial ovarian cancer syndrome.", The American journal, vol. 30, issue 2, pp. 230-236, 2006.
Meden et al., "CA 125 in benign gynecological conditions.", Int J Biol Alarkers 13, 231-237, 1998.
Meldrum et al., "Next-Generation Sequencing for Cancer Diagnostics: a Practical Perspective", Clin. Biochem. Rev. 32(4): 177-195, 2011.
Mendivil et al., "Increased incidence of severe gastrointestinal events with first-line paclitaxel, carboplatin, and vorinostat chemotherapy for advanced-stage epithelial ovarian, primary peritoneal, and fallopian tube cancer.", Int. J. Gynecol. Cancer 23(3): 533-539, 2013.
Menon et al., "Ovarian cancer screening-current status, future directions.", Gynecologic oncology, 2014, 132:490-5.
Menon et al., "Risk Algorithm Using Serial Biomarker Measurements Doubles the Number of Screen-Detected Cancers Compared With a Single-Threshold Rule in the United Kingdom Collaborative Trial of Ovarian Cancer Screening.", J Clin Oncol 33, 2062-2071, 2015.
Mermel et al., "GISTIC2.0 facilitates sensitive and confident localization of the targets of focal somatic copy-number alteration in human cancers", Genome biology 12: R41, 2011.
Metzker et al., "Sequencing technologies—the next generation" Nature reviews, 2010.
Michels et al., "Detection of DNA copy number alterations in cancer by array comparative genomic hybridization.", Genet. Med. 9: 574-584, 2007.
Miller et al., "Phase I trial of alvespimycin (KOS-1022; 17-DMAG) and trastuzumab (T)", J. Clin. Oncol. 25: s1115, 2007.
Miner et al., "Molecular barcodes detect redundancy and contamination in hairpin-bisulfite PCR.", Nucleic Acids Res 32:e135, 2004.
Mirus et al., "Cross-Species Antibody Microarray Interrogation Identifies a 3-Protein Panel of Plasma Biomarkers for Early Diagnosis of Pancreas Cancer", Clin. Cancer Res. 21(7): 1764-1771, 2015.
Misek et al., "Protein Biomarkers for the Early Detection of Breast Cancer", International Journal of Proteomics, vol. 2011, article ID 343582, 9 pages, 2011.

Mishriki et al., "Diagnosis of urologic malignancies in patients with asymptomatic dipstick hematuria: prospective study with 13 years' follow-up.", Urology 71: 13-16, 2008.
Mitchell et al., "Accuracy and survival benefit of cytological prediction of endometrial carcinoma on routine cervical smears.", Int J Gynecol Pathol 12, 34-40, 1993.
Mitra et al., "Digital genotyping and haplotyping with polymerase colonies.", Proc Natl Acad Sci USA 100: 5926-5931, 2008.
Mizutani et al., "A Novel FRET-Based Biosensor for the Measurement of BCR-ABL Activity and Its Response to Drugs in Living Cells", Clin. Cancer Res. 16: 3964-75, 2010.
Mo et al., "Hyperactivation of Haras oncogene, but not Ink4a/Arf deficiency, triggers bladder tumorigenesis.", J Clin Invest 117: 314-325, 2007.
Moch et al., "The 2016 WHO Classification of Tumours of the Urinary System and Male Genital Organs—Part A: Renal, Penile, and Testicular Tumours", EAU, 70, 93-105, 2016.
Mockler et al., "Applications of DNA tiling arrays for whole-genome analysis", Genomics, 85(1): 1-15, 2005.
Modesitt et al., "A phase II study of vorinostat in the treatment of persistent or recurrent epithelial ovarian or primary peritoneal carcinoma: a Gynecologic Oncology Group study.", 109(2): 182-186, 2008.
Modi et al., "Phase II trial of the Hsp90 inhibitor tanespimycin (Tan) + trastuzumab (T) in patients (pts) with HER2-positive metastatic breast cancer (MBC)", J. Clin Oncol. 26: s1027, 2008.
Moertel et al., "Fluorouracil plus levamisole as effective adjuvant therapy after resection of stage III colon carcinoma: a final report.", Ann Intern Med 122(5): 321-326, 1995.
Monnat et al., "Nucleotide sequence preservation of human mitochondrial DNA", Proc Natl Acad Sci USA 82: 2895-2899, 1985.
Moonen et al., "UroVysion compared with cytology and quantitative cytology in the surveillance of non-muscle-invasive bladder cancer.", Eur Urol 51: 1275-80, 2007.
Moore et al., "The use of multiple novel tumor biomarkers for the detection of ovarian carcinoma in patients with a pelvic mass.", Gynecologic oncology 108, 402-408, 2008.
Moore et al., "Uterine Papillary Serous Carcinoma", Clin Obstet Gynecol 54: 278-291, 2011.
Moran et al., "Cytologic examination of ovarian cyst fluid for the distinction between benign and malignant tumors", Obstetrics and gynecology 82, 444-446, 1993.
Moyer et al., "Screening for ovarian cancer: U.S. Preventive Services Task Force reaffirmation recommendation statement", Annals of internal medicine 157: 900-904, 2012.
Murtaza et al., "Non-invasive analysis of acquired resistance to cancer therapy by sequencing of plasma DNA", Nature 497, 108-112, 2013.
Nachmanson et al., "Targeted genome fragmentation with CRISPR/Cas9 enables fast and efficient enrichment of small genomic regions and ultra-accurate sequencing with low DNA input (CRISPR-DS)," Genome Research, Sep. 19, 2018, 28(10):1589-1599.
Nair et al., "Genomic Analysis of Uterine Lavage Fluid Detects Early Endometrial Cancers and Reveals a Prevalent Landscape of Driver Mutations in Women without Histopathologic Evidence of Cancer: A Prospective Cross-Sectional Study", PLoS Med 13: e1002206, 2016.
National Toxicology Program. Aristolochic acids. Rep Carcinog, 12, 45-49, 2011.
Naucler et al., "Human papillomavirus and Papanicolaou tests to screen for cervical cancer.", N Engl J Med 357, 1589-1597, 2007.
Nazarian et al., "Melanomas acquire resistance to B-RAF(V600E) inhibition by RTK or N-RAS upregulation.", Nature 468: 973-977, 2010.
Nazli et al., "The diagnostic importance of CEA and CA 19-9 for the early diagnosis of pancreatic carcinoma.", Hepatogastroenterology, 47(36): 1750-1752, 2000.
Netto et al., "Emerging Bladder Cancer Biomarkers and Targets of Therapy.", Urol Clin North Am 43: 63-76, 2016.
Netto et al., "Theranostic and prognostic biomarkers: genomic applications in urological malignancies", Pathology 42: 384-394, 2010.

(56) References Cited

OTHER PUBLICATIONS

Netto, "Clinical applications of recent molecular advances in urologic malignancies: no longer chasing a "mirage"?. ", Adv Anat Pathol 20: 175-203, 2013.
Netto, "Molecular biomarkers in urothelial carcinoma of the bladder: are we there yet ?. ", Nat Rev Urol 9: 41-51, 2011.
Newman et al., "An ultrasensitive method for quantitating circulating tumor DNA with board patient coverage", Nature medicine 20, 548-554, 2014.
Newman et al., "Integrated digital error suppression for improved detection of circulating tumor DNA," Nature Biotechnology, 2016, 34(5):547-555.
Ng et al., "Significance of endometrial cells in the detection of endometrial carcinoma and its precursors.", Acta cytologica 18, 356-361, 1974.
Ngamruengphong et al., "Preoperative endoscopic ultrasound-guided fine needle aspiration does not impair survival of patients with resected pancreatic cancer.", Gut, 64: 1105-1110, 2015.
Ngan et al., "Abnormal expression and mutation of p53 in cervical cancer—a study at protein, RNA and DNA levels", Genitourin Med, 73: 54-58, 1997.
Nguyen et al., "High prevalence of TERT promoter mutations in micropapillary urothelial carcinoma.", Virchows Arch 469: 427-434, 2016.
Nik et al., "Origin and pathogenesis of pelvic (ovarian, tubal, and primary peritoneal) serous carcinoma.", Annual review of pathology 9: 27-45, 2014.
Niknafs et al., SubClonal Hierarchy Inference from Somatic Mutations: Automatic Reconstruction of Cancer Evolutionary Trees from Multi-region Next Generation Sequencing. PLoS computational biology, 11: e1004416, pp. 1-26, 2015.
Nolen et al., "Protein biomarkers of ovarian cancer: the forest and the trees", Future Oncol., 8(1): 55-71, 2012.
O'Brien et al., "Serum CA19-9 is significantly upregulated up to 2 years before diagnosis with pancreatic cancer: implications for early disease detection.", Clin Cancer Res 21(3): 622-631, 2015.
Oda et al., "High Frequency of Coexistent Mutations of PIK3CA and PTEN Genes in Endometrial Carcinoma," Cancer Research, vol. 65, No. 23, pp. 10669-10673, 2005.
Odunsi et al., "Epigenetic potentiation of NY-ESO-1 vaccine therapy in human ovarian cancer", Cancer Immunol. Res. 2(1): 37-49, 2014.
Ogiwara et al., "Unbalanced translocation, a major chromosome alteration causing loss of heterozygosity in human lung cancer." Oncogene, 27: 4788-97, 2008.
Ottesen et al., "Microfluidic digital PCR enables multigene analysis of individual environmental bacteria.", Science 314: 1464-1467, 2006.
Out et al., "Deep Sequencing to Reveal New Variants in Pooled DNA Samples," Hum. Mutat. 2009, 30:1703-1712.
Paik et al., "A Multigene Assay to Predict Recurrence of Tamoxifen-Treated, Node-Negative Breast Cancer", N. Engl. J. Med. 351: 2817-2826, 2004.
Parameswaran et al., "A pyrosequencing-tailored nucleotide barcode design unveils opportunities for large-scale sample multiplexing.", Nucleic Acids Res 35: e130, 2007.
Pardall, "The blockade of immune checkpoints in cancer immunotherapy", Nat. Rev Cancer 12: 252-264, 2012.
Park et al., "Large-scale clinical validation of biomarkers for pancreatic cancer using a mass spectrometry-based proteomics approach", Oncotarget., 8(26): 42761-42771, 2017.
Parker et al., "Ovarian conservation at the time of hysterectomy and long-term health outcomes in the nurses' health study.", Obstetrics and gynecology, 113: 1027-37, 2009.
Parsons et al., "Mismatch repair deficiency in phenotypically normal human cells", Science 268: 738-740, 1995.
Partridge et al., "Results from four rounds of ovarian cancer screening in a randomized trial.", Obstet Gynecol 113, 775-782, 2009.
Patch et al., "Whole-genome characterization of chemoresistant ovarian cancer.", Nature, 521: 489-94, 2015.
Patel et al., "Endometrial carcinoma detected with SurePath liquid-based cervical cytology: comparison with conventional cytology", Cytopathology, vol. 20, No. 6, pp. 380-387, 2009.
Patz et al., "Panel of serum biomarkers for the diagnosis of lung cancer.", J Clin Oncol 25: 5578-5583, 2007.
Pavlik et al., "Frequency and disposition of ovarian abnormalities followed with serial transvaginal ultrasonography", Obstetrics and gynecology 122, 210-217, 2013.
Pecorelli, "Revised FIGO staging for carcinoma of the vulva, cervix, and endometrium.", Int J Gynaecol Obstet 105, 103-104, 2009.
Peng et al., "Targeted Single Primer Enrichment Sequencing with Single End Duplex-UMI," Scientific Reports, 2019, 9:4810, 10 pages.
Peng et al., Reducing amplification artifacts in high multiplex amplicon sequencing by using molecular barcodes, BMC Genomics, 2015, 16(589): 1-12.
Pengelly et al., "A SNP profiling panel for sample tracking in whole-exome sequencing studies", Genome medicine 5: 89, 2013.
Perets et al., "It's Totally Tubular . . . Riding The New Wave of Ovarian Cancer Research.", Cancer research, 76: 10-7, 2016.
Perets et al., "Transformation of the fallopian tube secretory epithelium leads to high-grade serous ovarian cancer in Brca;Tp53;Pten models.", Cancer cell, 24: 751-65, 2013.
Phallen et al., "Direct detection of early-stage cancers using circulating tumor DNA.", Science translational medicine 9, 2017.
Philips et al., "Targeting HER2-positive breast cancer with trastuzumab-DM1, an antibody-cytotoxic drug conjugate.", Cancer Res 68: 9280-9290, 2008.
Piccart-Gebhart et al., "Trastuzumab after adjuvant chemotherapy in HER2-positive breast cancer.", N. Engl. J. Med. 353: 1659-1672, 2005.
Piek et al., "BRCA1/2-related ovarian cancers are of tubal origin: a hypothesis.", Gynecologic oncology, 90: 491, 2003.
Piek et al., "Dysplastic changes in prophylactically removed Fallopian tubes of women predisposed to developing ovarian cancer.", The Journal of pathology, 195: 451-6, 2001.
Pinkel et al., "Array comparative genomic hybridization and its applications in cancer", Nature Genetics, vol. 37, S11-S17, 2005.
Pinsky et al., "Prostate Cancer Screening—A Perspective on the Current State of the Evidence", The New England Journal of Medicine, 376; 13, 1285-1289, 2017.
Powers et al., "Protein analytical assays for diagnosing, monitoring, and choosing treatment for cancer patients.", J. Healthc Eng. 3(4): 503-534, 2015.
Prior et al., "A comprehensive survey of Ras mutations in cancer," Cancer Res., May 2012, 72:10:2457-2467.
Proctor et al., "The promise of telomere length, telomerase activity and its regulation in the translocation-dependent cancer ESFT; clinical challenges and utility", Biochimica et Biophysica Acta, 260-274, 2009.
Qiu et al., "No evidence of clonal somatic genetic alterations in cancer-associated fibroblasts from human breast and ovarian carcinomas.", Nature Genetics, vol. 40, pp. 650-655. 2008.
Quail et al., "A large genome center's improvements to the Illumina sequencing system.", Nat Methods 5:1005-1010, 2008.
Quail et al., "Improved Protocols for the Illumina Genome Analyzer Sequencing System," Current Protocols in Human Genetics, Supplement 62, pp. 18.2.1-18.2.27, 2009.
Rago et al., "Serial assessment of human tumor burdens in mice by the analysis of circulating DNA.", Cancer Res 67, 9364-9370, 2007.
Rahib et al., "Projecting Cancer Incidence and Deaths to 2030: The Unexpected Burden of Thyroid, Liver, and Pancreas Cancers in the United States", Cancer research 74, 2913-2921. 2014.
Ralla et al., "Nucleic acid-based biomarkers in body fluids of patients with urologic malignancies", Crit Rev Clin Lab Sci 51: 200-231, 2014.
Randerath et al., "Covalent DNA Damage in Tissues of Cigarette Smokers as Determined by 32P-Postlabeling Assay", Journal of the National Cancer Institute 81: 341-347, 1989.
Rebbeck et al., "Prophylactic oophorectomy in Carriers of BRCA 1 or BRCA2 mutations.", The New England journal of medicine, 346: 1616-22, 2002.

(56) References Cited

OTHER PUBLICATIONS

Resaei-Matehkolaei et al., Use of Single-enzyme PCR-restriction Digestion Bardode Targeting the Internal Transcribed Spacers (ITS rDNA) to identify Dermatophyte Species, Iranian J. Publ. Health, 2012, 41(3):82-94.
Resta et al., "Phase I study of enzastaurin (ENZ) and bevacizumab (BV) in patients with advanced cancer", J. Clin. Oncol. 26 (May 20 suppl), abstr 3529, 2008.
Ricciuti et al., "Long-Lasting Response to Nivolumab and Immune-Related Adverse Events in a Nonsquamous Metastatic Non-Small Cell Lung Cancer Patient.", J. Thorne Oncol. 12(5): e51-e55, 2017.
Ries et al., SEER Survival Monograph: Cancer Survival Among Adults: US SEER Program, 1988-2001, Patient and Tumor Characteristics (NIH Pub. No. 07-6215, National Cancer Institute, Bethesda, MD, 2007).
Roach et al., "Analysis of Genetic Inheritance in a Family Quartet by Whole Genome Sequencing", Science 328: 636-639, 2010.
Rodriguez et al., Spectrum of genetic mutations in de novo PUNLMP of the urinary bladder. Virchows Arch, vol. 471, issue 6, pp. 761-767, 2017.
Roh et al., "High-grade fimbrial—Ovarian carcinomas are unified by altered p53, PTEN and PAX2 expression.", Modem pathology, 23: 1316-24, 2010.
Romond et al., "Trastuzumab plus Adjuvant Chemotherapy for Operable HER2-Positive Breast Cancer", N. Engl. J. Med. 353: 1673-1684, 2005.
Rosen et al., "Safety, pharmacokinetics, and efficacy of AMG 706, an oral multikinase inhibitor, in patients with advanced solid tumors.", J. Clin. Oncol. 25: 2369-76, 2007.
Rosenberg et al., "Adoptive cell transfer as personalized immunotherapy for human cancer", Science 348(6230): 62-68, 2015.
Rougemont et al., "Probabilistic base calling of Solexa sequencing data.", BMC Bioinformatics 9:431, 2008.
Roupret et al., "European Association of Urology Guidelines on Upper Urinary Tract Urothelial Cell Carcinoma: 2015 Update", Eur Ural. 68(5): 868-79, 2015.
Rozen et al., "Primer3 on the WWW for general users and for biologist programmers.", Methods Afol Biol 132, 365-386, 2000.
Ryan et al., "Pancreatic adenocarcinoma.", N Engl J Med 371(22): 2140-2141, 2014.
Salk et al., "Enhancing the accuracy of next-generation sequencing for detecting rare and subclonal mutations," Nature Reviews Genetics, Mar. 26, 2018, 19(5):269-285.
Saltz et al., "Phase II Trial of Sunitinib in Patients With Metastatic Colorectal Cancer After Failure of Standard Therapy", J. Clin. Oncol. 25: 4793-4799, 2007.
Samorodnitsky et al., "Evaluation of Hybridization Capture Versus Amplicon-Based Methods for Whole-Exome Sequencing," Hum Mutat., 2015, 36:903-914.
Sams et al.., "Liquid-based Papanicolaou tests in endometrial carcinoma diagnosis. Performance, error root cause analysis, and quality improvement.", Am J Clin Pathol 137, 248-254, 2012.
Sandhu et al., "The poly(ADP-ribose) polymerase inhibitor niraparib (MK4827) in BRCA mutation carriers and patients with sporadic cancer: a phase 1 dose-escalation trial.", Lancet Oncol 14: 882-92, 2013.
Saraswat et al., "Comparative proteomic profiling of the serum differentiates pancreatic cancer from chronic pancreatitis", Cancer Med., vol. 6, issue 7, 1738-1751, 2017.
Sarkis et al., "Association of P53 nuclear overexpression and tumor progression in carcinoma in situ of the bladder.", J Urol 152: 388-392, 1994.
Sarkis et al., "Nuclear overexpression of p53 protein in transitional cell bladder carcinoma: a marker for disease progression.", J Natl Cancer Inst 85:53-59, 1993.
Sarkis et al., "Prognostic value of p53 nuclear overexpression in patients with invasive bladder cancer treated with neoadjuvant MVAC.", J Clin Oncol 13: 1384-1390, 1995.
Sarojini et al., "Early Detection Biomarkers for Ovarian Cancer", J. Oncol. 2012: 709049, 2012.
Sarosdy et al., "Use of a multitarget fluorescence in situ hybridization assay to diagnose bladder cancer in patients with hematuria.", J Urol, 2006, 176:44-47.
Schmeler et al., "Neoadjuvant chemotherapy for low-grade serous carcinoma of the ovary or peritoneum", Gynecologic oncology 108, 510-514, 2008.
Schmidt et al., "Pre-diagnostic metabolite concentrations and prostate cancer risk in 1077 cases and 1077 matched controls in the European Prospective Investigation into Cancer and Nutrition", BMC Med, 15: 122, 14 pages, 2012.
Schmitt et al., "Detection of ultra-rare mutations by next-generation sequencing", PNAS USA 109:14508-14513, 2012.
Schmitt et al., "Sequencing small genomic targets with high efficiency and extreme accuracy," Nat Methods, 2015, 12:423-425.
Schnatz et al., "Clinical significance of atypical glandular cells on cervical cytology.", Obstetrics and gynecology 107, 701-708, 2006.
Schorge et al., "ThinPrep detection of cervical and endometrial adenocarcinoma: a retrospective cohort study.", Cancer, 96: 338-43, 2002.
Schroder et al., "Dual-color Proteomic Profiling of Complex Samples with a Microarray of 810 Cancer-related Antibodies", Mol. Cell. Proteomics 9: 1271-80, 2010.
Schulz et al., "Inhibiting the HSP90 chaperone destabilizes macrophage migration inhibitory factor and thereby inhibits breast tumor progression.", J Exp Med 209(2): 275-89, 2012.
Schwienbacher et al., "Abnormal RNA expression of 11p15 imprinted genes and kidney developmental genes in Wilms' tumor.", Cancer Res., 60: 1521-5, 2000.
Scott et al., "Mutations of the TERT promoter are common in basal cell carcinoma and squamous cell carcinoma.", Mod Pathol 27: 516-523, 2014.
Scott, "Niraparib: First Global Approval", Drugs, 77: 1029-1034, 2017.
Screening for ovarian cancer: recommendation statement. U.S. Preventive Services Task Force. Am Fam Physician 71, 759-762, 2005.
Semrad et al., "Integrating Chemotherapy into the Management of Oligometastatic Colorectal Cancer: Evidence-Based Approach Using Clinical Trial Findings.", Ann Surg Oncol 22(Suppl 3): S855-862, 2015.
Sethi et al., "Evolving Concept of Cancer Stem Cells: Role of Micro-RNAs and their Implications in Tumor Aggressiveness", J. Carcinog. Mutag. S 1-005, 2011.
Shariat et al., "Gender differences in radical nephroureterectomy for upper tract urothelial carcinoma", World J Ural. 29(4): 481-486, 2011.
Sharma et al., "Risk of epithelial ovarian cancer in asymptomatic women with ultrasound-detected ovarian masses: a prospective cohort study within the UK collaborative trial of ovarian cancer screening (UKCTOCS)", Ultrasound Obstet Gynecol 40: 338-344, 2012.
Sharma et al., "Screening for gynaecological cancers," EJSO, 2006, 32(8):818-824.
Sharpless et al., "Dysplasia associated with atypical glandular cells on cervical cytology.", Obstet Gynecol 1 05, 494-500, 2005.
Shen et al., "BMN 673, a novel and highly potent PARP1/2 inhibitor for the treatment of human cancers with DNA repair deficiency.", Clin. Cancer Res. 19(18): 5003-5015, 2013.
Shen et al., "Mitochondrial copy number and risk of breast cancer: A pilot study", Mitochondrion, 10: 62-68, 2010.
Shendure et al., "Next-generation DNA sequencing," nature biotechnology, 2008, 26(10):1135-1145.
Sherman et al., "Survival among women with borderline ovarian tumors and ovarian carcinoma: a population-based analysis", Cancer 100, 1045-1052, 2004.
Shi et al., "A Novel Proximity Assay for the Detection of Proteins and Protein Complexes: Quantitation of HER1 and HER2 Total Protein Expression and Homodimerization in Formalin-fixed, Paraffin-Embedded Cell Lines and Breast Cancer Tissue", Diagnostic molecular pathology: the American journal of surgical pathology, part B: 18: 11-21, 2009.
Shi et al., "LigAmp for sensitive detection of single-nucleotide differences.", Nat Methods 1: 141-147, 2004.

(56) References Cited

OTHER PUBLICATIONS

Shibata, "Mutation and epigenetic molecular clocks in cancer.", Carcinogenesis 32: 123-128, 2011.
Shih et al., "Risk factors for recurrence of ovarian borderline tumors", Gynecologic oncology 120, 480-484, 2011.
Shlien et al., "Combined hereditary and somatic mutations of replication error repair genes result in rapid onset of ultra-hypermutated cancers.", Nature genetics 47: 257-262, 2015.
Sidranksy, "Nucleic acid-based methods for the detection of cancer.", Science 278(5340): 1054-9, 1997.
Sidransky et al., Identification of p53 gene mutations in bladder cancers and urine samples. Science 252: 706-709, 1991.
Siegel et al., "Cancer Statistics, 2017.", CA Cancer J Clin 67: 7-30, 2017.
Siegel et al., Cancer statistics, 2015. CA: a cancer journal for clinicians, 65:5-29, 2015.
Singer et al., "Mutations in BRAF and KRAS characterize the development of low-grade ovarian serous carcinoma", Journal of National Cancer Institute, vol. 95, No. 6, pp. 484-486, 2003.
Siravegna et al., "Integrating liquid biopsies into the management of cancer.", Nat Rev Clin Oncol 14, 531-548, 2017.
Skacel et al., "Multitarget Fluorescence In Situ Hybridization Assay Detects Transitional Cell Carcinoma in the Majority of Patients with Bladder Cancer and Atypical or Negative Urine Cytology", J Urol 169: 2101-2105, 2003.
Smith et al., "Epigenetic therapy for the treatment of epithelial ovarian cancer: A clinical review", Gynecol. Oncol. Rep. 20: 81-86, 2017.
Smith et al., "UMI-tools: modeling sequencing errors in Unique Molecular Identifiers to improve quantification accuracy," Genome Res., 2017, 27:491-499.
Smith et al., "Transvaginal ultrasound for identifying endometrial abnormality.", Acta Obstet Gynecol Scand 70, 591-594, 1991.
Somlo et al., "Efficacy of the PARP inhibitor (PI) ABT-888 (veliparib [vel]) either with carboplatin (carb) or as a single agent followed by post-progression therapy in combination with carb in patients (pts) with BRCA1- or BRCA2—(BRCA)-associated metastatic breast cancer (MBC)..", J. Clin. Oncol. 31: 1024, 2013.
Song et al., "Prognostic factors in women with synchronous endometrial and ovarian cancers.", Int J Gynecol Cancer 24: 520-527, 2014.
Soria et al., "Epidemiology, diagnosis, preoperative evaluation and prognostic assessment of upper-tract urothelial carcinoma (UTUC)", World J Urol, 35(3), 379-387, 2017.
Sorscher, "Pembrolizumab in Non-Small-Cell Lung Cancer.", N Engl J Med 376, 10: 996-7, 2017.
Soung et al., "Exosomes in Cancer Diagnostics", Cancers 9(1):pii:E8, 2017.
Spalding et al., "Retrospective birth dating of cells in humans.", Cell 122, 133-143, 2005.
Springer et al., "A Combination of Molecular Markers and Clinical Features Improve the Classification of Pancreatic Cysts", Gastroenterology 149(6): 1501-1510, 2015.
Springer et al., "Non-invasive detection of urothelial cancer through the analysis of driver gene mutations and ancuploidy", eLIFE, 7: e32143, 27 pages, 2018.
Steensma et al., "Clonal hematopoiesis of indeterminate potential and its distinction from myelodysplastic syndromes.", Blood 126, 9-16, 2015.
Stem et al., "Mutation of the TERT promoter, switch to active chromatin, and monoallelic TERT expression in multiple cancers.", Genes Dev 29: 2219-2224, 2015.
Stratagene Catalog, "Gene Characterization Kits" 1988, p. 39 only.
Stratton et al., "The cancer genome.", Nature 458: 719-724, 2009.
Stromberg et al., "A high-throughput strategy for protein profiling in cell microarrays using automated image analysis.", Proteomics 7: 2142-50, 2007.
Suh et al., "Major clinical research advances in gynecologic cancer in 2011", Journal of Gynecologic Oncology, vol. 23, No. 1, pp. 53-64, 2012.
Sun et al., "Elevated expression of the centromere protein-A(CENP-A)-encoding gene as a prognostic and predictive biomarker in human cancers", Int. J. Cancer, 139, 899-907, 2016.
Sun et al., "Nivolumab effectively inhibit platinum-resistant ovarian cancer cells via induction of cell apoptosis and inhibition of ADAM17 expression", Eur Rev Med Pharmacol Sci 21(6): 1198-1205, 2017.
Sundfeldt et al., "Specific mutant tumor DNA can be detected in ovarian cystic fluid of an unknown ovarian tumor cyst", In: The American Association for Cancer Research, abstract #2839, 2015.
Tabernero et al., "Dose- and Schedule-Dependent Inhibition of the Mammalian Target of Rapamycin Pathway With Everolimus: A Phase I Tumor Pharmacodynamic Study in Patients With Advanced Solid Tumors," J. Clin. Oncol., 2008, 26: 1603-1610.
Tabernero et al., "Phase I study of AZD0530, an oral potent inhibitor of Src kinase: First demonstration of inhibition of Src activity in human cancers", J. Clin. Oncol. 25: 18S, abstr 3520, 2007.
Takahashi et al., "Clonal and chronological genetic analysis of multifocal cancers of the bladder and upper urinary tract.", Cancer Res 58: 5835-5841, 1998.
Tanase et al., "Prostate cancer proteomics: Current trends and future perspectives for biomarker discovery", Oncotarget., Mar. 14; 8(11): 18497-18512, 2017.
Tang et al., "A phase I study of vorinostat (VOR) in combination with capecitabine (CAP) in patients (pts) with advanced solid tumors", J. Clin. Oncol 26, May 20 suppl; abstr 4027, 2018.
Tao, "Direct intrauterine sampling: the IUMC Endometrial Sampler.", Diagnostic cytopathology 17, 153-159, 1997.
The 1000 Genomes Project Consortium, "An integrated map of genetic variation from 1,092 human genomes.", Nature 491: 56-65, 2012.
Thermo Scientific. Phusion U Hot Start DNA Polymerase (online) Sep. 23, 2016 [retrieved Jun. 7, 2018]. Available on the internet: <URL: https://assets.thermofisher.comfTFS-Assets/LSG/manuals/MAN0012916_ PhusionUHotStart_DNAPolymerase_F555L_UG pdf >2 pages.
Thomas et al., "Construction of a 2-Mb resolution BAC microarray for CGH analysis of canine tumors", Genome Res. 15(12): 1831-1837, 2005.
Thomas et al., "Evaluation of serum CEA, CYFRA21-1 and CA125 for the early detection of colorectal cancer using longitudinal preclinical samples.", Br J Cancer 113(2): 268-274, 2015.
Thompson et al., "Winnowing DNA for Rare Sequences: Highly Specific Sequence and Methylation Based Enrichment", PLoS One, 7:e31597, 2012.
Thorpe et al., "Effects of blood collection conditions on ovarian cancer serum markers.", PLoS One 2(12): e1281, 2007.
Thunnissen, "Sputum examination for early detection of lung cancer.", J Clin Pathol 56: 805-810, 2003.
Thyagarajan et al., "Mitochondrial Copy Number is Associated With Colorectal Cancer Risk", Cancer Epidemiol Biomarkers Prev, 21(9): 1574-1581, 2012.
Tie et al., "Circulating tumor DNA analysis detects minimal residual disease and predicts recurrence in patients with stage II colon cancer," Sci Transl Med., 2016, 8:346ra392.
Tindall et al., "Fidelity of DNA synthesis by the Thermus aquaticus DNA polymerase.", Biochemistry 27: 6008-6013, 1988.
Tomasetti et al., "Cancer etiology. Variation in cancer risk among tissues can be explained by the number of stem cell divisions.", Science 347, 78-81, 2015.
Tomasetti et al., "Half or more of the somatic mutations in cancers of self-renewing tissues originate prior to tumor initiation.", Proceedings of the National Academy of Sciences of the United States of America 110, 1999-2004, 2013.
Tran et al., "Tract embolization with gelatin sponge slurry for prevention of pneumothorax after percutaneous computed tomography-guided lung biopsy.", Cardiovascular and interventional radiology 37, 1546-1553, 2014.
Traut et al., "Cancer of the Uterus: The Vaginal Smear in Its Diagnosis.", Cali. West. Med. 59, 121-122, 1943.
Troiano et al., "Sonographically guided therapeutic aspiration of benign-appearing ovarian cysts and endometriomas," AJR, 1998, 171:1601-1605.

(56) References Cited

OTHER PUBLICATIONS

Tsang et al., "KRAS (but not BRAF) mutations in ovarian serous borderline tumour are associated with recurrent low-grade serous carcinoma", The Journal of pathology 231, 449-456, 2013.
Tsang et al., "Ultrasound-guided plugged percutaneous biopsy of solid organs in patients with bleeding tendencies.", Hong Kong Medical Journal, 20, 107-112, 2014.
Tsuchiya et al., "Biomarkers for the early diagnosis of hepatocellular carcinoma", World J Gastroenterol., 21(37): 10573-10583, 2015.
Tsuchiya et al., "Collective review of small carcinomas of the pancreas.", Ann Surg 203(1): 77-81, 1986.
Turner et al., "Massively parallel exon capture and library-free resequencing across 16 genomes," Nat. Methods, 2009, 6:315-316.
Turner et al., "Palbociclib in Hormone-Receptor-Positive Advanced Breast Cancer", N Engl J Med 373: 209-219, 2015.
Tutt et al., "Oral poly(ADP-ribose) polymerase inhibitor olaparib in patients with BRCA1 or BRCA2 mutations and advanced breast cancer: a proof-of-concept trial", Lancet 376: 235-44, 2010.
Ueland et al., "Effectiveness of a multivariate index assay in the preoperative assessment of ovarian tumors.", Obstetrics and gynecology 117, 1289-1297, 2011.
Uhlen et al., "Tissue-based map of the human proteome.", Science 347(6220): 1260419, 2015.
Urick et al., "PIK3R1 (p85a) Is Somatically Mutated at High Frequency in Primary Endometrial Cancer," Cancer Research, 2011, 71(12):4062-4064.
Vallania et al., High-throughput discovery of rare insertions and deletions in large cohorts. Genome Res 20: 1711-1718, 2010.
Van Beers et al., "Array-CGH and breast cancer", Breast Cancer Res. 8(3): 210, 10 pages, 2006.
Van Dijk et al., "Ten years of next-generation sequencing technology," Trends in Genetics, 2014, 30(9):418-426.
Van Dongen et al., "Analysis of immunoglobulin and T cell receptor genes. Part II: Possibilities and limitations in the diagnosis and management of lymphoproliferative diseases and related disorders.", Clin Chim Acta 198: 93-174, 1991.
Van Nagell et al., "Ovarian cancer screening with annual transvaginal sonography: findings of 25,000 women screened.", Cancer 109, 1887-1896, 2007.
Vansteenkiste et al., "Prospects and progress of atezolizumab in non-small cell lung cancer", Expert Opin Biol Ther 17(6): 781-789, 2017.
Vijg et al., "Somatic mutations, genome mosaicism, cancer and aging", Current opinion in genetics & development 26: 141-149, 2014.
Vogelstein et al., "Cancer genes and the pathways they control.", Nat. Med. 10, 789-799, 2004.
Vogelstein et al., "Cancer genome landscapes", Science 339, 1546-1558, 2013.
Vogelstein et al., "Digital PCR.", Proc Natl Acad Sci US A 96: 9236-9241, 1999.
Vogelstein et al., "The Path to Cancer—Three Strikes and You're Out", N Engl J Med 3 73: 1895-1898, 2015.
Volpe et al., "Techniques, safety and accuracy of sampling of renal tumors by fine needle aspiration and core biopsy", The journal of urology 178, 379-386, 2007.
Waddell et al., "Whole genomes redefine the mutational landscape of pancreatic cancer", Nature 518(7540):495-501, 2015.
Walsh et al., Coexisting ovarian malignancy in young women with endometrial cancer. Obstetrics and gynecology 106, 693-699, 2005.
Wang et al., "Detection of somatic mutations and HPV in the saliva and plasma of patients with head and neck squamous cell carcinomas.", Science translational medicine 7(293): 293ra104, 2015.
Wang et al., "Detection of tumor-derived DNA in cerebrospinal fluid of patients with primary tumors of the brain and spinal cord.", Proc Natl Acad Sci USA 1 12(31): 9704-9709, 2015.
Wang et al., "Diagnostic potential of tumor DNA from ovarian cyst fluid.", Elife 5, 18 pages, 2016.

Wang et al., "Diagnostic significance of urinary long non-coding PCA3 RNA in prostate cancer", Oncotarget, vol. 8, No. 35, 58577-58586, 2017.
Wang et al., "Evaluation of liquid from the Papanicolaou test and other liquid biopsies for the detection of endometrial and ovarian cancers", Sci. Transl. Med., 10, eaap8796, 9 pages, 2018.
Wang et al., "Extracellular interactions and ligand degradation shape the nodal morphogen gradient", Elife 5: 10.7554/eLife.15 175, 19 pages, 2016.
Wang et al., "Molecular inversion probes: a novel microarray technology and its application in cancer research.", Cancer Genet 205(7-8): 341-55, 2012.
Wang et al., "Molecular mechanisms and clinical applications of miR-22 in regulating malignant progression in human cancer (Review)", International Journal of Oncology, 50: 345-355, 2017.
Wang et al., "PD-L1 and intratumoral immune response in breast cancer", Oncotarget, vol. 8, (No. 31), pp. 51641-51651, 2017.
Wang et al., "TERT promoter mutations are associated with distant metastases in upper tract urothelial carcinomas and serve as urinary biomarkers detected by a sensitive castPCR.", Oncotarget, 5: 12428-12439, 2014.
Wang et al., "The clinical impact of recent advances in LC-MS for cancer biomarker discovery and verification", Expert Rev Proteomics 13: 99-114, 2016.
Wang et al., "The long non-coding RNA Cytor drives colorectal cancer progression by interacting with NCL and Sam68", Molecular Cancer, 17: 110, 16 pages, 2018.
Wei et al., "A study of the relationships between oligonucleotide properties and hybridization signal intensities from NimbleGen microarray datasets", Nucleic Acids Res 36(9): 2926-2938, 2008.
Wilcox et al., "Chronic pancreatitis pain pattern and severity are independent of abdominal imaging findings.", Clin Gastroenterol Hepatol 13(3):552-560; quiz e528-559, 2015.
Wong et al., "A Phase I Study with Neratinib (HKI-272), an Irreversible Pan ErbB Receptor Tyrosine Kinase Inhibitor, in Patients with Solid Tumors, " Clin. Cancer Res., Apr. 2009, 2552-2558.
Woodbury et al., "Elevated HGF Levels in Sera from Breast Cancer Patients Detected Using a Protein Microarray ELISA", J. Proteome Res. 1: 233-237, 2002.
Wu et al., "Endometrial brush biopsy (Tao brush). Histologic diagnosis of 200 cases with complementary cytology: an accurate sampling technique for the detection of endometrial abnormalities.", American journal of clinical pathology 114, 412-418, 2000.
Wu et al., "Recurrent GNAS mutations define an unexpected pathway for pancreatic cyst development.", Sci Transl Med 3, 92ra66, 2011.
Wu et al., "Whole-exome sequencing of neoplastic cysts of the pancreas reveals recurrent mutations in components of ubiquitin-dependent pathways", PNAS 108, 21188-21193, 2011.
Wu, "Urothelial tumorigenesis: a tale of divergent pathways.", Nat Rev Cancer 5: 713-725, 2005.
Xia et al., "Lapatinib Antitumor Activity Is Not Dependent upon Phosphatase and Tensin Homologue Deleted on Chromosome 10 in ErbB2-Overexpressing Breast Cancers", Cancer Res. 67: 1170-1175, 2007.
Xie et al., "Age-related mutations associated with clonal hematopoietic expansion and malignancies.", Nat Med 20(12): 1472-1478, 2014.
Xie et al., "Lnc-PCDH9-13:1 Is a Hypersensitive and Specific Biomarker for Early Hepatocellular Carcinoma", EBioMedicine, 33, 57-67, 2018.
Xu et al., "Recent advances of highly selective CDK4/6 inhibitors in breast cancer", J Hematol. Oncol. 10(1): 97, 2017.
Yachida et al., "Clinical significance of the genetic landscape of pancreatic cancer and implications for identification of potential long-term survivors.", Clin Cancer Res 18: 6339-6347, 2012.
Yachida et al., "Distant metastasis occurs late during the genetic evolution of pancreatic cancer.", Nature, 467: 1114-7, 2010.
Yafi et al., "Prospective analysis of sensitivity and specificity of urinary cytology and other urinary biomarkers for bladder cancer.", Urol Oncol 33 :66.e25-66.e3 1, 2015.
Yamada et al., "It is possible to diagnose malignancy from fluid in cystic ovarian tumors?", European journal of obstetrics, gynecology, and reproductive biology 171, 96-100, 2013.

(56) References Cited

OTHER PUBLICATIONS

Yang et al., "Unusually high incidence of upper urinary tract urothelial carcinoma in Taiwan.", Urology, 59( 5), 681-687, 2002.
Yee et al., "Personalized Therapy Tumor Antigen Discovery for Adoptive Cellular Therapy", Cancer J. 23(2): 144-148, 2016.
Young et al., "Clonal hematopoiesis harbouring AML-associated mutations is ubiquitous in healthy adults.", Nat Commun 7, 12484, 2016.
Young et al., Validation of Biomarkers for Early Detection of Pancreatic Cancer: Summary of the Alliance of Pancreatic Cancer Consortia for Biomarkers for Early Detection Workshop., Pancreas, 2018, 47(2):135-141.
Yousem et al., "Pulmonary Langerhans Cell Histiocytosis. Profiling of Multifocal Tumors Using Next-Generation Sequencing Identifies Concordant Occurrence of BRAF V600E Mutations", Chest 143: 1679-1684, 2013.
Yu et al., "LncRNA HCP5 promotes the development of cervical cancer by regulating MACCI via suppression of microRNA-15a.", Eur. Rev. Med. Pharmacol. Sci., 22: 4812-4819, 2018.
Yu et al., "Long non-coding RNA CACNAIG-ASI promotes cell migration, invasion and epithelial-mesenchymal transition by HNRNPA2B1 in non-small cell lung cancer", Eur. Rev. Med. Pharmacol. Sci., 22: 993-1002, 2018.
Yun et al., "Biomonitoring of aristolactam-DNA adducts in human tissues using ultra-performance liquid chromatography/ion-trap mass spectrometry.", Chem ResToxicol. 2012 25(5): 1119-31, 2012.
Zack et al., "Pan-cancer patterns of somatic copy number alteration.", Nature genetics 45: 1134-1140, 2013.
Zaino et al., "Simultaneously Detected Endometrial and Ovarian Carcinomas—A Prospective Clinicopathologic Study of 74 Cases: A Gynecologic Oncology Group Study", Gynecologic oncology 83: 355-362, 2001.
Zhai et al., "High-grade serous carcinomas arise in the mouse oviduct via defects linked to the human disease.", The Journal of pathology 243, 16-25, 2017.
Zhang "Study of Use of Liquid-based Cytologic Test in Cervical Cancer and Endometrial Carcinoma Screening," China Master Dissertations Full-text Database, No. 8, pp. 4-28, 2005(with English translation).
Zhang et al., "Analysis of the complex interaction of CDR1as-miRNA-protein and detection of its novel role in melanoma", Oncology Letters, 16: 1219-1225, 2018.
Zhang et al., "LncRNA DQ786243 expression as a biomarker for assessing prognosis in patients with gastric cancer.", Eur. Rev. Med. Pharmacol. Sci., 22: 2304-2309, 2018.
Zhang et al., "LncRNA H19 regulates the expression of its target gene HOXA10 in endometrial carcinoma through competing with miR-612.", Eur. Rev. Med. Pharmacol. Sci., 22: 4820-4827, 2018.
Zhang et al., "The cytomorphological features of low-grade urothelial neoplasms vary by specimen type.", Cancer Cytopathol 124: 552-564, 2016.
Zhao et al., "Histologic follow-up results in 662 patients with Pap test findings of atypical glandular cells: results from a large academic womens hospital laboratory employing sensitive screening methods.", Gynecologic oncology 114, 383-389, 2009.
Zheng et al., "Anchored multiplex PCR for targeted next-generation sequencing," Nat Med., 2014, 20:1479-1484.
Zhou et al., "Identifying markers for pancreatic cancer by gene expression analysis.", Cancer Epidemiol Biomarkers Prev 7(2): 109-112, 1998.
Zilbermann et al., "Genome-wide analysis of Dna methylation patterns" Development 134, 2007.
Zimmermann et al., "Digital PCR: a powerful new tool for noninvasive prenatal diagnosis?", Prenat Diagn 28: 1087-1093, 2008.
Zou et al., "More valuable than platinum: first-line pembrolizumab in advanced stage non-small-cell lung cancer.", Ann Oncol 28(4): 685-687, 2017.
Extended Search Report in European Appln. No. 22856660.0, mailed on May 16, 2025, 9 pages.

Same Endogenous UID (Molecule End) and Exogenous UID

Watson Orientation

Crick Orientation

Watson

Same Endogenous UID (Molecule End)
and Exogenous UID

Crick

Watson

5'————————————— - - -

————————→
——————————————— — — — — -5'  Watson Read 1: UID is Read *Last* and
Insert Maps to *Sense* Strand Crick 5'- - - ———————————————
                        ←——
——————————————— — ———5'  Crick Read 1: UID is Read *First* and
Insert Maps to *Antisense* Strand

FIG. 20

Watson

5'————————————————— - - -
                     ←— -
——————————————— — - - - -5'  Watson Read 2: UID is Read *First* and
Insert Maps to *Antisense* Strand Crick 5'- - ———————————————
———→
——————————————— — ———5'  Crick Read 2: UID is Read *Last* and
Insert Maps to *Sense* Strand

METHODS AND MATERIALS FOR ASSESSING NUCLEIC ACIDS

The present application is a continuation of U.S. application Ser. No. 17/174,838, filed on Feb. 12, 2021, which claims priority to U.S. Provisional Application Ser. No. 62/977,066, filed Feb. 14, 2020, which are herein incorporated by reference in their entireties.

STATEMENT REGARDING FEDERAL FUNDING

This invention was made with government support under grants CA062924, CA152753 and CA230691 awarded by the National Institutes of Health. The government has certain rights in the invention.

TECHNICAL FIELD

This invention is related to the area of nucleotide sequencing. In particular, it relates to sequencing library preparation and sequencing workflow for the identification of mutations.

SEQUENCE LISTING

This application contains a Sequence Listing that has been submitted electronically as an XML file named "44807-0341002_ST26_SL.XML." The XML file, created on Jun. 5, 2024, is 105,675 bytes in size. The material in the XML file is hereby incorporated by reference in its entirety.

BACKGROUND INFORMATION

The identification of rare mutations is useful in aspects of fundamental biological as well as to improve the clinical management of patients. Fields of use include infectious diseases, immune repertoire profiling, palentogenetics, forensics, aging, non-invasive prenatal testing, and cancer. Next generation sequencing (NGS) technologies are theoretically suitable for this application, and a variety of NGS approaches exist for the detection of rare mutations. However, for conventional NGS approaches, the error rate of the sequencing itself is too high to allow confident detection of mutations, particularly those mutations present at low frequencies in the original sample.

The use of molecular barcodes to tag original template molecules was designed to overcome various obstacles in the detection of rare mutations. With molecular barcoding, redundant sequencing of the PCR-generated progeny of each tagged molecule is performed and sequencing errors are easily recognized (Kinde et al., *Proc Natl Acad Sci USA* 108:9530-9535 (2011)). For example, if a given threshold of the progeny of the barcoded template molecule contain the same mutation, then the mutation is considered genuine (a "supermutant"). If less than a given threshold of the progeny contain the mutation of interest, then the mutation is considered an artifact. Two types of molecular barcodes have been described: exogenous and endogenous. Exogenous barcodes (also referred to herein as exogenous UIDs) comprise pre-specified or random nucleotides, and are appended during library preparation or during PCR. Endogenous barcodes (also referred to herein as endogenous UIDS) are formed by the sequences at the 5' and 3' ends of fragments (e.g., fragments generated by random shearing of DNA or fragments present in a cell-free fluid biological sample) of the template DNA to be assayed. Such barcodes have been proven useful for tracing amplicons back to an original starting template, allowing for molecular counting and improving the identification of true mutations in clinically-relevant samples.

Forked adapters for paired end sequencing have been developed to enable "duplex sequencing", wherein each of the two strands (Watson and Crick) of the original DNA duplex can be discerned by the 5' to 3' directionality revealed upon sequencing. Duplex sequencing reduces sequencing errors because it is extremely unlikely that both strands of DNA would contain the identical mutation if that mutation was erroneously generated during library preparation or sequencing.

However, there are many issues that have limited the range of applications and clinical applicability of molecular barcoding. For example, it is challenging to convert a large fraction of the initial template molecules to duplex molecules with the same barcode on each strand (Schmitt et al., *Proc Natl Acad Sci USA* 109:14508-14513 (2012); Schmitt et al., *Nat Methods* 12:423-425 (2015); and Newman et al., *Nat Biotechnol* 34:547-555 (2016)). This issue is particularly problematic when the amount of initial DNA is limited (e.g. <33 ng), such as is found in the cell-free plasma DNA typically used for liquid biopsies.

Preparation of targeted sequencing libraries generally involve adapter attachment to sequencing templates, amplification of the library, and hybridization capture to enrich the library for targets of interest. While effective for enriching large regions of interest, hybridization capture does not scale well for small target regions (Springer et al., *Elife* 7:doi: 10.7554/eLife.32143 (2018)) and exhibits poor duplex recovery (Wang et al., *Proc Natl Acad Sci USA* 112:9704-9709 (2015); and Wang et al., *Elife* 5:doi:10.7554/eLife.15175 (2016)). Sequential rounds of capture can partially overcome these limitations, but even with such improvements, duplex recovery rates are typically ~1%. CRISPR-DS can achieve up to 15% recovery, but is not applicable to cell-free DNA. When the targeted region is very small (e.g. one or a few positions in the genome of particular interest, such as required for disease monitoring in plasma), or the amount of DNA available is limited (e.g. <33 ng, as often found in plasma), capture-based approaches are suboptimal.

Accordingly, there exists a need for improvements to sequencing library preparation and workflow, to enable accurate identification of mutations, e.g., rare mutations, in clinically relevant samples such as liquid biopsy samples.

SUMMARY

The present document provides methods and materials that addresses these issues by providing an approach to identically barcode both strands of templates, and by providing a method for PCR-based enrichment of each strand that does not require hybridization capture.

This document relates to methods and materials that can be used to detect the presence of one or more mutations present on both strands of a double stranded nucleic acid (e.g., DNA). In some cases, methods for detecting one or more mutations present on both strands of a double stranded nucleic acid can include generating a duplex sequencing library having a duplex molecular barcode on each end (e.g., the 5' end and the 3' end) of each nucleic acid in the library, generating a library of single stranded Watson strand-derived sequences and a library of single stranded Crick-strand derived sequences from the duplex sequencing library, and detecting the presence of one or more mutations present on both strands of the double stranded nucleic acid in each single stranded library.

As demonstrated herein, a single stranded DNA library corresponding to the Watson strands of a double stranded nucleic acid template and a single stranded DNA library corresponding to the Crick strands of a double stranded nucleic acid template can be generated from sequencing libraries incorporating duplex molecular barcodes, each single stranded DNA library can be enriched for a target region using a strand-specific anchored PCR approach, and the target region can be sequenced to detect the presence of absence of one or more mutations within the target region of a nucleic acid. For example, methods and materials described herein that can be used to detect the presence of one or more mutations present on both strands of a double stranded nucleic acid can be termed the Sequence Ascertainment Free of Errors Sequencing System (SaferSeqS), and can include for example, library construction with in situ generation of double stranded molecular barcodes (see, e.g., FIG. 22a), target enrichment via anchored PCR (see, e.g., FIG. 22b), and in silico reconstruction of template molecules (see, e.g., FIG. 22c). Bonafide mutations present in the original starting templates can be identified by requiring alterations to be found on both strands of the same initial nucleic acid molecule.

Having the ability to detect one or more mutations present on both strands of a double stranded nucleic acid (e.g., true somatic mutations) provides a unique and unrealized opportunity to accurately and efficiently assess multiple mutations simultaneously and at an affordable cost. Using methods and materials described herein to detect the presence of one or more mutations present on both strands of a double stranded nucleic acid (e.g., SaferSeqS methods) can permit the identification of rare mutations with high confidence, while minimizing the amount of DNA damage, the amount of PCR to be performed, and/or the number of DNA damage artifacts. It is noted that the terms "Watson strand" and "Crick strand" are used simply to distinguish between the two strands of a double-stranded starting nucleic acid sequence. Either of the strands can be denoted "Watson" or "Crick," and then the other strand is denoted with the other name.

In some embodiments, provided herein are methods of comprising: a) forming a reaction mixture comprising: i) a plurality of double-stranded DNA fragments that are dephosphorylated and blunt-ended, wherein each of the double-stranded DNA fragments comprises Watson and Crick strands; ii) a plurality of adaptors, wherein each of the adaptors comprises, in the 5' to 3' direction: A) a barcode, and B) a universal 3' adaptor sequence; and iii) a ligase; and b) incubating the reaction mixture such that: i) adaptors are ligated to the 3' ends of the Watson and Crick strands, and ii) adaptors are not ligated to the 5' ends of either the Watson or Crick strands, thereby generating double-stranded ligation products.

In certain embodiments, each of the plurality of adaptors comprises a unique barcode. In further embodiments, each of the double-stranded ligation products comprises a Watson strand with only one barcode and a Crick strand with only one barcode that is different from the barcode on the Watson strand. In further embodiments, the methods further comprise the step of: c) sequencing at least a portion of the double-stranded ligation products.

In particular embodiments, provided herein are methods comprising: a) attaching partially double-stranded 3' adaptors (3'PDSAs) to 3' ends of both Watson and Crick strands of a population of double-stranded DNA fragments in an analyte DNA sample, wherein a first strand of the 3'PDSAs comprises, in the 5'-3' direction, (i) a first segment, (ii) an exogenous UID sequence, (iii) an annealing site for a 5' adaptor, and (iv) a universal 3' adaptor sequence comprising an R2 sequencing primer site, and wherein the second strand of the 3'PDSAs comprises, in the 5' to 3' direction, (i) a segment complementary to the first segment, and, optionally, (ii) a 3' blocking group, b) annealing 5' adaptors to the annealing site, wherein the 5' adaptors comprise, in the 5' to 3' direction, (i) a universal 5' adaptor sequence that is not complementary to the universal 3' adaptor sequence and that comprises an R1 sequencing primer site, and (ii) a sequence complementary to the annealing site for the 5' adaptor; c) extending the 5' adaptors across the exogenous UID sequence and the first segment, thereby generating the complement of the exogenous UID sequence and complement of the first segment, and d) covalently linking the 3' end of the complement of the first segment to the 5' ends of the Watson and Crick strands of the double-stranded DNA fragments, thereby generating a plurality of adaptor-ligated double-stranded DNA fragments.

In some embodiments, provided herein are methods comprising: a) attaching partially double-stranded 3' adaptors (3'PDSAs) to 3' ends of both Watson and Crick strands of a population of double-stranded DNA fragments in an analyte DNA sample, wherein a first strand of the 3'PDSAs comprises, in the 5'-3' direction, (i) a first segment, (ii) an exogenous UID sequence, (iii) an annealing site for a 5' adaptor, and (iv) a universal 3' adaptor sequence comprising an R2 sequencing primer site, and wherein the second strand of the 3'PDSAs comprises, in the 5' to 3' direction, (i) a segment complementary to the first segment, and optionally (ii) a 3' blocking group, b) annealing 5' adaptors to the annealing site, wherein the 5' adaptors comprise, in the 5' to 3' direction, (i) a universal 5' adaptor sequence that is not complementary to the universal 3' adaptor sequence and that comprises an R1 sequencing primer site, and (ii) a sequence complementary to the annealing site for the 5' adaptor; c) extending the 5' adaptors across the exogenous UID sequence, thereby generating the complement of the exogenous UID sequence, and d) covalently linking the 3' end of the complement of the exogenous UID sequence to the 5' ends of the segment complementary to the first segment on each of the Watson and Crick strands of the double-stranded DNA fragments, thereby generating a plurality of adaptor-ligated double-stranded DNA fragments.

In some embodiments, provided herein are methods comprising: a) attaching partially double-stranded 3' adaptors (3'PDSAs) to 3' ends of both Watson and Crick strands of a population of double-stranded DNA fragments in an analyte DNA sample, wherein a first strand of the 3'PDSAs comprises, in the 5'-3' direction, (i) a first segment, (ii) an exogenous UID sequence, (iii) an annealing site for a 5' adaptor, and (iv) a universal 3' adaptor sequence comprising an R2 sequencing primer site, and wherein the second strand of the 3'PDSAs comprises, in the 5' to 3' direction, (i) a segment complementary to the first segment, and optionally (ii) a 3' blocking group, b) annealing 5' adaptors to the annealing site, wherein the 5' adaptors comprise, in the 5' to 3' direction, (i) a universal 5' adaptor sequence that is not complementary to the universal 3' adaptor sequence and that comprises an R1 sequencing primer site, and (ii) a sequence complementary to the annealing site for the 5' adaptor; c) extending the 5' adaptors across the exogenous UID sequence and the first segment of the 3'PDSA, thereby generating the complement of the exogenous UID sequence and the complement of the first segment of the 3'PDSA, and d) covalently linking the 3' end of the complement of the first segment of the 3'PDSA to the 5' ends of the Watson and Crick strands of the double-stranded DNA fragments, thereby generating a plurality of adaptor-ligated double-stranded DNA fragments.

In some embodiments, provided here are systems and kits and compositions comprising: a) a population of partially double-stranded 3' adaptors (3'PDSAs) configured to be ligated to the 3' ends of both Watson and Crick strands of a population of double-stranded DNA fragments, wherein a first strand of the 3'PDSAs comprises, in the 5'-3' direction, (i) a first segment, (ii) an exogenous UID sequence, (iii) an annealing site for a 5' adaptor, and (iv) a universal 3' adaptor sequence comprising an R2 sequencing primer site, and wherein the second strand of the 3'PDSAs comprises, in the 5' to 3' direction, (i) a segment complementary to the first segment, and (ii) a 3' blocking group; and b) a population of 5' adaptors configured to anneal to the annealing site, wherein the 5' adaptors comprise, in the 5' to 3' direction, (i) a universal 5' adaptor sequence that is not complementary to the universal 3' adaptor sequence and that comprises an R1 sequencing primer site, and (ii) a sequence complementary to the annealing site for the 3' adaptor.

In further embodiments, the systems, kits, and compositions further comprise: c) the population of double-stranded DNA fragments from a biological sample, and/or c) reagents for degrading the second strand of the 3'PDSAs to generate single-stranded 3' adaptors (3'SSAs); and/or c) a first primer complementary to the universal 3' adaptor sequence, and second primer complementary to the complement of the universal 5' adaptor sequence; and/or c) a sequencing system; and/or c) a Watson anchor primer complimentary to the universal 3' adapter sequence, and d) a Crick anchor primer complimentary to the complement of the universal 5' adapter sequence; and/or c) a first set of Watson target-selective primer pairs, comprising (i) one or more first Watson target-selective primers comprising a sequence complementary to a portion of the universal 3' adapter sequence, and (ii) one or more second Watson target selective primers, each of the one or more second Watson target-selective primers comprising a target-selective sequence; and/or c) a first set of Crick target-selective primer pairs, comprising (i) one or more Crick target-selective primers comprising a sequence complementary to a portion of the universal 5' adapter sequence, and (ii) one or more second Crick target-selective primers, each of the one or more second Crick target selective primers comprising the same target-selective sequence as the second Watson target-selective primer sequence.

In some embodiments, the methods further comprise: amplifying the plurality of adaptor-ligated, double-stranded DNA fragments with a first primer complementary to the universal 3' adaptor sequence, and second primer complementary to the complement of the universal 5' adaptor sequence, thereby generating amplicons, wherein the amplicons comprise a plurality of double-stranded Watson templates and a plurality of double-stranded Crick templates. In certain embodiments, the methods further comprise: selectively amplifying said double-stranded Watson templates with a first set of Watson target-selective primer pairs, the first set of Watson target-selective primer pairs comprising: (i) a first Watson target-selective primer comprising a sequence complementary to a portion of the universal 3' adapter sequence, and (ii) a second Watson target-selective primer comprising a target-selective sequence, thereby creating target Watson amplification products. In further embodiments, the methods further comprise: selectively amplifying said double-stranded Crick templates with a first set of Crick target-selective primer pairs, the first set of Crick target-selective primer pairs comprising: (i) a first Crick target-selective primer comprising a sequence complementary to the complement of a portion of the universal 5' adapter sequence, and (ii) a second Crick target-selective primer comprising the same target-selective sequence as the second Watson target-selective primer sequence, thereby creating target Crick amplification products. In certain embodiments, the population of double-stranded DNA fragments are incubated with a mixture of uracil-DNA glycosylase and DNA glycosylase-lyase Endonuclease VIII, prior to ligating any adapters.

In some embodiments, the polymerase employed (e.g., for extending the 5' adapter sequences) has 5' to 3' exonuclease activity (e.g., which can digest the second strand of the 3'PDSAs). In other embodiments, the polymerase employed (e.g., for extending the 5' adapter sequences) does not have 5' to 3' exonuclease activity.

In other embodiments, the methods further comprise: removing the second strand of the 3'PDSAs to generate single-stranded 3' adaptors (3'SSAs). In other embodiments, wherein the removing the second strand occurs after step b), or before step b), or during step b). In some embodiments, the removing the second strand of the 3'PDSAs comprises contacting the 3' duplex adapter with uracil-DNA glycosylase (UDG) to degrade the second strand. In further embodiments, the removing the second strand is accomplished by a polymerase with exonuclease activity, wherein the polymerase extends the 5' adaptors across the exogenous UID sequence and the first segment.

In further embodiments, the methods further comprise: determining sequence reads of one or more of the amplicons. In other embodiments, the methods further comprise: assigning the sequence reads into UID families, wherein each member of a UID family comprises the same exogenous UID sequence. In particular embodiments, the methods further comprise: assigning sequence reads of each UID family into a Watson subfamily and Crick subfamily based on spatial relationship of the exogenous UID sequence to the R1 and R2 read sequence. In other embodiments, the methods further comprise: identifying a nucleotide sequence as accurately representing a Watson strand of an analyte DNA fragment when at least 50% (e.g., 50 . . . 75 . . . 95%) of the Watson subfamily contain the sequence. In other embodiments, the methods further comprise: identifying a nucleotide sequence as accurately representing a Crick strand of an analyte DNA fragment when at least 50% (e.g., 50 . . . 75 . . . 90%) of the Crick subfamily contain the sequence.

In some embodiments, the methods further comprise: identifying a mutation in the nucleotide sequence as accurately representing a the Watson strand when the sequence accurately representing the Watson strand differs from a reference sequence that lacks the mutation. In additional embodiments, the methods further comprise: identifying a mutation in the nucleotide sequence as accurately representing the Crick Strand when the sequence accurately representing the Crick Strand differs from a reference sequence that lacks the mutation. In other embodiments, the methods further comprise: identifying a mutation in the analyte DNA fragment when the mutation in the nucleotide sequence accurately representing the Watson strand and the mutation in the nucleotide sequence accurately representing the Crick strand are the same mutation. In some embodiments, each member of a UID family further comprises the same endogenous UID sequence, wherein the endogenous UID sequence comprises an end of a double-stranded DNA fragment from the population. In other embodiments, the population of double-stranded DNA fragments has blunt ends.

Provided herein are for detecting the presence or absence of a mutation in a target region of a double stranded DNA template obtained from a sample from a mammal, and determining whether the mutation is present on both strands of the double stranded DNA template, wherein the method comprises: A) generating double stranded DNA fragments each having a duplex molecular barcode on each end of the double stranded DNA fragment; B) amplifying the double stranded DNA fragment comprising the duplex molecular barcode on each end of the double stranded DNA fragment to generate an amplified duplex sequencing library, wherein the amplifying comprises contacting the double stranded DNA fragment comprising the duplex molecular barcode on each end of the double stranded DNA fragment with a universal primer pair under whole-genome PCR conditions; C) optionally, generating a single stranded DNA library of Watson strands from the amplified duplex sequencing library; D) optionally, generating a single stranded DNA library of Crick strands from the amplified duplex sequencing library; E) amplifying the target region from the DNA library (e.g., the single stranded DNA library) of Watson strands using a primer pair consisting of a first primer capable of hybridizing to the target region and a second primer capable of hybridizing to the 3' duplex adapter; F) amplifying the target region from the DNA library (e.g., the single stranded DNA library) of Crick strands using a primer pair consisting of a first primer capable of hybridizing to the target region and a second primer capable of hybridizing to the 5' adapter; G) sequencing the target region amplified from the DNA library (e.g., the single stranded DNA library) (e.g., the DNA library (e.g., the single stranded DNA library)) of Watson strands to generate a sequencing read and to detect the presence or absence of the mutation in a Watson strand of the target region; H) sequencing the target region amplified from the DNA library (e.g., the single stranded DNA library) (e.g., the DNA library (e.g., the single stranded DNA library)) of Crick strands to generate a sequencing read and detect the presence or absence of the mutation in a Crick strand of the target region; and I) grouping the sequencing reads by the molecular barcode present in each sequencing read to determining whether the mutation is present on both strands of the double stranded DNA template. In some embodiments, generating the double stranded DNA fragments each having the duplex molecular barcode on each end of the double stranded DNA fragment comprises: i) ligating a 3' duplex adapter to each 3' end of a double stranded DNA fragment obtained from the double stranded DNA template, wherein the 3' duplex adapter comprises a) a first oligonucleotide comprising a 5' phosphate, a first molecular barcode, and a 3' oligonucleotide annealed to b) a second oligonucleotide comprising a degradable 3' blocking group, wherein the 3' oligonucleotide and the second oligonucleotide sequence are complementary; ii) degrading the degradable 3' blocking group; iii) ligating a 5' adapter to each dephosphorylated 5' end of the double stranded DNA fragment obtained from the double stranded DNA template, wherein the 5' duplex adapter comprises an oligonucleotide comprising a second molecule barcode, wherein the second molecular barcode is different from the first molecular barcode, wherein the 5' adapter is ligated onto the double stranded DNA fragment upstream of the first molecular barcode and leaving a gap of single stranded nucleic acid between the 5' end of the double stranded DNA fragment and the 5' adapter; and iv) filling in the gap of single stranded nucleic acid between the 5' end of the double stranded DNA fragment and the 5' adapter to generate the double stranded DNA fragment comprising the duplex molecular barcode on each end of the double stranded DNA fragment. In some embodiments, generating the DNA library (e.g., the single stranded DNA library) (e.g., the DNA library (e.g., the single stranded DNA library)) of Watson strands from the amplified duplex sequencing library comprises: i) amplifying a first aliquot of the amplified duplex sequencing library using a primer pair consisting of a first primer and a second primer, wherein the first primer is capable of hybridizing to the Watson strand, and wherein the first primer comprises a tag, to generate double stranded amplification products having tagged Watson strands; ii) denaturing the double stranded amplification products having tagged Watson strands to generate single stranded tagged Watson strands and single stranded Crick strands; and iii) recovering the single stranded tagged Watson strands to generate the DNA library (e.g., the single stranded DNA library) of Watson strands from the amplified duplex sequencing library.

In some embodiments, the double stranded DNA template is obtained from a sample from a mammal the generating the DNA library (e.g., the single stranded DNA library) of Crick strands from the amplified duplex sequencing library comprises: i) amplifying a second aliquot of the amplified duplex sequencing library using a primer pair consisting of a first primer and a second primer, wherein the first primer is capable of hybridizing to the Crick strand, and wherein the first primer comprises a tag, to generate double stranded amplification products having tagged Crick strands; ii) denaturing the double stranded amplification products having tagged Crick strands to generate single stranded tagged Crick strands and single stranded Watson strands; and iii) recovering the single stranded tagged Crick strands to generate the DNA library (e.g., the single stranded DNA library) of Crick strands from the amplified duplex sequencing library. In some embodiments, the mammal is a human.

In some embodiments, the method further comprises, prior to the generating a double stranded DNA fragment having the duplex molecular barcode on each end of the double stranded DNA fragment: fragmenting the double stranded DNA to generate double stranded DNA fragments; dephosphorylating 5' ends of the double stranded DNA fragments; and blunting the ends of double stranded DNA fragments. In some embodiments, ligating a 3' duplex adapter to each 3' end of a double stranded DNA fragment obtained from the double stranded DNA template comprises contacting the 3' duplex adapter and the double stranded DNA fragment obtained from the double stranded DNA template in the presence of a ligase. In some embodiments, the ligase is a T4 DNA ligase.

In some embodiments, degrading the degradable 3' blocking group comprises contacting the 3' duplex adapter with uracil-DNA glycosylase (UDG). In some embodiments, ligating the 5' adapter to each dephosphorylated 5' end of the double stranded DNA fragment obtained from the double stranded DNA template comprises contacting the 5' adapter and the double stranded DNA fragment obtained from the double stranded DNA template in the presence of a ligase. In some embodiments, the ligase is an *Escherichia coli* ligase.

In some embodiments, filling in the gap of single stranded nucleic acid between the 5' end of the double stranded DNA fragment and the 5' adapter comprises contacting the 5' end of the double stranded DNA fragment and the 5' adapter in the presence of a polymerase and dNTPs. In some embodiments, the polymerase is a Taq polymerase.

In some embodiments, the ligating the 5' adapter to each 5' end of the double stranded DNA fragment, and the filling in the gap between the 5' end of the double stranded DNA fragment and the 5' adapter are performed concurrently. In some embodiments, amplifying the double stranded DNA fragment comprising the duplex molecular barcode on each end of the double stranded DNA fragment to generate an amplified duplex sequencing library comprises contacting the double stranded DNA fragment comprising the duplex molecular barcode on each end of the double stranded DNA fragment with a universal primer pair under PCR conditions. In some embodiments, the amplifying comprises whole-genome PCR. In some embodiments, the tagged primers are biotinylated primers, and wherein the biotinylated primers can generate biotinylated single stranded Watson strands and biotinylated single stranded Crick strands. In some embodiments, the denaturing steps comprise NaOH denaturation, heat denaturation, or a combination of both.

In some embodiments, the recovering steps comprise contacting the tagged Watson strands with streptavidin-functionalized beads and contacting the tagged Crick strands with streptavidin-functionalized beads. In some embodiments, the recovering steps further comprise denaturing non-tagged Watson strands and denaturing non-tagged Watson strands. In some embodiments, the recovering steps further comprise releasing the biotinylated single stranded Watson strands from the streptavidin-functionalized beads and releasing the biotinylated single stranded Crick strands from the streptavidin-functionalized beads. In some embodiments, the tagged primers are phosphorylated primers, and the phosphorylated primers can generate phosphorylated single stranded Watson strands and phosphorylated single stranded Crick strands. In some embodiments, the denaturing steps comprises lambda exonuclease digestion.

In some embodiments, amplifying the target region from the DNA library (e.g., the single stranded DNA library) of Watson strands further comprises second amplification using a second primer pair consisting of a first primer capable of hybridizing to the target region and a second primer capable of hybridizing to the 3' duplex adapter; and wherein the amplifying the target region from the DNA library (e.g., the single stranded DNA library) of Crick strands further comprises a second amplification using a second primer pair consisting of a first primer capable of hybridizing to the target region and a second primer capable of hybridizing to the 5' adapter. In some embodiments, the sequencing steps comprise paired-end sequencing.

Also provided herein are methods for detecting the presence or absence of a mutation in a target region of a double stranded DNA template obtained from a sample from a mammal, and determining whether the mutation is present on both strands of the double stranded DNA template, wherein the method comprises: A) generating double stranded DNA fragments each having a duplex molecular barcode on each end of the double stranded DNA fragment; B) generating a DNA library (e.g., the single stranded DNA library) of Watson strands and a DNA library (e.g., the single stranded DNA library) of Crick strands from the amplified duplex sequencing library from the double stranded DNA fragment having the duplex molecular barcode on each end of the double stranded DNA fragment; C) amplifying the target region from the single stranded Watson strands using a primer pair consisting of a first primer capable of hybridizing to the target region and a second primer capable of hybridizing to the 3' duplex adapter; D) amplifying the target region from the single stranded Crick strands using a primer pair consisting of a first primer capable of hybridizing to the target region and a second primer capable of hybridizing to the 5' adapter; E) sequencing the target region amplified from the DNA library (e.g., the single stranded DNA library) of Watson strands to generate a sequencing read and to detect the presence or absence of the mutation in a Watson strand of the target region; F) sequencing the target region amplified from the DNA library (e.g., the single stranded DNA library) of Crick strands to generate a sequencing read and detect the presence or absence of the mutation in a Crick strand of the target region; and G) grouping the sequencing reads by the molecular barcode present in each sequencing read to determining whether the mutation is present on both strands of the double stranded DNA template.

In some embodiments, the double stranded DNA template is a genomic DNA sample and generating the double stranded DNA fragments each having the duplex molecular barcode on each end of the double stranded DNA fragment comprises: i) ligating a 3' duplex adapter to each 3' end of a double stranded DNA fragment obtained from the double stranded DNA template, wherein the 3' duplex adapter comprises a) a first oligonucleotide comprising a 5' phosphate, a first molecular barcode, and a 3' oligonucleotide annealed to b) a second oligonucleotide comprising a degradable 3' blocking group, wherein the 3' oligonucleotide and the second oligonucleotide sequence are complementary; ii) degrading the degradable 3' blocking group; iii) ligating a 5' adapter to each dephosphorylated 5' end of the double stranded DNA fragment obtained from the double stranded DNA template, wherein the 5' duplex adapter comprises an oligonucleotide comprising a second molecule barcode, wherein the second molecular barcode is different from the first molecular barcode, wherein the 5' adapter is ligated onto the double stranded DNA fragment upstream of the first molecular barcode and leaving a gap of single stranded nucleic acid between the 5' end of the double stranded DNA fragment and the 5' adapter; and iv) filling in the gap of single stranded nucleic acid between the 5' end of the double stranded DNA fragment and the 5' adapter to generate the double stranded DNA fragment comprising the duplex molecular barcode on each end of the double stranded DNA fragment.

In some embodiments, the double stranded DNA template is a cell-free DNA sample and generating the DNA library (e.g., the single stranded DNA library) of Watson strands and the DNA library (e.g., the single stranded DNA library) of Crick strands from the amplified duplex sequencing library from the double stranded DNA fragment having the duplex molecular barcode on each end of the double stranded DNA fragment comprises: i) amplifying the double stranded DNA fragment having the duplex molecular barcode on each end of the double stranded DNA fragment using a universal primer pair consisting of a first primer and a second primer, wherein the amplifying comprises contacting the double stranded DNA fragment comprising the duplex molecular barcode on each end of the double stranded DNA fragment with the primer pair under whole-genome PCR conditions, wherein the first primer is capable of hybridizing to the Watson strand, and wherein the first primer is biotinylated, to generate double stranded amplification products having biotinylated Watson strands; ii) contacting the double stranded amplification products having biotinylated Watson strands with streptavidin-functionalized beads under conditions where the biotinylated Watson strands bind to the streptavidin-functionalized beads; iii) denaturing the double stranded amplification products having biotinylated Watson strands to leave single stranded biotinylated Watson strands bound to the streptavidin-functionalized beads and to release single stranded Crick strands; iv) collecting the single stranded Crick strands; v) releasing the single stranded biotinylated Watson strands from the streptavidin-functionalized beads; and vi) collecting the single stranded biotinylated Watson strands.

In some embodiments, the double stranded DNA template is obtained from a sample from a mammal. In some embodiments, the mammal is a human.

In some embodiments, the method further comprises, prior to the generating a double stranded DNA fragment having the duplex molecular barcode on each end of the double stranded DNA fragment: fragmenting the double stranded DNA to generate double stranded DNA fragments; dephosphorylating 5' ends of the double stranded DNA fragments; and blunting the ends of double stranded DNA fragments.

In some embodiments, ligating a 3' duplex adapter to each 3' end of a double stranded DNA fragment obtained from the double stranded DNA template comprises contacting the 3' duplex adapter and the double stranded DNA fragment obtained from the double stranded DNA template in the presence of a ligase. In some embodiments, the ligase is a T4 DNA ligase. In some embodiments, the degradable 3' blocking group comprises contacting the 3' duplex adapter with uracil-DNA glycosylase (UDG). In some embodiments, ligating the 5' adapter to each dephosphorylated 5' end of the double stranded DNA fragment obtained from the double stranded DNA template comprises contacting the 5' adapter and the double stranded DNA fragment obtained from the double stranded DNA template in the presence of a ligase. In some embodiments, the ligase is an *Escherichia coli* ligase.

In some embodiments, filling in the gap of single stranded nucleic acid between the 5' end of the double stranded DNA fragment and the 5' adapter comprises contacting the 5' end of the double stranded DNA fragment and the 5' adapter in the presence of a polymerase and dNTPs. In some embodiments, the polymerase is a Taq-B polymerase. In some embodiments, ligating the 5' adapter to each 5' end of the double stranded DNA fragment, and the filling in the gap between the 5' end of the double stranded DNA fragment and the 5' adapter are performed concurrently.

In some embodiments, amplifying the double stranded DNA fragment having the duplex molecular barcode on each end of the double stranded DNA fragment comprises contacting the double stranded DNA fragment comprising the duplex molecular barcode on each end of the double stranded DNA fragment with the primer pair under PCR conditions. In some embodiments, amplifying comprises whole-genome PCR. In some embodiments, amplifying the target region from the DNA library (e.g., the single stranded DNA library) of Watson strands further comprises second amplification using a second primer pair consisting of a first primer capable of hybridizing to the target region and a second primer capable of hybridizing to the 3' duplex adapter; and wherein the amplifying the target region from the DNA library (e.g., the single stranded DNA library) of Crick strands further comprises a second amplification using a second primer pair consisting of a first primer capable of hybridizing to the target region and a second primer capable of hybridizing to the 5' adapter. In some embodiments, the sequencing steps comprise paired-end sequencing or single-end sequencing.

Also provided herein are methods for detecting the presence or absence of a mutation in a target region of a double stranded DNA template obtained from a sample from a mammal, and determining whether the mutation is present on both strands of the double stranded DNA template, wherein the method comprises: A) generating double stranded DNA fragments each having a duplex molecular barcode on each end of the double stranded DNA fragment; B) amplifying the double stranded DNA fragments each having the duplex molecular barcode on each end of the double stranded DNA fragment using a universal primer pair, wherein the amplifying comprises contacting the double stranded DNA fragment comprising the duplex molecular barcode on each end of the double stranded DNA fragment with the primer pair under whole-genome PCR conditions; C) amplifying the target region from a Watson strand of the amplified double stranded DNA fragments each having the duplex molecular barcode on each end of the double stranded DNA fragment using a primer pair consisting of a first primer capable of hybridizing to the target region and a second primer capable of hybridizing to the 3' duplex adapter; D) amplifying the target region from a Crick strand of the amplified double stranded DNA fragments each having the duplex molecular barcode on each end of the double stranded DNA fragment using a primer pair consisting of a first primer capable of hybridizing to the target region and a second primer capable of hybridizing to the 5' adapter; E) sequencing the target region amplified from the Watson strand to generate a sequencing read and to detect the presence or absence of the mutation in a Watson strand of the target region; F) sequencing the target region amplified from the Crick strand to generate a sequencing read and detect the presence or absence of the mutation in a Crick strand of the target region; G) grouping the sequencing reads by the molecular barcode present in each sequencing read to determining whether the mutation is present on both strands of the double stranded DNA template.

In some embodiments, the double stranded DNA template is a genomic DNA sample and generating the double stranded DNA fragments each having the duplex molecular barcode on each end of the double stranded DNA fragment comprises: i) ligating a 3' duplex adapter to each 3' end of a double stranded DNA fragment obtained from the double stranded DNA template, wherein the 3' duplex adapter comprises a) a first oligonucleotide comprising a 5' phosphate, a first molecular barcode, and a 3' oligonucleotide annealed to b) a second oligonucleotide comprising a degradable 3' blocking group, wherein the 3' oligonucleotide and the second oligonucleotide sequence are complementary; ii) degrading the degradable 3' blocking group; iii) ligating a 5' adapter to each dephosphorylated 5' end of the double stranded DNA fragment obtained from the double stranded DNA template, wherein the 5' duplex adapter comprises an oligonucleotide comprising a second molecule barcode, wherein the second molecular barcode is different from the first molecular barcode, wherein the 5' adapter is ligated onto the double stranded DNA fragment upstream of the first molecular barcode and leaving a gap of single stranded nucleic acid between the 5' end of the double stranded DNA fragment and the 5' adapter; and iv) filling in the gap of single stranded nucleic acid between the 5' end of the double stranded DNA fragment and the 5' adapter to generate the double stranded DNA fragment comprising the duplex molecular barcode on each end of the double stranded DNA fragment. In some embodiments, the double stranded DNA template is a cell-free DNA sample. In some embodiments, the double stranded DNA template is a genomic DNA sample. In some embodiments, the mammal is a human.

In some embodiments, the method further comprises, prior to the generating a double stranded DNA fragment having the duplex molecular barcode on each end of the double stranded DNA fragment: fragmenting the double stranded DNA to generate double stranded DNA fragments; dephosphorylating 5' ends of the double stranded DNA fragments; and blunting the ends of double stranded DNA fragments.

In some embodiments, ligating a 3' duplex adapter to each 3' end of a double stranded DNA fragment obtained from the double stranded DNA template comprises contacting the 3' duplex adapter and the double stranded DNA fragment obtained from the double stranded DNA template in the presence of a ligase. In some embodiments, the ligase is a T4 DNA ligase. In some embodiments, degrading the degradable 3' blocking group comprises contacting the 3' duplex adapter with uracil-DNA glycosylase (UDG). In some embodiments, ligating the 5' adapter to each dephosphorylated 5' end of the double stranded DNA fragment obtained from the double stranded DNA template comprises contacting the 5' adapter and the double stranded DNA fragment obtained from the double stranded DNA template in the presence of a ligase. In some embodiments, the ligase is an *Escherichia coli* ligase.

In some embodiments, filling in the gap of single stranded nucleic acid between the 5' end of the double stranded DNA fragment and the 5' adapter comprises contacting the 5' end of the double stranded DNA fragment and the 5' adapter in the presence of a DNA polymerase and dNTPs. In some embodiments, the DNA polymerase is a Taq-B polymerase.

In some embodiments, ligating the 5' adapter to each 5' end of the double stranded DNA fragment, and the filling in the gap between the 5' end of the double stranded DNA fragment and the 5' adapter are performed concurrently. In some embodiments, amplifying the double stranded DNA fragment having the duplex molecular barcode on each end of the double stranded DNA fragment comprises contacting the double stranded DNA fragment comprising the duplex molecular barcode on each end of the double stranded DNA fragment with the primer pair under PCR conditions. In some embodiments, amplifying comprises whole-genome PCR. In some embodiments, amplifying the target region from the DNA library (e.g., the single stranded DNA library) of Watson strands further comprises second amplification using a second primer pair consisting of a first primer capable of hybridizing to the target region and a second primer capable of hybridizing to the 3' duplex adapter; and wherein the amplifying the target region from the DNA library (e.g., the single stranded DNA library) of Crick strands further comprises a second amplification using a second primer pair consisting of a first primer capable of hybridizing to the target region and a second primer capable of hybridizing to the 5' adapter. In some embodiments, the sequencing steps comprise paired-end sequencing.

Also provided herein are methods, comprising:
a. attaching partially double-stranded 3' adaptors to 3' ends of both Watson and Crick strands of a population of double-stranded DNA fragments in an analyte DNA sample, wherein a first strand of the partially double-stranded 3' adaptor comprises, in the 5'-3' direction, (i) a first segment, (ii) an exogenous UID sequence, (iii) an annealing site for a 5' adaptor, and (iv) a universal 3' adaptor sequence comprising an R2 sequencing primer site, and wherein the second strand of the partially double-stranded 3' adaptor comprises, in the 5' to 3' direction, (i) a segment complementary to the first segment, and (ii) a 3' blocking group, optionally wherein the second strand is degradable;
b. annealing 5' adaptors to the 3' adaptors via the annealing site, wherein the 5' adaptors comprise, in the 5' to 3' direction, (i) a universal 5' adaptor sequence that is not complementary to the universal 3' adaptor sequence and that comprises an R1 sequencing primer site, and (ii) a sequence complementary to the annealing site for the 5' adaptor;
c. performing a nick translation-like reaction to extend the 5' adaptors across the exogenous UID sequence of the 3' adaptors (e.g., using a DNA polymerase) and covalently link the extended 5' adaptor to the 5' ends of the Watson and Crick strands of the double-stranded DNA fragments (e.g., using a ligase);
d. performing an initial amplification to amplify the adaptor-ligated, double-stranded DNA fragments to produce amplicons;
e. determining sequence reads of one or more amplicons of the one or more of the adaptor-ligated, double-stranded DNA fragments;
f. assigning the sequence reads into UID families, wherein each member of a UID family comprises the same exogenous UID sequence;
g. assigning sequence reads of each UID family into a Watson subfamily and Crick subfamily based on spatial relationship of the exogenous UID sequence to the R1 and R2 read sequence;
h. identifying a nucleotide sequence as accurately representing a Watson strand of an analyte DNA fragment when a threshold percentage of members of the Watson subfamily contain the sequence;
i. identifying a nucleotide sequence as accurately representing a Crick strand of an analyte DNA fragment when a threshold percentage of members of the Crick subfamily contain the sequence;
j. identifying a mutation in the nucleotide sequence accurately representing the Watson Strand when the sequence accurately representing the Watson Strand differs from a reference sequence that lacks the mutation;
k. identifying a mutation in the nucleotide sequence accurately representing the Crick Strand when the sequence accurately representing the Crick Strand differs from a reference sequence that lacks the mutation; and
l. identifying a mutation in the analyte DNA fragment when the mutation in the nucleotide sequence accurately representing the Watson strand and the mutation in the nucleotide sequence accurately representing the Crick strand are the same mutation.

In some embodiments, each member of a UID family further comprises the same endogenous UID sequence, wherein the endogenous UID sequence comprises an end of a double-stranded DNA fragment from the population. In some embodiments, the endogenous UID sequence comprising the end of the double-stranded DNA fragment comprises at least 8, 10, or 15 bases. In some embodiments, exogenous UID sequence is unique to each double-stranded DNA fragment. In some embodiments, the exogenous UID sequence is not unique to each double-stranded DNA fragment. In some embodiments, each member of a UID family comprises the same endogenous UID sequence and the same exogenous UID sequence. In some embodiments, step (d) comprises no more than 11 cycles of PCR amplification. In some embodiments, step (d) comprises no more than 7 cycles of PCR amplification. In some embodiments, step (d)

comprises no more than 5 cycles of PCR amplification. In some embodiments, step (d) comprises at least 1 cycles of PCR amplification.

In some embodiments, prior to determining the sequence reads, the amplicons are enriched for one or more target polynucleotides. In some embodiments, the enriching comprises:
 a. selectively amplifying amplicons of Watson strands comprising the target polynucleotide sequence with a first set of Watson target-selective primer pairs, the first set of Watson target-selective primer pairs comprising: (i) a first Watson target-selective primer comprising a sequence complementary to a portion of the universal 3' adapter sequence, optionally wherein the portion of the universal 3' adapter sequence is the R2 sequencing primer site of the universal 3' adaptor sequence, and (ii) a second Watson target-selective primer comprising a target-selective sequence, thereby creating target Watson amplification products; and
 b. selectively amplifying amplicons of Crick strands comprising the same target polynucleotide sequence with a first set of Crick target-selective primer pairs, the first set of Crick target-selective primer pairs comprising: (i) a first Crick target-selective primer comprising a sequence complementary to a portion of the universal 5' adapter sequence, optionally wherein the portion of the universal 5' adapter sequence is the R1 sequencing primer site of the universal 5' adaptor sequence, and (ii) a second Crick target-selective primer comprising the same target-selective sequence as the second Watson target-selective primer sequence, thereby creating target Crick amplification products.

In some embodiments, the method further comprises purifying the target Watson amplification products and the target Crick amplification products from non-target polynucleotides. In some embodiments, the method further comprises purifying comprises attaching the target Watson amplification products and the target Crick amplification products to a solid support. In some embodiments, the first Watson target-selective primer and first Crick target-selective primer comprises a first member of an affinity binding pair, and wherein the solid support comprises a second member of the affinity binding pair. In some embodiments, the first member is biotin and the second member is streptavidin. In some embodiments, the solid support comprises a bead, well, membrane, tube, column, plate, sepharose, magnetic bead, or chip. In some embodiments, the method further comprises removing polynucleotides that are not attached to the solid support.

In some embodiments, the method further comprises:
 a. further amplifying the target Watson amplification products with a second set of Watson target-selective primers, the second set of Watson target-selective primers comprising (i) a third Watson target-selective primer comprising a sequence complementary to a portion of the universal 3' adapter sequence, optionally wherein the portion of the universal 3' adapter sequence is the R2 sequencing primer site of the universal 3' adaptor sequence, and (ii) a fourth Watson target-selective primer comprising, in the 5' to 3' direction, an R1 sequencing primer site and a target-selective sequence selective for the same target polynucleotide, thereby creating target Watson library members;
 b. further amplifying the target Crick amplification products with a second set of Crick target-selective primers, the second set of Crick target-selective primers comprising (i) a third Crick target-selective primer comprising a sequence complementary to a portion of the universal 5' adapter sequence, optionally wherein the portion of the universal 5' adapter sequence is the R1 sequencing primer site of the universal 5' adaptor sequence, and (ii) a fourth Crick target-selective primer comprising, in the 5' to 3' direction, an R2 sequencing primer site and the target-selective sequence selective for the same target polynucleotide of the fourth Watson target-selective primer, thereby creating target Crick library members.

In some embodiments, the third Watson and Crick target-selective primers further comprise a sample barcode sequence. In some embodiments, the third Watson target-selective primer further comprises a first grafting sequence that enables hybridization to a first grafting primer on a sequencer and wherein the third Crick target-selective primer further comprises a second grafting sequence that enables hybridization to a second grafting primer on the sequencer. In some embodiments, the fourth Watson target-selective primer further comprises the second grafting sequence and wherein the fourth Crick target-selective primer further comprises the first grafting sequence. In some embodiments, the first grafting sequence is a P7 sequence and wherein the second grafting sequence is a P5 sequence. In some embodiments, the target Watson library members and the target Crick library members represent at least 50% of the target polynucleotides in the population of double-stranded DNA fragments. In some embodiments, the target Watson library members and the target Crick library members represent at least 70% of the target polynucleotides in the population of double-stranded DNA fragments. In some embodiments, the target Watson library members and the target Crick library members represent at least 80% of the target polynucleotides in the population of double-stranded DNA fragments. In some embodiments, the target Watson library members and the target Crick library members represent at least 90% of the target polynucleotides in the population of double-stranded DNA fragments. In some embodiments, the target Watson library members and the target Crick library members represent at least 50% of the population of total DNA fragments. IN some embodiments, the target Watson library members and the target Crick library members represent at least 70% of the population of total DNA fragments. In some embodiments, the target Watson library members and the target Crick library members represent at least 80% of the population of total DNA fragments. In some embodiments, the target Watson library members and the target Crick library members represent at least 90% of the population of total DNA fragments.

Also provided herein are methods comprising:
 a. attaching adaptors to a population of double-stranded DNA fragments in an analyte DNA sample, wherein the adaptors comprise a double-stranded portion comprising an exogenous UID and a forked portion comprising (i) a single-stranded 3' adaptor sequence comprising an R2 sequencing primer site and (ii) a single-stranded 5' adaptor sequence comprising an R1 sequencing primer site;
 b. performing an initial amplification to amplify the adaptor-ligated, double-stranded DNA fragments to produce amplicons;
 c. selectively amplifying amplicons of Watson strands comprising a target polynucleotide sequence with a first set of Watson target-selective primer pairs, the first set of Watson target-selective primer pairs comprising: (i) a first Watson target-selective primer comprising a sequence complementary to a portion of the universal 3' adapter sequence, optionally wherein the portion of the universal 3' adapter sequence is the R2 sequencing primer site of the universal 3' adaptor sequence, and (ii) a second Watson target-selective primer comprising a target-selective sequence, thereby creating target Watson amplification products;

d. selectively amplifying amplicons of Crick strands comprising the same target polynucleotide sequence with a first set of Crick target-selective primer pairs, the first set of Crick target-selective primer pairs comprising: a first Crick target-selective primer comprising a sequence a sequence complementary to a portion of the universal 5' adapter sequence, optionally wherein the portion of the universal 5' adapter sequence is the R1 sequencing primer site of the universal 5' adaptor sequence, and (ii) a second Crick target-selective primer comprising the same target-selective sequence as the second Crick target-selective primer sequence, thereby creating target Crick amplification products.

e. determining sequence reads of the target Watson amplification products and the target Crick amplification products;

f. assigning the sequence reads into UID families, wherein each member of a UID family comprises the same exogenous UID sequence;

g. assigning sequence reads of each UID family into a Watson subfamily and Crick subfamily based on spatial relationship of the exogenous UID sequence to the R1 and R2 read sequence;

h. identifying a nucleotide sequence as accurately representing a Watson strand of an analyte DNA fragment when a threshold percentage of members of the Watson family contain the sequence;

i. identifying a nucleotide sequence as accurately representing a Crick strand of an analyte DNA fragment when a threshold percentage of members of the Crick family contain the sequence; and j. identifying a mutation in the analyte DNA fragment when the nucleotide sequence accurately representing the Watson strand and the nucleotide sequence accurately representing the Crick strand both contain the same mutation.

In some embodiments, the method further comprises purifying the target Watson amplification products and the target Crick amplification products from non-target polynucleotides. In some embodiments, the method further comprises attaching the target Watson amplification products and the target Crick amplification products to a solid support. In some embodiments, the first Watson target-selective primer and first Crick target-selective primer comprises a first member of an affinity binding pair, and wherein the solid support comprises a second member of the affinity binding pair. In some embodiments, the first member is biotin and the second member is streptavidin. In some embodiments, the solid support comprises a bead, well, membrane, tube, column, plate, sepharose, magnetic bead, or chip. In some embodiments, the method further comprises removing polynucleotides that are not attached to the solid support.

In some embodiments, the method further comprises:

a. further amplifying the target Watson amplification products with a second set of Watson target-selective primers, the second set of Watson target-selective primers comprising (i) a third Watson target-selective primer comprising a sequence complementary to the R2 sequencing primer site of the universal 3' adaptor sequence, and (ii) a fourth Watson target-selective primer comprising, in the 5' to 3' direction, an R1 sequencing primer site and a target-selective sequence selective for the same target polynucleotide, thereby creating target Watson library members;

b. further amplifying the target Crick amplification products with a second set of Crick target-selective primers, the second set of Crick target-selective primers comprising (i) a third Crick target-selective primer comprising a sequence complementary to the R1 sequencing primer site of the universal 3' adaptor sequence, and (ii) a fourth Crick target-selective primer comprising, in the 5' to 3' direction, an R2 sequencing primer site and the target-selective sequence selective for the same target polynucleotide of the fourth Watson target-selective primer, thereby creating target Crick library members, thereby creating target Crick library members.

In some embodiments, the third Watson and Crick target-selective primers further comprise a sample barcode sequence. In some embodiments, the third Watson target-selective primer further comprises a first grafting sequence that enables hybridization to a first grafting primer on a sequencer and wherein the third Crick target-selective primer further comprises a second grafting sequence that enables hybridization to a second grafting primer on the sequencer. In some embodiments, the fourth Watson target-selective primer further comprises the second grafting sequence and wherein the fourth Crick target-selective primer further comprises the first grafting sequence. In some embodiments, the first grafting sequence is a P7 sequence and wherein the second grafting sequence is a P5 sequence. In some embodiments, the attaching comprises attaching A-tailed adaptors to the population of double-stranded DNA fragments. In some embodiments, the attaching comprises attaching A-tailed adaptors to both ends of DNA fragments in the population.

In some embodiments, the attaching comprises:

a. attaching partially double-stranded 3' adaptors to 3' ends of both Watson and Crick strands of a population of double-stranded DNA fragments, wherein a first strand of the partially double-stranded 3' adaptor comprises, in the 5'-3' direction, (i) a first segment, (ii) optionally, an exogenous UID sequence, (iii) an annealing site for a 5' adaptor, and (iv) a universal 3' adaptor sequence comprising an R2 sequencing primer site, and wherein the second strand of the partially double-stranded 3' adaptor comprises, in the 5' to 3' direction, (i) a segment complementary to the first segment, and (ii) a 3' blocking group, optionally wherein the second strand is degradable; and b. annealing 5' adaptors to the 3' adaptors via the annealing site, wherein the 5' adaptors comprise, in the 5' to 3' direction, (i) a universal 5' adaptor sequence that is not complementary to the universal 3' adaptor sequence and that comprises an R1 sequencing primer site, and (ii) a sequence complementary to the annealing site for the 5' adaptor; and c. performing a nick translation-like reaction to extend the 5' adaptors across the 3' adaptors (e.g., using a DNA polymerase) and covalently link the extended 5' adaptor to the 5' ends of the Watson and Crick strands of the double-stranded DNA fragments (e.g. using a ligase).

In some embodiments, the UID sequence comprises an endogenous UID sequence comprising an end of a double-stranded DNA fragment from the population. In some embodiments, the endogenous UID sequence comprising the end of the double-stranded DNA fragment comprises at least 8, 10, or 15 bases. In some embodiments, the exogenous UID sequence is unique to each double-stranded DNA fragment. In some embodiments, the exogenous UID sequence is not unique to each double-stranded DNA fragment. In some embodiments, each member of a UID family comprises the same endogenous UID sequence and the same exogenous UID sequence.

In some embodiments, amplifying the adaptor-ligated, double-stranded DNA fragments to produce amplicons comprises no more than 11 cycles of PCR amplification. In some embodiments, amplifying the adaptor-ligated, double-stranded DNA fragments to produce amplicons comprises no more than 7 cycles of PCR amplification. In some embodiments, amplifying the adaptor-ligated, double-stranded DNA fragments to produce amplicons comprises no more than 5 cycles of PCR amplification. In some embodiments, amplifying the adaptor-ligated, double-stranded DNA fragments to produce amplicons comprises at least 1 cycles of PCR amplification. In some embodiments, the target Watson library members and the target Crick library members represent at least 50% of the target polynucleotides in the population of double-stranded DNA fragments. In some embodiments, the target Watson library members and the target Crick library members represent at least 70% of the target polynucleotides in the population of double-stranded DNA fragments. In some embodiments, the target Watson library members and the target Crick library members represent at least 80% of the target polynucleotides in the population of double-stranded DNA fragments. In some embodiments, the target Watson library members and the target Crick library members represent at least 90% of the target polynucleotides in the population of double-stranded DNA fragments. In some embodiments, the target Watson library members and the target Crick library members represent at least 50% of the population of total DNA fragments. In some embodiments, the target Watson library members and the target Crick library members represent at least 70% of the population of total DNA fragments. In some embodiments, the target Watson library members and the target Crick library members represent at least 80% of the population of total DNA fragments. In some embodiments, the target Watson library members and the target Crick library members represent at least 90% of the population of total DNA fragments.

In some embodiments, the determination of the sequence reads enables sequence determination of both ends of template molecules. In some embodiments, the determination of both ends of template molecules comprises paired end sequencing. In some embodiments, the determination of the sequence reads comprises single read sequencing across the length of the templates for generating the sequence reads. In some embodiments, the determination of the sequence reads comprises sequencing with a massively parallel sequencer. In some embodiments, the massively parallel sequencer is configured to determine sequence reads from both ends of template polynucleotides. In some embodiments, the population of double-stranded DNA fragments comprises one or more fragments that are about 50-600 nt in length. In some embodiments, the population of double-stranded DNA fragments comprises one or more fragments that are less than 2000, less than 1000, less than 500, less than 400, less than 300, or less than 250 nt in length.

In some embodiments, methods provided herein further comprise, after the initial amplification and before the selective amplification, preparing single stranded (ss) DNA libraries corresponding to sense and antisense strands of the amplicons. In some embodiments, the ss DNA library preparation comprises:

a. performing an amplification reaction utilizing two primers, wherein only one of the two primers comprises a first member of an affinity binding pair, thereby creating amplification products comprising a strand comprising the first member of the affinity binding pair and a strand not comprising the first member of the affinity binding pair;

b. contacting the amplification products with a solid support, wherein the solid support comprises the second member of the affinity binding pair;

c. denaturing the amplification products to separate the strand comprising the first member of the affinity binding pair from the strand not comprising the first member of the affinity binding pair; and d. purifying the separated strands comprising the first member of the affinity binding pair and the separated strands not comprising the first member of the affinity binding pair.

In some embodiments, the first member of the affinity binding pair is biotin and the second member of the affinity binding pair is streptavidin. In some embodiments, the ss DNA library preparation comprises:

a. partitioning the amplicons into two amplification reactions, each amplification reaction utilizing a forward primer and a reverse primer, wherein only one of the two primers is phosphorylated, thereby creating amplification products comprising a phosphorylated strand and a non-phosphorylated strand;

b. contacting the amplification products with an exonuclease that selectively digests the strands with the 5' phosphate.

In some embodiments:

a. in the first amplification reaction, the forward primer is phosphorylated and the reverse primer is non-phosphorylated;

b. in the second amplification reaction, the reverse primer is phosphorylated and the forward primer is non-phosphorylated.

In some embodiments, the exonuclease is a lambda exonuclease. In some embodiments, the phosphorylation is at the 5' site.

In some embodiments, the initial amplification comprises:

a. amplifying with a primer pair, in which only one of the two primers in the primer pair comprises a first member of an affinity binding pair, thereby creating amplification products comprising a strand comprising the first member of the affinity binding pair and a strand not comprising the first member of the affinity binding pair;

b. contacting the amplification products with a solid support, wherein the solid support comprises the second member of the affinity binding pair;

c. denaturing the amplification products to separate the strand comprising the first member of the affinity binding pair from the strand not comprising the first member of the affinity binding pair; and d. purifying the separated strands comprising the first member of the affinity binding pair and the separated strands not comprising the first member of the affinity binding pair.

In some embodiments, the first member of the affinity binding pair is biotin and the second member of the affinity binding pair is streptavidin. In some embodiments, sequence reads of a UID family are assigned to a Watson subfamily when the exogenous UID sequence is downstream of the R2 sequence and upstream of the R1 sequence. In some embodiments, sequence reads of a UID family are assigned to a Crick subfamily when the exogenous UID sequence is downstream of the R1 sequence and upstream of the R2 sequence. In some embodiments, sequence reads of a UID family are assigned to a Watson subfamily when the exogenous UID sequence is in greater proximity to the R2 sequence and lesser proximity to the R1 sequence. In some embodiments, sequence reads of a UID family are assigned to a Crick subfamily when the exogenous UID sequence is in greater proximity to the R1 sequence and in lesser proximity to the R2 sequence. In some embodiments, sequence reads of a UID family are assigned to a Watson subfamily when the exogenous UID sequence is immediately downstream or within 1-300, 1-70, 1-60, 1-50, 1-40, 1-30, 1-20, 1-10, or 1-5 nucleotides of the R2 sequence. In some embodiments, sequence reads of a UID family are assigned to a Crick subfamily when the exogenous UID sequence is immediately downstream or within 1-300, 1-70, 1-60, 1-50, 1-40, 1-30, 1-20, 1-10, or 1-5 nucleotides of the R1 sequence.

In some embodiments, the population of double-stranded DNA fragments are from a biological sample. In some embodiments, the biological sample is obtained from a subject. In some embodiments, the subject is a human subject. In some embodiments, the biological sample is a fluid sample. In some embodiments, the fluid sample is selected from whole blood, plasma, serum sputum, urine, sweat, tears, ascites, semen, and bronchoaveolar lavage. In some embodiments, the fluid sample is a cell-free or essentially cell-free sample. In some embodiments, the biological sample is a solid biological sample. In some embodiments, the solid biological sample is a tumor sample.

In some embodiments, the identified mutation is present in the population of double-stranded DNA fragments at a frequency of 0.1% or less. In some embodiments, the identified mutation is present in the population of double-stranded DNA fragments at a frequency of 0.1% to 0.00001%. In some embodiments, the identified mutation is present in the population of double-stranded DNA fragments at a frequency of 0.1% to 0.01%. In some embodiments, the determining of sequence reads comprises determining sequence reads from both Watson and Crick strands of at least 50% of the double-stranded DNA fragments comprising a target polynucleotide in the analyte DNA sample. In some embodiments, the determining of sequence reads comprises determining sequence reads from both Watson and Crick strands of at least 70% of the double-stranded DNA fragments comprising a target polynucleotide in the analyte DNA sample. In some embodiments, the determining of sequence reads comprises determining sequence reads from both Watson and Crick strands of at least 80% of the double-stranded DNA fragments comprising a target polynucleotide in the analyte DNA sample. In some embodiments, the determining of sequence reads comprises determining sequence reads from both Watson and Crick strands of at least 90% of the double-stranded DNA fragments comprising a target polynucleotide in the analyte DNA sample. In some embodiments, the determining of sequence reads comprises determining sequence reads from both Watson and Crick strands of at least 50% of the double-stranded DNA fragments in the analyte DNA sample. In some embodiments, the determining of sequence reads comprises determining sequence reads from both Watson and Crick strands of at least 70% of the double-stranded DNA fragments in the analyte DNA sample. In some embodiments, the determining of sequence reads comprises determining sequence reads from both Watson and Crick strands of at least 80% of the double-stranded DNA fragments in the analyte DNA sample. In some embodiments, the determining of sequence reads comprises determining sequence reads from both Watson and Crick strands of at least 90% of the double-stranded DNA fragments in the analyte DNA sample.

In some embodiments, the error rate associated with the identification of one or more mutations in analyte DNA fragments according to a method of any one of the preceding claims is reduced by at least 2-fold, 4-fold, 5-fold, 10-fold, 20-fold, 30-fold, 40-fold, 50-fold, 60-fold, 70-fold, 80-fold, 90-fold, or 100-fold, as compared to an alternative method of identifying mutations that does not require the mutation to be detected in both Watson and Crick strands of an analyte DNA fragment. In some embodiments, the alternative method comprises standard molecular barcoding or standard PCR-based molecular barcoding. In some embodiments, the alternative method comprises:

a. attaching adaptors to a population of double-stranded DNA fragments in an analyte DNA sample, wherein the adaptors comprise a unique exogenous UID;
  b. performing an initial amplification to amplify the adaptor-ligated, double-stranded DNA fragments to produce amplicons;
  c. determining sequence reads of one or more amplicons of the one or more of the adaptor-ligated, double-stranded DNA fragments;
  d. assigning the sequence reads into UID families, wherein each member of a UID family comprises the same exogenous UID sequence;
  e. identifying a nucleotide sequence as accurately representing an analyte DNA fragment when a threshold percentage of members of a UID family contain the sequence; and
  f. identifying a mutation in the analyte DNA fragment when the sequence identified as accurately representing an analyte DNA fragment differs from a reference sequence that lacks the mutation.

In some embodiments, the error rate associated with the identification of one or more mutations in analyte DNA fragments according to a method of any one of the preceding claims is no more than $1\times10^{-2}$, no more than $1\times10^{-3}$, no more than $1\times10^{-4}$, no more than $1\times10^{-5}$, no more than $1\times10^{-6}$, no more than $5\times10^{-6}$, or no more than $1\times10^{-7}$.

Also provided herein are computer readable media comprising computer executable instructions for analyzing sequence read data from a nucleic acid sample, wherein the data is generated by a method of any one of the preceding claims. In some embodiments, the computer readable medium comprises executable instructions for a. assigning sequence reads into UID families, wherein each member of a UID family comprises the same exogenous UID sequence;
  b. assigning sequence reads of each UID family into Watson and Crick subfamilies based on spatial relationship of the exogenous UID sequence to the R1 and R2 read sequence;
  c. identifying a nucleotide sequence as accurately representing a Watson strand of an analyte DNA fragment when a threshold percentage of members of the Watson subfamily contain the sequence;
  d. identifying a nucleotide sequence as accurately representing a Crick strand of an analyte DNA fragment when a threshold percentage of members of the Crick subfamily contain the sequence;
  e. identifying a mutation in the nucleotide sequence accurately representing the Watson Strand when the sequence accurately representing the Watson Strand differs from a reference sequence that lacks the mutation;

f. identifying a mutation in the nucleotide sequence accurately representing the Crick Strand when the sequence accurately representing the Crick Strand differs from a reference sequence that lacks the mutation;

g. identifying a mutation in the analyte DNA fragment when the mutation in the nucleotide sequence accurately representing the Watson strand and the mutation in the nucleotide sequence accurately representing the Crick strand are the same mutation.

In some embodiments, the computer readable medium comprises executable instructions for assigning UID family members to the Watson subfamily when the exogenous UID sequence is immediately downstream or within 1-300 nucleotides of the R2 sequencing primer binding site. In some embodiments, the computer readable medium comprises executable instructions for assigning UID family members to the Crick subfamily when the exogenous UID sequence is immediately downstream or within 1-300 nucleotides of the R1 sequencing primer binding site. In some embodiments, the computer readable medium comprises executable instructions for mapping the sequence reads to a reference genome. In some embodiments, the reference genome is a human reference genome.

In some embodiments, the computer readable medium further comprises computer executable instructions to generate a report of therapeutic options based on the presence, absence, or amount of a mutation in the sample. In some embodiments, the computer readable medium further comprises computer executable code that enables transmission of the data over a network.

Also provided herein are computer systems, comprising:
a. a memory unit configured to receive sequence data from a nucleic acid sample, wherein the data is generated by a method of any one of the preceding claims;
b. a processor communicatively coupled to the memory unit, wherein the processor comprises a computer readable medium of any of the preceding claims.

In some embodiments, the computer system further comprises a sequencing system configured to communicate the data to the memory unit. In some embodiments, the computer system further comprises a user interface configured to communicate or display the report to a user. In some embodiments, the computer system further comprises a digital processor configured to transmit results of the data analysis over a network.

Also provided herein are systems, comprising:
a. a population of double-stranded DNA fragments from a biological sample;
b. a population of 3' adaptors as described in any one of the preceding claims;
c. a population of 5' adaptors as described in any one of the preceding claims;
d. reagents for performing nick translation-like reaction (e.g., with a DNA polymerase, cohesive end-specific ligase, and uracil-DNA glycosylase);
e. reagents for enriching amplicons for one or more target polynucleotides; and
f. a sequencing system.

In some embodiments, the system further comprises a computer system of any of the preceding claims.

Also provided herein are kits, comprising:
a. a first set of Watson target-selective primer pairs, comprising (i) one or more first Watson target-selective primers comprising a sequence complementary to a portion of the universal 3' adapter sequence, optionally wherein the portion of the universal 3' adapter sequence is the R2 sequencing primer site of the universal 3' adaptor sequence, and (ii) one or more second Watson target-selective primers, each of the one or more second Watson target-selective primers comprising a target-selective sequence;
b. a first set of Crick target-selective primer pairs, comprising (i) one or more Crick target-selective primers comprising a sequence a sequence complementary to a portion of the universal 5' adapter sequence, optionally wherein the portion of the universal 5' adapter sequence is the R1 sequencing primer site of the universal 5' adaptor sequence, and (ii) one or more second Crick target-selective primers, each of the one or more second Crick target-selective primers comprising the same target-selective sequence as the second Watson target-selective primer sequence;
c. a second set of Watson target-selective primer pairs, comprising (i) one or more third Watson target-selective primers comprising a sequence complementary to the R2 sequencing primer site of the universal 3' adaptor sequence, and (ii) one or more fourth Watson target-selective primers, each of the one or more fourth Watson target-selective primers comprising, in the 5' to 3' direction, an R1 sequencing primer site and a target-selective sequence selective for the same target polynucleotide; and
d. a second set of Crick target-selective primers comprising (i) one or more third Crick target-selective primers comprising a sequence complementary to the R1 sequencing primer site of the universal 3' adaptor sequence, and (ii) one or more fourth Crick target-selective primers, each of the one or more fourth Crick target-selective primers comprising, in the 5' to 3' direction, an R2 sequencing primer site and a target-selective sequence selective for the same target polynucleotide.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Figures 17, 18:
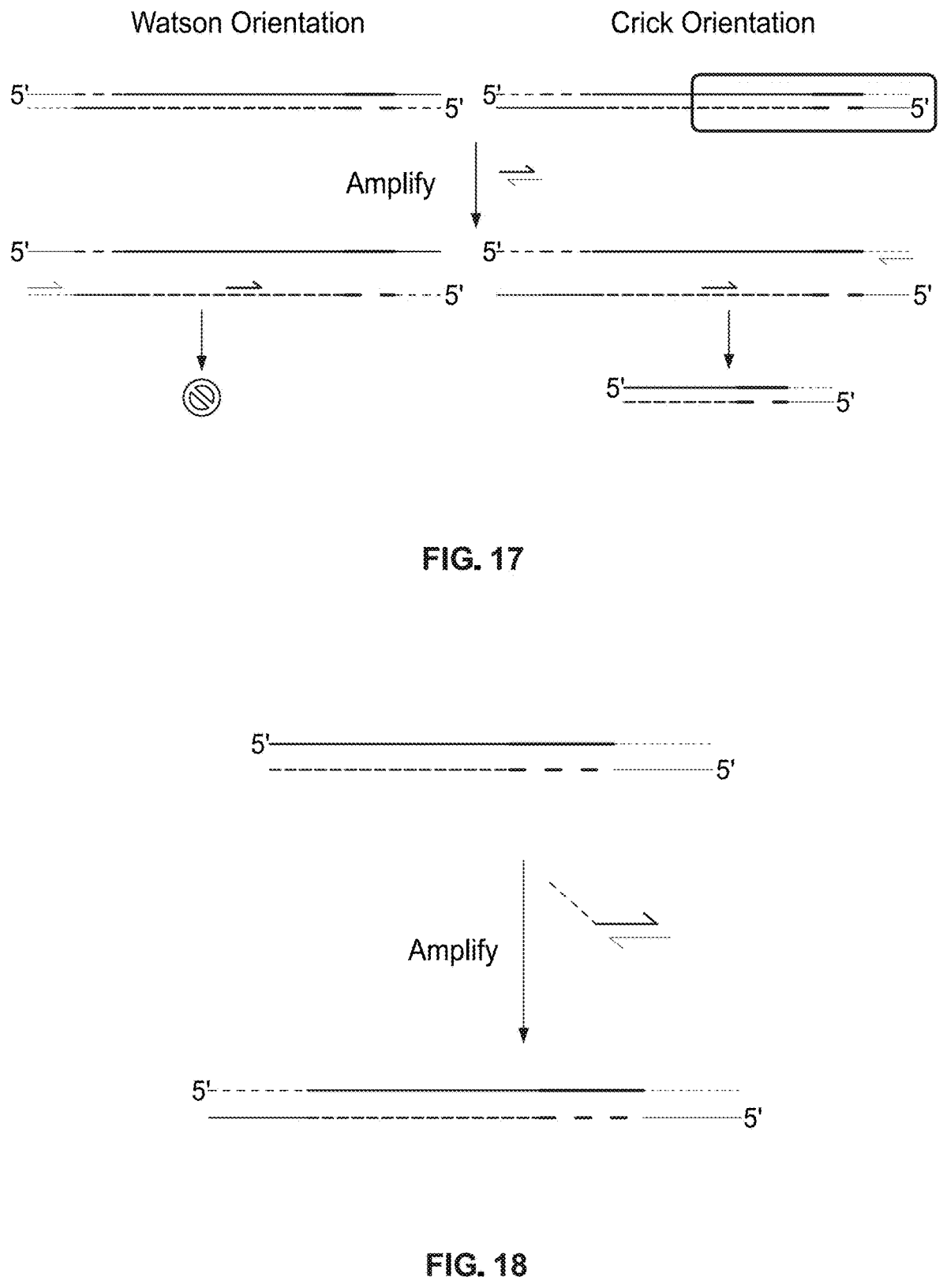

FIG. 17 contains a schematic of an exemplary Crick amplification.

FIG. 18 contains a schematic of an exemplary nested Crick amplification.

FIG. 20 contains a schematic showing how paired-end sequencing can be used to distinguish the Watson strand from the Crick strand of the input nucleic acid using the final amplification products generated by an exemplary duplex anchored PCR.

FIG. 21 contains a schematic showing how paired-end sequencing can be used to distinguish the Watson strand from the Crick strand of the input nucleic acid using the final amplification products generated by an exemplary duplex anchored PCR.

Lower and upper hinges correspond to the 25$^{th}$ and 75$^{th}$ percentile, whiskers extend to 1.5 times the interquartile range. Individual points are overlaid with random scatter for ease of visualization.

Figure 25:
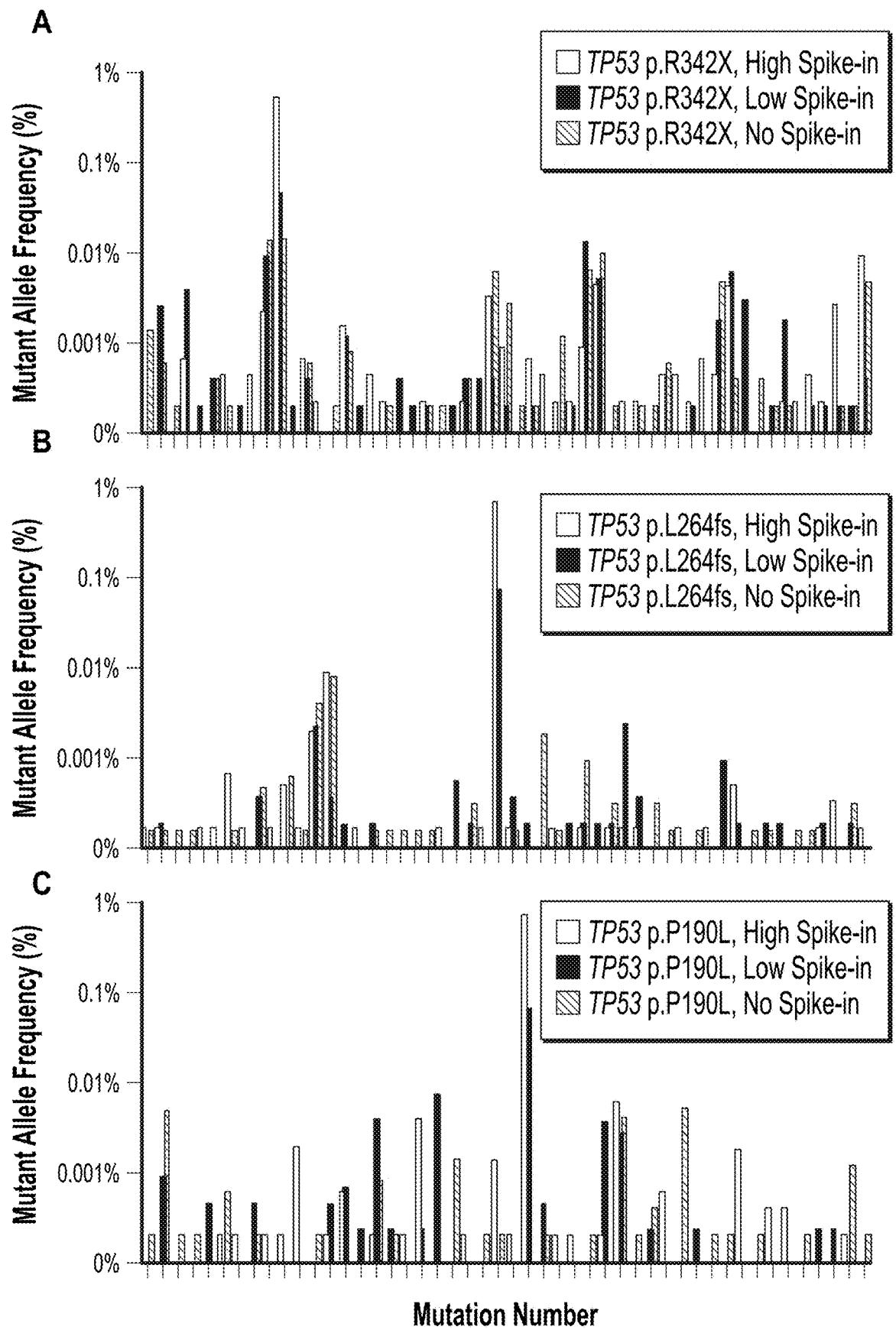
Figure 25:
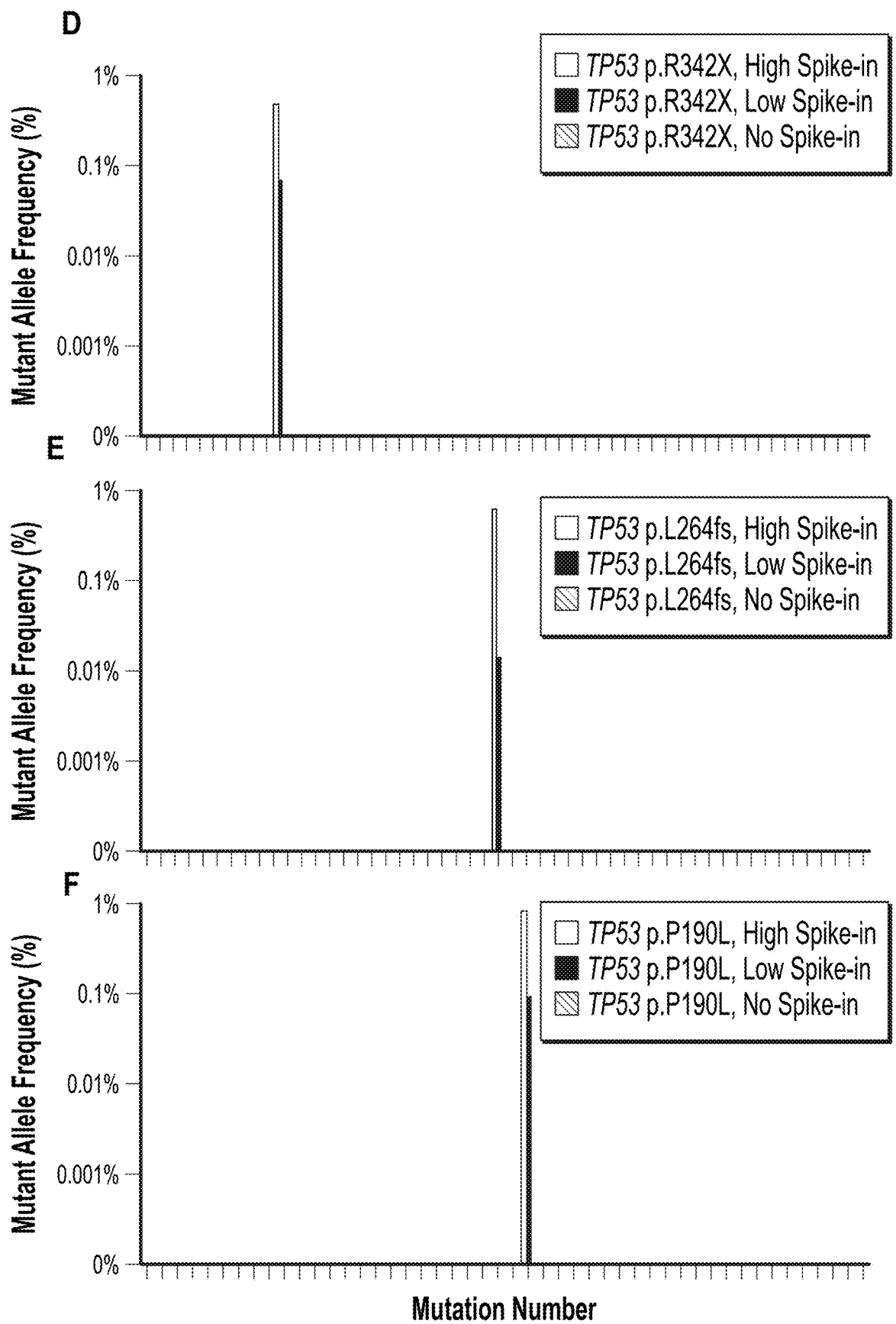

FIG. 25 contains graphs showing the detection of exemplary mutations in liquid biopsy samples. Analysis of 33 ng of plasma cell-free DNA from healthy individuals admixed with cell-free plasma DNA from a cancer patient. The mixtures were created to generate a high frequency (~0.5-1%) of mutation, low frequency (~0.01-0.1%) of mutation, or no mutation. The admixed TP53p.R342X sample was assayed with (a) SafeSeqs or (b) SaferSeqS. Similarly, the admixed TP53p.L264fs sample was assayed with (c) SafeSeqs and (d) SaferSeqS, and the admixed TP53p.P190L sample was assayed with (e) SafeSeqs and (f) SaferSeqS. Mutation numbers represent each of the 153 distinct mutations observed with SafeSeqS (defined in Table 8). The single supercalimutant detected by SaferSeqS (Table 9) was outside the genomic region assayed by SafeSeqS and is therefore not shown.

Figure 26:
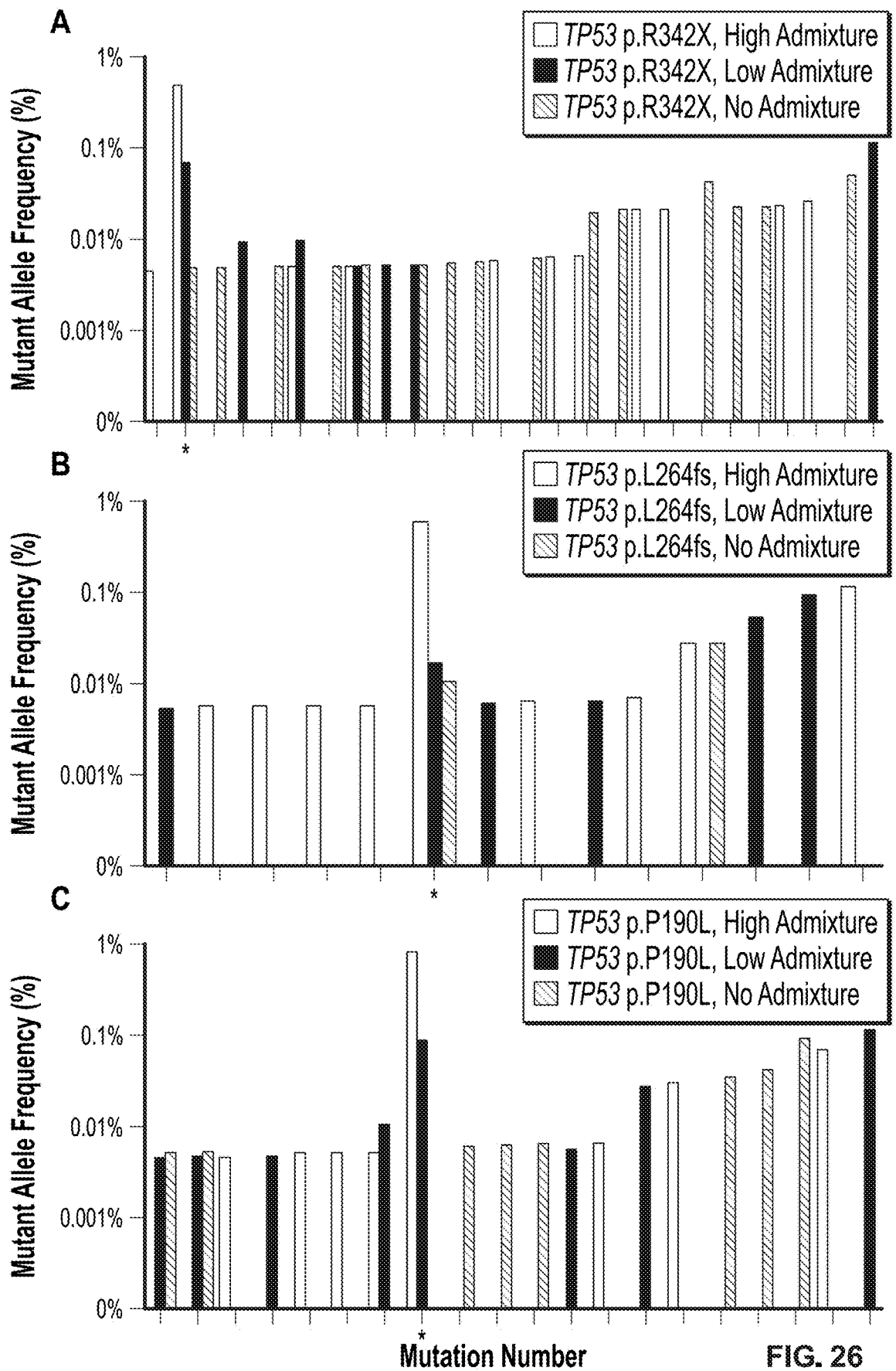
Figure 26:
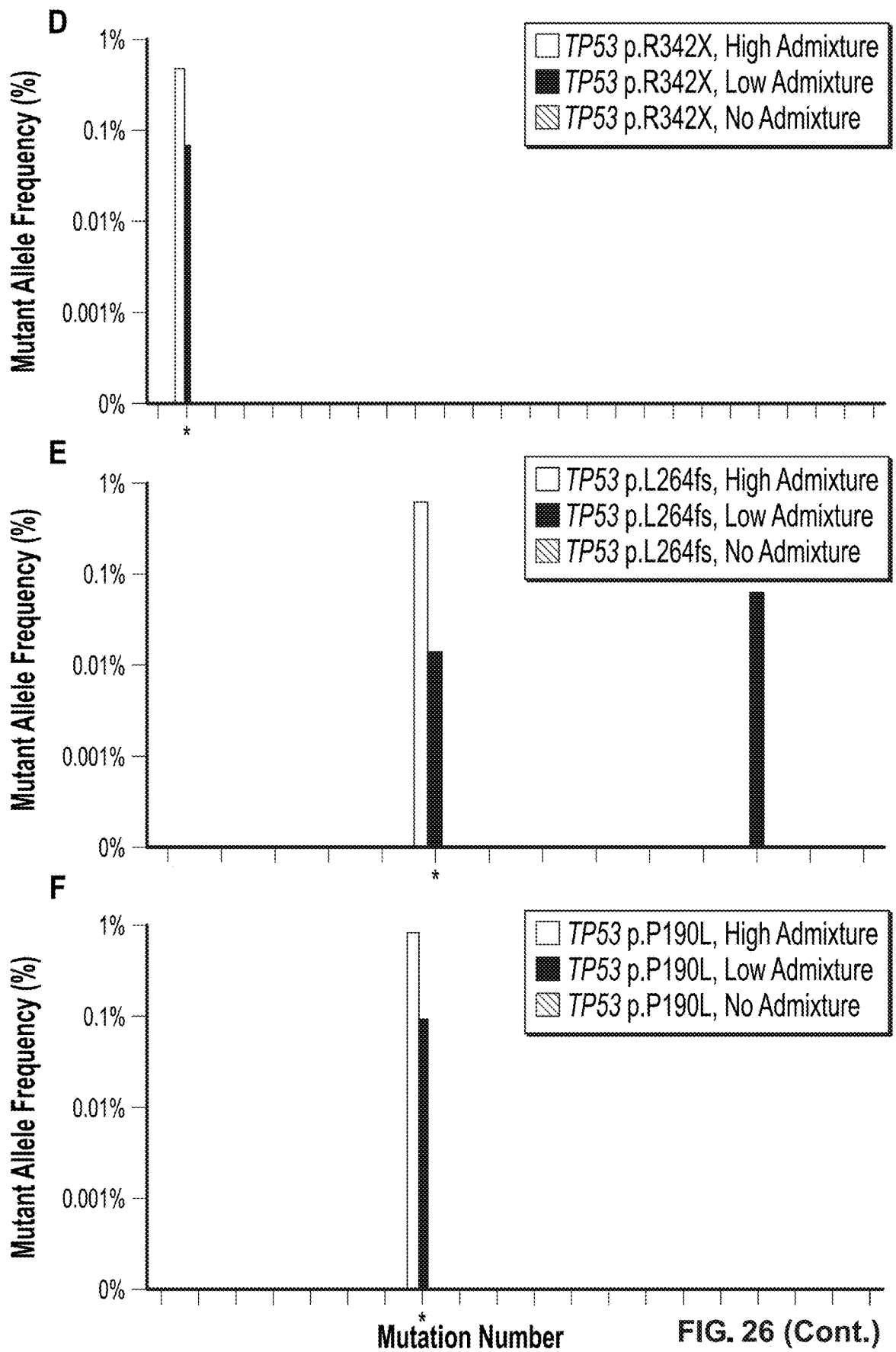

FIG. 26. Errors in SaferSeqS as compared to those of strand-agnostic, ligation-based molecular barcoding methods. Analysis of 33 ng of plasma cell-free DNA from healthy individuals admixed with cell-free plasma DNA from a cancer patient. The mixtures were created to generate a high frequency (~0.5-1%) of mutation, low frequency (~0.01-0.1%) of mutation, or no mutation. The admixed TP53 p.R342X sample was assayed with SaferSeqS but (a) strand information was ignored in the analysis to mimic strand-agnostic, ligation-based molecular barcoding methods or (b) strand information was considered during mutation calling. Similarly, the admixed TP53 p.L264fs sample was assayed (c) without consideration of strand information and (d) with SaferSeqS. The admixed TP53 p.P190L sample was similarly assayed (e) without consideration of strand information and (f) with SaferSeqS. Mutation numbers are defined in Supplementary Table 3. The asterisks denote the admixed mutations. The single unexpected supercalimutant detected by SaferSeqS is shown in (e).

Figure 27:
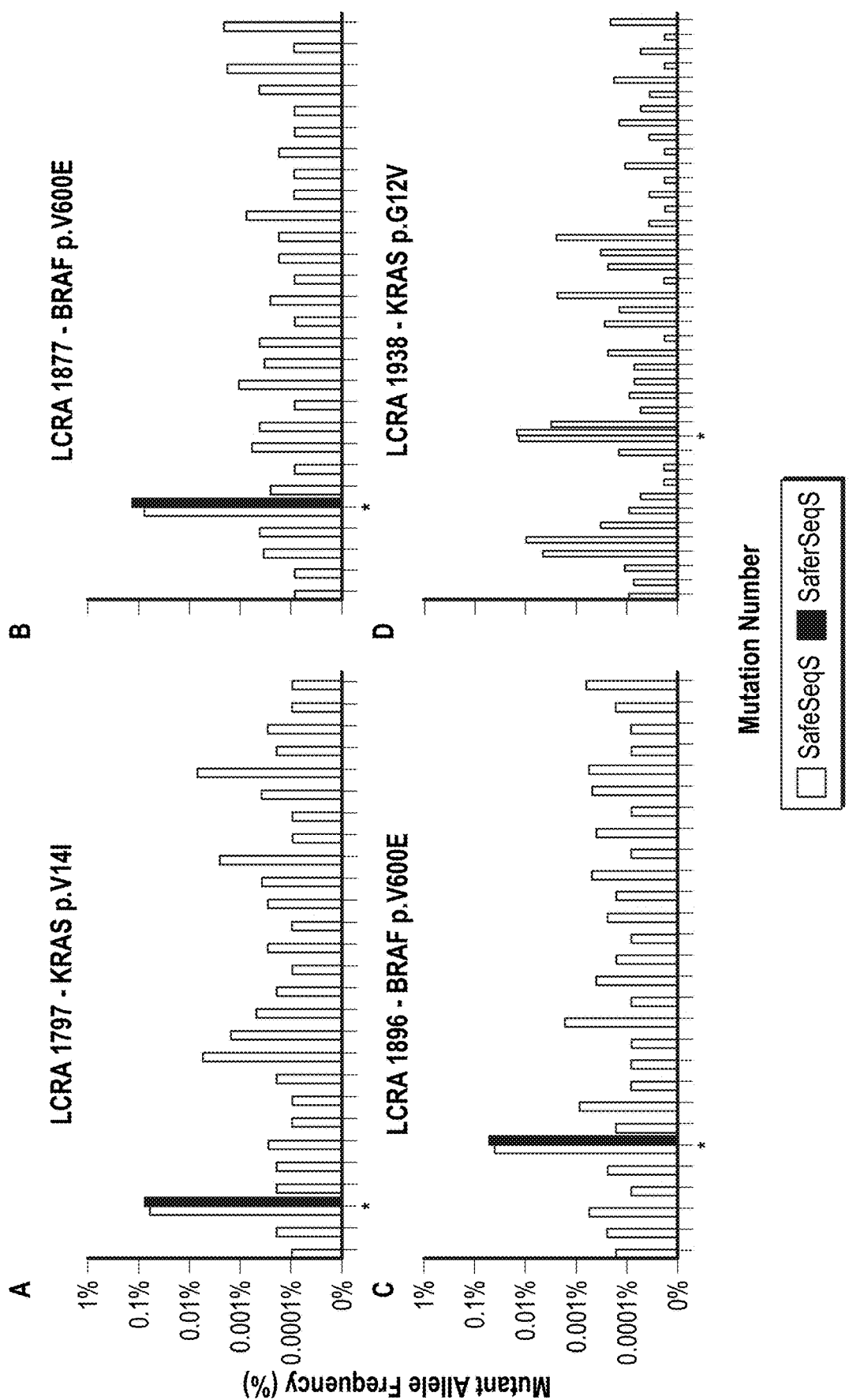
Figure 27:
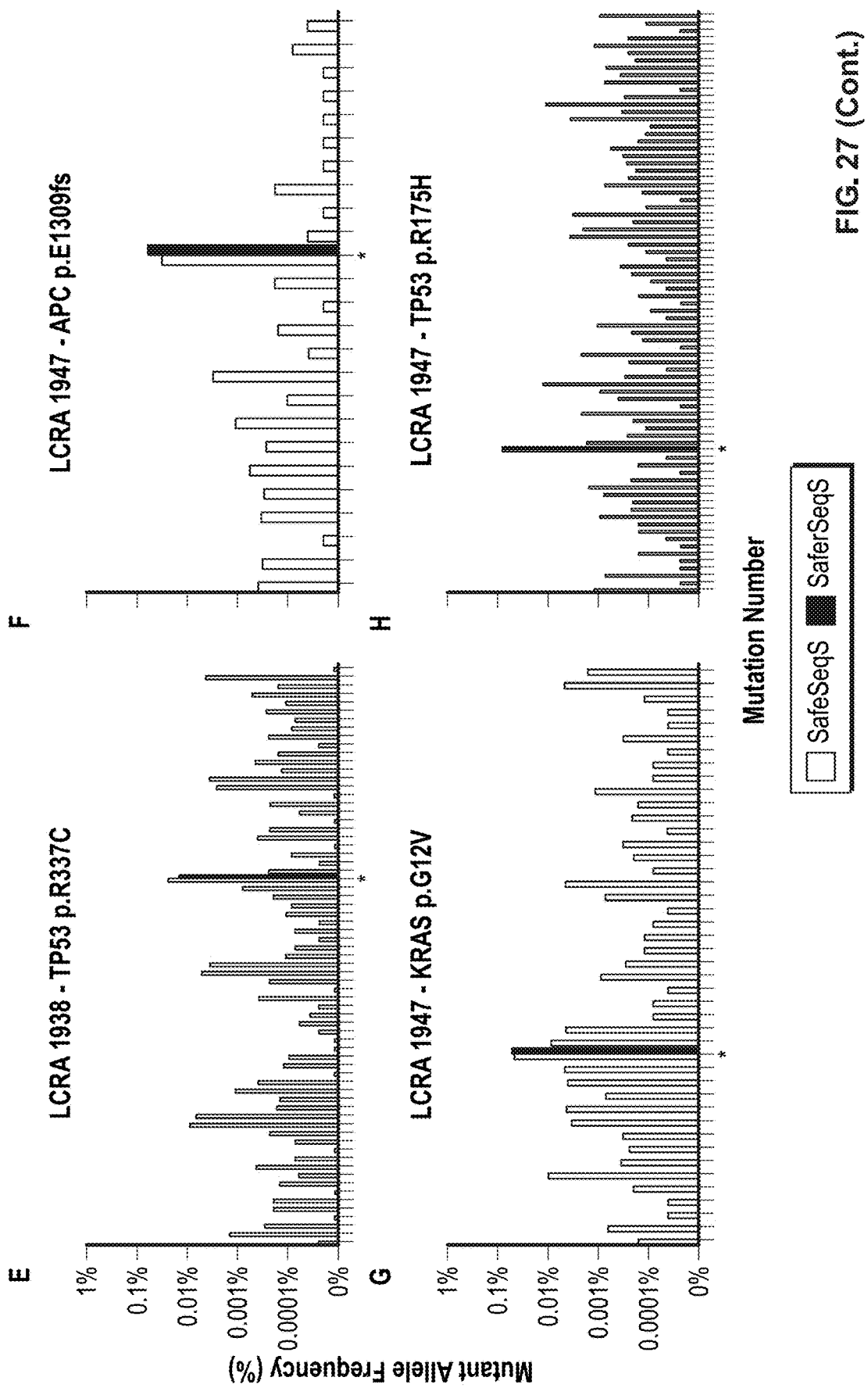

FIG. 27. Evaluation of plasma samples from cancer patients. Plasma cell-free DNA samples from five cancer patients harboring eight known mutations at frequencies between 0.01% and 0.1% were assayed with a previously described, PCR-based molecular barcoding method ("SafeSeqS" rather than "SaferSeqS") and with SaferSeqS. Mutation numbers are defined in Table 11. Asterisks denote the expected mutations. The single unexpected supercalimutant detected by SaferSeqS (Table 11) was outside the genomic region assayed by SafeSeqS and is therefore not shown.

Figure 28:
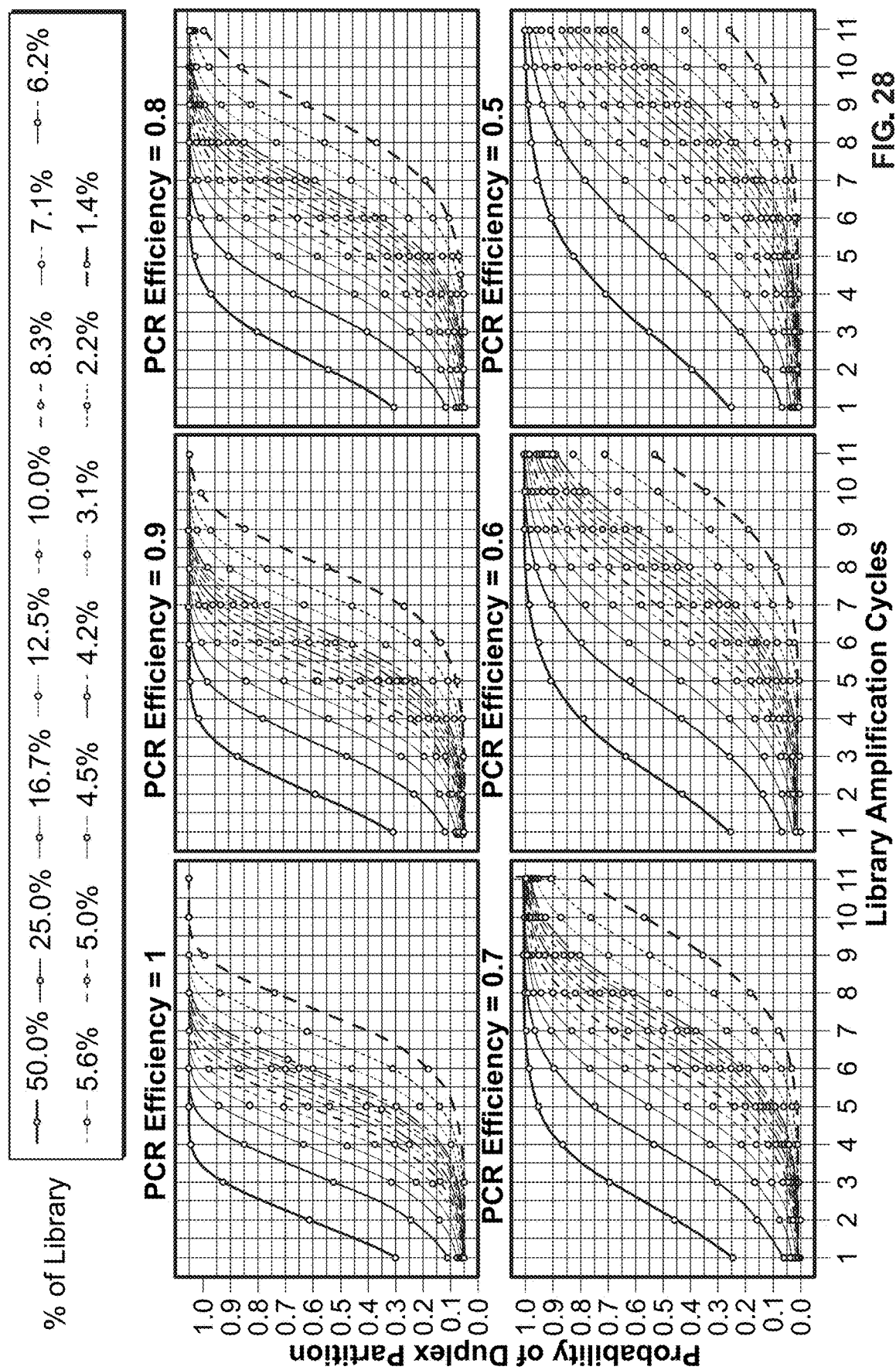

FIG. 28. Effects of PCR efficiency and cycle number on duplex recovery. The probability of recovering both strands of the original DNA duplexes (y-axis) is plotted against library amplification cycle number (x-axis). Each pane in the figure represents the assumed PCR efficiency denoted at the top of the pane. The proportion of the library amplification product used in the strand-specific PCRs are shown. Library amplification cycle number was varied from one to 11. PCR efficiency was varied from 100% to 50% in 10% increments. The proportion of library amplification product using in each strand-specific PCRs was varied from 50% to 1.4%. Probabilistic modeling was performed as described in Example 2.

Figure 29:
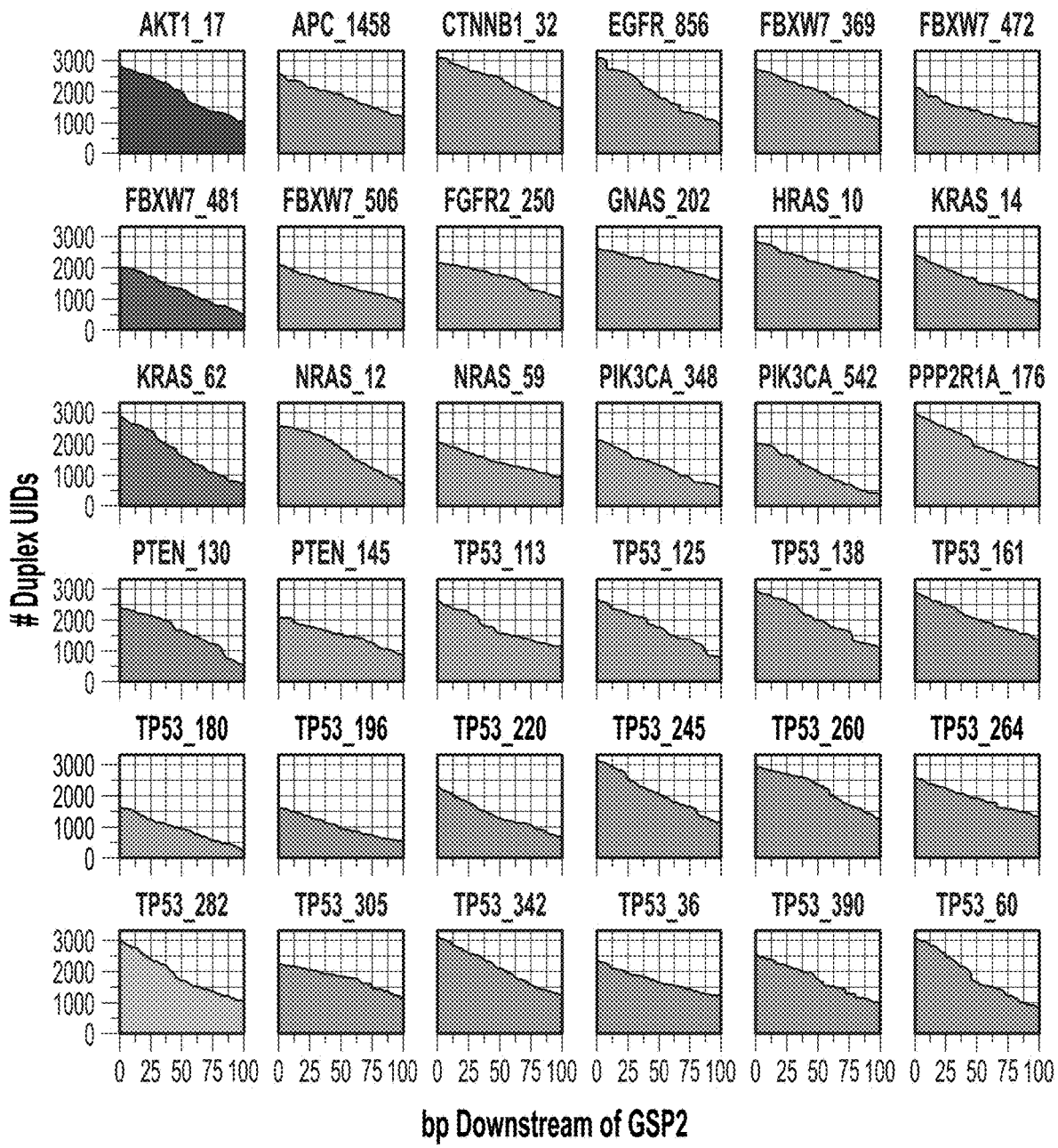

FIG. 29 contains graphs showing a multiplex panel for detection of exemplary cancer driver gene mutations. Recovery and coverage of the 36 amplicons that successfully amplified within the multiplex panel. The horizontal axis displays the position downstream of the 3' end of the second gene-specific primer (GSP2). The gradual decline in coverage with increasing distance from the 3' primer end is a consequence of the input DNA fragmentation pattern. Details regarding the theoretical recovery of reads with specific amplicon lengths are discussed in Example 2.

Figure 30:
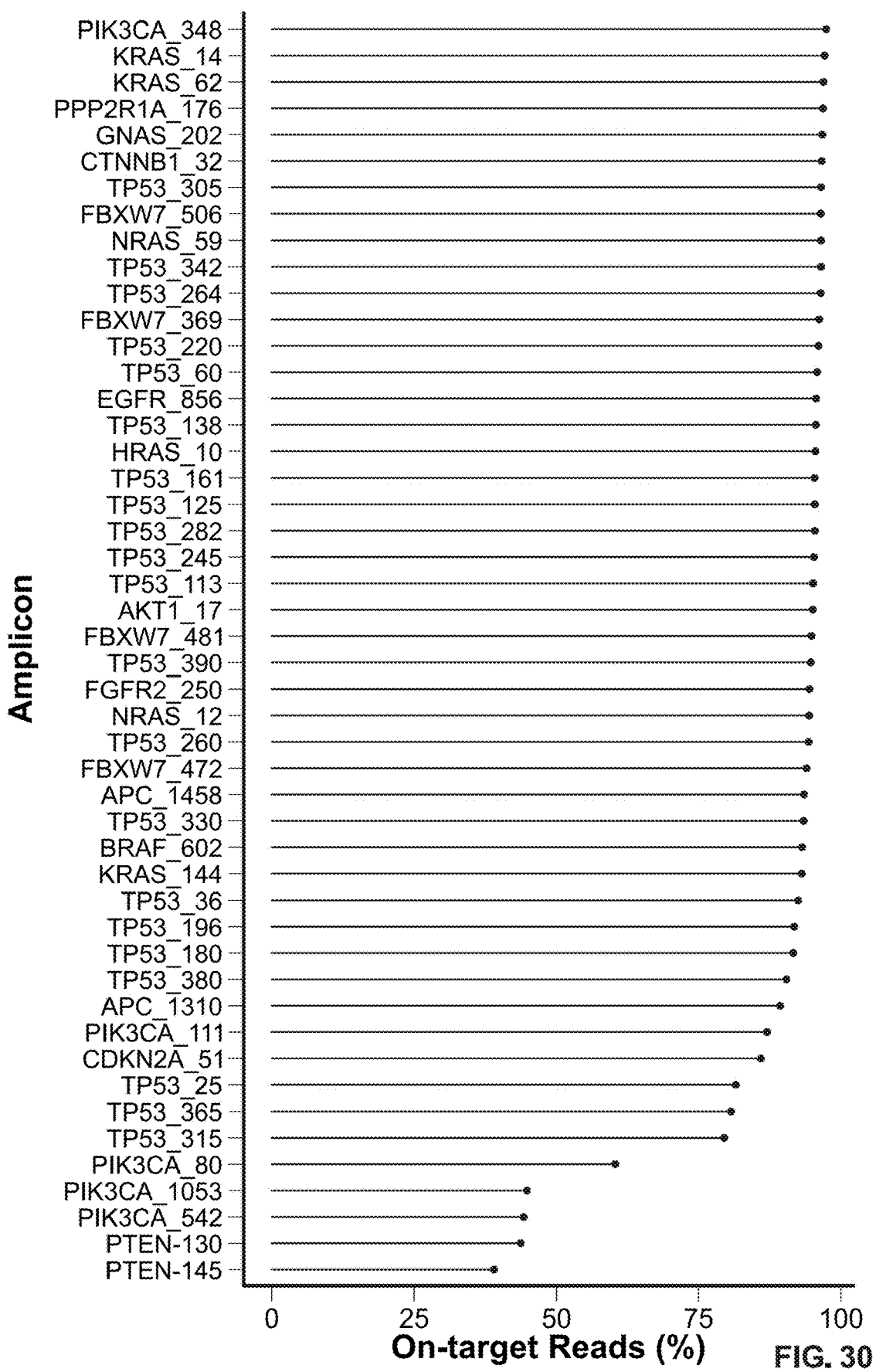

FIG. 30. Performance of the 48 primer pairs used in a multiplex panel to assay regions of driver genes commonly mutated in cancer. The proportion of on-target reads (i.e. the fraction of total reads that map to the intended target) for each of the 48 SaferSeqS primer pairs used in the strand-specific PCRs. Primers were used at equimolar concentrations in each gene-specific PCR.

Figure 31:
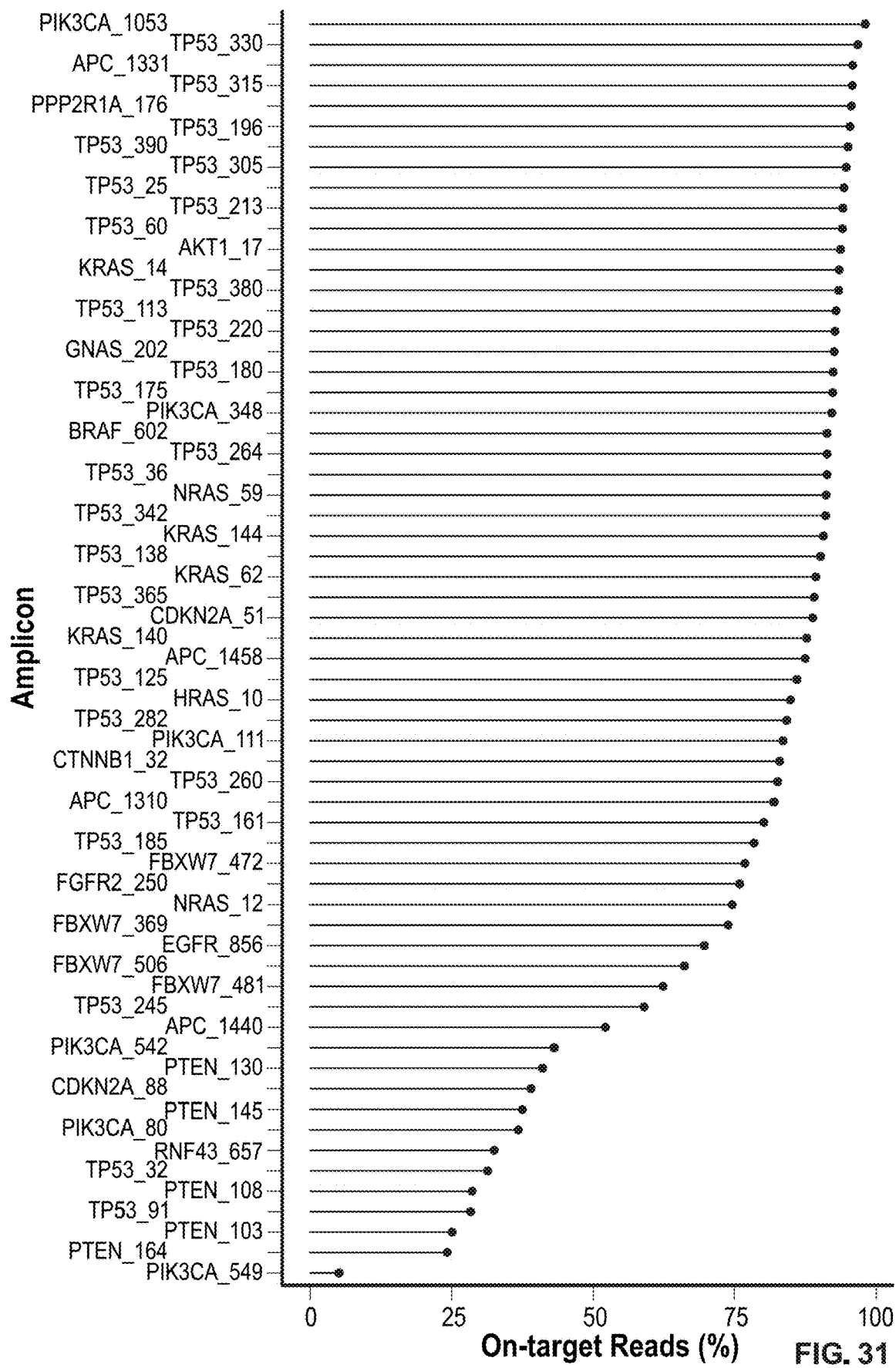

FIG. 31. Performance of 62 primer pairs. The proportion of on-target reads (i.e. the fraction of total reads that map to the intended target) for each of 62 SaferSeqS primer pairs tested to date. Fifty of the 62 pairs (81%) exhibit an on-target rate of greater than 50%. The results presented reflect a single attempt at primer design.

Figure 32:
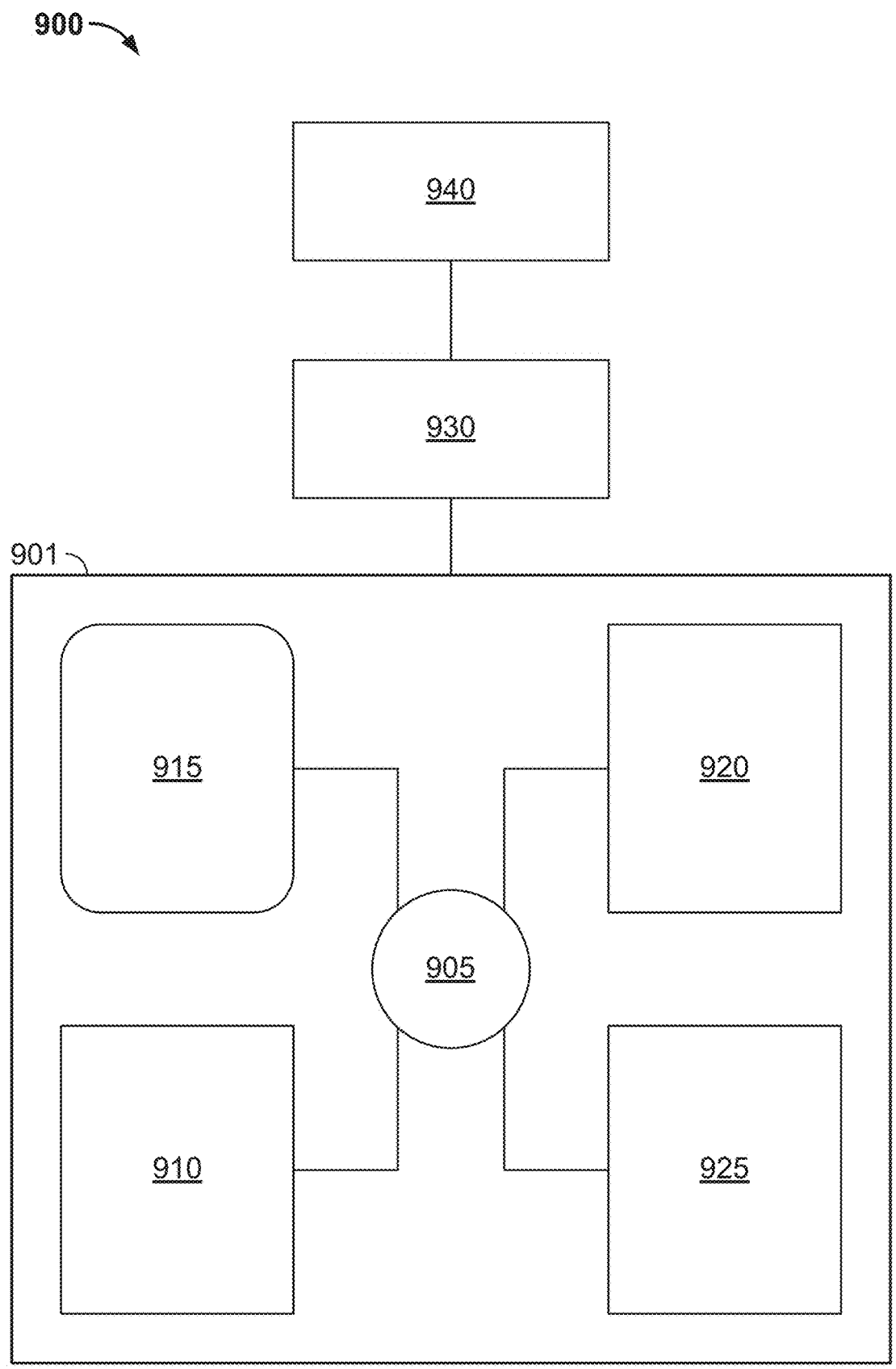

FIG. 32 depicts an exemplary computer system adapted to enable a user to analyze a nucleic acid sample according to a method described herein.

DETAILED DESCRIPTION

It must be noted that, as used in the specification and the appended claims, the singular forms "a," "an" and "the" include plural referents unless the context clearly dictates otherwise.

"Nucleotides" and "nt" are used interchangeably herein to generally refer to biological molecules that comprise nucleic acids. Nucleotides can have moieties that contain the known purine and pyrimidine bases. Nucleotides may have other heterocyclic bases that have been modified. Such modifications include, e.g., methylated purines or pyrimidines, acylated purines or pyrimidines, alkylated riboses, or other heterocycles. The terms "polynucleotides," "nucleic acid," and "oligonucleotides" can be used interchangeably. They can refer to a polymeric form of nucleotides of any length, either deoxyribonucleotides or ribonucleotides, or analogs thereof. Polynucleotides may have any three-dimensional structure, and may perform any function, known or unknown. The following are non-limiting examples of polynucleotides: coding or non-coding regions of a gene or gene fragment, loci (locus) defined from linkage analysis, exons, introns, messenger RNA (mRNA), transfer RNA, ribosomal RNA, ribozymes, cDNA, recombinant polynucleotides, branched polynucleotides, plasmids, vectors, isolated DNA of any sequence, isolated RNA of any sequence, nucleic acid probes, and primers. A polynucleotide may comprise non-naturally occurring sequences. A polynucleotide may comprise modified nucleotides, such as methylated nucleotides and nucleotide analogs. If present, modifications to the nucleotide structure may be imparted before or after assembly of the polymer. The sequence of nucleotides may be interrupted by non-nucleotide components. A polynucleotide may be further modified after polymerization, such as by conjugation with a labeling component.

A "primer" is generally a polynucleotide molecule comprising a nucleotide sequence (e.g., an oligonucleotide), generally with a free 3'-OH group, that hybridizes with a template sequence (such as a target polynucleotide, or a primer extension product) and is capable of promoting polymerization of a polynucleotide complementary to the template.

The term "mammal" as used herein includes both humans and non-humans and include but is not limited to humans, non-human primates, canines, felines, murines, bovines, equines, and porcines.

Overview

This document relates to methods and materials useful for accurately identifying a mutation present in a nucleic acid sample. In some aspects, the method comprises identifying the mutation when it is present on both Watson and Crick strands of a double stranded nucleic acid template. Such methods are particularly useful for distinguishing true mutations from artifacts stemming from, e.g., DNA damage, PCR, and other sequencing artifacts, allowing for the identification of mutations with high confidence.

In some cases, the methods and materials described herein can detect one or more mutations with a low error rate. For example, the methods and materials described herein can be used to detect the presence or absence of a nucleic acid mutation in a nucleic acid template with an error rate of less than about 1% (e.g., less than about 0.1%, less than about 0.05%, or less than about 0.01%). In some cases, the methods and materials described herein can be used to detect the presence or absence of a nucleic acid mutation in a nucleic acid template with an error rate of from about 0.001% to about 0.01%. In some cases, the error rate associated with the identification of one or more mutations in analyte DNA fragments according to a method described herein is no more than $1 \times 10^{-2}$, no more than $1 \times 10^{-3}$, no more than $1 \times 10^{-4}$, no more than $1 \times 10^{-5}$, no more than $1 \times 10^{-6}$, no more than $5 \times 10^{-6}$, or no more than $1 \times 10^{-7}$. In some cases, the error rate associated with the identification of one or more mutations in analyte DNA fragments according to a method described herein is reduced by at least 2-fold, 4-fold, 5-fold, 10-fold, 20-fold, 30-fold, 40-fold, 50-fold, 60-fold, 70-fold, 80-fold, 90-fold, or 100-fold, as compared to an alternative method of identifying mutations that does not require the mutation to be detected in both Watson and Crick strands of an analyte DNA fragment.

In some embodiments, the alternative method comprises standard molecular barcoding or standard PCR-based molecular barcoding followed by sequencing. In particular embodiments, the alternative method comprises: (a) attaching adapters to a population of double-stranded DNA fragments in an analyte DNA sample, wherein the adapters comprise a unique exogenous UID; (b) performing an initial amplification to amplify the adapter-ligated, double-stranded DNA fragments to produce amplicons; (c) determining sequence reads of one or more amplicons of the one or more of the adapter-ligated, double-stranded DNA fragments; (d) assigning the sequence reads into UID families, wherein each member of a UID family comprises the same exogenous UID sequence; (e) identifying a nucleotide sequence as accurately representing an analyte DNA fragment when a threshold percentage of members of a UID family contain the sequence; and (f) identifying a mutation in the analyte DNA fragment when the sequence identified as accurately representing an analyte DNA fragment differs from a reference sequence that lacks the mutation.

In some cases, the methods and materials described herein can be used to achieve efficient duplex recovery. For example, methods described herein can be used to recover PCR amplification products derived from both the Watson strand and the Crick strand of a double stranded nucleic acid template. In some cases, the methods described herein can be used to achieve at least 50% (e.g., about 50%, about 60%, about 70%, about 75%, about 80%, about 82%, about 85%, about 88%, about 90%, about 93%, about 95%, about 97%, about 99%, or 100%) duplex recovery.

In some cases, the methods and materials described herein can be used to detect a mutation having low allele frequency. For example, methods described herein can be used to detect a mutation having low allele frequency of less than about 1% (e.g., less than about 0.1%, less than about 0.05%, or less than about 0.01%). In some cases, the methods described herein can be used to detect a mutation having low allele frequency of about 0.001%.

In some cases, the methods described herein can be used to detect a mutation that is present in an analyte nucleic acid sample at a frequency of 0.1% or less. In some embodiments, the methods described herein can be used to detect a mutation that is present in an analyte nucleic acid sample at a frequency of 0.1% to 0.00001%. In some embodiments, the methods described herein can be used to detect a mutation that is present in an analyte nucleic acid sample at a frequency of 0.1% to 0.01%.

In some cases, the methods and materials described herein can be used to detect a mutation with minimal (or no) background artifact mutations. In some cases, the methods described herein can be used to detect a mutation with less than 0.01% background artifact mutations. In some cases, the methods described herein can be used to detect a mutation with no background artifact mutations.

In some cases, methods for detecting one or more mutations present on both strands of a double stranded nucleic acid can include generating a duplex sequencing library having a duplex molecular barcode on each end (e.g., the 5' end and the 3' end) of each nucleic acid in the library, generating a library of single stranded Watson strand-derived sequences and a library of single stranded Crick-strand derived sequences from the duplex sequencing library, and detecting the presence of one or more mutations present on both strands of the double stranded nucleic acid in each single stranded library. The presence of a first molecular barcode in a 3' duplex adapter and a second molecular barcode present in a 5' adapter can be used to distinguish amplification products derived from the Watson strand from amplification products derived from the Crick strand.

In some cases, methods for identifying a mutation comprises: (a) attaching partially double-stranded 3' adapters to 3' ends of both Watson and Crick strands of a population of double-stranded DNA fragments in an analyte DNA sample, wherein a first strand of the partially double-stranded 3' adapter comprises, in the 5'-3' direction, (i) a first segment, (ii) an exogenous UID sequence, (iii) an annealing site for a 5' adapter, and (iv) a universal 3' adapter sequence comprising an R2 sequencing primer site, and wherein the second strand of the partially double-stranded 3' adapter comprises, in the 5' to 3' direction, (i) a segment complementary to the first segment, and (ii) a 3' blocking group, optionally wherein the second strand is degradable; (b) annealing 5' adapters to the 3' adapters via the annealing site, wherein the 5' adapters comprise, in the 5' to 3' direction, (i) a universal 5' adapter sequence that is not complementary to the universal 3' adapter sequence and that comprises an R1 sequencing primer site, and (ii) a sequence complementary to the annealing site for the 5' adapter; (c) performing a nick translation-like reaction to extend the 5' adapters across the exogenous UID sequence of the 3' adapters (e.g., using a DNA polymerase) and covalently link the extended 5' adapter to the 5' ends of the Watson and Crick strands of the double-stranded DNA fragments (e.g., using a ligase); (d) performing an initial amplification to amplify the adapter-ligated, double-stranded DNA fragments to produce amplicons; (e) determining sequence reads of one or more amplicons of the one or more of the adapter-ligated, double-stranded DNA fragments; (f) assigning the sequence reads into UID families, wherein each member of a UID family comprises the same exogenous UID sequence; (g) assigning sequence reads of each UID family into a Watson subfamily and Crick subfamily based on spatial relationship of the exogenous UID sequence to the R1 and R2 read sequence; (h) identifying a nucleotide sequence as accurately representing a Watson strand of an analyte DNA fragment when a threshold percentage of members of the Watson subfamily contain the sequence; (i) identifying a nucleotide sequence as accurately representing a Crick strand of an analyte DNA fragment when a threshold percentage of members of the Crick subfamily contain the sequence; (j) identifying a mutation in the nucleotide sequence accurately representing the Watson Strand when the sequence accurately representing the Watson Strand differs from a reference sequence that lacks the mutation; (k) identifying a mutation in the nucleotide sequence accurately representing the Crick Strand when the sequence accurately representing the Crick Strand differs from a reference sequence that lacks the mutation; and (l) identifying a mutation in the analyte DNA fragment when the mutation in the nucleotide sequence accurately representing the Watson strand and the mutation in the nucleotide sequence accurately representing the Crick strand are the same mutation.

In some cases, methods for identifying a mutation comprises: (a) attaching adapters to a population of double-stranded DNA fragments, wherein the adapters comprise a double-stranded portion comprising an exogenous UID and a forked portion comprising (i) a single-stranded 3' adapter sequence comprising an R2 sequencing primer site and (ii) a single-stranded 5' adapter sequence comprising an R1 sequencing primer site; (b) performing an initial amplification to amplify the adapter-ligated, double-stranded DNA fragments to produce amplicons; (c) selectively amplifying amplicons of Watson strands comprising the target polynucleotide sequence with a first set of Watson target-selective primer pairs, the first set of Watson target-selective primer pairs comprising: (i) a first Watson target-selective primer comprising a sequence complementary to the R2 sequencing primer site of the universal 3' adapter sequence, and (ii) a second Watson target-selective primer comprising a target-selective sequence, thereby creating target Watson amplification products; (d) selectively amplifying amplicons of Crick strands comprising the same target polynucleotide sequence with a first set of Crick target-selective primer pairs, the first set of Crick target-selective primer pairs comprising: a first Crick target-selective primer comprising a sequence complementary to the R1 sequencing primer site of the universal 5' adapter sequence, and (ii) a second Crick target-selective primer comprising the same target-selective sequence as the second Crick target-selective primer sequence, thereby creating target Crick amplification products; (e) determining sequence reads of the target Watson amplification products and the target Crick amplification products; (f) assigning the sequence reads into UID families, wherein each member of a UID family comprises the same exogenous UID sequence; (g) assigning sequence reads of each UID family into a Watson subfamily and Crick subfamily based on spatial relationship of the exogenous UID sequence to the R1 and R2 read sequence; (h) identifying a nucleotide sequence as accurately representing a Watson strand of an analyte DNA fragment when a threshold percentage of members of the Watson family contain the sequence; (i) identifying a nucleotide sequence as accurately representing a Crick strand of an analyte DNA fragment when a threshold percentage of members of the Crick family contain the sequence; and (j) identifying a mutation in the analyte DNA fragment when the nucleotide sequence accurately representing the Watson strand and the nucleotide sequence accurately representing the Crick strand both contain the same mutation.

In some cases, the methods and materials described herein can be used to independently assess each strand of a double stranded nucleic acid. For example, when a nucleic acid mutation is identified in independently assessed strands of a double stranded nucleic acid as described herein, the materials and methods described herein can used to determine from which strand of the double stranded nucleic acid the nucleic acid mutation originated.

Any appropriate method can be used to generate a duplex sequencing library. As used herein a duplex sequencing library is a plurality of nucleic acid fragments including a duplex molecular barcode on at one end (e.g., the 5' end and/or the 3' end) of each nucleic acid fragment in the library and can allow both strands of a double stranded nucleic acid to be sequenced. In some cases, a nucleic acid sample can be fragmented to generate nucleic acid fragments, and the generated nucleic acid fragments can be used to generate a duplex sequencing library. Nucleic acid fragments used to generate a duplex sequencing library can also be referred to herein as input nucleic acid. For example, when nucleic acid fragments used to generate a duplex sequencing library are DNA fragments, the DNA fragments can also be referred to herein as input DNA. A duplex sequencing library can include any appropriate number of nucleic acid fragments. In some cases, generating a duplex sequencing library can include fragmenting a nucleic acid template and ligating adapters to each end of each nucleic acid fragment in the library.

Analyte Nucleic Acid Sample

Nucleic acid templates in an analyte nucleic acid sample can comprise any type of nucleic acid (e.g., DNA, RNA, and DNA/RNA hybrids). In some cases, a nucleic acid template can be a double-stranded DNA template. Examples of nucleic acid can be used as a template for the methods described herein include, without limitation, genomic DNA, circulating free DNA (cfDNA; e.g., circulating tumor DNA (ctDNA), and cell-free fetal DNA (cffDNA)).

In some embodiments, the nucleic acid templates in the nucleic acid sample are nucleic acid fragments, e.g., DNA fragments. In some embodiments, the ends of a DNA fragment represent unique sequences which can be used as an endogenous unique identifier of the fragment. In some embodiments, the fragments are manually produced. In some embodiments, the fragments are produced by shearing, e.g., enzymatic shearing, shearing by chemical means, acoustic shearing, nebulization, centrifugal shearing, point-sink shearing, needle shearing, sonication, restriction endonucleases, non-specific nucleases (e.g., DNase I), and the like. In some embodiments, the fragments are not manually produced. In some embodiments, the fragments are from a cfDNA sample.

In some embodiments, a nucleic acid fragment in the nucleic acid sample has a length. The length may be about 4-1000 nucleotides. The length may be about 60-300 nucleotides. The length may be about 60-200 nucleotides. Then length can be about 140-170 nucleotides. The length may be less than 500, less than 400, less than 300, less than 250 nt, or less than 200 nt.

In some embodiments, ends of nucleic acid templates are used as endogenous UIDs. A skilled artisan may determine the length of the endogenous UID needed to uniquely identify a nucleic acid template, using factors such as, e.g., overall template length, complexity of nucleic acid templates in a partition or starting nucleic acid sample, and the like. In some embodiments, 10-500 nucleotides of the ends of nucleic acid templates are used as endogenous UIDs. In some embodiments, 15-100 nucleotides of the ends of nucleic acid templates are used as endogenous UIDs. In some embodiments, 15-40 nucleotides of the ends of nucleic acid templates are used as endogenous UIDs. In some embodiments, at least 10 nucleotides of the ends of nucleic acid templates are used as endogenous UIDs. In some embodiments, at least 15 nucleotides of the ends of nucleic acid templates are used as endogenous UIDs. In some embodiments, only one end of a nucleic acid template is used as an endogenous UID.

In some embodiments, nucleic acid templates comprise one or more target polynucleotides. The terms "target polynucleotide," "target region," "nucleic acid template of interest," "desired locus," "desired template," or "target," are used interchangeably herein to refer to a polynucleotide of interest under study. In certain embodiments, a target polynucleotide contains one or more sequences that are of interest and under study. A target polynucleotide can comprise, for example, a genomic sequence. The target polynucleotide can comprise a target sequence whose presence, amount, and/or nucleotide sequence, or changes in these, are desired to be determined.

The target polynucleotide can be a region of gene associated with a disease. In some embodiments, the gene is a druggable target. The term "druggable target", as used herein, generally refers to a gene or cellular pathway that is modulated by a disease therapy. The disease can be cancer. Accordingly, the gene can be a known cancer-related gene.

In some embodiments, the input nucleic acid, also referred to herein as the nucleic acid sample, was obtained from a biological sample. The biological sample may be obtained from a subject. In some embodiments, the subject is a mammal. Examples of mammals from which nucleic acid can be obtained and used as a nucleic acid template in the methods described herein include, without limitation, humans, non-human primates (e.g., monkeys), dogs, cats, sheep, rabbits, mice, hamsters, and rats. In some embodiments, the subject is a human subject. In some embodiments, the subject is a plant.

Biological samples include but are not limited to plasma, serum, blood, tissue, tumor sample, stool, sputum, saliva, urine, sweat, tears, ascites, bronchoaveolar lavage, semen, archeologic specimens and forensic samples. In particular embodiments, the biological sample is a solid biological sample, e.g., a tumor sample. In some embodiments, the solid biological sample is processed. The solid biological sample may be processed by fixation in a formalin solution, followed by embedding in paraffin (e.g., is a FFPE sample). Processing can alternatively comprise freezing of the sample prior to conducting the probe-based assay. In some embodiments, the sample is neither fixed nor frozen. The unfixed, unfrozen sample can be, by way of example only, stored in a storage solution configured for the preservation of nucleic acid.

In some embodiments, the biological sample is a liquid biological sample. Liquid biological samples include, but are not limited to plasma, serum, blood, sputum, saliva, urine, sweat, tears, ascites, bronchoaveolar lavage, and semen. In some embodiments, the liquid biological sample is cell free or substantially cell free. In particular embodiments, the biological sample is a plasma or serum sample. In some embodiments, the liquid biological sample is a whole blood sample. In some embodiments, the liquid biological sample comprises peripheral mononuclear blood cells.

In some embodiments, a nucleic acid sample has been isolated and purified from the biological sample. Nucleic acid can be isolated and purified from the biological sample using any means known in the art. For example, a biological sample may be processed to release nucleic acid from cells, or to separate nucleic acids from unwanted components of the biological sample (e.g., proteins, cell walls, other contaminants). For example, nucleic acid can be extracted from the biological sample using liquid extraction (e.g., Trizol, DNAzol) techniques. Nucleic acid can also be extracted using commercially available kits (e.g., Qiagen DNeasy kit, QIAamp kit, Qiagen Midi kit, QIAprep spin kit).

In some embodiments, the biological sample comprises low amounts of nucleic acid. In some embodiments, the biological sample comprises less than about 500 nanograms (ng) of nucleic acid. For example, the biological sample comprises from about 30 ng to about 40 ng of nucleic acid.

Nucleic acid can be concentrated by known methods, including, by way of example only, centrifugation. Nucleic acid can be bound to a selective membrane (e.g., silica) for the purposes of purification. Nucleic acid can also be enriched for fragments of a desired length, e.g., fragments which are less than 1000, 500, 400, 300, 200 or 100 base pairs in length. Such an enrichment based on size can be performed using, e.g., PEG-induced precipitation, an electrophoretic gel or chromatography material (Huber et al. (1993) Nucleic Acids Res. 21:1061-6), gel filtration chromatography, TSK gel (Kato et al. (1984) J. Biochem, 95:83-86), which publications are hereby incorporated by reference.

Polynucleotides extracted from a biological sample can be selectively precipitated or concentrated using any methods known in the art.

In some embodiments, the nucleic acid sample comprises less than about 35 ng of nucleic acid. For example, the nucleic acid sample comprises can include from about 1 ng to about 35 ng of nucleic acid (e.g., from about 1 ng to about 30 ng, from about 1 ng to about 25 ng, from about 1 ng to about 20 ng, from about 1 ng to about 15 ng, from about 1 ng to about 10 ng, from about 1 ng to about 5 ng, from about 5 ng to about 35 ng, from about 10 ng to about 35 ng, from about 15 ng to about 35 ng, from about 20 ng to about 35 ng, from about 25 ng to about 35 ng, from about 30 ng to about 35 ng, from about 5 ng to about 30 ng, from about 10 ng to about 25 ng, from about 15 ng to about 20 ng, from about 5 ng to about 10 ng, from about 10 ng to about 15 ng, from about 15 ng to about 20 ng, from about 20 ng to about 25 ng, or from about 25 ng to about 30 ng of nucleic acid). In some cases, a nucleic acid sample can include nucleic acid from a genome that includes more than about several hundred nucleotides of nucleic acid.

In some cases, a nucleic acid sample can be essentially free of contamination. For example, when a nucleic acid sample is a cfDNA template, the cfDNA can be essentially free of genomic DNA contamination. In some cases, a cfDNA sample that is essentially free of genomic DNA contamination can include minimal (or no) high molecular weight (e.g., >1000 bp) DNA. In some cases, methods described herein can include determining whether a nucleic acid sample is essentially free of contamination. Any appropriate method can be used to determine whether a nucleic acid sample is essentially free of contamination. Examples of methods that can be used to determine whether a nucleic acid sample is essentially free of contamination include, for example, a TapeStation system, and a Bioanalyzer. For example, when using a TapeStation system and/or a Bioanalyzer to determine whether a cfDNA sample is essentially free of genomic DNA contamination, a prominent peak at ~180 bp (e.g., corresponding to mononucleosomal DNA) can be used to indicate that the nucleic acid sample is essentially free of genomic DNA contamination.

Figure 9:
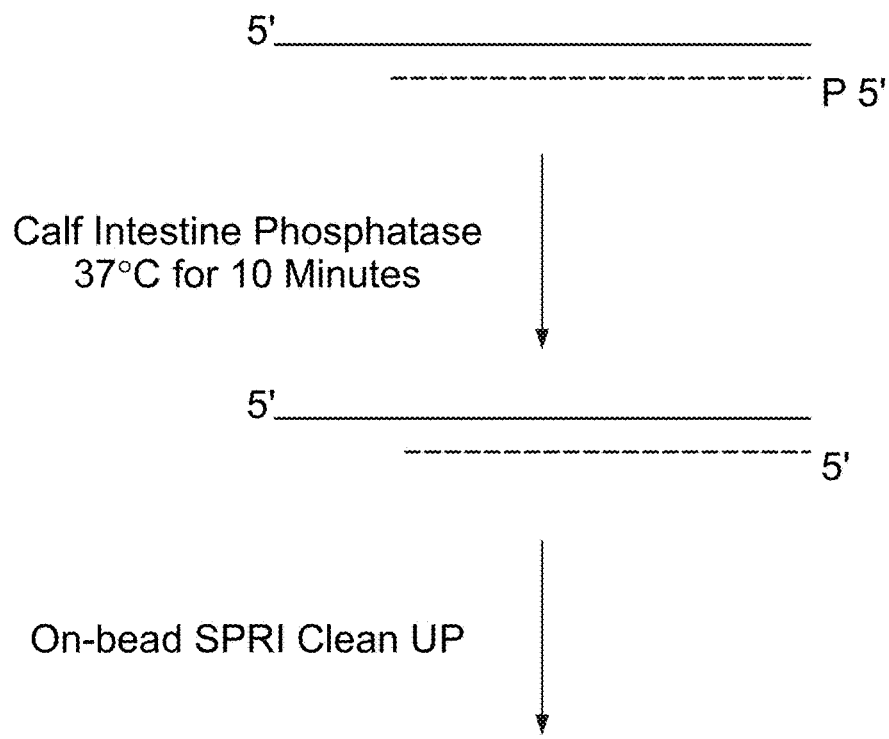
FIG. 9 contains a schematic of an exemplary removal of a 5' phosphate.

In some cases, nucleic acid fragments that can be used to generate a duplex sequencing library (e.g., prior to attaching a 3' duplex adapter to the 3' ends of the nucleic acid fragments) can be end-repaired. Any appropriate method can be used to end-repair a nucleic acid template. For example, blunting reactions (e.g., blunt end ligations) and/or dephosphorylation reactions can be used to end-repair a nucleic acid template. In some cases, blunting can include filling in a single stranded region. In some cases, blunting can include degrading a single stranded region. In some cases, blunting and dephosphorylation reactions can be used to end-repair a nucleic acid template as shown in FIG. 9 and/or FIG. 10.

Adapters

In some embodiments, the method comprises attaching adapters to a population of double-stranded DNA fragments to produce a population of adapter-attached, double-stranded DNA fragments.

In some embodiments, the adapters comprise a double-stranded portion comprising an exogenous UID and a forked portion comprising (i) a single-stranded 3' adapter sequence and (ii) a single-stranded 5' adapter sequence. In some embodiments, the single-stranded 3' adapter sequence is not complementary to the single-stranded 5' adapter sequence. In some embodiments, the 3' adapter sequence comprises a second (e.g., R2) sequencing primer site and the 5' adapter sequence comprises a first (e.g., R1) sequencing primer site. It is to be understood that an "R1" and "R2" sequencing primer sites are used by sequencing systems that produce paired end reads, e.g., reads from opposite ends of a DNA fragment to be sequenced. In some embodiments, the R1 sequencing primer is used to produce a first population of reads from first ends of DNA fragments, and the R2 sequencing primer is used to produce a second population of reads from the opposite ends of the DNA fragments. The first population is referred to herein as "R1" or "Read 1" reads. The second population is referred to herein as "R2" or "Read 2" reads. The R1 and R2 reads can be aligned as "read pairs" or "mate pairs" corresponding to each strand of a double-stranded analyte DNA fragment.

Certain sequencing systems, e.g., Illumina, utilizes what they refer to as "R1" and "R2" primers, and "R1" and "R2" reads. It should be noted that the terms "R1" and "R2", and "Read 1" and "Read 2", for the purposes of this application, are not limited to how they are referenced in relation to a particular sequencing platform. For example, if an Illumina sequencer is used, the "R2" primer and corresponding R2 read disclosed herein may refer to the Illumina "R2" primer and read, or may refer to the Illumina "R1" primer and read, so long as the "R1" primer and corresponding R1 read disclosed herein refers to the other Illumina primer and read. To clarify, in some embodiments wherein an "R2" primer provided herein is the Illumina "R1" primer producing "R1" reads, the corresponding "R1" primer provided herein is the Illumina "R2" primer producing "R2" reads. To clarify, in some embodiments wherein an "R2" primer provided herein is the Illumina "R2" primer providing "R2" reads, the "R1" primer provided herein is the Illumina "R1" primer providing R1 reads.

In some embodiments, the exogenous UID is unique to each double-stranded DNA fragment in the nucleic acid sample. In some embodiments, the exogenous UID is not unique to each double-stranded DNA fragment.

In some embodiments, the exogenous UID has a length. The length can be about 2-4000 nt. The length can be about 6-100 nt. The length can be about 8-50 nt. The length can be about 10-20 nt. The length can be about 12-14 nt. In some embodiments, the length of the exogenous UID is sufficient to uniquely barcode the molecules and the length/sequence of the exogenous UID does not interfere with the downstream amplification steps.

In some embodiments, the exogenous UID sequence does not exist in the nucleic acid template. In some embodiments, the exogenous UID sequence does not exist in a desired template harboring a desired locus. Such unique sequences can be randomly generated, e.g., by a computer readable medium, and selected by BLASTing against known nucleotide databases such as, e.g., EMBL, GenBank, or DDBJ. In some embodiments, an exogenous UID sequence exists in a nucleic acid template. In such cases, the position of the exogenous UID sequence in the sequence read is used to distinguish the exogenous UID sequence from a sequence within the nucleic acid template.

In some embodiments, the exogenous UID sequence is random. In some embodiments, the exogenous UID sequence is a random N-mer. For example, if the exogenous UID sequence has a length of six nt, then it may be a random hexamer. If the exogenous UID sequence has a length of 12 nt, then it may be a random 12-mer.

Exogenous UIDs may be made using random addition of nucleotides to form a sequence having a length to be used as an identifier. At each position of addition, a selection from one of four deoxyribonucleotides may be used. Alternatively a selection from one of three, two, or one deoxyribonucleotides may be used. Thus the UID may be fully random, somewhat random, or non-random in certain positions.

In some embodiments, the exogenous UIDs are not random N-mers, but are selected from a predetermined set of exogenous UID sequences.

Exemplary exogenous UIDs suitable for use in the methods disclosed herein are described in PCT/US2012/033207, which is hereby incorporated by reference in its entirety.

Forked adapters described herein may be attached to double-stranded DNA fragments by any means known in the art.

In some embodiments, the forked adapters are attached to double-stranded DNA fragments by: (a) attaching partially double-stranded 3' adapters to 3' ends of both Watson and Crick strands of a population of double-stranded DNA fragments, wherein a first strand of the partially double-stranded 3' adapter comprises, in the 5'-3' direction, (i) a first segment, (ii) an exogenous UID sequence, (iii) an annealing site for a 5' adapter, and (iv) a universal 3' adapter sequence comprising an R2 sequencing primer site, and wherein the second strand of the partially double-stranded 3' adapter comprises, in the 5' to 3' direction, (i) a segment complementary to the first segment, and (ii) a 3' blocking group, optionally wherein the second strand is degradable; (b) annealing 5' adapters to the 3' adapters via the annealing site, wherein the 5' adapters comprise, in the 5' to 3' direction, (i) a universal 5' adapter sequence that is not complementary to the universal 3' adapter sequence and that comprises an R1 sequencing primer site, and (ii) a sequence complementary to the annealing site for the 5' adapter; and (c) performing a nick translation-like reaction) to extend the 5' adapters across the exogenous UID sequence of the 3' adapters (e.g., using a DNA polymerase) and covalently link the extended 5' adapter to the 5' ends of the Watson and Crick strands of the double-stranded DNA fragments (e.g., using a ligase).

Figure 11:
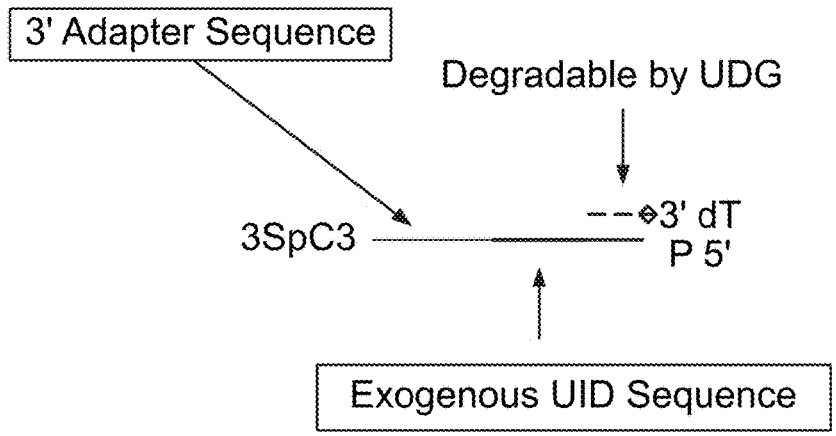
FIG. 11 contains a schematic of an exemplary 3' duplex adapter including a 3SpC3 spacer, exogenous UID sequence containing a molecular barcode, and a 3' oligonucleotide (dT) hybridized to a 3' blocking group which can be degraded by uracil-DNA glycosylase (UDG).

In some embodiments, the forked adapters are attached to double-stranded DNA fragments by: (a) attaching a 3' duplex adapter to 3' ends of both Watson and Crick strands of a population of double-stranded DNA fragments. A 3' duplex adapter, also referred to herein as a partially double stranded 3' adapter, as described herein is an oligonucleotide complex including a molecular barcode that can have a first oligonucleotide (also referred to herein as "first strand") annealed (hybridized) to a second oligonucleotide (also referred to herein as "second strand") such that a portion (e.g., first portion) of the 3' duplex adapter is double stranded and a portion (e.g., a second portion) of the 3' duplex adapter is single stranded. In some cases, a first oligonucleotide of a 3' duplex adapter described herein comprises a first segment comprising nucleotides that are complementary to nucleotides present in a second oligonucleotide of the 3' duplex adapter (e.g., such that the first oligonucleotide of the 3' duplex adapter and the second oligonucleotide of the 3' duplex adapter can anneal at the complementary region). An exemplary structure of a 3' duplex adapter can be as shown in FIG. 11.

The first oligonucleotide of a 3' duplex adapter described herein can be an oligonucleotide that includes a 5' phosphate and a molecular barcode. The first oligonucleotide of a 3' duplex adapter described herein can include any appropriate number of nucleotides. Any appropriate molecular barcode can be included in a first oligonucleotide of a 3' duplex adapter described herein. In some cases, a molecular barcode can include a random sequence. In some cases, a molecular barcode can include a fixed sequence. Examples of molecular barcodes that can be included in a first oligonucleotide of a 3' duplex adapter described herein include, without limitation, IDT 8, IDT 10, ILMN 8, ILMN 10 as available from Integrated DNA technologies. Any appropriate type of molecular barcode can be used. In some cases, a molecular barcode comprise an exogenous UID sequence. Exogenous UIDs are described herein. Examples of oligonucleotides that include a 5' phosphate and a molecular barcode and can be included in a first oligonucleotide of a 3' duplex adapter described herein include, without limitation, ATAAAACGACGGCNNNNNNNNNNNNNNNAGATCG-GAAGAGCACACGTCTGAACT CCAG*T*C (with the asterisks representing phosphorothioate bonds; SEQ ID NO:1), where NNNNNNNNNNNNNNN (SEQ ID NO:2) is a molecular barcode, and where the number of nucleotides in the molecular barcode can be from 0 to about 25.

In some embodiments, the first oligonucleotide of the 3' duplex adapter comprises an annealing site for a 5' adapter.

In some embodiments, the first oligonucleotide of the 3' duplex adapter comprises a universal 3' adapter sequence. In some embodiments, the universal 3' adapter sequence comprises an R2 sequencing primer site.

In some cases, a first oligonucleotide of a 3' duplex adapter described herein also can include one or more features to prevent or reduce extension during a PCR. A feature that can prevent or reduce extension during a PCR can be any type of feature (e.g., a chemical modification). Examples of feature that can prevent or reduce extension during a PCR and can be included in a first oligonucleotide of a 3' duplex adapter described herein include, without limitation, 3SpC3 and 3Phos. A feature that can prevent or reduce extension during a PCR can be incorporated into a first oligonucleotide of a 3' duplex adapter described herein in any appropriate position within the oligonucleotide. In some case, a molecule that can prevent or reduce extension during a PCR can be incorporated internally within the oligonucleotide. In some case, a molecule to prevent or reduce extension during a PCR can be incorporated at and end (e.g., the 5' end) of the oligonucleotide.

In particular embodiments, the first oligonucleotide of the 3' duplex adapter comprises a 5' phosphate, a first segment comprising nucleotides that are complementary to nucleotides present in a second oligonucleotide of the 3' duplex adapter, an exogenous UID sequence, an annealing site for a 5' adapter, and a universal 3' adapter sequence.

The second oligonucleotide of a 3' duplex adapter described herein can be an oligonucleotide that includes a blocked 3' group (e.g., to reduce or eliminate dimerization of two adapters). The second oligonucleotide of a 3' duplex adapter described herein can include any appropriate number of nucleotides. In some embodiments, the second oligonucleotide of the 3' duplex adapter is complementary to the first segment of the first oligonucleotide of the 3' duplex adapter. An exemplary oligonucleotide that includes a blocked 3' group and can be included in a second oligonucleotide of a 3' duplex adapter described herein includes, without limitation, GCCGUCGUUUUAdT (SEQ ID NO:3).

The second oligonucleotide of a 3' duplex adapter described herein can be degradable. Any appropriate method can be used to degrade a second oligonucleotide of a 3' duplex adapter described herein. For example, UDG can be used to degrade a second oligonucleotide of a 3' duplex adapter described herein.

In some cases, a 3' duplex adapter described herein can include a first oligonucleotide including the sequence ATAAAACGACGGCNNNNNNNNNNNNNNNAGATCG-GAAGAGCACACGTCTGAACT CCAG*T*C/3SpC3 (SEQ ID NO:1) annealed to a second oligonucleotide including the sequence GCCGUCGUUUUAdT (SEQ ID NO:3).

In some cases, a 3' duplex adapter described herein can include a commercially available adapter. An exemplary commercially available adapters that can be used as (or can be used to generate) a 3' duplex adapter described herein includes, without limitation, adapters in an Accel-NGS 2S DNA Library Kit (Swift Biosciences, cat. #21024). In some cases, a 3' duplex adapter described herein can be as described in Example 1.

The 3' adapters can be attached (e.g., covalently attached) to 3' ends of the double-stranded DNA fragments using any appropriate method. In some embodiments, the 3' adapters are attached by ligation. In some embodiments, the ligation comprises use of a ligase. Examples of ligases that can be used to attach a 3' adapter to the 3' ends of each nucleic acid fragment include, without limitation, T4 DNA ligases, *E. coli* ligases (e.g., Enzyme Y3), CircLigase I, CircLigase II, Taq-Ligase, T3 Ligase, T7 Ligase, and 9N Ligase.

Once the 3' duplex adapter is attached (e.g., covalently attached) to the 3' ends of each nucleic acid fragment, the second oligonucleotide of a 3' duplex adapter described herein can be degraded, and a 5' adapter can be attached (e.g., covalently attached) to the 5' ends of each nucleic acid fragment. In some embodiments, the 5' adapter sequence is not complementary to the first oligonucleotide of the 3' adapter. In some embodiments, the 5' adapter sequence comprises, in the 5' to 3' direction, an R1 sequencing primer site and a sequence complementary to the annealing site of the 3' adapter.

In some embodiments, the attaching of the 5' adapter comprises annealing the 5' adapter to the 3' adapter via the annealing site.

A 5' adapter can anneal to a nucleic acid fragment upstream of a molecular barcode on a 3' duplex adapter such that a gap (e.g., single stranded nucleic acid fragment) containing a portion (e.g., a molecular barcode) of the 3' duplex adapter is present on the nucleic acid fragment. The gap containing a portion of the 3' duplex adapter can be filled in (e.g., to generate a double stranded nucleic acid fragment). Any appropriate method can be used to fill in the single stranded gap. Examples of methods that can be used to fill in a single stranded gap on a nucleic acid fragment include, without limitation, polymerases such as DNA polymerases (e.g., Taq polymerases such as a Taq-B polymerase) and nick-translation reactions (e.g., including both a ligase such as an E. coli ligase and a polymerase such as a DNA polymerase). In cases where filling in a single stranded gap on a nucleic acid fragment includes providing a polymerase, the method also can include providing deoxyribonucleotide triphosphates (dNTPs; e.g., dATP, dGTP, dCTP, and dTTP). In some cases, attaching a 5' adapter to the 5' ends of each nucleic acid fragment and filling in the single stranded gap can be done concurrently (e.g., in a single reaction tube).

In some cases, alternative methods can be used to attach the adapters to templates. For example, nucleic acid fragments can be treated with single strand nucleases (e.g., to digest overhangs) followed by ligation can be used to prepare a duplex sequencing library. For example, a single nucleotide can be added to the 3' ends of each nucleic acid fragment and adapters (e.g., containing a molecular barcode) containing a complementary base at the 5' end can be ligated to each nucleic acid fragment to prepare a duplex sequencing library of adapter-attached templates.

Initial Amplification of the Adapter-Attached Templates

Following adapter attachment, the adapter-attached templates can be amplified (e.g., PCR amplified) in an initial amplification reaction. Any appropriate method can be used to amplify the adapter-attached templates. An exemplary method that can be used to amplify the adapter-attached templates includes, without limitation, whole-genome PCR.

Any appropriate primer pair can be used to amplify the adapter-attached templates. In some cases, a universal primer pair can be used. A primer can include, without limitation from about 12 nucleotides to about 30 nucleotides. Examples of primer pairs that can be used to amplify the adapter-attached templates as described herein include, without limitation, those described in Example 1 and/or Example 2.

Any appropriate PCR conditions can be used in the initial amplification. PCR amplification can include a denaturing phase, an annealing phase, and an extension phase. Each phase of an amplification cycle can include any appropriate conditions. In some cases, a denaturing phase can include a temperature of about 90° C. to about 105° C. (e.g., about 94° C. to about 98° C.), and a time of about 1 second to about 5 minutes (e.g., about 10 seconds to about 1 minute). For example, a denaturing phase can include a temperature of about 98° C. for about 10 seconds. In some cases, an annealing phase can include a temperature of about 50° C. to about 72° C., and a time of about 30 seconds to about 90 seconds. In some cases, an extension phase can include a temperature of about 55° C. to about 80° C., and a time of about 15 seconds per kb of the amplicon to be generated to about 30 seconds per kb of the amplicon to be generated. In some cases, annealing and extension phases can be performed in a single cycle. For example, an annealing and phase extension phase can include a temperature of about 65° C. for about 75 seconds.

PCR conditions used in the initial amplification can include any appropriate number of PCR amplification cycles. In some cases, PCR amplification can include from about 1 to about 50 cycles. In some embodiments, the PCR amplification comprises no more than 11 cycles. In some embodiments, the PCR amplification comprises no more than 7 cycles. In some embodiments, the PCR amplification comprises no more than 5 cycles.

In some cases, when PCR conditions include a heat-activated polymerase, PCR amplification also can include an initialization step. For example, PCR amplification can include an initialization step prior to performing the PCR amplification cycles. In some cases, an initialization step can include a temperature of about 94° C. to about 98° C., and a time of about 15 seconds to about 1 minute. For example, an initialization step can include a temperature of about 98° C. for about 30 seconds.

In some cases, PCR amplification also can include a hold step. For example, PCR amplification can include a hold step after performing the PCR amplification cycles, an optionally after performing any final extension step. In some case, a hold step can include a temperature of about 4° C. to about 15° C., for an indefinite amount of time.

In some cases, a duplex sequencing library generated as described herein (e.g., an amplified duplex sequencing library) can be purified. Any appropriate method can be used to purify a duplex sequencing library. An exemplary method that can be used to purify a duplex sequencing library includes, without limitation, magnetic beads (e.g., solid phase reversible immobilization (SPRI) magnetic beads).

Optional ssDNA Library Prep

Figure 1:
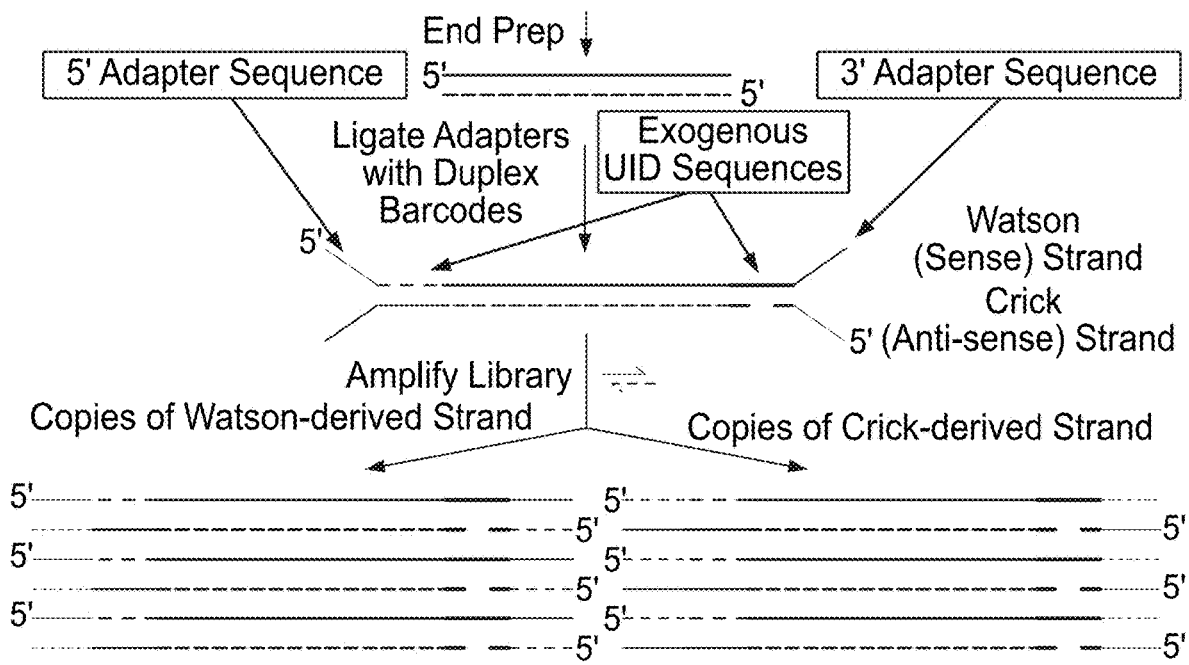
FIG. 1 contains a schematic of an exemplary duplex anchored PCR method. Duplex adapters with molecular barcodes are ligated onto the ends of nucleic acid fragments having blunted ends, to generate a duplex sequencing library, and the duplex sequencing library is subjected to PCR to generate an amplified duplex sequencing library. The amplification products in the amplified duplex sequencing library are divided into two aliquots and each aliquot is subjected to PCR where the Watson strand is amplified from the first aliquot, and the Crick strand is amplified from the second aliquot.
Figure 2:
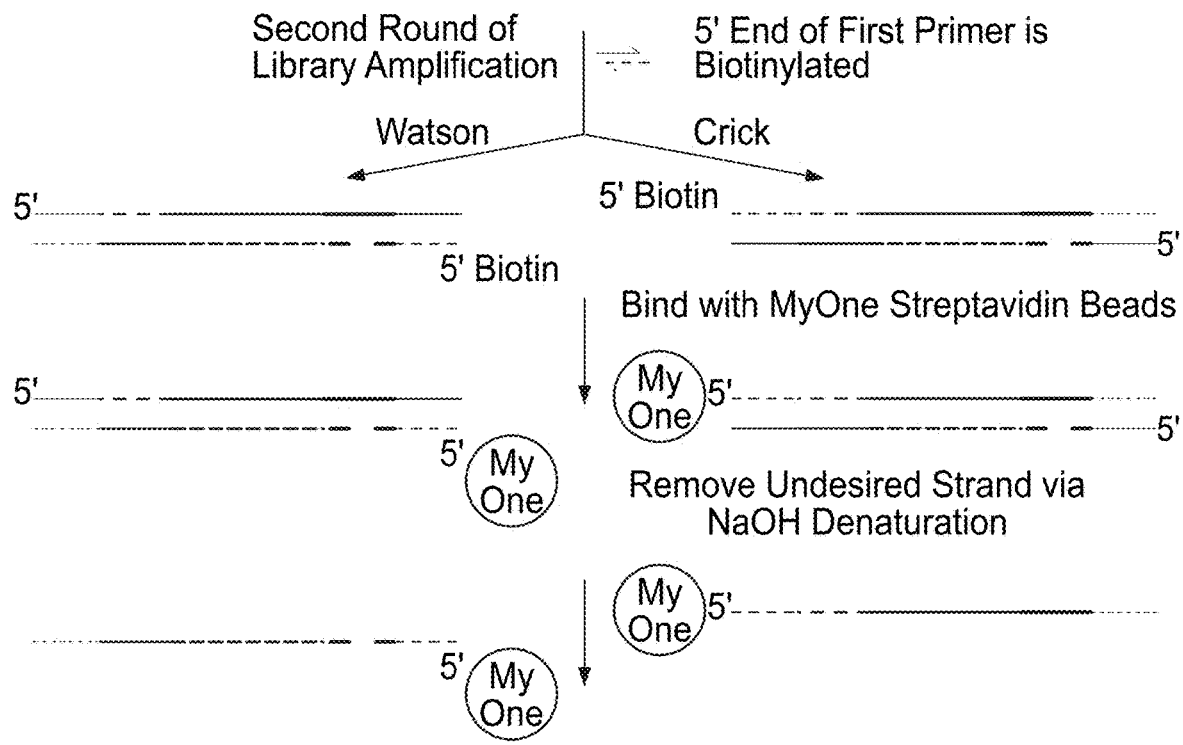
FIG. 2 contains a schematic of an exemplary second round of library amplification where the Watson strands amplified from the first aliquot in FIG. 1 are subjected to PCR using a primer pair where a first primer is biotinylated and a second primer is non-biotinylated to generate a single stranded DNA library that can be used to amplify and assess Watson strands.
Figure 3:
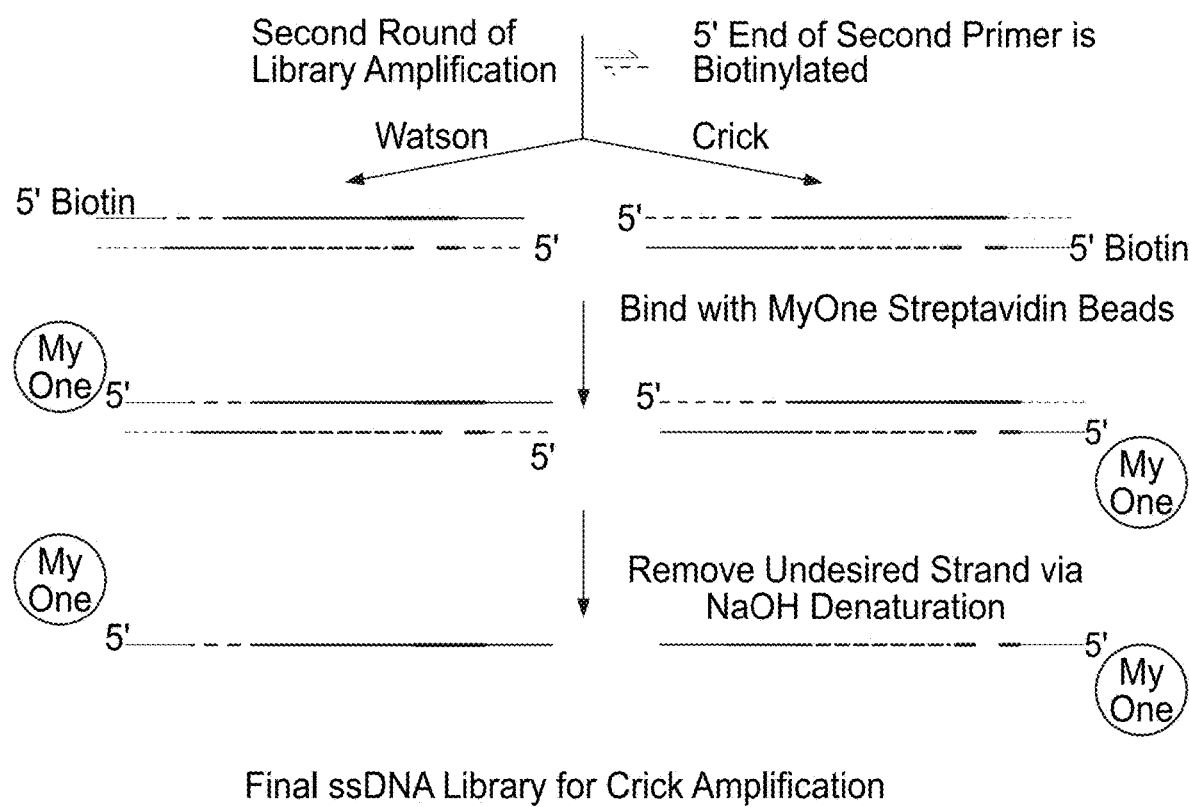
FIG. 3 contains a schematic of an exemplary second round of library amplification where the Crick strands amplified from the first aliquot in FIG. 1 are subjected to PCR using a primer pair where a first primer is non-biotinylated and a second primer is biotinylated to generate a single stranded DNA library that can be used to amplify and assess Crick strands.

In some cases, a duplex sequencing library can be used to generate a library of single stranded Watson strand-derived sequences and a library of single stranded Crick-strand derived sequences. Generating a library of single stranded Watson strand-derived sequences and a library of single stranded Crick-strand derived sequences can minimize non-specific amplification (e.g., from a primer complementary to a ligated sequence such as a 3' duplex adapter or a 5' adapter). Any appropriate method can be used to generate a library of single stranded Watson strand-derived sequences and a library of single stranded Crick-strand derived sequences (e.g., from a duplex sequencing library generated as described herein). In some cases, a library of single stranded Watson strand-derived sequences and a library of single stranded Crick-strand derived sequences can be generated from an amplified duplex sequencing library by dividing the amplification products into at least two aliquots, and subjecting each aliquot to a PCR amplification where the Watson strand is amplified from a first aliquot, and the Crick strand is amplified from a second aliquot. For example, a first aliquot of amplification products from an amplified duplex sequencing library can be subjected to a PCR amplification using a primer pair where a first primer is biotinylated and a second primer is non-biotinylated to generate a single stranded library of Watson strands, and a second aliquot of amplification products from an amplified duplex sequencing library can be subjected to a PCR amplification using a primer pair where a first primer is non-biotinylated and a second primer is biotinylated to generate a single stranded library of Crick strands. In some cases, a library of single stranded Watson strand-derived sequences and a library of single stranded Crick-strand derived sequences can be generated as shown in FIG. 2 and FIG. 3.

Any appropriate method can be used to generate a library of single stranded Watson strand-derived sequences and a library of single stranded Crick-strand derived sequences from an amplified duplex sequencing library. For example, amplification products from an amplified duplex sequencing library can be separated into a first PCR amplification and a second PCR amplification in which only one of the two primers in the PCR primer pair is tagged. For example, a first PCR amplification can use a primer pair that includes a primer (e.g., a first primer) that is tagged and a primer (e.g., a second primer) that is not tagged, and a second PCR amplification can use a primer pair that includes a primer (e.g., a first primer) that is not tagged and a primer (e.g., a second primer) that is tagged. A primer tag can be any tag that enables a PCR amplification product generated from the tagged primer to be recovered. In some cases, a tagged primer can be a biotinylated primer, and a PCR amplification produce generated from the biotinylated primer can be recovered using streptavidin. For example, a library of single stranded Watson strand-derived sequences and a library of single stranded Crick-strand derived sequences can be generated in a PCR amplification using a primer pair including a biotinylated primer and a non-biotinylated primer. In some cases, a tagged primer can be a phosphorylated primer, and a PCR amplification produce generated from the phosphorylated primer can be recovered using a lambda nuclease. For example, a library of single stranded Watson strand-derived sequences and a library of single stranded Crick-strand derived sequences can be generated in a PCR amplification using a primer pair including a phosphorylated primer and a non-phosphorylated primer.

Any appropriate primer pair can be used to generate a library of single stranded Watson strand-derived sequences and a library of single stranded Crick-strand derived sequences (e.g., from a duplex sequencing library generated as described herein). A primer can include, without limitation, from about 12 nucleotides to about 30 nucleotides. In some cases, a primer pair can include at least one primer that can target (e.g., target and bind to) an adapter sequence (e.g., an adapter sequence containing a molecular barcode) present in an amplification product generated as described herein (e.g., by ligating a 3' duplex adapter including a first molecular barcode and a 5' adapter including a second molecular barcode to a nucleic acid fragment in a duplex sequencing library prior to the amplification). Examples of primer pairs that can be used to generate a library of single stranded Watson strand-derived sequences and a library of single stranded Crick-strand derived sequences as described herein include, without limitation, a P5 primer and a P7 primer.

Any appropriate PCR conditions can be used to generate a library of single stranded Watson strand-derived sequences and a library of single stranded Crick-strand derived sequences (e.g., from a duplex sequencing library generated as described herein). PCR amplification can include a denaturing phase, an annealing phase, and an extension phase. Each phase of an amplification cycle can include any appropriate conditions. In some cases, a denaturing phase can include a temperature of about 90° C. to about 105° C., and a time of about 1 second to about 5 minutes. For example, a denaturing phase can include a temperature of about 98° C. for about 10 seconds. In some cases, an annealing phase can include a temperature of about 50° C. to about 72° C., and a time of about 30 seconds to about 90 seconds. In some cases, an extension phase can include a temperature of about 55° C. to about 80° C., and a time of about 15 seconds per kb of the amplicon to be generated to about 30 seconds per kb of the amplicon to be generated In some cases, an extension phase reflects the processivity of the polymerase that is used. In some cases, annealing and extension phases can be performed in a single cycle. For example, an annealing and phase extension phase can include a temperature of about 65° C. for about 75 seconds.

PCR conditions used to generate a library of single stranded Watson strand-derived sequences and a library of single stranded Crick-strand derived sequences (e.g., from a duplex sequencing library generated as described herein) can include any appropriate number of PCR amplification cycles. In some cases, PCR amplification can include, without limitation, from about 1 to about 50 cycles. For example, PCR amplification can include about 4 amplification cycles.

In some cases, when PCR conditions include a heat-activated polymerase, PCR amplification also can include an initialization step. For example, PCR amplification can include an initialization step prior to performing the PCR amplification cycles. In some cases, an initialization step can include a temperature of about 94° C. to about 98° C., and a time of about 15 seconds to about 1 minute. For example, an initialization step can include a temperature of about 98° C. for about 30 seconds.

In some cases, PCR amplification also can include a hold step. For example, PCR amplification can include a hold step after performing the PCR amplification cycles, an optionally after performing any final extension step. In some case, a hold step can include a temperature of about 4° C. to about 15° C., for an indefinite amount of time.

Any appropriate method can be used to separate double stranded amplification products into single stranded amplification products. In some cases, a double stranded amplification products can be denatured to separate double stranded amplification products into two single stranded amplification products. Examples of methods that can be used to separate a double stranded amplification product into single stranded amplification products include, without limitation, heat denaturation, chemical (e.g., NaOH) denaturation, and salt denaturation.

Following PCR amplification, the tagged PCR amplification products can be recovered. Any appropriate method can be used to recover tagged PCR amplification products generated using a tagged primer. In cases where a tagged primer is a biotinylated primer, the biotinylated amplification products (e.g., generated from the biotinylated primer) can be recovered using streptavidin (e.g., streptavidin-functionalized beads). For example, when an amplified duplex sequencing library is further amplified in a first PCR amplification using a primer pair that includes a first biotinylated primer and a second non-biotinylated primer, and a second PCR amplification using a primer pair that includes a first non-biotinylated primer and a second biotinylated primer, the biotinylated amplification products generated from the first PCR amplification can be bound to streptavidin-functionalized beads (e.g., a first set of streptavidin-functionalized beads) and the biotinylated amplification products generated from the second PCR amplification can be bound to streptavidin-functionalized beads (e.g., a first second of streptavidin-functionalized beads), and the double stranded amplification products can be separated (e.g., denatured) into single strands of the amplification products. In some cases, recovering biotinylated PCR amplification products also can include releasing the biotinylated PCR amplification products from the streptavidin (e.g., the streptavidin-functionalized beads). Separating the double stranded amplification products generated by a first PCR amplification using a primer pair that includes a first biotinylated primer and a second non-biotinylated primer, and a second PCR amplification using a primer pair that includes a first non-biotinylated primer and a second biotinylated primer, can allow single stranded amplification products generated from the biotinylated primers to remain bound to the streptavidin-functionalized beads while single stranded amplification products generated from the non-biotinylated primers can be denatured (e.g., denatured and degraded) from the streptavidin-functionalized beads, thereby generating a library of single stranded Watson strand-derived sequences and a library of single stranded Crick-strand derived sequences of the duplex sequencing library.

In cases where a tagged primer is a phosphorylated primer, the phosphorylated amplification products (e.g., generated from the phosphorylated primer) can be recovered using an exonuclease (e.g., a lambda exonuclease). For example, when an amplified duplex sequencing library is further amplified in a first PCR amplification using a primer pair that includes a first phosphorylated primer and a second non-phosphorylated primer, and a second PCR amplification using a primer pair that includes a first non-phosphorylated primer and a second phosphorylated primer, the double stranded amplification products can be separated into single strands of the amplification products. Separating the double stranded amplification products generated by a first PCR amplification using a primer pair that includes a first phosphorylated primer and a second non-phosphorylated primer, and a second PCR amplification using a primer pair that includes a first non-phosphorylated primer and a second phosphorylated primer, can allow single stranded amplification products generated from the non-phosphorylated primers to be recovered while single stranded amplification products generated from the phosphorylated primers can be degraded by a lambda exonuclease, thereby generating a library of single stranded Watson strand-derived sequences and a library of single stranded Crick-strand derived sequences of the duplex sequencing library.

Target Enrichment

In some embodiments of any one of the methods herein, amplicons produced by the initial amplification are enriched for one or more target polynucleotides. In some embodiments, prior to target enrichment, single-stranded DNA libraries are prepared from amplicons produced by the initial amplification. Exemplary methods for producing the single-stranded DNA libraries are described herein.

Figure 4:
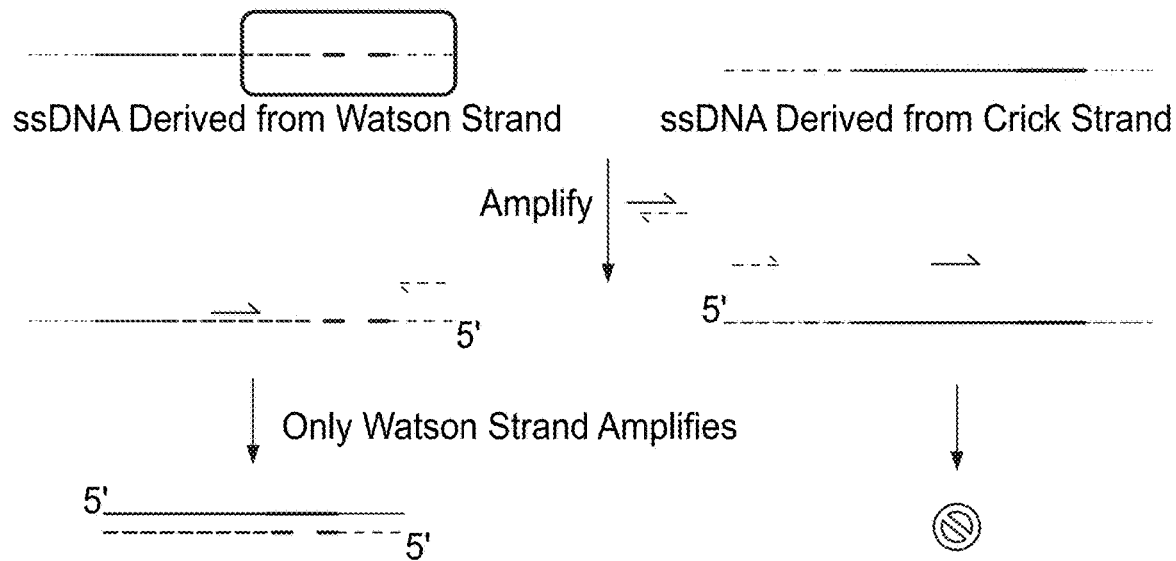
FIG. 4 contains a schematic of an exemplary Watson amplification.
Figure 5:
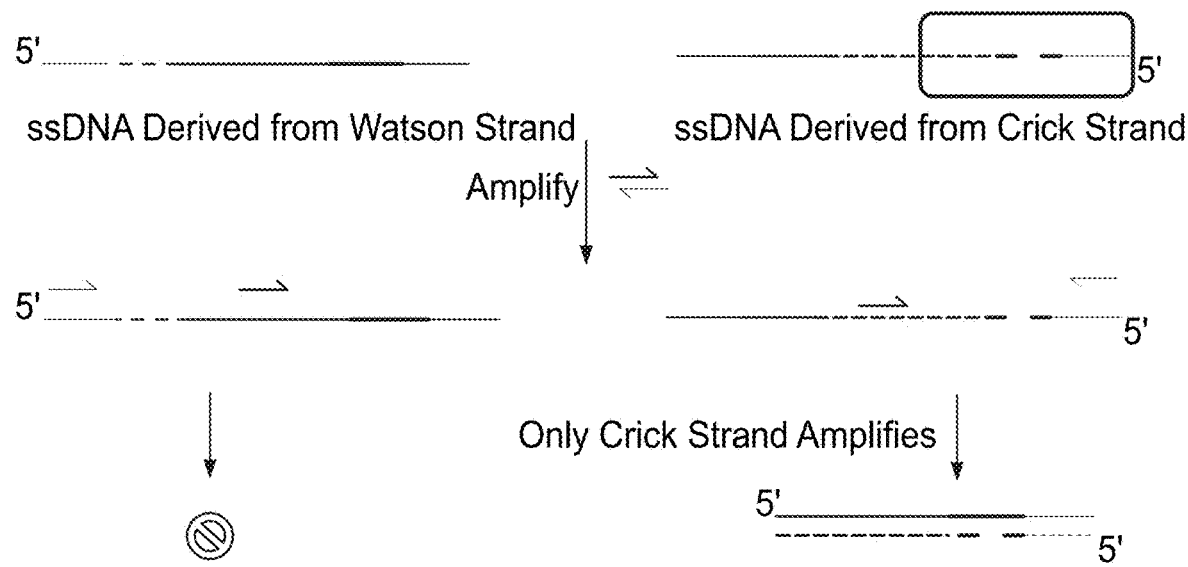
FIG. 5 contains a schematic of an exemplary Crick amplification.
Figure 6:
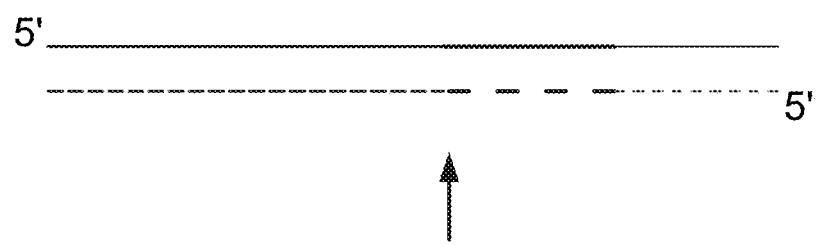
FIG. 6 contains a schematic of an exemplary amplified Watson strand and an exemplary amplified Crick strand.
Figure 6:
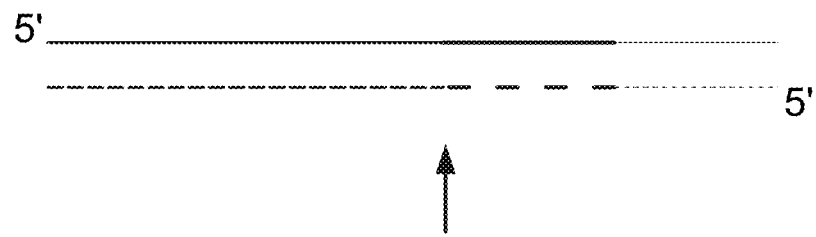
Figure 7:
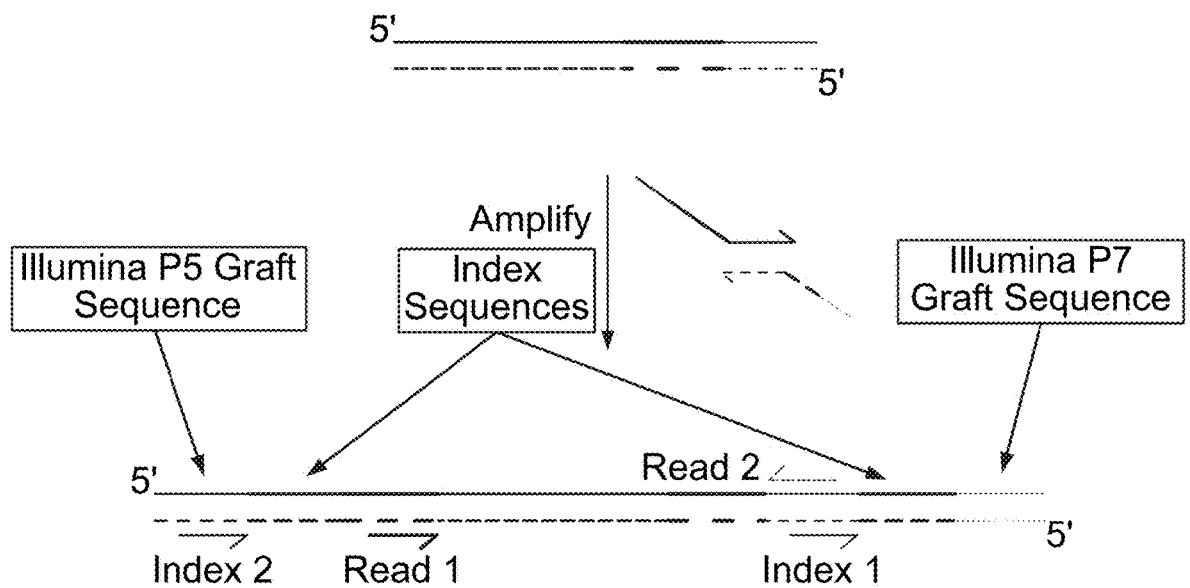
FIG. 7 contains a schematic of an exemplary nested Watson amplification.
Figure 8:
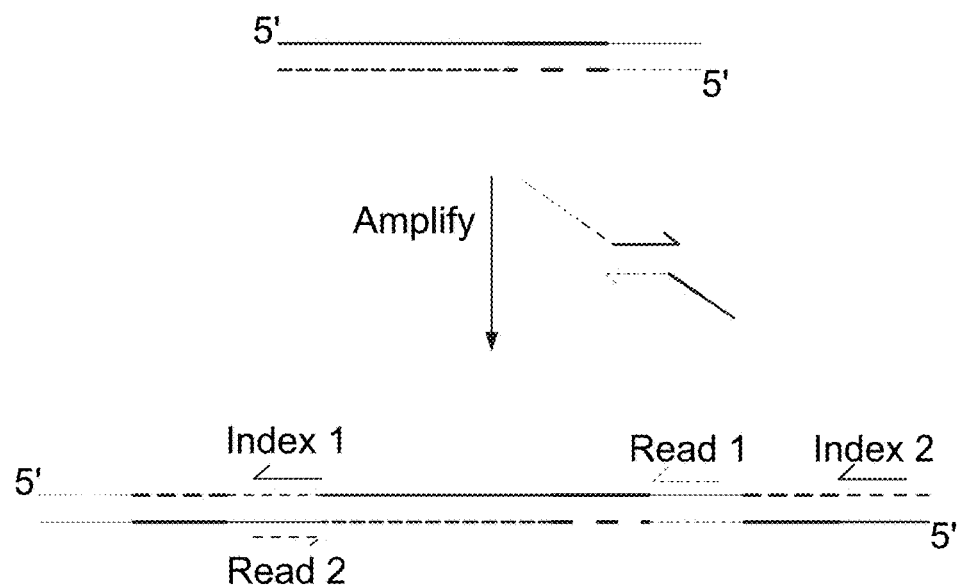
FIG. 8 contains a schematic of an exemplary nested Crick amplification.

Any appropriate method can be used to amplify a target region from a library of amplification products (e.g., a duplex sequencing library, a library of single stranded Watson strand-derived sequences, or a library of single stranded Crick-strand derived sequences generated as described herein). In some cases, a target region can be amplified from library of amplification products by subjecting the library of amplification products to a PCR amplification using a primer pair where a primer (e.g., a first primer) that can target (e.g., target and bind to) an adapter sequence (e.g., an adapter sequence containing a molecular barcode) present in an amplification product generated as described herein (e.g., by ligating a 3' duplex adapter including a first molecular barcode and a 5' adapter including a second molecular barcode to a nucleic acid fragment in a duplex sequencing library prior to the amplification) and a primer (e.g., a second primer) that can target (e.g., target and bind to) a target region (e.g., a region of interest). In some cases, a library of single stranded Watson strand-derived sequences and a library of single stranded Crick-strand derived sequences can be generated as shown in FIG. 4 and FIG. 5. In some cases, a library of single stranded Watson strand-derived sequences and a library of single stranded Crick-strand derived sequences can be generated as described in Example 2.

In some cases, a target region can be amplified from a library of amplification products (e.g., a duplex sequencing library, a library of single stranded Watson strand-derived sequences, or a library of single stranded Crick-strand derived sequences generated as described herein) in a single PCR amplification. For example, a target region can be amplified from a library of amplification products in a single PCR amplification using a primer pair including a first primer that can target an adapter sequence (e.g., an adapter sequence containing a molecular barcode) present in an amplification product generated as described herein (e.g., by ligating a 3' duplex adapter including a first molecular barcode and a 5' adapter including a second molecular barcode to a nucleic acid fragment in a duplex sequencing library prior to the amplification) and a second primer that can target a target region. For example, a target region can be amplified from a library of amplification products in a single PCR amplification as shown in FIG. 4, FIG. 5, FIG. 15, and FIG. 17.

In some cases, a target region can be amplified from a library of amplification products (e.g., a duplex sequencing library, a library of single stranded Watson strand-derived sequences, or a library of single stranded Crick-strand derived sequences generated as described herein) in multiple PCR amplifications. Multiple PCR amplifications (e.g., a first PCR amplification and a subsequent, nested PCR amplification) can be used to increase the specificity of amplifying a target region. For example, a target region can be amplified from a library of amplification products in a series of PCR amplifications where a first PCR amplification uses a primer pair including a first primer that can target an adapter sequence (e.g., an adapter sequence containing a molecular barcode) present in an amplification product generated as described herein (e.g., by ligating a 3' duplex adapter including a first molecular barcode and a 5' adapter including a second molecular barcode to a nucleic acid fragment in a duplex sequencing library prior to the amplification) and a second primer that can target a target region, and subjecting the amplification products generated in the first PCR amplification to a subsequent, nested PCR amplification that uses a primer pair including a first primer that can target an adapter sequence (e.g., an adapter sequence containing a molecular barcode) present in an amplification product generated as described herein (e.g., by ligating a 3' duplex adapter including a first molecular barcode and a 5' adapter including a second molecular barcode to a nucleic acid fragment in a duplex sequencing library prior to the amplification) and a second primer that can target a nucleic acid sequence from the target region that is present in the amplification products generated in the first PCR amplification. For example, a target region can be amplified from a library of amplification products in a series of PCR amplifications as shown in FIG. 7, FIG. 8, FIG. 16, and FIG. 18.

Any appropriate primer pair can be used to amplify a target region from a library of amplification products (e.g., a duplex sequencing library, a library of single stranded Watson strand-derived sequences, or a library of single stranded Crick-strand derived sequences generated as described herein). A primer can include, without limitation, from about 12 nucleotides to about 30 nucleotides. In some cases, a primer pair can include a primer (e.g., a first primer) that can target (e.g., target and bind to) an adapter sequence (e.g., an adapter sequence containing a molecular barcode) present in an amplification product generated as described herein (e.g., by ligating a 3' duplex adapter including a first molecular barcode and a 5' adapter including a second molecular barcode to a nucleic acid fragment in a duplex sequencing library prior to the amplification) and a primer (e.g., a second primer) that can target (e.g., target and bind to) a target region (e.g., a region of interest). Examples of primers that can target an adapter sequence containing a molecular barcode present in an amplification product generated as described herein (e.g., by ligating a 3' duplex adapter including a first molecular barcode and a 5' adapter including a second molecular barcode to a nucleic acid fragment in a duplex sequencing library prior to the amplification) include, without limitation, an i5 index primer and an i7 index primer. Primers that can target a target region can include a sequence that is complementary to the target region. In cases where a target region is a nucleic acid encoding TP53, examples of primers that can target nucleic acid encoding TP53 include, without limitation, TP53_342_GSP1 and TP53_GSP2. In some cases, when a target region is a nucleic acid encoding TP53, a primer targeting the nucleic acid encoding TP53 can be as described in Example 2.

In some cases, one or both primers of a primer pair used to amplify a target region from a library of amplification products (e.g., a duplex sequencing library, a library of single stranded Watson strand-derived sequences, or a library of single stranded Crick-strand derived sequences generated as described herein) can include one or more molecular barcodes.

In some cases, one or both primers of a primer pair used to amplify a target region from a library of amplification products (e.g., a duplex sequencing library, a library of single stranded Watson strand-derived sequences, or a library of single stranded Crick-strand derived sequences generated as described herein) can include one or more graft sequences (e.g. graft sequences for next generation sequencing).

In an aspect, the target enrichment comprises (a) selectively amplifying amplicons of Watson strands comprising the target polynucleotide sequence with a first set of Watson target-selective primer pairs, the first set of Watson target-selective primer pairs comprising: (i) a first Watson target-selective primer comprising a sequence complementary to the R2 sequencing primer site of the universal 3' adapter sequence, and (ii) a second Watson target-selective primer comprising a target-selective sequence, thereby creating target Watson amplification products; and (b) selectively amplifying amplicons of Crick strands comprising the same target polynucleotide sequence with a first set of Crick target-selective primer pairs, the first set of Crick target-selective primer pairs comprising: (i) a first Crick target-selective primer comprising a sequence complementary to the R1 sequencing primer site of the universal 5' adapter sequence, and (ii) a second Crick target-selective primer comprising the same target-selective sequence as the second Watson target-selective primer sequence, thereby creating target Crick amplification products.

In some embodiments, the method further comprises purifying the target Watson amplification products and the target Crick amplification products from non-target polynucleotides. In some embodiments, the purifying comprises attaching the target Watson amplification products and the target Crick amplification products to a solid support. In some embodiments, the first Watson target-selective primer and first Crick target-selective primer comprises a first member of an affinity binding pair, and wherein the solid support comprises a second member of the affinity binding pair. In some embodiments, the first member is biotin and the second member is streptavidin. In some embodiments, the solid support comprises a bead, well, membrane, tube, column, plate, sepharose, magnetic bead, or chip. In some embodiments, the method comprises removing polynucleotides that are not attached to the solid support.

In some embodiments, the method further comprises (a) further amplifying the target Watson amplification products with a second set of Watson target-selective primers, the second set of Watson target-selective primers comprising (i) a third Watson target-selective primer comprising a sequence complementary to the R2 sequencing primer site of the universal 3' adapter sequence, and (ii) a fourth Watson target-selective primer comprising, in the 5' to 3' direction, an R1 sequencing primer site and a target-selective sequence selective for the same target polynucleotide, thereby creating target Watson library members; (b) further amplifying the target Crick amplification products with a second set of Crick target-selective primers, the second set of Crick target-selective primers comprising (i) a third Crick target-selective primer comprising a sequence complementary to the R1 sequencing primer site of the universal 3' adapter sequence, and (ii) a fourth Crick target-selective primer comprising, in the 5' to 3' direction, an R2 sequencing primer site and the target-selective sequence selective for the same target polynucleotide of the fourth Watson target-selective primer, thereby creating target Crick library members.

In some embodiments, the third Watson and Crick target-selective primers further comprise a sample barcode sequence. In some embodiments, the third Watson target-selective primer further comprises a first grafting sequence that enables hybridization to a first grafting primer on a sequencer and wherein the third Crick target-selective primer further comprises a second grafting sequence that enables hybridization to a second grafting primer on the sequencer. In some embodiments, the fourth Watson target-selective primer further comprises the second grafting sequence and wherein the fourth Crick target-selective primer further comprises the first grafting sequence. In some embodiments, the first grafting sequence is a P7 sequence and wherein the second grafting sequence is a P5 sequence.

Any appropriate PCR conditions can be used to generate an amplified target region as described herein (e.g., from a library of amplification products such as a duplex sequencing library, a library of single stranded Watson strand-derived sequences, or a library of single stranded Crick-strand derived sequences generated). Exemplary PCR conditions are described herein. PCR conditions used to generate an amplified target region as described herein (e.g., from a library of amplification products such as a duplex sequencing library, a library of single stranded Watson strand-derived sequences, or a library of single stranded Crick-strand derived sequences generated) can include any appropriate number of PCR amplification cycles. In some cases, PCR amplification can include, without limitation, from about 1 to about 50 cycles. For example, when PCR amplification of an amplified target region includes a single PCR amplification, the PCR amplification can include about 18 amplification cycles. For example, when PCR amplification of an amplified target region includes a first PCR amplification and a subsequent, nested PCR amplification, the first PCR amplification can include about 18 amplification cycles, and the subsequent, nested PCR amplification can include about 10 amplification cycles.

Exemplary Targets

Any appropriate target region (e.g., a region of interest) can be amplified from a library of amplification products (e.g., a duplex sequencing library, a library of single stranded Watson strand-derived sequences, or a library of single stranded Crick-strand derived sequences generated as described herein) and assessed for the presence or absence of one or more mutations. In some cases, a target region can be a region of nucleic acid in which one or more mutations are associated with a disease or disorder. Examples of target regions that can be amplified and assessed for the presence or absence of one or more mutations include, without limitation, nucleic acid encoding tumor protein p53 (TP53), nucleic acid encoding breast cancer 1 (BRCA1), nucleic acid encoding BRCA2, nucleic acid encoding a phosphatase and tensin homolog (PTEN) polypeptide, nucleic acid encoding a AKT1 polypeptide, nucleic acid encoding a APC polypeptide, nucleic acid encoding a CDKN2A polypeptide, nucleic acid encoding a EGFR polypeptide, nucleic acid encoding a FBXW7 polypeptide, nucleic acid encoding a GNAS polypeptide, nucleic acid encoding a KRAS polypeptide, nucleic acid encoding a NRAS polypeptide, nucleic acid encoding a PIK3CA polypeptide, nucleic acid encoding a BRAF polypeptide, nucleic acid encoding a CTNNB1 polypeptide, nucleic acid encoding a FGFR2 polypeptide, nucleic acid encoding a HRAS polypeptide, and nucleic acid encoding a PPP2R1A polypeptide, In some cases, a target region that can be amplified and assessed for the presence or absence of one or more mutations can be nucleic acid encoding TP53. For example, nucleic acid encoding TP53 can be amplified and assessed as described in Example 2.

Any appropriate method can be used to assess a target region (e.g., an amplified target region) for the presence or absence of one or more mutations. In some cases, one or more sequencing methods can be used to assess an amplified target region for the presence or absence of one or more mutations.

Sequence Determination

In some cases, one or more sequencing methods can be used to assess an amplified target region determine whether the mutation(s) are present on both the Watson strand and the Crick strand. In some cases, sequencing reads can be used to assess an amplified target region for the presence or absence of one or more mutations and can be used to determine whether the mutation(s) are present on both the Watson strand and the Crick strand. Examples of sequencing methods that can be used to assess an amplified target region for the presence or absence of one or more mutations as describe herein include, without limitation, single read sequencing, paired-end sequencing, NGS, and deep sequencing. In some embodiments, the single read sequencing comprises sequencing across the entire length of the templates to generate the sequence reads. In some embodiments, the sequencing comprises paired end sequencing. In some embodiments, the sequencing is performed with a massively parallel sequencer. In some embodiments, the massively parallel sequencer is configured to determine sequence reads from both ends of template polynucleotides.

Analysis of Sequence Reads

In some embodiments, the sequence reads are mapped to a reference genome.

In some embodiments, the sequence reads are assigned into UID families. A UID family can comprise sequence reads from amplicons originating from an original template, e.g., original double-stranded DNA fragment from a nucleic acid sample.

In some embodiments, each member of a UID family comprises the same exogenous UID sequence. In some embodiments, each member of a UID family further comprises the same endogenous UID sequence. Endogenous UIDs are described herein.

In some embodiments, each member of a UID family further comprises the same exogenous UID sequence and the same endogenous UID sequence. In some embodiments, the combination of the exogenous UID sequence and endogenous UID sequence are unique to the UID family. In some embodiments, the combination of the exogenous UID sequence and endogenous UID sequence does not exist in another UID family represented in the nucleic acid sample.

The number of members of a UID family can depend on the depth of sequencing. In some embodiments, a UID family comprises at least 1, 2, 3, 4, 5, 6, 7, 8, 9, 10, 15, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, or 1000 members. In some embodiments, a UID family comprises about 2-1000 members, about 2-500 members, about 2-100 members, about 2-50 members, or about 2-20 members.

In some embodiments, the sequence reads of an individual UID family are assigned to a Watson subfamily and a Crick subfamily. In some embodiments, the sequence reads of an individual UID family are assigned to the Watson and Crick subfamilies based on the orientation of the insert relative to the adapter sequences. In some embodiments, the orientation of the insert relative to the adapter sequences is resolved by how the sequence reads were aligned as "read pairs" or "mate pairs".

In some embodiments, the assignment of the sequence reads into the Watson and Crick subfamilies are based on spatial relationship of the exogenous UID sequence to the R1 and R2 read sequence. In some embodiments, members of the Watson subfamily are characterized by the exogenous UID sequence being downstream of the R2 sequence and upstream of the R1 sequence. In some embodiments, members of the Crick subfamily are characterized by the exogenous UID sequence being downstream of the R1 sequence and upstream of the R2 sequence. In some embodiments, members of the Watson subfamily are characterized by the exogenous UID sequence being in greater proximity to the R2 sequence and lesser proximity to the R1 sequence. In some embodiments, members of the Crick subfamily are characterized by the exogenous UID sequence being in greater proximity to the R1 sequence and in lesser proximity to the R2 sequence. In some embodiments, members of the Watson subfamily are characterized by the exogenous UID sequence being immediately downstream or within 1-70, 1-60, 1-50, 1-40, 1-30, 1-20, 1-10, or 1-5 nucleotides of the R2 sequence. In some embodiments, members of the Crick subfamily are characterized by the exogenous UID sequence being immediately downstream or within 1-70, 1-60, 1-50, 1-40, 1-30, 1-20, 1-10, or 1-5 nucleotides of the R1 sequence.

In some embodiments, a UID subfamily (e.g., Watson subfamily and/or Crick subfamily) comprises at least 1, 2, 3, 4, 5, 6, 7, 8, 9, 10, 15, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, or 500 members. In some embodiments, a UID subfamily (e.g., Watson subfamily and/or Crick subfamily) comprises about 2-500 members, about 2-100 members, about 2-50 members, about 2-20 members, or about 2-10 members.

In some embodiments, a nucleotide sequence is determined to accurately represent a Watson strand of an analyte DNA fragment, e.g., a double stranded DNA fragment from the nucleic acid sample, when a threshold percentage (or a percentage exceeding a threshold) of members of the Watson subfamily contain the sequence. In some embodiments, a nucleotide sequence is determined to accurately represent a Crick strand of an analyte DNA fragment, e.g., a double stranded DNA fragment from the nucleic acid sample, when a threshold percentage (or a percentage exceeding a threshold) of members of the Crick subfamily contain the sequence.

Thresholds can be determined by a skilled artisan based on, e.g., number of the members of the subfamily, the particular purpose of the sequencing experiment, and the particular parameters of the sequencing experiment. In some embodiments, the threshold is set at 1%, 5%, 10%, 20%, 30%, 40%, 50%, 60%, 70%, 75%, 80%, 85%, 90%, 95%, 96%, 97%, 98%, 99%, or 100%. In particular embodiments, the threshold is set at 50%. By way of example only, in an embodiment wherein the threshold is set at 50%, a nucleotide sequence is determined to accurately represent a Watson or Crick strand of an analyte DNA fragment, e.g., a double stranded DNA fragment from the nucleic acid sample, when at least 50% of the subfamily members contain the sequence. By way of other example only, in an embodiment wherein the threshold is set at 50%, a nucleotide sequence is determined to accurately represent a Watson or Crick strand of an analyte DNA fragment, e.g., a double stranded DNA fragment from the nucleic acid sample, when more than 50% of the subfamily members contain the sequence.

In some embodiments, the sequence accurately representing the Watson strand of the analyte DNA fragment is determined to have a mutation. In some embodiments, the sequence accurately representing the Watson strand of the analyte DNA fragment is determined to have a mutation when the sequence differs from a reference sequence that lacks the mutation.

In some embodiments, the sequence accurately representing the Crick strand of the analyte DNA fragment is determined to have a mutation. In some embodiments, the sequence accurately representing the Crick strand of the analyte DNA fragment is determined to have a mutation when the sequence differs from a reference sequence that lacks the mutation.

In some embodiments, the analyte DNA fragment is determined to have the mutation when sequence accurately representing the Watson strand the sequence accurately representing the Crick strand comprise the same mutation.

In some cases, the location of the molecular barcode within the paired-end sequencing reads of the amplified target region can be used to distinguish which strand of the double stranded nucleic acid template the amplified target region was derived from. For example, when a first a paired-end sequencing read of an amplified target region indicates that a molecular barcode is read last, the amplified target region can be identified as being derived from the sense strand of the nucleic acid template, and when a first a paired-end sequencing read of an amplified target region indicates that a molecular barcode is read first, the amplified target region can be identified as being derived from the anti-sense strand of the nucleic acid template. For example, when a second a paired-end sequencing read of an amplified target region indicates that a molecular barcode is read first, the amplified target region can be identified as being derived from the anti-sense strand of the nucleic acid template, and when a second a paired-end sequencing read of an amplified target region indicates that a molecular barcode is read last, the amplified target region can be identified as being derived from the sense strand of the nucleic acid template. In some cases, paired-end sequencing can be used to distinguish amplification products derived from the Watson strand from amplification products derived from the Crick strand as shown in FIG. 20 and FIG. 21.

Following sequencing of target regions (e.g., target regions amplified as described herein), sequencing reads can be aligned to a reference genome and grouped by the molecular barcode present in each sequencing read. In some cases, sequencing reads that include the same molecular barcode and map to both the Watson strand and the Crick strand of the double stranded nucleic acid template (e.g., both the Watson strand and the Crick strand of the target region) can be identified as having duplex support. For example, when sequencing reads indicate the presence of one or more mutations in a target region include the same molecular barcode and map to both the Watson strand and the Crick strand of the target region, the mutation(s) can be identified as having duplex support.

Kits

Also provided herein are kits. The kits may comprise sets of primer pairs for amplification of one or more target polynucleotides.

In some embodiments, the kit comprises (a) a first set of Watson target-selective primer pairs, comprising (i) one or more first Watson target-selective primers comprising a sequence complementary to the R2 sequencing primer site of the universal 3' adapter sequence, and (ii) one or more second Watson target-selective primers, each of the one or more second Watson target-selective primers comprising a target-selective sequence; (b) a first set of Crick target-selective primer pairs, comprising (i) one or more Crick target-selective primers comprising a sequence complementary to the R1 sequencing primer site of the universal 5' adapter sequence, and (ii) one or more second Crick target-selective primers, each of the one or more second Crick target-selective primers comprising the same target-selective sequence as the second Watson target-selective primer sequence; (c) a second set of Watson target-selective primer pairs, comprising (i) one or more third Watson target-selective primers comprising a sequence complementary to the R2 sequencing primer site of the universal 3' adapter sequence, and (ii) one or more fourth Watson target-selective primers, each of the one or more fourth Watson target-selective primers comprising, in the 5' to 3' direction, an R1 sequencing primer site and a target-selective sequence selective for the same target polynucleotide; and (d) a second set of Crick target-selective primers comprising (i) one or more third Crick target-selective primers comprising a sequence complementary to the R1 sequencing primer site of the universal 3' adapter sequence, and (ii) one or more fourth Crick target-selective primers, each of the one or more fourth Crick target-selective primers comprising, in the 5' to 3' direction, an R2 sequencing primer site and a target-selective sequence selective for the same target polynucleotide.

The kit may comprise sets of primer pairs for multiplex amplification of a plurality of target polynucleotides.

Computer Readable Medium

Also provided herein is a computer readable medium comprising computer executable instructions configured to implement any of the methods described herein. The computer readable medium can comprise computer executable instructions for analyzing sequence data from a nucleic acid sample, wherein the data is generated by a method of any one of the preceding claims.

The computer readable medium can implement a method for semi-automated or automated sequence data analysis.

In some embodiments, the computer readable medium comprises executable instructions for (a) assigning sequence reads into UID families, wherein each member of a UID family comprises the same exogenous UID sequence; (b) assigning sequence reads of each UID family into Watson and Crick subfamilies; (c) identifying a nucleotide sequence as accurately representing a Watson strand of an analyte DNA fragment when a threshold percentage of members of the Watson subfamily contain the sequence; (d) identifying a nucleotide sequence as accurately representing a Crick strand of an analyte DNA fragment when a threshold percentage of members of the Crick subfamily contain the sequence; (e) identifying a mutation in the nucleotide sequence accurately representing the Watson Strand when the sequence accurately representing the Watson Strand differs from a reference sequence that lacks the mutation; (f) identifying a mutation in the nucleotide sequence accurately representing the Crick Strand when the sequence accurately representing the Crick Strand differs from a reference sequence that lacks the mutation; and (g) identifying a mutation in the analyte DNA fragment when the mutation in the nucleotide sequence accurately representing the Watson strand and the mutation in the nucleotide sequence accurately representing the Crick strand are the same mutation.

In some embodiments, the computer readable medium comprises executable code for assigning UID family members to the Watson subfamily or Crick subfamily based on spatial relationship of the exogenous UID sequence to the R1 and R2 read sequence. In some embodiments, the computer executable code assigns UID family members to the Watson subfamily when the exogenous UID sequence is downstream of the R2 sequence and upstream of the R1 sequence. In some embodiments, the computer executable code assigns UID family members to the Crick subfamily when the exogenous UID sequence is downstream of the R1 sequence and upstream of the R2 sequence. In some embodiments, the computer executable code assigns UID family members to the Watson subfamily when the exogenous UID sequence is in greater proximity to the R2 sequence and lesser proximity to the R1 sequence. In some embodiments, the computer executable code assigns UID family members to the Crick subfamily when the exogenous UID sequence is in greater proximity to the R1 sequence and in lesser proximity to the R2 sequence. In some embodiments, the computer executable code assigns UID family members to the Watson subfamily when the exogenous UID sequence is immediately downstream or within 1-70, 1-60, 1-50, 1-40, 1-30, 1-20, 1-10, or 1-5 nucleotides of the R2 sequence. In some embodiments, the computer executable code assigns UID family members to the Crick subfamily when the exogenous UID sequence is immediately downstream or within 1-70, 1-60, 1-50, 1-40, 1-30, 1-20, 1-10, or 1-5 nucleotides of the R1 sequence.

In some embodiments, the computer readable medium comprises executable code for mapping the sequence reads to a reference genome. In some embodiments, the reference genome is a human reference genome.

In some embodiments, the computer readable medium comprises executable code for generating a report of disease status, prognosis, or theranosis based on the presence, absence, or amount of a mutation in the sample. In some embodiments, the disease is cancer.

In some embodiments, the computer readable medium comprises executable code for generating a report of therapeutic options based on the presence, absence, or amount of a mutation in the sample.

In some embodiments, the computer readable medium comprises executable code for transmission of the data over a network.

Computer System

Also provided herein are computer systems. In some embodiments, the computer system comprises a memory unit configured to receive and store sequence data from a nucleic acid sample, the data generated by a method described herein; and a processor communicatively coupled to the storage memory, wherein the processor comprises a computer readable medium disclosed herein.

FIG. 32 depicts an exemplary computer system 900 adapted to enable a user to analyze a nucleic acid sample according to any of the methods described herein. The system 900 includes a central computer server 901 that is programmed to implement exemplary methods described herein. The server 901 includes a central processing unit (CPU, also "processor") 905 which can be a single core processor, a multi core processor, or plurality of processors for parallel processing. The server 901 also includes memory 910 (e.g. random access memory, read-only memory, flash memory); electronic storage unit 915 (e.g. hard disk); communications interface 920 (e.g. network adapter) for communicating with one or more other systems, e.g., a sequencing system; and peripheral devices 925 which may include cache, other memory, data storage, and/or electronic display adapters. The memory 910, storage unit 915, interface 920, and peripheral devices 925 are in communication with the processor 905 through a communications bus (solid lines), such as a motherboard. The storage unit 915 can be a data storage unit for storing data. The server 901 is operatively coupled to a computer network ("network") 930 with the aid of the communications interface 920. The network 930 can be the Internet, an intranet and/or an extranet, an intranet and/or extranet that is in communication with the Internet, a telecommunication or data network. The network 930 in some cases, with the aid of the server 901, can implement a peer-to-peer network, which may enable devices coupled to the server 901 to behave as a client or a server.

The storage unit 915 can store files, such as sequence data, barcode sequence data, or any aspect of data associated with the invention. The data storage unit 915 may be coupled with data relating to locations of cells in a virtual grid.

The server can communicate with one or more remote computer systems through the network 930. The one or more remote computer systems may be, for example, personal computers, laptops, tablets, telephones, Smart phones, or personal digital assistants.

In some situations the system 900 includes a single server 901. In other situations, the system includes multiple servers in communication with one another through an intranet, extranet and/or the Internet.

The server 901 can be adapted to store sequence data, data regarding the nucleic acid sample, data regarding the biological sample, data regarding the subject, and/or other information of potential relevance. Such information can be stored on the storage unit 915 or the server 901 and such data can be transmitted through a network.

Methods as described herein can be implemented by way of machine (e.g., computer processor) computer readable medium (or software) stored on an electronic storage location of the server 901, such as, for example, on the memory 910, or electronic storage unit 915. During use, the code can be executed by the processor 905.

In some cases, the code can be retrieved from the storage unit 915 and stored on the memory 910 for ready access by the processor 905. In some situations, the electronic storage unit 915 can be precluded, and machine-executable instructions are stored on memory 910. Alternatively, the code can be executed on a second computer system 940.

Aspects of the systems and methods provided herein, such as the server 901, can be embodied in programming. Various aspects of the technology may be thought of as "products" or "articles of manufacture" typically in the form of machine (or processor) executable code and/or associated data that is carried on or embodied in a type of machine readable medium (e.g., computer readable medium). Machine-executable code can be stored on an electronic storage unit, such memory (e.g., read-only memory, random access memory, and flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical, and electromagnetic waves, such as used across physical interfaces between local devices, through wired and optical landline networks and over various air-links. The physical elements that carry such waves, such as wired or wireless likes, optical links, or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, tangible storage medium, a carrier wave medium, or physical transmission medium. Non-volatile storage media can include, for example, optical or magnetic disks, such as any of the storage devices in any computer(s) or the like, such may be used to implement the system. Tangible transmission media can include: coaxial cables, copper wires, and fiber optics (including the wires that comprise a bus within a computer system). Carrier-wave transmission media may take the form of electric or electromagnetic signals, or acoustic or light waves such as those generated during radio frequency (RF) and infrared (IR) data communications. Common forms of computer-readable media therefore include, for example: a floppy disk, a flexible disk, hard disk, magnetic tape, any other magnetic medium, a CD-ROM, DVD, DVD-ROM, any other optical medium, punch cards, paper tame, any other physical storage medium with patterns of holes, a RAM, a ROM, a PROM and EPROM, a FLASH-EPROM, any other memory chip or cartridge, a carrier wave transporting data or instructions, cables, or links transporting such carrier wave, or any other medium from which a computer may read programming code and/or data. Many of these forms of computer readable media may be involved in carrying one or more sequences of one or more instructions to a processor for execution.

The results of the analysis can be presented to a user with the aid of a user interface, such as a graphical user interface.

The invention will be further described in the following examples, which do not limit the scope of the invention described in the claims.

EXAMPLES

Example 1: Duplex Anchored PCR

Materials and Methods

Duplex Anchored PCR Library Preparation

This protocol can prepare duplex libraries using a Swift Accel-NGS 2S PCR-Free Library Kit (Cat. #20024 and 20096) and specific truncated adapters and primers. In some cases, full-length P5 and P7 graft sequences can be added to the library by a separate PCR for sequencing on an Illumina instrument.

This protocol is for PCR tubes but can be scaled to PCR plates.

Materials:
1. Swift Accel-NGS 2S PCR-Free Library Kit (Cat. #20024 and 20096)
2. 3' Swift N14 Adapter 1 v3A
   a.

(SEQ ID NO: 1)
   /5Phos/ATAAAACGACGGCNNNNNNNNNNNNNNNAGATCGGAAG

AGCACACGTCTGAACTCCAG*T*C/3SpC3/ b. Order PAGE purified from IDT, 1 µmole synthesis scale, lyophilized
   c. /3SpC3/ can be substituted with /3Phos/, phosphorothioate linkages are not required, and oligo may be HPLC purified
3. 3' Swift Adapter 2 v3'dT a.
   (SEQ ID NO: 3)
   GCCGUCGUUUUA/33dT/ b. /33dT/is IDT off-catalog modification for 3'-deoxyT
   c. Order PAGE purified from IDT, 1 µmole synthesis scale, lyophilized
4. 5' Swift Adapter a.
   (SEQ ID NO: 4)
   /5SpC3/A*C*ACTCTTTCCCTACACGACGCTCTTCCGATCT b. Order PAGE purified from IDT, 1 µmole synthesis scale, lyophilized
   c. /5SpC3/ and phosphorothioate linkages are not required, and oligo should be HPLC purified
   d. Can substitute with truB2 reagent from 2S Dual Indexing Kit (Cat. No. 28096)
5. NEB Ultra II Q5 Master Mix (Cat. No. M0544L)
6. Truncated P5 Primer a.
   (SEQ ID NO: 4)
   ACACTCTTTCCCTACACGACGCTCTTCCGATCT b. No modifications required, desalted from IDT, 100 µM in IDTE 7. Truncated P7 Primer a.
   (SEQ ID NO: 5)
   GACTGGAGTTCAGACGTGTGCTCTTCCGATCT b. No modifications required, desalted from IDT, 100 µM in IDTE
8. SPRIselect beads (Beckman Coulter, Cat. No. B23317/B23318/B23319)
9. 80% EtOH (~2 mL per sample)
10. PCR tube strips (e.g., GeneMate VWR Cat. No. 490003-710)
11. Magnetic rack (e.g., Permagen MSRLV08)
12. USER Enzyme (NEB Cat. No. M5505L)—which is a mixture of uracil-DNA glycosylase and DNA glycosylase-lyase Endonuclease VIII.

Prepare Custom Adapters (can be Done Once for a Large Batch):

1. If not using Swift's truB2 reagent, resuspend 5' Swift Adapter to 42 µM in Low EDTA TE (included with Swift 2S kit)
2. Resuspend 3' Swift N14 Adapter 1 v3A to 100 µM in Low EDTA TE (included with Swift 2S kit). Store at −20° C. for subsequent uses.
3. Resuspend 3' Swift Adapter 2 v3'dT to 100 µM in Low EDTA TE (included with Swift 2S kit). Store at −20° C. for subsequent uses.
4. Anneal 3' Swift N14 Adapter 1 v3A to 3' Swift Adapter 2 v3'dT by mixing 100 µl of each oligo at room temperature. Label tube as 3' Swift N14 v3'dT Duplex Adapter, 50 µM. Final concentration of the 3' duplex adapter will be 50 µM. Incubate for at least 5 minutes at room temperature before use. Store at −20 C for subsequent uses.

Technical Notes:

Enzyme tubes can be removed from −20° C. storage and placed on ice, for about 10 minutes to allow enzymes to reach 4° C. prior to pipetting. Pipetting enzymes at −20° C. may result in a shortage of enzyme reagents.

After thawing reagents to 4° C., reagents (except the enzymes) can be briefly vortexed to mix them well. Spin all tubes in a microfuge to collect contents prior to opening.

Assemble all reagent master mixes on ice and scale volumes as appropriate, using 5% excess volume to compensate for pipetting loss.

Reagents should be added to the master mix in the specified order as stated throughout the protocol.

Reagents can be prepared in advance (e.g., to ensure that the magnetic beads do not dry out during size selection steps).

Step 1: Template Repair

1. Transfer 11 ng of cfDNA sample to a 0.2 mL PCR tube and adjust the volume of the sample to a final volume of 37 µl using Low EDTA TE, if necessary.
2. Add 3 µl USER Enzyme to each sample.
3. Mix by vortexing, and gently spin down to collect all liquid to the bottom of the tube.
4. Place the samples in the thermocycler, programmed at 37° C. for 15 minutes with lid heating off.

Step 2: End Repair 1

1. Gently spin down samples to collect any condensation.
2. Add 20 µl of pre-mixed Repair I Master Mix (see Table 1) to each sample containing the 40 µl DNA sample.

TABLE 1

| End Repair I Master Mix | |
|---|---|
| Reagent | Volume per Sample |
| Low EDTA TE | 13 µl |
| Buffer W1 | 6 µl |
| Enzyme W2 | 1 µl |
| Total Volume | 20 µl |

3. Mix by vortexing, gently spin down, place in the thermocycler, and run the Repair I Thermocycler Program in the order described below.
   a. 37° C., 5 minutes, lid heating on (lid set at 75° C.)
   b. 65° C., 2 minutes, lid heating on (lid set at 75° C.)
   c. 37° C., 5 minutes, lid heating on (lid set at 75° C.)
4. After thermocycler program completes, gently spin down tubes to collect condensation.
5. Clean up the Repair I reaction by adding 120 µl (2.0×) of SPRIselect beads. Mix by vortexing. Gently spin down to collect beads and incubate at room temperature for 5 minutes.
6. Collect beads by placing sample on magnetic rack for 5 minutes.
7. Remove and discard the supernatant without disturbing the pellet.
8. Add 180 µl of freshly prepared 80% ethanol solution to the sample while it is still on the magnetic rack. Use care not to disturb the pellet. Incubate for 30 seconds and then carefully remove the ethanol solution with P20 pipette.
9. Repeat above step for second wash with the 80% ethanol solution.
10. Remove any residual ethanol solution with P20 pipette, let beads dry for ~30 seconds. Take care to not over dry beads, and immediately proceed to step 1 of End Repair 2.

Step 3: End Repair 2

1. Add 50 µl of pre-mixed Repair II Master Mix (see Table 2) to the beads for each sample and mix by vortexing until homogeneous.

TABLE 2

| End Repair II Master Mix | |
|---|---|
| Reagent | Volume per Sample |
| Low EDTA TE | 30 µl |
| Buffer G1 | 5 µl |
| Reagent G2 | 13 µl |
| Enzyme G3 | 1 µl |
| Enzyme G4 | 1 µl |
| Total Volume | 50 µl |

2. Place the samples in the thermocycler, programmed at 20° C. for 20 minutes with lid heating off.
3. After thermocycler program completes, gently spin down tubes to collect condensation.
4. Clean up the Repair 2 reaction by adding 90 µl (1.8×) of PEG/NaCl Solution. Mix by vortexing. Gently spin down to collect beads and incubate at room temperature for 5 minutes.
5. Collect beads by placing sample on magnetic rack for 5 minutes.
6. Remove and discard the supernatant without disturbing the pellet.

7. Add 180 μl of freshly prepared 80% ethanol solution to the sample while it is still on the magnetic rack. Use care not to disturb the pellet. Incubate for 30 seconds and then carefully remove the ethanol solution with P20 pipette.
8. Repeat above step for second wash with the 80% ethanol solution.
9. Remove any residual ethanol solution with P20 pipette, let beads dry for ~30 seconds. Take care to not overdry beads, and immediately proceed to step 1 of Ligation 1.

Step 4: Ligation 1
1. Add 30 μl of pre-mixed Ligation I Master Mix (see Table 3) to the beads for each sample and mix by vortexing until homogeneous.

TABLE 3

Ligation I Master Mix

| Reagent | Volume per Sample |
|---|---|
| Low EDTA TE | 20 μl |
| 3' Swift N14 v3'dT Duplex Adapter, 50 uM | 5 μl |
| Buffer Y1 | 3 μl |
| Enzyme Y3 | 2 μl |
| Total Volume | 30 μl |

2. Place the samples in the thermocycler, programmed at 25° C. for 15 minutes with lid heating off.
3. After thermocycler program completes, gently spin down tubes to collect condensation.
4. Clean up the Ligation 1 reaction by adding 36 μl (1.2×) of PEG/NaCl Solution. Mix by vortexing. Gently spin down to collect beads and incubate at room temperature for 5 minutes.
5. Collect beads by placing sample on magnetic rack for 5 minutes.
6. Remove and discard the supernatant without disturbing the pellet.
7. Add 180 μl of freshly prepared 80% ethanol solution to the sample while it is still on the magnetic rack. Use care not to disturb the pellet. Incubate for 30 seconds and then carefully remove the ethanol solution with P20 pipette.
8. Repeat above step for second wash with the 80% ethanol solution.
9. Remove any residual ethanol solution with P20 pipette, let beads dry for ~30 seconds. Take care to not overdry beads, and immediately proceed to step 1 of Ligation 2.

Step 5: Ligation 2
1. Add 50 μl of pre-mixed Ligation II Master Mix (see Table 4) to the beads for each sample and mix by vortexing until homogeneous.

TABLE 4

Ligation II Master Mix

| Reagent | Volume per Sample |
|---|---|
| Low EDTA TE | 30 μl |
| Reagent B1 | 5 μl |
| 5' Swift Adapter, 42 μM | 2 μl |
| OR | |
| Reagent truB2 | |
| Reagent B3 | 9 μl |
| Enzyme B4 | 1 μl |
| Enzyme B5 | 2 μl |
| Enzyme B6 | 1 μl |
| Total Volume | 50 μl |

2. Place the samples in the thermocycler, programmed at 40° C. for 10 minutes with lid heating off.
3. After thermocycler program completes, gently spin down tubes to collect condensation.
4. Clean up the Ligation 1 reaction by adding 52.5 μl (1.05×) of PEG/NaCl Solution. Mix by vortexing. Gently spin down to collect beads and incubate at room temperature for 5 minutes.
5. Collect beads by placing sample on magnetic rack for 5 minutes.
6. Remove and discard the supernatant without disturbing the pellet.
7. Add 180 μl of freshly prepared 80% ethanol solution to the sample while it is still on the magnetic rack. Use care not to disturb the pellet. Incubate for 30 seconds and then carefully remove the ethanol solution with P20 pipette.
8. Repeat above step for second wash with the 80% ethanol solution.
9. Remove any residual ethanol solution with P20 pipette, let beads dry for ~30 seconds. Take care to not overdry beads, and immediately resuspend the beads in 24 μl of Low EDTA TE. Mix by vortexing and incubate for 2 minutes.
10. Gently spin down to collect beads and collect beads on magnetic rack for 2 minutes.

Step 6: PCR-Library Amplification
1. Add 26 μl of pre-mixed PCR-Library Amplification Master Mix (see Table 5) to a clean tube for each sample.

TABLE 5

PCR-library Amplification Master Mix

| Reagent | Volume per Sample |
|---|---|
| NEB Ultra II Q5 Master Mix (2x) | 25 μl |
| Truncated P5 Primer, 100 μM | 0.5 μl |
| Truncated P7 Primer, 100 μM | 0.5 μl |
| Total Volume | 26 μl |

2. Carefully transfer the supernatant containing the final post-ligation library to the PCR-Library Amplification Master Mix.
3. Transfer any residual final post-ligation library using a P20 pipette. Take care to transfer as much as the supernatant as possible.
4. Mix by vortexing, gently spin down, place in the thermocycler, and run the PCR-Library Amplification Thermocycler Program in the order described below.

TABLE 6

Exemplary PCR-library Amplification Thermocycler Program

| Step | Temperature | Time |
| --- | --- | --- |
| Initial denaturation | 98° C. | 30 seconds |
| 5 PCR Cycles | 98° C. | 10 seconds |
| (4 GOTO Steps) | 65° C. | 75 seconds |
| Final Extension | 65° C. | 5 minutes |
| Hold | 4° C. | Hold |

5. Clean up the PCR-Library Amplification reaction by adding 90 µl (1.8×) of SPRIselect beads. Mix by vortexing. Gently spin down to collect beads and incubate at room temperature for 5 minutes.
6. Collect beads by placing sample on magnetic rack for 5 minutes.
7. Remove and discard the supernatant without disturbing the pellet.
8. Add 180 µl of freshly prepared 80% ethanol solution to the sample while it is still on the magnetic rack. Use care not to disturb the pellet. Incubate for 30 seconds and then carefully remove the ethanol solution with P20 pipette.
9. Repeat above step for second wash with the 80% ethanol solution.
10. Remove any residual ethanol solution with P20 pipette, let beads dry for ~30 seconds. Take care to not overdry beads, and immediately resuspend the beads in 47 µl of Low EDTA TE. Mix by vortexing and incubate for 2 minutes.
11. Gently spin down to collect beads and collect beads on magnetic rack for 2 minutes.
12. Carefully transfer the supernatant containing the final PCR-amplified library to a clean tube without carrying any beads.
13. Analyze 1 µl of the amplified libraries by TapeStation. Prominent peak should be present at ~300 bp corresponding to adapter-ligated mononucleosomal DNA (180 bp+60 bp+59 bp).
14. Store libraries at −20° C.

Accurate and Efficient Detection of Rare Mutations Using Duplex Anchored PCR

Figure 10:
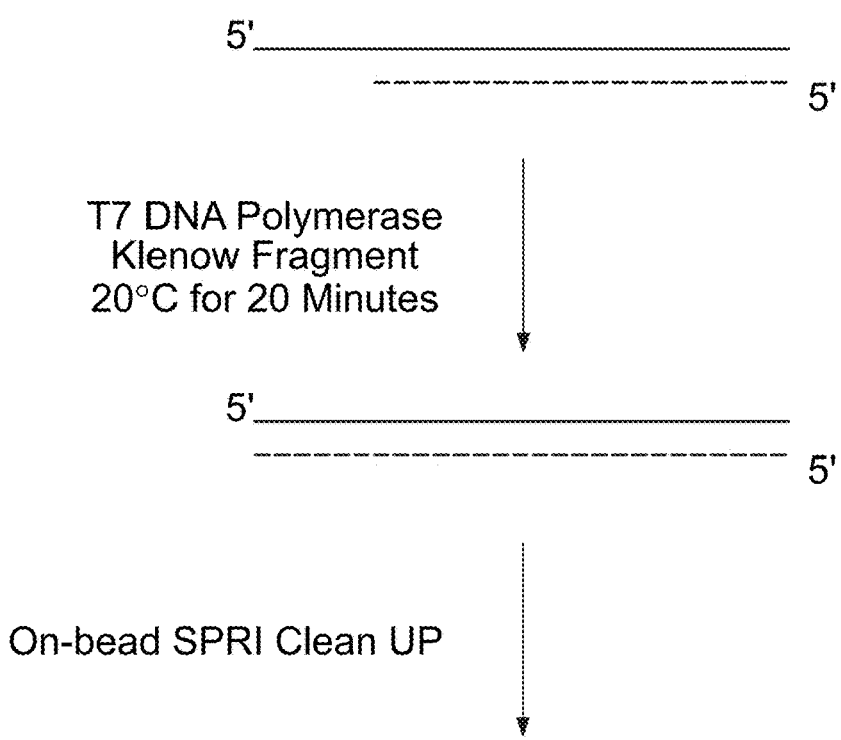
FIG. 10 contains a schematic of an exemplary filling in of a 3' end of an amplification fragment having a 5' overhang to generate a blunt end amplification product.
Figure 12:
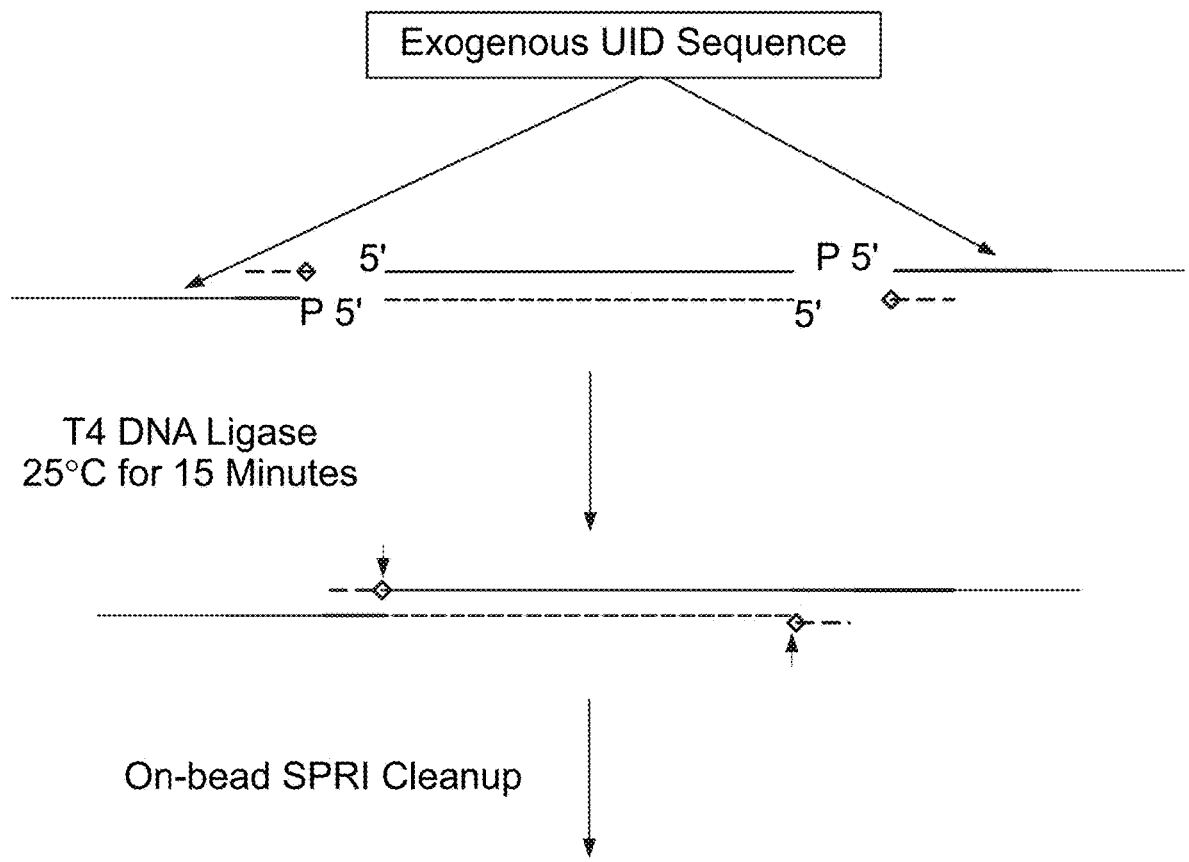
FIG. 12 contains a schematic of an exemplary 3' adapter ligation using a 3' duplex adapter. The 5' phosphate of the 3' duplex adapter is ligated to the 3' end of the nucleic acid template.
Figure 13:
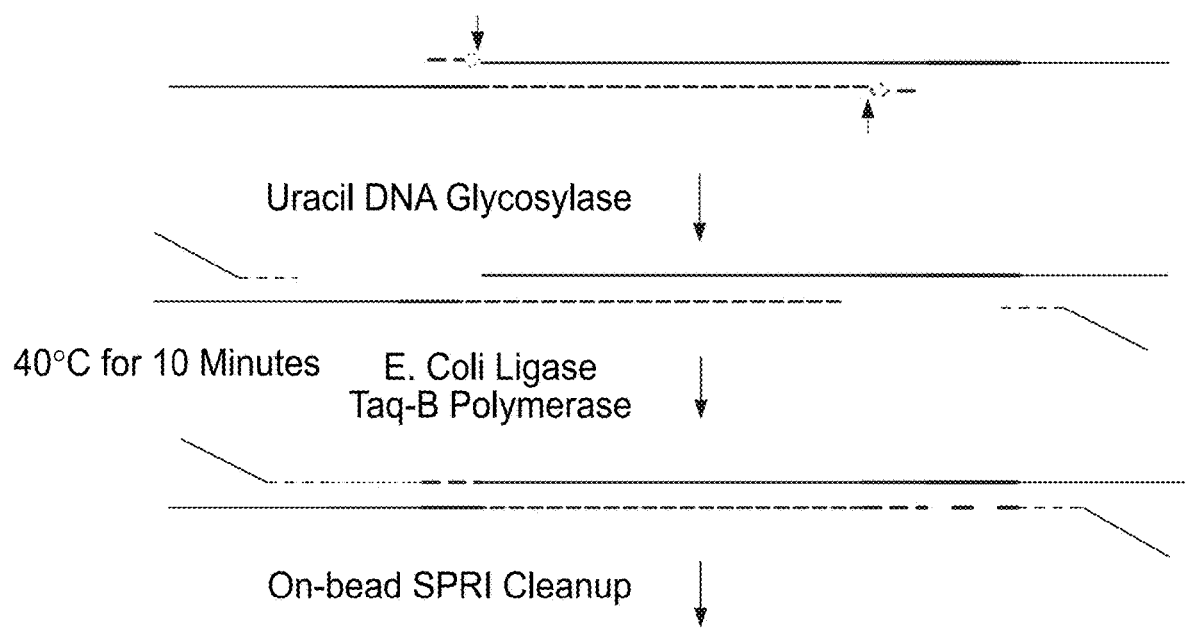
FIG. 13 contains a schematic of an exemplary 5' adapter ligation. In a single reaction, the blocking group of the 3' duplex adapter is degraded and a 5' adapter containing is ligated to the 5' end of the nucleic acid template via a nick-translation reaction.
Figure 14:
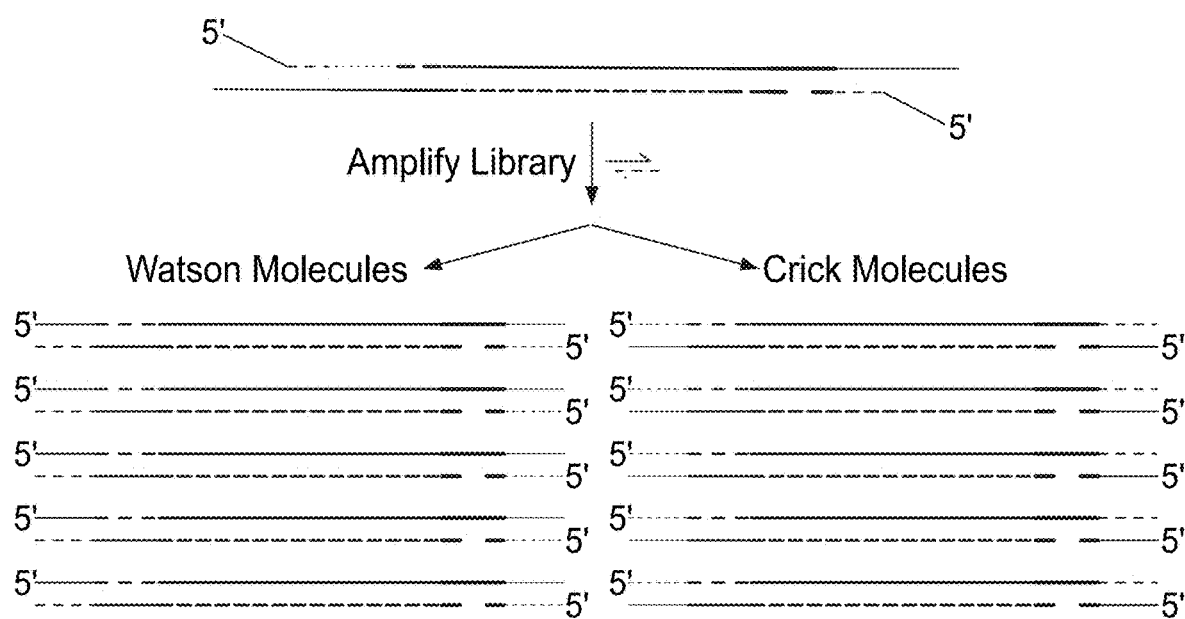
FIG. 14 contains a schematic of an exemplary library PCR amplification.
Figure 15:
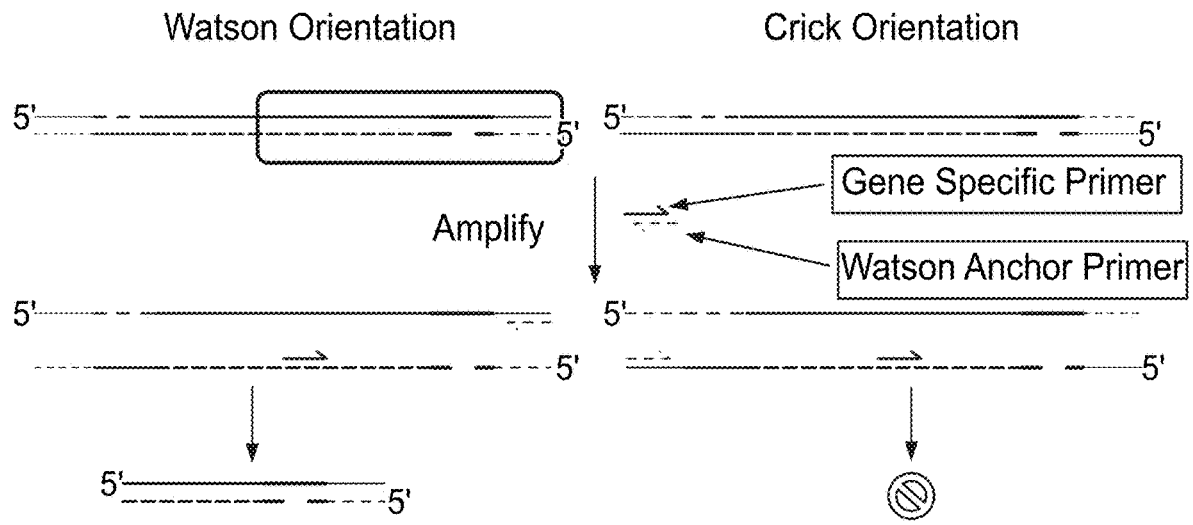
FIG. 15 contains a schematic of an exemplary Watson amplification.
Figure 16:
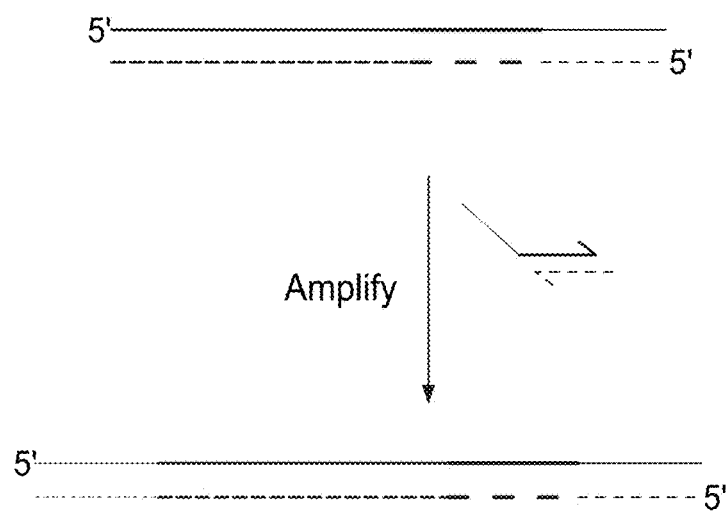
FIG. 16 contains a schematic of an exemplary nested Watson amplification.
Figure 19:
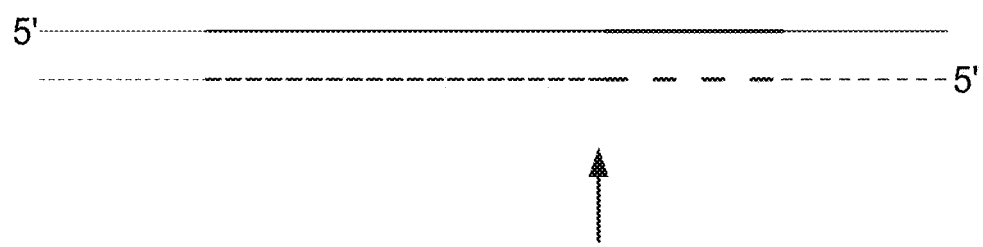
FIG. 19 contains a schematic of final amplification products generated by an exemplary duplex anchored PCR.
Figure 19:
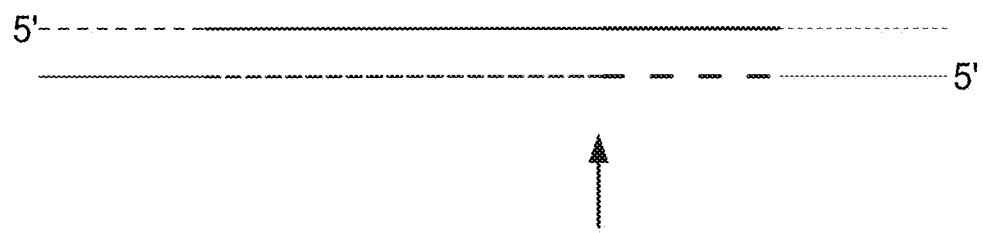

Sequencing libraries incorporating duplex molecular barcodes were generated by sequentially ligating two adapter molecules to double stranded input DNA. First, input DNA was end-repaired via blunting and dephosphorylation reactions (FIGS. 9 and 10). Following end-repair, a 3' adapter containing a 5' phosphate (3' oligo #1) annealed to a short oligonucleotide with a blocked 3' group (3' oligo #2) was ligated to each 3' end of the input DNA (FIG. 12). As one of the oligonucleotides contains a 3' blocking group, only the oligonucleotide containing the 5' phosphate (3' oligo #1) was covalently attached to the input DNA at the 3' ends. The attached 3' oligonucleotide also contains a molecular barcode which uniquely labels each strand (FIG. 11). Next, the 3' oligo containing a 3' blocking group was degraded and a 5' adapter oligo was ligated to each 5' end via a nick translation-like reaction. Specifically, the 5' adapter oligo anneals immediately upstream of the molecular barcode on 3' adapter oligo #1 leaving a gap. This gap was filled in and sealed during a nick-translation-like reaction thereby generating a duplex molecular barcode in-situ on each end of the DNA fragments (FIG. 13). The resulting ligated products were purified and amplified via an initial whole-genome PCR (FIG. 14).

Following the initial whole-genome PCR, the product can optionally be purified and single stranded (ss) NA libraries corresponding to sense and anti-sense strands are generated (FIGS. 2 and 3).

The amplified DNA libraries were enriched for the desired targets using a strand-specific anchored PCR approach. This PCR enrichment utilized a single primer targeting the desired region of interest and a second primer targeting the ligated adapter sequence (FIGS. 4, 5, 15, 17). To increase the specificity of target enrichment, a second nested PCR can be performed using a single primer targeting the desired region of interest and a second primer targeting the ligated adapter sequence (FIGS. 7, 8, 16, 18). To increase the specificity of target enrichment, a second nested PCR can be used to incorporate sample barcodes as well as the requisite graft sequences necessary for next generation sequencing. The resulting libraries are then quantified, normalized, and sequenced.

Following sequencing, reads were aligned to the genome and grouped by their molecular barcode. Fragments containing reads with the same molecular barcode that map to both the sense and anti-sense strand of the target were designed to have "duplex support." Mutations were only scored if they were present in both strands (FIGS. 20 and 21).

Example 2: Targeted DNA Sequencing of the Watson and Crick Strands of DNA

The identification and quantification of rare nucleic acid sequences is important for many areas of biology and clinical medicine. This example describes a method (termed SaferSeqS) that addresses this challenge by (i) efficiently introducing identical molecular barcodes in the Watson and Crick strands of template molecules and (ii) enriching for genomic regions of interest with a novel strand-specific PCR assay. It can be applied to evaluate mutations within a single amplicon or simultaneously within multiple amplicons, can assess limited quantities of DNA such as those found in plasma, and reduces the error rate of existing PCR-based molecular barcoding approaches by at least two orders of magnitude.

Results

To address inefficiencies and introduced errors typically associated with library construction, a strategy was designed that involves the sequential ligation of adapter sequences to the 3' and 5' DNA fragment ends and the generation of double stranded molecular barcodes in situ (FIG. 22a). The in situ generation of molecular barcodes is a key innovation of the new library preparation method. The enzymes used for the in situ generation of double stranded molecular barcodes uniquely barcoded each DNA fragment and obviated the need to enzymatically prepare duplex adapters (FIG. 22a, steps 2 and 3). The adapter contained a stretch of 14 random nucleotides as the exogenous molecular barcode (unique identifier sequence [UID]). The adapter-ligated fragments were subjected to a limited of number of PCR cycles to create redundant copies of the two original DNA strands (FIG. 22a, step 4). For clarity, in this exemplary embodiment a UCSC reference sequence (available at genome.ucsc.edu/) was arbitrarily defined as the "Watson" strand and its reverse complement as the "Crick" strand.

Another innovation in this protocol is the use of a hemi-nested PCR-based approach for enrichment. Though hemi-nested PCR has previously been used for target enrichment (see, e.g., Zheng et al., 2014, Nat Med 20:1479-1484), major changes were required to apply it to duplex sequencing. In particular, two separate PCRs were performed—one for the Watson strand and one for the Crick strand. Both PCRs employed the same gene-specific primer, but each employed a different anchoring primer. PCR duplicates derived from each strand could be distinguished by the orientation of the insert relative to the exogenous UID (FIG. 22b).

Following sequencing, reads corresponding to each strand of the original DNA duplexes were grouped into Watson and Crick families. Each family member had the identical endogenous barcode representing the sequence at one end of the initial template fragment and the identical exogenous UID introduced in situ during library construction. Mutations present in >80% of a Watson strand family were called "Watson supermutants". Mutations present in >80% of a Crick strand family were called "Crick supermutants". Those present in >80% of both the Watson and Crick families with the same UID (a "duplex family") were called "supercalifragilisticexpialidocious mutants", referred to herein as "supercalimutants" (FIG. 22c).

Figure 23:
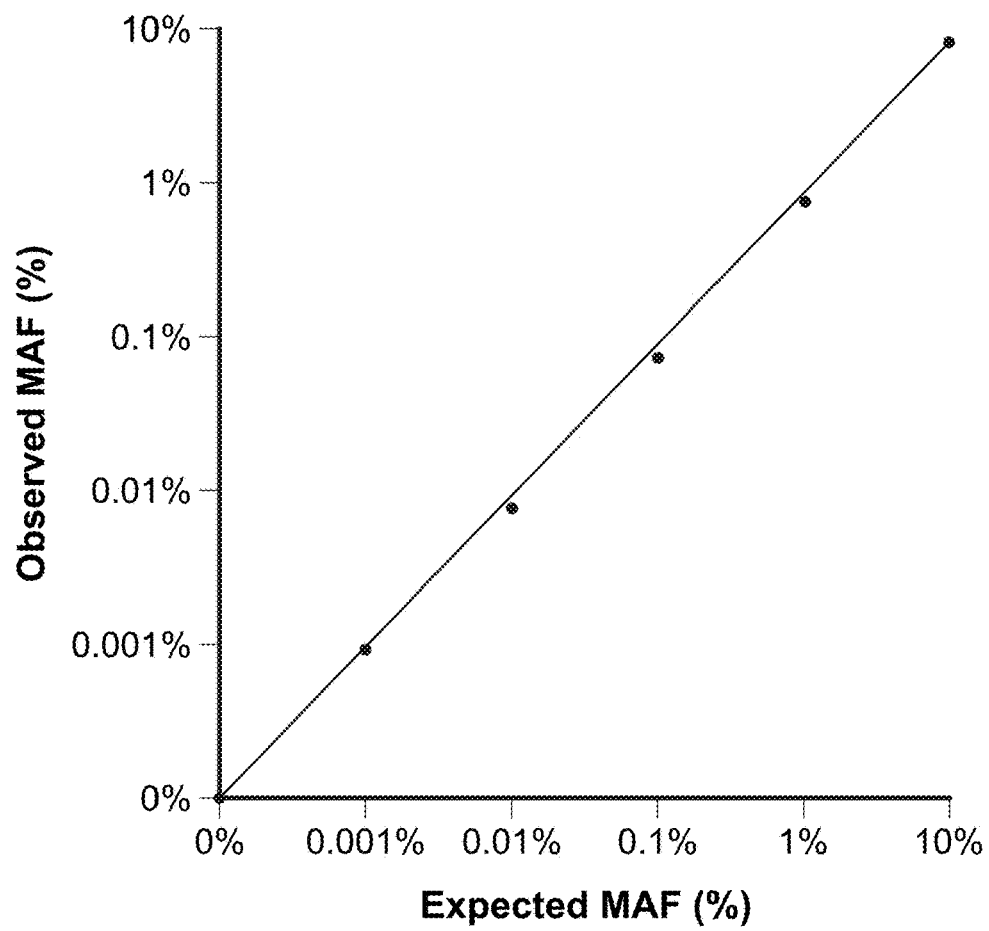
FIG. 23 contains a graph shown an analytical performance of SaferSeqS. Mutant allele frequencies (MAF) determined by SaferSeqS versus the expected frequencies when DNA from a cancer containing a known mutation was mixed with leukocyte DNA from a healthy donor at ratios varying from 10% down to 0.001%. A 0% control sample was also assayed to determine specificity for the mutation of interest. The solid line represents a fit of a linear regression model in which the y-intercept was fixed at zero (slope=0.776, $R^2$>0.999, P=3.95×10$^{-15}$).

As an initial demonstration of SaferSeqS, a mixing experiment was conducted in which DNA with a known mutation was spiked into DNA from a normal individual's leukocytes at ratios varying from 10% to 0%. These admixtures were predicted to result in 15,400, 150, 15, 15, 8 or 0 supercalimutants per assay. The fraction of on-target reads (i.e., reads comprised of the intended amplicon) was 88%, much higher than achievable with hybrid capture-based approaches (see, e.g., Samorodnitsky et al., 2015 *Hum Mutat* 36:903-914). Moreover, a strong correlation between the expected and observed allele frequencies was demonstrated across five orders of magnitude (FIG. 23, Pearson's r>0.999, p=2.02×10$^{-12}$). Not a single mutant corresponding to the pre-specified admixed variant was observed in DNA from the normal individual, indicating very high specificity for the mutation of interest. Specificity was also determined for any base within the amplicon rather than just the queried base. Across a total of 37,747,670 bases queried among all DNA samples, only six supercalimutants were observed, representing a mutation frequency of 1.59×10$^{-7}$ supercalimutants/bp (Table 7).

Figure 24:
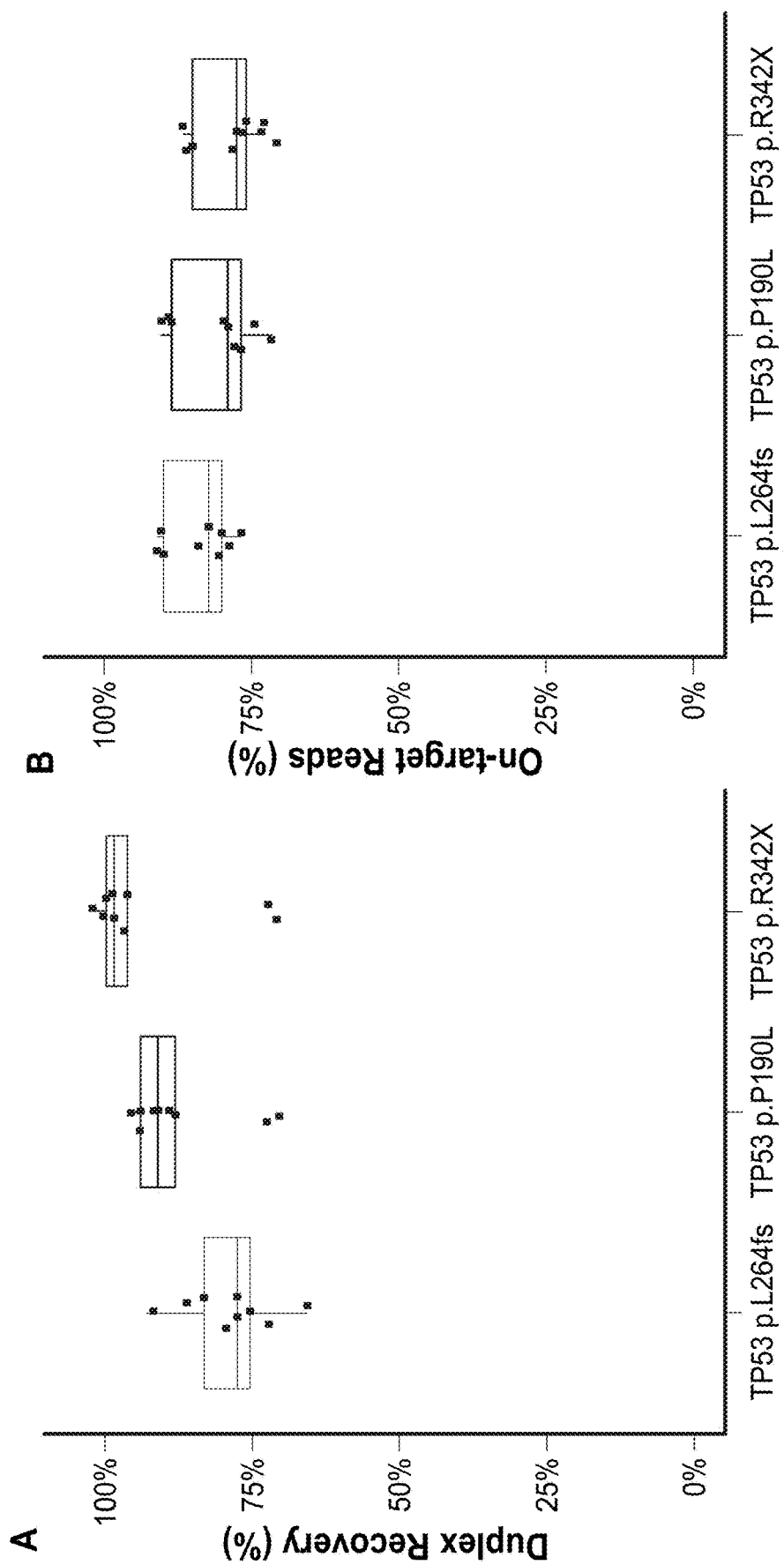
FIG. 24. High duplex recovery and efficient target enrichment with SaferSeqS. Thirty-three ng of admixed cfDNA samples were assayed for one of three different mutations in TP53 (p.L264fs, p.P190L, or p.R342X). Three libraries were prepared per cfDNA sample, each containing ~11 ng of cfDNA. (a) The median number of duplex families (i.e., both Watson and Crick strands containing the same endogenous and exogenous barcodes) was 89% (range: 65% to 102%) of the number of original template molecules. (b) The median fraction of on-target reads was 80% (range: 72% to 91%).

To assess SaferSeqS in such a challenging context, cell-free plasma DNA from cancer patients was mixed with cell-free plasma DNA from normal individuals to mimic mutation frequencies that are typically observed in clinical samples. In these experiments, 33 ng of each sample was assayed for one of three different mutations in TP53. The median fraction of on-target reads across the 27 experimental conditions (3 TP53 amplicons×3 samples×3 aliquots/sample) was 80% (range: 72% to 91%) (FIG. 24a). The median number of duplex families (i.e., both Watson and Crick strands containing the same endogenous and exogenous barcodes) was 89% (range: 65% to 102%) of the number of original template molecules (FIG. 24b). Moreover, in all six admixed samples, the supercalimutant of interest was identified at the expected frequency (FIG. 25b,d,e, Table 9). Mutations at this expected frequency were also identified in these same samples using a previously described, molecular barcoding method ("SafeSeqS" rather than "SaferSeqS") (FIG. 25a,b,c, Table 8). An advantage of SaferSeqS was its specificity. There were a total of 1,406 supermutants representing 153 distinct mutations observed with the previously described method, reflecting an average error rate of 9.39×10$^{-6}$ supermutants/bp (FIG. 25a,b,c, Table 8). The vast majority of these mutations were presumably polymerase errors that arose during early barcoding cycles in only one of the two strands. Similarly, if only Watson supermutants or Crick supermutants (i.e. those observed in only one of the two strands, FIG. 22c), rather than super-calimutants, were considered, an error rate of 6.56×10$^{-6}$ supermutants/bp was observed (FIG. 26, Table 9). In contrast, only one supercalimutant was detected among 4,947,725 bases queried with SaferSeqS, representing an overall mutation rate of 2.02×10$^{-7}$ (Table 9). These differences in specificity between SaferSeqS and previously described molecular barcoding methods (i.e. those employing direct PCR or adapter ligation to incorporate molecular barcodes

TABLE 7

Mutations identified in analytical sensitivity and specificity validation experiments.

| Sample | Chrom | Position* | Reference Base | Variant Base | Gene | cDNA change | Protein change | # Supercalimutants | Duplex Depth | MAF |
|---|---|---|---|---|---|---|---|---|---|---|
| 10% Spike-in | chr17 | 7579507 | T | G | TP53 | c. 180A > C | p. P60P | 3,067 | 37,686 | 8.14E+00 |
| 1% Spike-in | chr17 | 7579507 | T | G | TP53 | c. 180A > C | p. P60P | 280 | 34,997 | 8.00E−01 |
| 1% Spike-in | chr17 | 7579560 | A | G | TP53 | c. 127T > C | p. L43L | 1 | 1,481 | 6.75E−02 |
| 0.1% Spike-in | chr17 | 7579507 | T | G | TP53 | c. 180A > C | p. P60P | 28 | 36,764 | 7.62E−02 |
| 0.01% Spike-in | chr17 | 7579507 | T | G | TP53 | c. 180A > C | p. P60P | 3 | 37,872 | 7.92E−03 |
| 0.001% Spike-in | chr17 | 7579507 | T | G | TP53 | c. 180A > C | p. P60P | 2 | 206,682 | 9.68E−04 |
| 0.001% Spike-in | chr17 | 7579518 | C | G | TP53 | c. 169G > C | p. D57H | 1 | 193,317 | 5.17E−04 |
| 0.001% Spike-in | chr17 | 7579547 | G | A | TP53 | c. 140C > T | p. P47L | 1 | 153,733 | 6.50E−04 |
| 0.001% Spike-in | chr17 | 7579575 | G | — | TP53 | c. 112del | p. Q38del | 1 | 37,951 | 2.63E−03 |
| 0.001% Spike-in | chr17 | 7579716 | G | A | TP53 | c. 80C > T | p. P27L | 1 | 14,207 | 7.04E−03 |
| 0% Spike-in | chr17 | 7579508 | G | C | TP53 | c. 179C > G | p. P60R | 1 | 200,754 | 4.98E−04 |

*Coordinates refer to the human reference genome hg19 release (Genome Reference Consortium GRCh37, February 2009).

It was then sought to determine whether SaferSeqS could be applied to clinical samples in which the quantity of DNA is limiting. For example, as little as 33 ng of DNA is often present in ten mL of cell-free plasma DNA samples used for liquid biopsies. The vast majority of DNA template molecules in these samples are wild type, with as few as one or two mutant templates among the 10,000 wild-type templates present in samples from patients with low tumor burdens. To sensitively detect this exceedingly small number of mutant templates, the assay should efficiently recover the starting molecules.

prior to sequencing) were highly significant (P<3.5×10$^{-10}$, two-sided Z test for proportions comparing SaferSeqS with each of the other methods).

Table 8. Comparison of mutations identified by SafeSeqS and SaferSeqS.
(See Appendix A)
Table 9. Comparison of mutations identified by strand-agnostic molecular barcodes and SaferSeqS.
(See Appendix B)

As a further demonstration of the clinical applicability of SaferSeqS, five cancer patients with minimal tumor burdens were evaluated. In each case, mutations in the primary tumors (rather than the plasma) were identified as described elsewhere (Tie et al., *Sci Transl Med* 8:346ra392 (2016)). The plasma from these patients was divided into two equal aliquots and evaluated one aliquot with a molecular barcoding method described elsewhere (Kinde et al., *Proc Natl Acad Sci USA* 108: 9530-9535 (2011)) and the other with SaferSeqS. In both cases, primers that resulted in small amplicons targeting the mutations of interest were designed. Evaluation with the previously described barcoding method revealed that the plasma samples harbored in aggregate eight mutations that were originally identified in the primary tumors. The frequencies of these mutations in the plasma varied from 0.01% to 0.1% (FIG. 27, Table 10). In addition to the eight known mutations, the previously described method identified 334 distinct mutations present at frequencies up to 0.013%, none of which were found in the primary tumors of these patients. These 334 mutations comprised 10,347 supermutants, reflecting an average error rate of $1.23 \times 10^{-5}$ supermutants/bp (FIG. 27, Table 10). With SaferSeqS, the eight mutations found in the primary tumors were detected in all five patients at frequencies similar to those found with the previously described method (FIG. 27, Table 10). However, among the 8,707,755 queried bases, only one additional supercalimutant (rather than 334 mutations) was identified with SaferSeqS, representing an average error rate of $1.15 \times 10^{-7}$ (Table 10). This >100-fold improvement in specificity over the previously described molecular barcoding method was highly significant ($P<2.2 \times 10^{-16}$, two-sided Z test for proportions).

Table 10. Mutations identified by SafeSeqS and SaferSeqS in plasma samples obtained from cancer patients.
(See Appendix C)

It was next examined whether SaferSeqS could simultaneously assay multiple targets, which can be useful for a variety of sequencing applications. SaferSeqS permits two types of multiplexing, one in which multiple targets are assayed in separate PCR reactions, and another in which multiple targets are assayed in the same PCR reaction. Because redundant Watson and Crick strand-derived copies are created during library amplification, the library can be partitioned into multiple PCR reactions without adversely impacting sample recovery. For example, assuming a PCR efficiency of 70%, up to 22 targets can be separately assayed with <10% loss in recovery if a DNA library is amplified with 11 PCR cycles (FIG. 28). In practice, either 100% or 4.4% of a library was assayed. The on-target rate was similar whether using 100% of 4.4% of the library, with 82% and 92% of reads properly mapping to the intended region. The number of duplex families recovered was also similar, with 7,825 and 6,769 recovered in the 100% and 4.4% library partitions.

While the multiplexing approach described above is useful for simultaneously assaying a limited number of targets, applications which assess many genomic regions can include multiplexing into a small number of PCR reactions. To evaluate the multiplexing capabilities of SaferSeqS in this context, 48 primers were designed to query regions of driver genes that are commonly mutated in cancer (Table 11). These primers were combined in two reactions: one targeting 25 and the other targeting 23 regions. Each of the 48 primer pairs specifically amplified their intended targets (FIG. 30) and 36 were judged to be successful in that the number of duplex families was at least 50% of those identified with singleplex reactions. Of these 36, the median on-target rate for Watson-derived reads was 95% (range: 39% to 97%), and the median on-target rate for Crick-derived reads was 95% (range: 39% to 98%). Most importantly, the targets demonstrated relatively uniform recovery of the input molecules, with a coefficient of variation of only 17% (FIG. 29). The lengths of the amplicons sequenced (median of 77 bp, interquartile range: 71-83 bp) were also similar in all amplicons and consistent with the initial size of cell-free plasma DNA being ~167 bp±10.4 bp (FIG. 29).

TABLE 11

Composition and GSP primer sequences of multiplex panel.

| Amplicon | Multi-plex Set # | GSP1 Sequence | SEQ ID NO: | GSP2 Sequence | SEQ ID NO: | GSP2 Chrom | GSP2 Strand | GSP2 Start Position* | GSP2 End Position* |
|---|---|---|---|---|---|---|---|---|---|
| AKT1_17 | 1 | TGCGTGGCTC TCACC*A*C | 6 | CACCCGCACG TCTGT*A*G | 7 | chr14 | − | 105,246,554 | 105,246,570 |
| APC_1310 | 1 | ACAGGATCTT CAGCTGAC*C *T | 8 | CTTCAGCTGA CCTAGTTCC* A*A | 9 | chr5 | − | 112,175,223 | 112,175,243 |
| CDKN2A_51 | 1 | CCTGGCTCTG ACCATTCTG* T*T | 10 | CCATTCTGTT CTCTCTGG*C *A | 11 | chr9 | − | 21,971,209 | 21,971,228 |
| EGFR_856 | 1 | AACACCGCAG CATGTC*A*A | 12 | GCAGCATGTC AAGATCACA* G*A | 13 | chr7 | + | 55,259,486 | 55,259,506 |
| FBXW7_369 | 1 | TTGTGCAGAG TTCAGTTACC TT*A*G | 14 | GAGTTCAGTT ACCTTAGGAG ATTTG*A*G | 15 | chr4 | + | 153,251,872 | 153,251,898 |
| FBXW7_481 | 1 | GGCCTGTCTC AATATCCCA* A*A | 16 | GTCTCAATAT CCCAAACCCT AA*G*A | 17 | chr4 | + | 153,247,333 | 153,247,356 |
| GNAS_202 | 1 | GGAACTTGGT CTCAAAGATT C*C*A | 18 | GGTCTCAAAG ATTCCAGAAG TC*A*G | 19 | chr20 | − | 57,484,426 | 57,484,449 |

TABLE 11-continued

Composition and GSP primer sequences of multiplex panel.

| Amplicon | Multi-plex Set # | GSP1 Sequence | SEQ ID NO: | GSP2 Sequence | SEQ ID NO: | GSP2 Chrom | GSP2 Strand | GSP2 Start Position* | GSP2 End Position* |
|---|---|---|---|---|---|---|---|---|---|
| KRAS_14 | 1 | TCTGAATTAG CTGTATCGTC AA*G*G | 20 | TATCGTCAAG GCACTCTTG* C*C | 21 | chr12 | + | 25,398,256 | 25,398,276 |
| KRAS_144 | 1 | CTGTATTTAT TTCAGTGTTA CTTACCTGT* C*T | 22 | AGTGTTACTT ACCTGTCTTG TC*T*T | 23 | chr12 | + | 25,378,536 | 25,378,559 |
| NRAS_12 | 1 | GACTGAGTAC AAACTGGTG* G*T | 24 | AAACTGGTGG TGGTTGG*A* G | 25 | chr1 | − | 115,258,751 | 115,258,769 |
| PIK3CA_80 | 1 | TTTCGTAAGT GTTACTCAAG AA*G*C | 26 | AGTGTTACTC AAGAAGCAGA AA*G*G | 27 | chr3 | + | 178,916,827 | 178,916,850 |
| PIK3CA_348 | 1 | GCATCAGCAT TTGACTTTAC CTTAT*C*A | 28 | CATTTGACTT TACCTTATCA ATGTCT*C*G | 29 | chr3 | − | 178,921,563 | 178,921,590 |
| PIK3CA_1053 | 1 | GCATGCTGTT TAATTGTGTG *G*A | 30 | TGTGTGGAAG ATCCAATCCA T*T*T | 31 | chr3 | − | 178,952,106 | 178,952,128 |
| PTEN_145 | 1 | CCATAGAAAT CTAGGGCCTC *T*T | 32 | TAGGGCCTCT TGTGCCTT*T *A | 33 | chr10 | − | 89,692,953 | 89,692,972 |
| TP53_25 | 1 | GGCCTGCCCT TCCAA*T*G | 34 | TTCCAATGGA TCCACTC*A* C | 35 | chr17 | + | 7,579,820 | 7,579,838 |
| TP53_60 | 1 | GCAGCCTCTG GCATTC*T | 36 | GGCATTCTGG GAGCTTC*A* T | 37 | chr17 | + | 7,579,487 | 7,579,505 |
| TP53_125 | 1 | GCCAGGCATT GAAGTCTC*A *T | 38 | ATTGAAGTCT CATGGAAGC* C*A | 39 | chr17 | + | 7,579,272 | 7,579,292 |
| TP53_161 | 1 | CCGTCATGTG CTGTGA*C*T | 40 | GTGCTGTGAC TGCTTGTA*G *A | 41 | chr17 | + | 7,578,426 | 7,578,445 |
| TP53_196 | 1 | CCAAATACTC CACACGCAA* A*T | 42 | CACACGCAAA TTTCCTTC*C *A | 43 | chr17 | + | 7,578,240 | 7,578,259 |
| TP53_245 | 1 | GGAGTCTTCC AGTGTGATGA *T*G | 44 | GTGATGATGG TGAGGATG*G *G | 45 | chr17 | + | 7,577,514 | 7,577,533 |
| TP53_264 | 1 | CACAAACACG CACCTC*A*A | 46 | ACGCACCTCA AAGCTGT*T* C | 47 | chr17 | + | 7,577,119 | 7,577,137 |
| TP53_305 | 1 | AACTGCACCC TTGGTC*T*C | 48 | CCTCCACCGC TTCTTG*T*C | 49 | chr17 | + | 7,576,989 | 7,577,006 |
| TP53_330 | 1 | GAAACTTTCC ACTTGATAAG AGG*T*C | 50 | TGATAAGAGG TCCCAAGACT *T*A | 51 | chr17 | + | 7,576,827 | 7,576,848 |
| TP53_365 | 1 | AGTAGGGCCA GGAAG*G*G | 52 | GGGCTGAGGT CACTC*A*C | 53 | chr17 | + | 7,573,910 | 7,573,926 |
| TP53_390 | 1 | TGGGAGGCTG TCAGT*G*G | 54 | GGGAACAAGA AGTGGAGAA* T*G | 55 | chr17 | + | 7,572,906 | 7,572,926 |
| APC_1458 | 2 | TGCTTAGGTC CACTCTCT*C *T | 56 | GTCCACTCTC TCTCTTTTCA G*C*A | 57 | chr5 | − | 112,175,668 | 112,175,690 |

TABLE 11-continued

Composition and GSP primer sequences of multiplex panel.

| Amplicon | Multiplex Set # | GSP1 Sequence | SEQ ID NO: | GSP2 Sequence | SEQ ID NO: | GSP2 Chrom | GSP2 Strand | GSP2 Start Position* | GSP2 End Position* |
|---|---|---|---|---|---|---|---|---|---|
| BRAF_602 | 2 | ACAACTGTTCAAACTGATGG*G*A | 58 | ATGGGACCCACTCCAT*C*G | 59 | chr7 | + | 140,453,111 | 140,453,128 |
| CTNNB1_32 | 2 | TTAGTCACTGGCAGCAAC*A*G | 60 | GGCAGCAACAGTCTTAC*C*T | 61 | chr3 | + | 41,266,077 | 41,266,095 |
| FBXW7_472 | 2 | TAGAGGAAGAAGTCCCAAC*C*A | 62 | GAAGTCCCAACCATGACAAG*A*T | 63 | chr4 | + | 153,249,328 | 153,249,349 |
| FBXW7_506 | 2 | CTAACAACCCTCCTGCCA*T*C | 64 | CCCTCCTGCCATCATATTGA*A*C | 65 | chr4 | + | 153,247,262 | 153,247,283 |
| FGFR2_250 | 2 | ACTCCTCCTTTCTTCCCT*C*T | 66 | TTTCTTCCCTCTCTCCACC*A*G | 67 | chr10 | − | 123,279,684 | 123,279,704 |
| HRAS_10 | 2 | GGAGCGATGACGGAATATAA*G*C | 68 | GGAATATAAGCTGGTGGTGG*T*G | 69 | chr11 | − | 534,296 | 534,317 |
| KRAS_62 | 2 | CTCATGTACTGGTCCCTCAT*T*G | 70 | GTCCCTCATTGCACTGTAC*T*C | 71 | chr12 | + | 25,380,251 | 25,380,271 |
| NRAS_59 | 2 | GTGAAACCTGTTTGTTGGAC*A*T | 72 | CCTGTTTGTTGGACATACTGGAT*A*C | 73 | chr1 | − | 115,256,538 | 115,256,562 |
| PIK3CA_111 | 2 | CACGGTTGCCTACTGG*T*T | 74 | GTTGCCTACTGGTTCAATTACT*T*T | 75 | chr3 | − | 178,916,911 | 178,916,934 |
| PIK3CA_542 | 2 | GAACAGCTCAAAGCAATTTCTAC*A*C | 76 | AATTTCTACACGAGATCCTCTC*T*C | 77 | chr3 | + | 178,936,057 | 178,936,080 |
| PPP2RIA76_1 | 2 | CGACTCCCAGGTACTTC*C*G | 78 | TACTTCCGGAACCTGTGC*T*C | 79 | chr19 | + | 52,715,940 | 52,715,959 |
| PTEN_130 | 2 | CATGTTGCAGCAATTCACT*G*T | 80 | CAATTCACTGTAAAGCTGGAAA*G*G | 81 | chr10 | + | 89,692,878 | 89,692,901 |
| TP53_36 | 2 | GGGACAGCATCAAATCATC*C*A | 82 | ATCAAATCATCCATTGCTTG*G*G | 83 | chr17 | + | 7,579,556 | 7,579,577 |
| TP53_113 | 2 | GTCACAGACTTGGCTGT*C*C | 84 | TTGGCTGTCCCAGAAT*G*C | 85 | chr17 | + | 7,579,328 | 7,579,345 |
| TP53_138 | 2 | ATCAACCCACAGCTGC*A*C | 86 | TGCACAGGGCAGGTC*T*T | 87 | chr17 | + | 7,578,499 | 7,578,515 |
| TP53_180 | 2 | CCAGCTGCTCACCAT*C*G | 88 | TCACCATCGCTATCTGAG*C*A | 89 | chr17 | + | 7,578,367 | 7,578,386 |
| TP53_220 | 2 | TGACAACCACCCTTAAC*C*C | 90 | CAGTTGCAAACCAGACCTC*A*G | 91 | chr17 | + | 7,578,161 | 7,578,181 |
| TP53_260 | 2 | GTGCAGGGTGGCAAG*T*G | 92 | GGCAAGTGGCTCCTG*A*C | 93 | chr17 | + | 7,577,482 | 7,577,498 |
| TP53_282 | 2 | CCTTTCTTGCGGAGATTCTC*T*T | 94 | CGGAGATTCTCTTCCTCTG*T*G | 95 | chr17 | + | 7,577,069 | 7,577,089 |

TABLE 11-continued

Composition and GSP primer sequences of multiplex panel.

| Amplicon | Multi-plex Set # | GSP1 Sequence | SEQ ID NO: | GSP2 Sequence | SEQ ID NO: | GSP2 Chrom | GSP2 Strand | GSP2 Start Position* | GSP2 End Position* |
|---|---|---|---|---|---|---|---|---|---|
| TP53_315 | 2 | AAATATTCTC CATCCAGTGG TT*T*C | 96 | CCAGTGGTTT CTTCTTTGG* C*T | 97 | chr17 | + | 7,576,876 | 7,576,896 |
| TP53_342 | 2 | GGGCATCCTT GAGTTCC*A* A | 98 | CTTGAGTTCC AAGGCCTC*A *T | 99 | chr17 | + | 7,573,974 | 7,573,993 |
| TP53_380 | 2 | TCAGGCCCTT CTGTCTTG*A *A | 100 | CCTTCTGTCT TGAACATGAG T*T*T | 101 | chr17 | + | 7,572,943 | 7,572,965 |

*Coordinates refer to the human reference genome hg19 release (Genome Reference Consortium GRCh37, February 2009).
Asterisks within primer sequences designate phosphorothioate bonds.

Two exemplary methods can be used to assess multiple amplicons. The first involves parallel amplicon-specific PCR's in different wells. For liquid biopsies to monitor disease recurrence, when only a few driver gene mutations are typically observed, this strategy can be readily applied without concern about cross-hybridization among primers or other issues commonly encountered in multiplex PCR reactions. For other applications of liquid biopsies, such as screening when the mutation of interest is unknown, the evaluation of many more amplicons is useful; e.g., a combination of multiple primer pairs in each PCR well. This example has shown that at least 18 amplicons can be effectively analyzed in a single well with SaferSeqS, and hemi-nested PCR strategies not involving duplex sequencing have shown it is possible to co-amplify up to 313 amplicons.

By permitting efficient detection and quantification of rare genetic alterations, SaferSeqS can enable the development of highly sensitive and specific DNA-based molecular diagnostics as well as help answer a variety of important basic scientific questions.

Methods

Plasma and Peripheral Blood DNA Samples

DNA was purified from 10 mL plasma using cfPure MAX Cell-Free DNA Extraction Kit (BioChain, cat. #K5011625MA) as specified by the manufacturers. DNA from peripheral WBCs was purified with the QIAsymphony DSP DNA Midi Kit (Qiagen, cat. #937255) as specified by the manufacturer. Purified DNA from all samples was quantified as described elsewhere (see, e.g., Douville et al., 2019 bioRxiv, 660258).

Library Preparation

A custom library preparation workflow was developed that could efficiently recover input DNA fragments and simultaneously incorporate double stranded molecular barcodes. In brief, duplex sequencing libraries were prepared with cell-free DNA or peripheral WBC DNA using an Accel-NGS 2S DNA Library Kit (Swift Biosciences, cat. #21024) with the following modifications: 1) DNA was pre-treated with three units of USER enzyme (New England BioLabs, cat. #M5505L) for 15 minutes at 37° C. to excise uracil bases; 2) the SPRI bead/PEG NaCl ratios used after each reaction were 2.0×, 1.8×, 1.2×, and 1.05× for End Repair 1, End Repair 2, Ligation 1, and Ligation 2, respectively; 3) a custom 50 μM 3' adapter (Table 12) was substituted for Reagent Y2; 4) a custom 42 μM 5' adapter (Table 12) was substituted for Reagent B2. The libraries were subsequently PCR-amplified in 50 μL reactions using primers targeting the ligated adapters (Table 12). The reaction conditions were as follows: 1×NEBNext Ultra II Q5 Master Mix (New England BioLabs, cat. #M0544L), 2 μM universal forward primer, and 2 μM universal reverse primer (Table 12). Libraries were amplified with 5, 7, or 11 cycles of PCR, depending on how many experiments were planned, according the following protocol: 98° C. for 30 seconds, cycles of 98° C. for 10 seconds, 65° C. for 75 seconds, and 4° C. hold. If 5 or 7 cycles were used, the libraries were amplified in single 50 μL reactions. If 11 cycles were used, the libraries were divided into eight aliquots and amplified in eight 50 μL reactions each supplemented with an additional 0.5 units of Q5@ Hot Start High-Fidelity DNA Polymerase (New England BioLabs, cat. #M0493L), 1 μL of 10 mM dNTPs (New England BioLabs, cat. #N0447L), and 0.4 μL of 25 mM MgCl$_2$ Solution (New England BioLabs, cat. #B9021S). The products were purified with 1.8×SPRI beads (Beckman Coulter cat. #B23317) and eluted into EB Buffer (Qiagen).

TABLE 12

Oligonucleotides for library construction, strand-specific PCR assays, and sequencing.
Asterisks within primer sequences designate phosphorothioate bonds,
other custom modifications are indicated in the "Notes" column.

| Oligo Name | Oligo Sequence | SEQ ID NO | Purpose/Use | Notes |
|---|---|---|---|---|
| 3' N14 Adapter Oligo #1 | /5Phos/ATA AAACGACGGC NNNNNNNNNN NNNNAGATCG | 102 | 1/2 of 3' adapter containing UID sequence | /5Phos/ is a 5' phosphate modification; /3SpC3/ is a 3' 3- |

TABLE 12-continued

Oligonucleotides for library construction, strand-specific PCR assays, and sequencing. Asterisks within primer sequences designate phosphorothioate bonds, other custom modifications are indicated in the "Notes" column.

| Oligo Name | Oligo Sequence | SEQ ID NO | Purpose/Use | Notes |
|---|---|---|---|---|
| | GAAGAGCACA CGTCTGAACT CCAG*T*C/3 SpC3/ | | | carbon spacer modification |
| 3' Adapter Oligo #2 | GCCGUCGUUU UA/33dT/ | 103 | 1/2 of 3' adapter containing 3' block and degradable residues | /33dT/ is a 3'-deoxythymidine modified base, U represents deoxyuridine |
| 5' Adapter | ACACTCTTTC CCTACACGAC GCTCTTCCGA TCT | 104 | 5' adapter ligation | |
| Library amplification primer #1 | ACACTCTTTC CCTACACGAC GCTCTTCCGA TCT | 105 | Library amplification | |
| Library amplification primer #2 | GACTGGAGTT CAGACGTGTG CTCTTCCGAT CT | 106 | Library amplification | |
| GSP1 primer | See Table 11 | 107 | First nested gene-specific PCR primer | Same primer used in both Watson and Crick first nested PCRs |
| Watson GSP1 anchor primer | GACTGGAGTT CAGACGT*G* T | 108 | Watson-specific anchor PCR primer | |
| Crick GSP1 anchor primer | ACACTCTTTC CCTACACG*A *C | 109 | Crick-specific anchor PCR primer | |
| Watson GSP2 primer | AATGATACGG CGACCACCGA GATCTACACX XXXXXXXCG ACGTAAAACG ACGGCCAGT [GSP2] | 110 | Watson second nested gene-specific PCR primer | [GSP2] indicates sequence of gene-specific portion (see Table 11), Xs denote index sequence |
| Crick GSP2 primer | CAAGCAGAAG ACGGCATACG AGATXXXXXX XXCACACAGG AAACAGCTAT GACCATG [GSP2] | 111 | Crick second nested gene-specific PCR primer | [GSP2] indicates sequence of gene-specific portion (see Table 11), Xs denote index sequence |
| Watson GSP2 anchor/ indexing primer | CAAGCAGAAG ACGGCATACG AGATXXXXXX XXGTGACTGG AGTTCAGACG TGTGCTCTTC CGAT*C*T | 112 | Watson second nested anchor and indexing primer | Xs denote index sequence |
| Crick GSP2 anchor/ indexing primer | AATGATACGG CGACCACCGA GATCTACACX XXXXXXXACA CTCTTTCCCT ACACGACGCT CTTCCGAT*C *T | 113 | Crick second nested anchor and indexing primer | Xs denote index sequence |

TABLE 12-continued

Oligonucleotides for library construction, strand-specific PCR assays, and sequencing.
Asterisks within primer sequences designate phosphorothioate bonds,
other custom modifications are indicated in the "Notes" column.

| Oligo Name | Oligo Sequence | SEQ ID NO | Purpose/Use | Notes |
| --- | --- | --- | --- | --- |
| Custom Read 1 Sequencing Primer | GAGATCTACA CNNNNNNNNC GACGTAAAAC GACGGCCA*G *T | 114 | Illumina paired-end sequencing | Spike into Illumina standard read 1 sequencing primer |
| Custom Index Sequencing Primer | CATGGTCATA GCTGTTTCCT GTG*T*G | 115 | Illumina paired-end sequencing | Spike into Illumina standard index sequencing primer |
| Custom Read 2 Sequencing Primer | GGCATACGAG ATNNNNNNNN CACACAGGAA ACAGCTATGA CCA*T*G | 116 | Illumina paired-end sequencing | Spike into Illumina standard read 2 sequencing primer |

Library Construction

Figure 22:
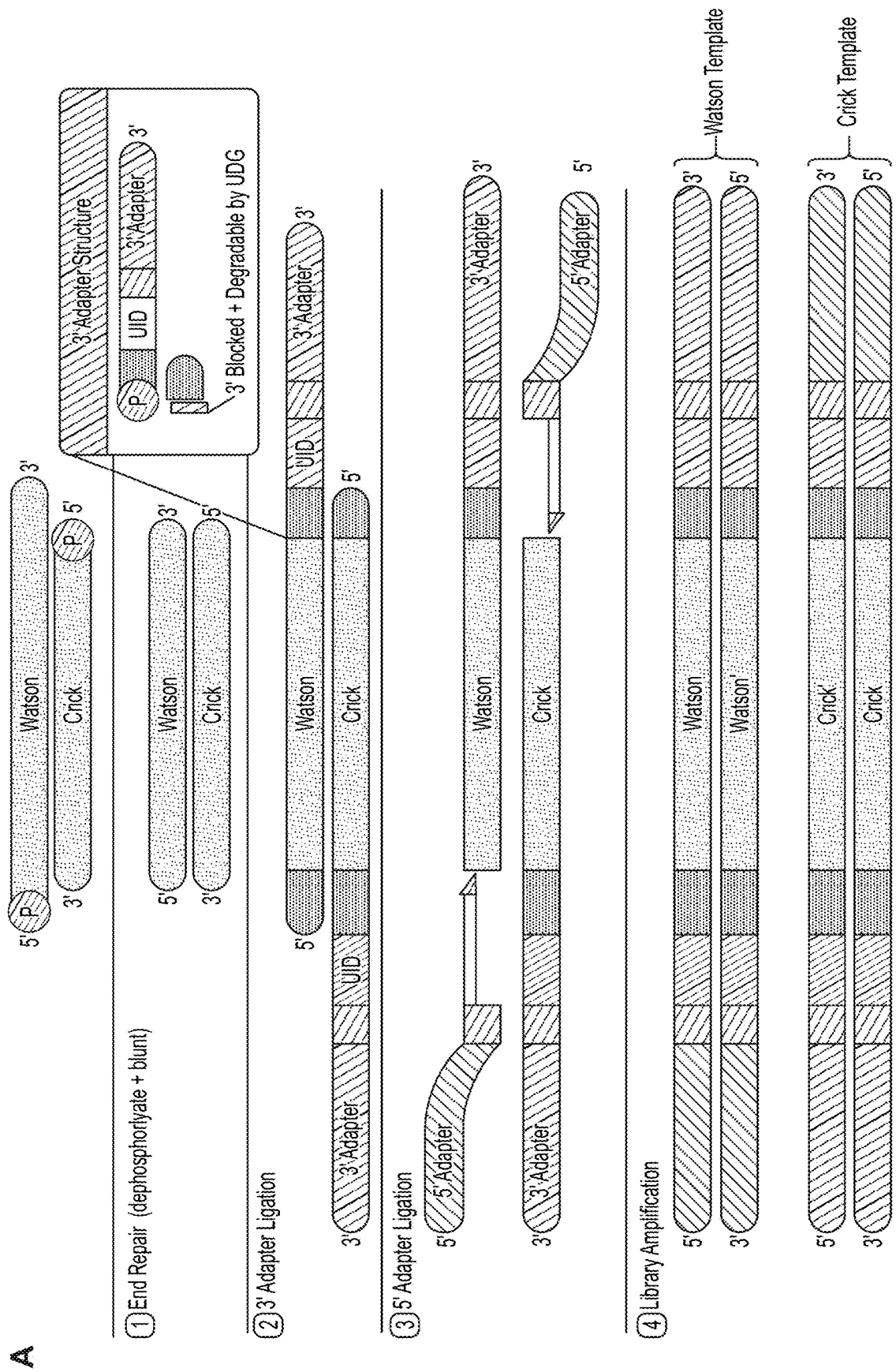
FIG. 22 contains a schematic of an overview of an exemplary SaferSeqS method. (a) Library preparation begins with end repair (step 1) in which DNA template molecules are dephosphorylated and blunted. Next, a 3' adapter containing a unique identifier (UID) sequence (narrow or wide diagonal cross-hatching) is ligated to the 3' fragment ends (step 2). The UID sequences are converted into double stranded barcodes upon extension and ligation of the 5' adapter (step 3). Finally, redundant PCR copies of each original template molecule are generated during library amplification (step 4). (b) Target enrichment is achieved with strand-specific hemi-nested PCRs. The amplified library is partitioned into Watson and Crick-specific reactions (step 5) which selectively amplify products derived from one of the DNA strands (step 6). Additional on-target specificity and incorporation of sample barcodes are achieved with a second nested PCR (step 7). The final PCR products (step 8) are subjected to paired-end sequencing (step 9). The endogenous barcode represents the end of the template fragment prior to library construction. (c) Following sequencing, reads are determined to be derived from the Watson or Crick strand. Because each strand of the original template molecules is tagged with the same exogenous barcode, and has the same endogenous barcode, reads derived from each of the two strands of the same parental DNA duplex can be grouped together into a duplex family. The different cross-hatch and stipple patterns at the right ends of the strands represent different barcodes. In the examples shown, each duplex family has eight members, four representing the Watson strand and four representing the Crick strand. In the actual experiments described in this paper, each family contains at least two members from the Watson strand and two from the Crick strand, with the actual number dependent on the depth of sequencing. Bonafide mutations, represented by the asterisks within the Bona Fide Mutation family, are present in both parental strands of a DNA duplex and are therefore found in both Watson and Crick families. In contrast, PCR or sequencing errors, represented by asterisks within the PCR of Sequencing Error family, are limited to a subset of reads from one of the two strands. Watson strand-specific (asterisks within Damaged Watson Strand family) and Crick strand-specific (asterisks within the Damaged Crick Strand family) artifacts are found in all copies of the Watson or Crick family, but not in both.
Figure 22:
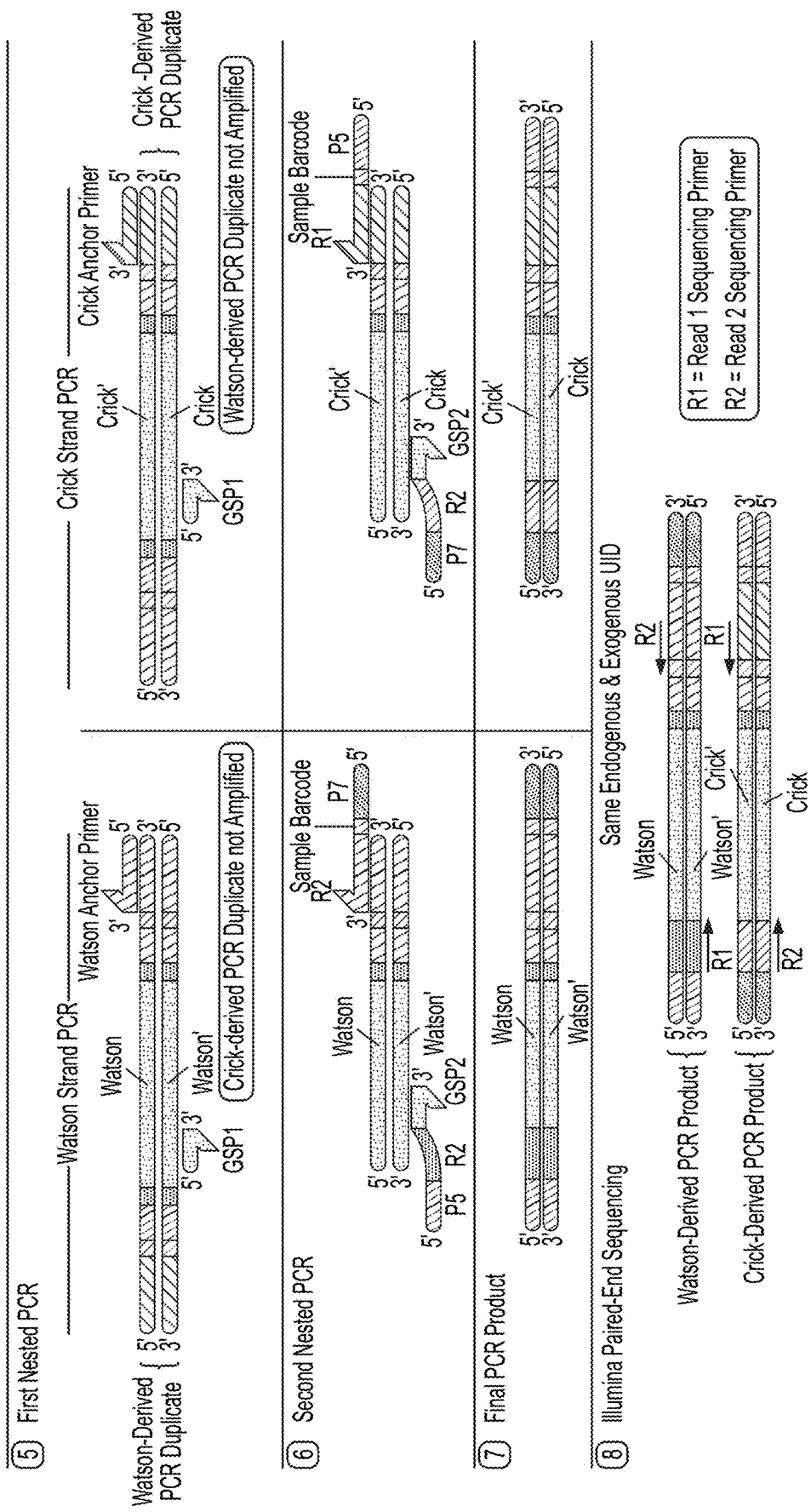
Figure 22:
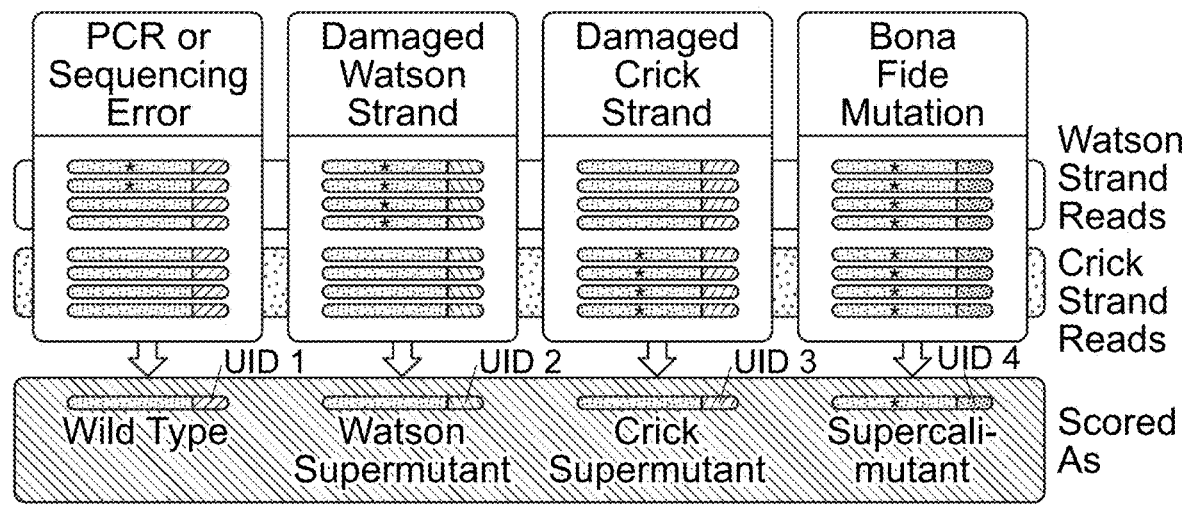

To address inefficiencies associated with library construction, a strategy that involves the sequential ligation of adapter sequences to the 3' and 5' DNA fragment ends and the generation of double stranded molecular barcodes in situ was designed (FIG. 22 a). After DNA ends were dephosphorylated and repaired (FIG. 22 a, step 1), an adapter was attached to the 3' end of DNA fragments (FIG. 22 a, step 2). The adapter was a partially double-stranded DNA fragment with end modifications that selectively ligated to the 3' DNA ends and prevented adapter-dimer formation. Specifically, this adapter consisted of one oligonucleotide containing a 5' phosphate end modification (Table 12, 3' N14 Adapter Oligo #1) which was hybridized to another oligonucleotide containing a 3' blocking group and deoxyuridines substituted for deoxythymidines (Table 12, 3' N14 Adapter Oligo #2). This design permitted of the use of adapters at high concentration in the ligation reaction which promoted efficient attachment to the 3' ends without the risk of significant dimer or concatemer formation. Furthermore, the adapter contained a stretch of 14 random nucleotides in one of the two oligonucleotides which comprised one strand of the duplex UID. Following ligation of the 3' adapter, a second adapter (Table 12, 5' Adapter) was ligated to the 5' DNA fragment ends via a nick translation-like reaction consisting of a DNA polymerase, cohesive end-specific ligase, and uracil-DNA glycosylase (FIG. 22 a, step 3). The concerted action of these enzymes synthesized the complementary strand of the UID, degraded the blocking portion of the 3' adapter, and ligated the extended adapter to the 5' DNA fragment end. The in situ generation of double stranded molecular barcodes uniquely barcoded each DNA fragment and obviated the need to enzymatically prepare duplex adapters, which has been noted to adversely affect input DNA recovery. Finally, the adapter-ligated fragments were subjected to a limited of number of PCR cycles to create redundant copies (UID "families") of the two original DNA strands (FIG. 22 a, step 4).

Effects of Library Amplification Cycle Number and Efficiency

The number of PCR cycles and the efficiency of duplication during library amplification can be adjusted to optimize SaferSeqS parameters. Because SaferSeqS can involve partitioning of redundant Watson and Crick strand-derived copies into specific strand-specific PCRs for target enrichment, in preferred embodiments a requisite number of copies should be generated to ensure a high probability of duplex recovery. For example, assuming 100% efficiency, after one PCR cycle, each template DNA duplex is converted into two double stranded copies (one representing each strand), and there is only a 25% probability of properly distributing these two copies such that the one Watson strand-derived copy is partitioned into the Watson-specific PCR and the one Crick strand-derived copy is partitioned into the Crick-specific PCR. Increasing the number of PCR cycles, or increasing the amplification efficiency, generates more redundant copies which in turn increases the probability of recovering the original DNA duplex.

A probabilistic model was developed to estimate the number of PCR cycles and amplification efficiency necessary for efficient duplex recovery. This model consisted of three steps: 1) simulate the number of PCR progeny generated during library amplification; 2) randomly partition these PCR copies into Watson and Crick strand-specific reactions; and 3) determine the duplex recovery—that is, the proportion of original DNA duplexes which have at least one Watson strand-derived copy partitioned into the Watson strand-specific reaction(s) and at least one Crick strand-derived copy partitioned into the Crick strand-specific reaction(s).

The number of PCR copies of the original template strands generated during each library amplification cycle follows a binomial distribution. For the first PCR cycle, the number of strand-specific copies were initialized to one. It should be noted that the counts were initialized to one (instead of two) because the first library amplification cycle merely serves to denature the two original template strands and convert them into physically distinct double stranded forms. During the subsequent ith cycles of PCR, each of the $n_i$ PCR copies can replicate with probability p (i.e. the efficiency of amplification) to generate a total of $n_{i+1}$ PCR copies equal to $n_i + \text{Binom}(n_i, p)$. This process was iteratively repeated to simulate the number of progeny generated after i PCR cycles. Formally, the number of total PCR copies generated can be expressed as follows:

$$n_i = \sum_{j=1}^{i-1} \text{Binom}(n_j, p); n_1 = 1$$

After library amplification, each original DNA duplex has been amplified to generate $n_{i,W}$ copies of the Watson strand and $n_{i,C}$ copies of the Crick strand as described above. Each of the $n_{i,W}$ and $n_{i,C}$ copies are randomly partitioned into Watson and Crick strand-specific PCR reactions with a probability q that is equal to the fraction of the library used for each reaction. When the library is divided into a single Watson and single Crick strand-specific PCR, q equals 50%. If the library is divided into two Watson and Crick strand-specific PCRs, q equals 25%. The number of PCR copies that are partitioned into the appropriate strand-specific PCR ($N_{k,W}$ or $N_{k,C}$ for the kth Watson-specific or Crick-specific PCR, respectively) is drawn from a Binomial distribution with $n_{i,W}$ or $n_{i,C}$ "trials" and probability q of "success" for the Watson and Crick copies, respectively. Therefore, the probability of partitioning at least one Watson-derived PCR copy into the kth Watson-specific PCR reaction is:

$$P(N_{k,W} > 0) = 1 - (1-q)^{n_{i,W}}$$

Similarly, the probability of partitioning at least one Crick-derived PCR copy into the kth Crick-specific PCR reaction is:

$$P(N_{k,C} > 0) = 1 - (1-q)^{n_{i,C}}$$

Both strands of an original DNA duplex can only be recovered if $N_{k,W}$ and $N_{k,C}$ are greater than zero. Because the partitioning of the PCR progeny is independent, the probability duplex recovery is therefore predicted to be:

$$P(N_{k,W} > 0, N_{k,C} > 0) = [1 - (1-q)^{n_{i,W}}][1 - (1-q)^{n_{i,C}}]$$

We varied the PCR efficiency from 100% to 50%, the number of library amplification cycles from 1 to 11, and the fraction of the library used for each reaction from 50% to 1.4%. For each condition, we conducted 10,000 simulations of the above described process and report the average duplex recovery in FIG. 28.

Fragment Size and Recovery with Anchored Hemi-Nested PCR

Anchored hemi-nested PCR theoretically demonstrates a higher recovery of template molecules than traditional amplicon PCR. In traditional amplicon PCR, a template molecule must contain the both forward and reverse primer binding sites and the intervening sequence that defines the amplicon. In contrast, in anchored hemi-nested PCR, the template molecules need only harbor the union of the two gene-specific primer binding sites in order to be recovered. The combined footprints of the nested gene-specific primers used in SaferSeqS are approximately 30 bp, whereas the amplicon lengths employed by SafeSeqS for profiling cfDNA are typically 70-80 bp. Formally, assuming uniformly random fragment start/end coordinates, the probability of recovering a template molecule of length L is $$\frac{L-r}{L}$$

where r is the amplicon length in the case of traditional PCR or the length of the combined footprint of the gene specific primers in the case of anchored hemi-nested PCR. Thus, for cell-free DNA fragments of size ~167 bp, anchored hemi-nested PCR can theoretically recover ~25% more of the original template fragments than traditional amplicon PCR. Furthermore, unlike traditional amplicon PCR which produces predefined product sizes of that are dictated by the positions of the forward and reverse primers, anchored hemi-nested produces fragments of varying lengths with only one of the fragment ends dictated by the positions of the gene specific primers. Assuming template molecules of length L with uniformly random start/end coordinates, the observed fragment length after anchored hemi-nested PCR will be $$\frac{L-r}{2}$$

where r is the length of the combined footprint of the gene specific primers.

Exemplary Embodiment of SaferSeqS Bioinformatic Pipeline

In an exemplary embodiment of a SaferSeqS bioinformatics pipeline, the Watson and Crick reads for each sample were merged into a single BAM file and sorted by read name using SAMtools so that mate pairs could be readily extracted. Custom Python scripts were used for subsequent reconstruction of the duplex families and identification of Watson supermutants, Crick supermutants, and supercalimutants.

First, reads were grouped into UID families while taking note of which reads were derived from the Watson and Crick strand by examining the value of their bitwise flag (i.e. FLAG field). Reads containing bitwise flagwise values of 99 and 147 are derived from the Watson strand and those containing bitwise flags of 83 and 163 are derived from the Crick strand. Reads with any other bitwise flag values were excluded from subsequent analysis. Bitwise flags are numerical values that are assigned to read pairs during mapping. Their value indicates how the read mates align to the genome relative to one another. For example, if a read maps to the reference strand and its mate maps to the reverse (complementary) strand, then this read pair was derived from the Watson strand. Similarly, if a read maps to the reverse (complementary) strand and its mate maps to the reference strand, then this read pair was derived from the Crick strand.

Second, two additional quality control criteria were imposed during UID family grouping to improve determination of the endogenous molecular barcode (i.e. fragment end coordinate): 1) reads with soft clipping at the 5' or 3' of the fragment ends were excluded, 2) reads were required to contain the expected constant tag sequence (GCCGTCGTTTTAT; SEQ ID NO:117) immediately following the exogenous UID with no more than one mismatch.

Third, because in this example the number of possible exogenous UID sequences greatly exceeds the number of starting template molecules, "barcode collisions" in which two molecules share the same exogenous UID sequence but have different endogenous UIDs should be exceedingly rare.

Specifically, the expected number of barcode collisions can be calculated from the classical "birthday problem" and is:

$$E[X] = n\left\{1 - \left(1 - \frac{1}{N}\right)^{n-1}\right\}$$

where n is equal to the number of template molecules and N is equal to the number of possible barcodes. For a 14 bp exogenous UID sequence (comprising a total of 268,435,456 possible sequences) and 10,000 genome equivalents, the expected number of collisions is 0.37, or 0.0037% of the input. For this example, it was therefore required that each exogenous UID sequence could only be associated with one endogenous UID. In instances where an exogenous UID was associated with more than one endogenous UID, the largest family was preserved and all others were discarded.

It should be noted that in other experimental design parameters, non-unique exogenous UIDs may be used, and non-unique exogenous UID can be used in combination with endogenous UIDs for assignment into UID families.

Finally, because the exogenous barcodes themselves are susceptible to PCR and sequencing errors, we error-corrected UID sequences and regrouped the UID families using the UMI-tools network adjacency method.

After the reads were assembled into UID families, Watson supermutants, Crick supermutants, and supercalimutants were called as described elsewhere herein. To exclude common polymorphisms, all mutations in the Genome Aggregation Database (gnomeAD) present at an allele frequency greater than 0.1% were excluded. Reads comprising supercalimutants were subjected to a final manual inspection to exclude possible alignment artifacts.

Estimates of Non-Clonal Somatic Mutation Rates

The DNA used in this study was obtained from a set of individuals of average age 30. As a result, the expected frequency of non-clonal somatic single base substitutions in these samples is 426 per diploid genome, or approximately $7 \times 10^{-8}$ mutations per bp. In this study we evaluated a total of 42,695,395 bases with SaferSeqS from DNA derived from healthy control subjects. Among these 42,695,395 bases, 5 single base substitution supercalimutants, representing a mutation frequency of $12 \times 10^{-8}$ were detected. To determine whether the frequency of supercalimutants observed is in accordance with previous estimates of non-clonal somatic mutation rates in healthy blood cells, the following exact one-sided binomial p-value was calculate:

$$P(X \geq 5) = 1 - \sum_{k=0}^{4} \binom{42,695,395}{k}(7*10^{-8})^k(1 - 7*10^{-8})^{42,695,395-k} = 0.19$$

Therefore, there is no statistically significance difference between the number of supercalimutants observed and the predicted number of age-associated non-clonal somatic mutations arising from healthy hematopoietic stem cells.

Anchored Hemi-Nested PCR

Target enrichment of the regions of interest was achieved using critical modifications of anchored hemi-nested PCR necessary for duplex sequencing. During the development of this custom stand-specific assay, various reaction conditions were optimized, including the number of cycles, the primer concentrations, and the polymerase formulation. The final optimized protocol was as follows: the first round of PCR was performed in a 50 µL reaction with following conditions: 1×NEBNext Ultra II Q5 Master Mix (New England BioLabs, cat. #M0544L), 2 µM GSP1 primer, and 2 µM P7 short anchor primer for amplification of the Watson strand. The GSP1 primer was specific for each amplicon, and the P7 short anchor primer was used as the anchor primer for the Watson strand of all amplicons (Tables 11 and 12). The Crick strand was amplified the same way, in a separate well, except that the P5 short primer anchor primer was substituted for the P7 short primer. Note that the GSP1 primer used for amplification of the Watson strand was identical to the GSP1 primer used for the Crick strand; the only difference between the Watson and Crick strand PCRs was the anchor primers. Both reactions (Watson and Crick strands) were amplified with 19 cycles according to the thermocycling protocol described above.

For the Watson strand, a second round of PCR was formed in 50 µl reactions using the identical reaction conditions used for the first round of PCR. The differences were (i) Template: 1% of product from the first anchored Watson strand PCR was used as the template (instead of the library used as template for the first PCR), and (ii) Primers: the gene-specific primers GSP2 were substituted for the GSP1 gene-specific primers and anchor P5 indexing primer was substituted for the P7 short anchor primer. The second round of PCR for the Crick strand was performed identically except that (i) Template: the first Crick strand PCR was used as the template and (ii) Primers: anchor P7 indexing primer was substituted for anchor P5 indexing primer. Both reactions (Watson and Crick strands) were amplified with 17 cycles according to the thermocycling protocol described previously. Sequences of the primers used for the second round of PCR are listed in Table 12. The products of the second round of PCR were pool and purified with 1.8×SPRI beads prior to sequencing.

For experiments in which multiple targets were simultaneously amplified within a single reaction, the PCR conditions were identical to those described above except: (i) each gene-specific primer was included at a final concentration of 0.25 µM, and (ii) the concentration of the anchor primer was included at a final concentration of 0.25 µM per target (e.g. at a final concentration of 6.25 µM if 25 targets were co-amplified).

Sequencing

Library concentrations were determined using a KAPA Library Quantification Kit (KAPA Biosystems, cat. #KK4824) as described by the manufacturer. Sequencing was performed using 2×75 paired-end reads with eight base dual-indexing on an Illumina MiSeq instrument. A dual-indexed PhiX control library (SeqMatic cat. #TM-502-ND) was spiked in at 25% of the total templates to ensure base diversity across all cycles. Custom read 1, index, and read 2 sequencing primers (Table 12) were combined with standard Illumina sequencing primers at a final concentration of 1 µM.

Mutation Calling and SaferSeqS Analysis Pipeline

Analysis of SafeSeqS data was performed as described elsewhere (see, e.g., Kinde et al., 2011 *Proc Natl Acad Sci USA* 108:9530-9535) using custom Python scripts. Sequencing reads underwent initial processing by extracting the first 14 nucleotides as the UID sequence and masking adapter sequences using Picard's IlluminaBasecallsToSam (broadinstitute.github.io/picard). Reads were then mapped to the hg19 reference genome using BWA-MEM (version 0.7.17) and sorted by UID sequence using SAMtools. UID families were scored if they consisted of 2 or more reads and if >90% of the reads mapped to the reference genome with the expected primer sequences. "Supermutants" were identified as mutations that were present in >95% of the mapped reads and had an average Phred score greater than 25.

A custom analysis pipeline was developed for the analysis of SaferSeqS. In brief, reads were demultiplexed, and the strand from which the reads were derived was identified using the index sequences. For clarity and succinctness, reads derived from the Watson strand are referred to as "Watson reads," and reads derived from the Crick strand are referred to as "Crick reads." For the Watson reads, the first 14 bases of read 1 were extracted as the UID sequence. Because the orientation of the insert is reversed for the Crick strand, the first 14 bases of read 2 were extracted as the UID sequence for the Crick reads. Adapter sequences were masked using Picard's IlluminaBasecallsToSam (broadinstitute.github.io/picard), and the resulting template-specific portions of the reads were mapped to the hg19 reference genome using BWA-MEM (version 0.7.17). Following alignment, the mapped Watson and Crick reads merged and sorted using SAMtools.

Python scripts were used for subsequent reconstruction of the duplex families and identification of Watson supermutants, Crick supermutants, and supercalimutants. After correcting for PCR and sequencing errors within the molecular barcode sequences as described elsewhere (see, e.g., Smith et al., 2017 *Genome Res* 27:491-499), Watson and Crick reads belonging to the same duplex family were grouped together to reconstruct the sequence of the original template molecule. To exclude artifacts stemming from the end repair step of library construction, bases fewer than 10 bases from the 3' adapter sequence were not considered for mutation analysis. Watson and Crick supermutants were defined as mutations present in >80% of the Watson or Crick reads of a duplex family, respectively. Supercalimutants were defined as mutations present in >80% of both the Watson and Crick families with the same UID.

Statistical Analyses

Continuous variables were reported as medians and range, while categorical variables were reported as whole numbers and percentages. All statistical tests were conducted using R's stats package (version 3.5.1).

These results demonstrate that SaferSeqS can detect rare mutations with extremely high specificity. The technique is highly scalable, cost effective, and amenable to high-throughput automation. SaferSeqS achieved up to a 5- to 75-fold improvement in input recovery over existing duplex sequencing techniques and can be applied to limited amounts of starting material, and resulted in a >50-fold improvement in error correction over standard PCR-based approaches employing molecular barcodes (FIG. 23, Table 8). It also offers a >50-fold improvement in error correction over optimal ligation-based techniques that employ only Watson or Crick supermutants rather than supercalimutants (FIG. 26, Table 9). Both reductions are useful for to the detection of mutations present at single or very low copy number, such as in cancer screening and minimal residual disease settings. Finally, because it incorporates duplex sequencing, SaferSeqS is considerably more sensitive than digital droplet PCR for the analysis of single amplicons, and, unlike digital droplet PCR, can be highly multiplexed.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

INCORPORATION BY REFERENCE

All references, issued patents and patent applications cited within the body of the instant specification are hereby incorporated by reference in their entirety, for all purposes.

What is claimed is:

1. A method, comprising:
   a) amplifying a plurality of adapter-double-stranded cell-free DNA fragments (ADScfDFs) with first and second universal primers,
   wherein each of said ADScfDFs comprise: a target Watson strand hybridized to a target Crick strand, a universal 3' adapter attached to a 3' end of said target Watson and Crick strands, and a universal 5' adapter attached to a 5' end of said target Watson and Crick strands, wherein said universal 3' adapters each comprise a universal 3' adapter sequence,
   wherein attachment of said universal 3' adapters followed by annealing and extending the universal 5' adapters and ligating them to the 5' ends to form the ADScfDFs provides a double stranded unique identifier (dsUID) sequence and single-stranded non-complementary 3' and 5' universal adapter sequences on each end of each of said ADScfDFs, wherein one strand of each dsUID is generated in situ after said universal 3' adapters are attached to the strands and prior to said amplifying, and further wherein said attachment of said universal adapters comprises
   1) attaching 3' adapters to 3' ends of a plurality of both Watson and Crick strands of a plurality of double-stranded DNA fragments of an analyte DNA sample obtained from cfDNA, whereby the plurality of Watson and Crick strands are UID labeled and uniquely identified,
   wherein a first strand of the 3' adapters comprises, in the 5'-3' direction, (i) a first segment, (ii) a single stranded UID (ssUID) sequence from a set of ssUIDs, (iii) an annealing site for the universal 5' adapter, and (iv) the universal 3' adapter sequence, and
   wherein the second strand of the 3' adapters comprises, in the 5' to 3' direction, (i) a segment complementary to the first segment, and (ii) a 3' blocking group,
   2) annealing the universal 5' adapters to said annealing site, wherein the universal 5' adapters comprise, in the 5' to 3' direction, (i) a universal 5' adapter sequence that is not complementary to the universal 3' adapter sequence, and (ii) a sequence complementary to the annealing site for the universal 5' adapter;
   3) Extending the universal 5' adapters across said ssUID sequence and said first segment, thereby generating the complement of said ssUID sequence and complement of said first segment to obtain extended universal 5' adapters; and 4) covalently linking the 3' end of said complement of said first segment to the 5' ends of the Watson and Crick strands of the double-stranded cfDNA fragments having 3' adapters attached to the 3' ends, thereby attaching extended universal 5' adapters to said 5' ends of said Watson and Crick strands to obtain each of the ADScfDFs;

wherein said first universal primer is complementary to said universal 3' adapter sequence and said second universal primer is complementary to the complement of said universal 5' adapter sequence, wherein said amplifying in step a) generates a duplex sequencing library sample comprising: i) a plurality of dsUID-labelled double-stranded templates (dsUID-dsTs);

b) amplifying a first aliquot from said duplex sequencing library sample with a first set of Watson target-selective primer pairs comprising: (i) a first Watson target-selective primer comprising a sequence complementary to the universal 3' adapter sequence, and (ii) a second Watson target-selective primer comprising a first Watson target-selective sequence, thereby: i) generating dsUID labelled double-stranded target Watson amplification products (dsUID-dsTWAPs) and ii) not generating dsUID labelled double-stranded target Crick amplification products (dsUID-dsTCAPs) in said first aliquot;

c) amplifying said dsUID-dsTWAPs with a second set of Watson target-selective primers comprising: (i) a third Watson target-selective primer comprising: A) a sequence complementary to said universal 3' adapter sequence, and B) a Watson sample index barcode, and (ii) a fourth Watson target-selective primer comprising a second Watson target-selective sequence that is nested with respect to said first Watson target-selective sequence, thereby creating a first sample comprising a plurality of dsUID-labelled double-stranded target Watson library members (dsUID-dsTWLMs);

d) amplifying a second aliquot from said duplex sequencing library sample with a first set of Crick target-selective primer pairs comprising: (i) a first Crick target-selective primer comprising a sequence complementary to the complement of said universal 5' adapter sequence, and (ii) a second Crick target-selective primer comprising a first Crick target-selective sequence that comprises the same target-selective sequence as said first Watson target-selective sequence, thereby: i) generating dsUID-dsTCAPs and ii) not generating said dsUID-dsTWAPs in said second aliquot;

e) amplifying said dsUID-dsTCAPs with a second set of Crick target-selective primers comprising: (i) a third Crick target-selective primer comprising: A) a sequence complementary to the complement of said universal 5' adapter sequence, and B) a Crick sample index barcode, and (ii) a fourth Crick target-selective primer comprising a second Crick target-selective sequence that is nested with respect to said first Crick target-selective sequence and comprises the same target-selective sequence as said second Watson target-selective sequence, thereby creating a second sample comprising a plurality of dsUID-double-stranded target Crick library members (dsUID-dsTCLMs);

f) pooling said first sample and said second sample to generate a combined sample comprising dsUID-dsTWLMs and dsUID-dsTCLMs;

g) sequencing said dsUID-dsTWLMs and dsUID-dsTCLMs to generate:
i) a plurality of UID-labeled Watson strand reads that comprise: A) a target Watson strand read, and B) a Watson sample index barcode read, and
ii) a plurality of UID-labeled Crick strand reads that comprise: A) a target Crick strand read, and B) a Crick sample index barcode read; and h) processing said plurality of UID-labeled Watson strand reads and said UID-labeled Crick strand reads with a computer system to identify the presence of a mutation in one of said ADScfDFs, and identifying a mutation as present when present in said target Watson strand read and a corresponding mutation is present in said target Crick strand read.

2. The method of claim 1, wherein said amplifying in step a) employs no more than 50 cycles of PCR.

3. The method of claim 1, wherein said processing with said computer system comprises: i) assigning said UID-labeled Watson and Crick strand reads into UID families, wherein each member of a UID family comprises the same UID sequence.

4. The method of claim 3, wherein said processing with said computer system further comprises: ii) assigning said UID-labeled Watson and Crick strand reads of each UID family into a Watson subfamily and Crick subfamily based on the presence of said Watson sample index barcode read or said Crick sample index barcode read.

5. The method of claim 4, wherein said processing with said computer system further comprises: iii) identifying a first target Watson read as accurately representing a first target Watson strand of one of said ADScfDFs when at least 50% of members of the Watson subfamily contain the same nucleic acid sequence, and iv) identifying a first target Crick strand read as accurately representing a first target Crick strand of said one of said ADScfDFs when at least 50% of members of the Crick subfamily contain the same nucleic acid sequence.

6. The method of claim 5, wherein said processing with said computer system further comprises: v) performing at least one of the following:
A) identifying the presence of a first Watson variant in said first target Watson strand read when said first target Watson strand read differs from a reference sequence that lacks said first Watson variant, and/or
B) identifying the presence of a first Crick variant in said first target Crick strand read when said first target Crick read differs from a reference sequence that lacks said first Crick variant.

7. The method of claim 6, wherein said processing with said computer system further comprises identifying the presence of a first bona fide mutation in one of said ADScfDFs when both said first Watson variant and said first Crick variant are present.

8. The method of claim 7, wherein said processing with said computer system further comprises reporting the presence of said first bona fide mutation.

9. The method of claim 5, wherein said at least 50% is greater than 80%.

10. The method of claim 1, wherein said third Watson target-selective primer further comprises: C) a first grafting sequence that permits hybridization to a first grafting primer on a sequencer.

11. The method of claim 10, wherein said third Crick target-selective primer further comprises: C) a second grafting sequence that permits hybridization to a second grafting primer on said sequencer.

12. The method of claim 1, wherein cell free DNA fragments are from a plasma sample.

13. The method of claim 1, wherein the identified mutation is present in a population of double-stranded DNA fragments at a frequency of 0.1% or less.

14. The method of claim 1, wherein the identified mutation is present in a population of double-stranded DNA fragments at a frequency of 0.1% to 0.01%.

15. The method of claim 1, wherein the identified mutation is present in a population of double-stranded DNA fragments at a frequency of 0.1% to 0.00001%.

16. The method of claim 1, wherein no hybridization capture is employed at any point during the method.

17. The method of claim 1, wherein said amplifying in step a) employs no more than 18 cycles of PCR.

18. The method of claim 1, wherein said amplifying in step a) employs no more than 11 cycles of PCR.

19. The method of claim 1, wherein said amplifying in step a) employs no more than 7 cycles of PCR.

* * * * *

UNITED STATES PATENT AND TRADEMARK OFFICE
CERTIFICATE OF CORRECTION

PATENT NO. : 12,442,038 B2
APPLICATION NO. : 18/899799
DATED : October 14, 2025
INVENTOR(S) : Nickolas Papadopoulos et al.

Page 1 of 1

It is certified that error appears in the above-identified patent and that said Letters Patent is hereby corrected as shown below:

In the Claims

Claim 1: Column 104, Line 63, delete "Extending" and insert -- extending --, therefor.

Signed and Sealed this
Sixteenth Day of December, 2025

John A. Squires
*Director of the United States Patent and Trademark Office*

SEQUENCE LISTING

```
Sequence total quantity: 117
SEQ ID NO: 1            moltype = DNA  length = 59
FEATURE                 Location/Qualifiers
misc_difference         57..58
                        note = Residues 57-58 are connected by a phosphorothioate
                        bond
misc_difference         58..59
                        note = Residues 58-59 are connected by a phosphorothioate
                        bond
source                  1..59
                        mol_type = other DNA
                        organism = synthetic construct
SEQUENCE: 1
ataaaacgac ggcnnnnnnn nnnnnnnaga tcggaagagc acacgtctga actccagtc    59

SEQ ID NO: 2            moltype =   length =
SEQUENCE: 2
000

SEQ ID NO: 3            moltype = DNA  length = 13
FEATURE                 Location/Qualifiers
modified_base           5
                        mod_base = OTHER
                        note = deoxyuridine
modified_base           8
                        mod_base = OTHER
                        note = deoxyuridine
modified_base           9
                        mod_base = OTHER
                        note = deoxyuridine
```

```
modified_base           10
                        mod_base = OTHER
                        note = deoxyuridine
modified_base           11
                        mod_base = OTHER
                        note = deoxyuridine
modified_base           13
                        mod_base = OTHER
                        note = 3'-deoxythymidine
source                  1..13
                        mol_type = other DNA
                        organism = synthetic construct
SEQUENCE: 3
gccgtcgttt tat                                                          13

SEQ ID NO: 4            moltype = DNA   length = 33
FEATURE                 Location/Qualifiers
source                  1..33
                        mol_type = other DNA
                        organism = synthetic construct
SEQUENCE: 4
acactctttc cctacacgac gctcttccga tct                                    33

SEQ ID NO: 5            moltype = DNA   length = 32
FEATURE                 Location/Qualifiers
source                  1..32
                        mol_type = other DNA
                        organism = synthetic construct
SEQUENCE: 5
gactggagtt cagacgtgtg ctcttccgat ct                                     32

SEQ ID NO: 6            moltype = DNA   length = 17
FEATURE                 Location/Qualifiers
source                  1..17
                        mol_type = other DNA
                        organism = synthetic construct
SEQUENCE: 6
tgcgtggctc tcaccac                                                      17

SEQ ID NO: 7            moltype = DNA   length = 17
FEATURE                 Location/Qualifiers
source                  1..17
                        mol_type = other DNA
                        organism = synthetic construct
SEQUENCE: 7
cacccgcacg tctgtag                                                      17

SEQ ID NO: 8            moltype = DNA   length = 20
FEATURE                 Location/Qualifiers
source                  1..20
                        mol_type = other DNA
                        organism = synthetic construct
SEQUENCE: 8
acaggatctt cagctgacct                                                   20

SEQ ID NO: 9            moltype = DNA   length = 21
FEATURE                 Location/Qualifiers
source                  1..21
                        mol_type = other DNA
                        organism = synthetic construct
SEQUENCE: 9
cttcagctga cctagttcca a                                                 21

SEQ ID NO: 10           moltype = DNA   length = 21
FEATURE                 Location/Qualifiers
source                  1..21
                        mol_type = other DNA
                        organism = synthetic construct
SEQUENCE: 10
cctggctctg accattctgt t                                                 21

SEQ ID NO: 11           moltype = DNA   length = 20
FEATURE                 Location/Qualifiers
source                  1..20
                        mol_type = other DNA
                        organism = synthetic construct
SEQUENCE: 11
ccattctgtt ctctctggca                                                   20
```

```
SEQ ID NO: 12          moltype = DNA   length = 18
FEATURE                Location/Qualifiers
source                 1..18
                       mol_type = other DNA
                       organism = synthetic construct
SEQUENCE: 12
aacaccgcag catgtcaa                                                       18

SEQ ID NO: 13          moltype = DNA   length = 21
FEATURE                Location/Qualifiers
source                 1..21
                       mol_type = other DNA
                       organism = synthetic construct
SEQUENCE: 13
gcagcatgtc aagatcacag a                                                   21

SEQ ID NO: 14          moltype = DNA   length = 24
FEATURE                Location/Qualifiers
source                 1..24
                       mol_type = other DNA
                       organism = synthetic construct
SEQUENCE: 14
ttgtgcagag ttcagttacc ttag                                                24

SEQ ID NO: 15          moltype = DNA   length = 27
FEATURE                Location/Qualifiers
source                 1..27
                       mol_type = other DNA
                       organism = synthetic construct
SEQUENCE: 15
gagttcagtt accttaggag atttgag                                             27

SEQ ID NO: 16          moltype = DNA   length = 21
FEATURE                Location/Qualifiers
source                 1..21
                       mol_type = other DNA
                       organism = synthetic construct
SEQUENCE: 16
ggcctgtctc aatatcccaa a                                                   21

SEQ ID NO: 17          moltype = DNA   length = 24
FEATURE                Location/Qualifiers
source                 1..24
                       mol_type = other DNA
                       organism = synthetic construct
SEQUENCE: 17
gtctcaatat cccaaaccct aaga                                                24

SEQ ID NO: 18          moltype = DNA   length = 23
FEATURE                Location/Qualifiers
source                 1..23
                       mol_type = other DNA
                       organism = synthetic construct
SEQUENCE: 18
ggaacttggt ctcaaagatt cca                                                 23

SEQ ID NO: 19          moltype = DNA   length = 24
FEATURE                Location/Qualifiers
source                 1..24
                       mol_type = other DNA
                       organism = synthetic construct
SEQUENCE: 19
ggtctcaaag attccagaag tcag                                                24

SEQ ID NO: 20          moltype = DNA   length = 24
FEATURE                Location/Qualifiers
source                 1..24
                       mol_type = other DNA
                       organism = synthetic construct
SEQUENCE: 20
tctgaattag ctgtatcgtc aagg                                                24

SEQ ID NO: 21          moltype = DNA   length = 21
FEATURE                Location/Qualifiers
source                 1..21
                       mol_type = other DNA
                       organism = synthetic construct
SEQUENCE: 21
tatcgtcaag gcactcttgc c                                                   21
```

```
SEQ ID NO: 22          moltype = DNA   length = 31
FEATURE                Location/Qualifiers
source                 1..31
                       mol_type = other DNA
                       organism = synthetic construct
SEQUENCE: 22
ctgtatttat ttcagtgtta cttacctgtc t                               31

SEQ ID NO: 23          moltype = DNA   length = 24
FEATURE                Location/Qualifiers
source                 1..24
                       mol_type = other DNA
                       organism = synthetic construct
SEQUENCE: 23
agtgttactt acctgtcttg tctt                                       24

SEQ ID NO: 24          moltype = DNA   length = 21
FEATURE                Location/Qualifiers
source                 1..21
                       mol_type = other DNA
                       organism = synthetic construct
SEQUENCE: 24
gactgagtac aaactggtgg t                                          21

SEQ ID NO: 25          moltype = DNA   length = 19
FEATURE                Location/Qualifiers
source                 1..19
                       mol_type = other DNA
                       organism = synthetic construct
SEQUENCE: 25
aaactggtgg tggttggag                                             19

SEQ ID NO: 26          moltype = DNA   length = 24
FEATURE                Location/Qualifiers
source                 1..24
                       mol_type = other DNA
                       organism = synthetic construct
SEQUENCE: 26
tttcgtaagt gttactcaag aagc                                       24

SEQ ID NO: 27          moltype = DNA   length = 24
FEATURE                Location/Qualifiers
source                 1..24
                       mol_type = other DNA
                       organism = synthetic construct
SEQUENCE: 27
agtgttactc aagaagcaga aagg                                       24

SEQ ID NO: 28          moltype = DNA   length = 27
FEATURE                Location/Qualifiers
source                 1..27
                       mol_type = other DNA
                       organism = synthetic construct
SEQUENCE: 28
gcatcagcat ttgactttac cttatca                                    27

SEQ ID NO: 29          moltype = DNA   length = 28
FEATURE                Location/Qualifiers
source                 1..28
                       mol_type = other DNA
                       organism = synthetic construct
SEQUENCE: 29
catttgactt taccttatca atgtctcg                                   28

SEQ ID NO: 30          moltype = DNA   length = 22
FEATURE                Location/Qualifiers
source                 1..22
                       mol_type = other DNA
                       organism = synthetic construct
SEQUENCE: 30
gcatgctgtt taattgtgtg ga                                         22

SEQ ID NO: 31          moltype = DNA   length = 23
FEATURE                Location/Qualifiers
source                 1..23
                       mol_type = other DNA
                       organism = synthetic construct
SEQUENCE: 31
```

```
tgtgtggaag atccaatcca ttt                                            23

SEQ ID NO: 32         moltype = DNA   length = 22
FEATURE               Location/Qualifiers
source                1..22
                      mol_type = other DNA
                      organism = synthetic construct
SEQUENCE: 32
ccatagaaat ctagggcctc tt                                             22

SEQ ID NO: 33         moltype = DNA   length = 20
FEATURE               Location/Qualifiers
source                1..20
                      mol_type = other DNA
                      organism = synthetic construct
SEQUENCE: 33
tagggcctct tgtgccttta                                                20

SEQ ID NO: 34         moltype = DNA   length = 17
FEATURE               Location/Qualifiers
source                1..17
                      mol_type = other DNA
                      organism = synthetic construct
SEQUENCE: 34
ggcctgccct tccaatg                                                   17

SEQ ID NO: 35         moltype = DNA   length = 19
FEATURE               Location/Qualifiers
source                1..19
                      mol_type = other DNA
                      organism = synthetic construct
SEQUENCE: 35
ttccaatgga tccactcac                                                 19

SEQ ID NO: 36         moltype = DNA   length = 17
FEATURE               Location/Qualifiers
source                1..17
                      mol_type = other DNA
                      organism = synthetic construct
SEQUENCE: 36
gcagcctctg gcattct                                                   17

SEQ ID NO: 37         moltype = DNA   length = 19
FEATURE               Location/Qualifiers
source                1..19
                      mol_type = other DNA
                      organism = synthetic construct
SEQUENCE: 37
ggcattctgg gagcttcat                                                 19

SEQ ID NO: 38         moltype = DNA   length = 20
FEATURE               Location/Qualifiers
source                1..20
                      mol_type = other DNA
                      organism = synthetic construct
SEQUENCE: 38
gccaggcatt gaagtctcat                                                20

SEQ ID NO: 39         moltype = DNA   length = 21
FEATURE               Location/Qualifiers
source                1..21
                      mol_type = other DNA
                      organism = synthetic construct
SEQUENCE: 39
attgaagtct catggaagcc a                                              21

SEQ ID NO: 40         moltype = DNA   length = 18
FEATURE               Location/Qualifiers
source                1..18
                      mol_type = other DNA
                      organism = synthetic construct
SEQUENCE: 40
ccgtcatgtg ctgtgact                                                  18

SEQ ID NO: 41         moltype = DNA   length = 20
FEATURE               Location/Qualifiers
source                1..20
                      mol_type = other DNA
                      organism = synthetic construct
```

```
SEQUENCE: 41
gtgctgtgac tgcttgtaga                                                   20

SEQ ID NO: 42          moltype = DNA   length = 21
FEATURE                Location/Qualifiers
source                 1..21
                       mol_type = other DNA
                       organism = synthetic construct
SEQUENCE: 42
ccaaatactc cacacgcaaa t                                                 21

SEQ ID NO: 43          moltype = DNA   length = 20
FEATURE                Location/Qualifiers
source                 1..20
                       mol_type = other DNA
                       organism = synthetic construct
SEQUENCE: 43
cacacgcaaa tttccttcca                                                   20

SEQ ID NO: 44          moltype = DNA   length = 22
FEATURE                Location/Qualifiers
source                 1..22
                       mol_type = other DNA
                       organism = synthetic construct
SEQUENCE: 44
ggagtcttcc agtgtgatga tg                                                22

SEQ ID NO: 45          moltype = DNA   length = 20
FEATURE                Location/Qualifiers
source                 1..20
                       mol_type = other DNA
                       organism = synthetic construct
SEQUENCE: 45
gtgatgatgg tgaggatggg                                                   20

SEQ ID NO: 46          moltype = DNA   length = 18
FEATURE                Location/Qualifiers
source                 1..18
                       mol_type = other DNA
                       organism = synthetic construct
SEQUENCE: 46
cacaaacacg cacctcaa                                                     18

SEQ ID NO: 47          moltype = DNA   length = 19
FEATURE                Location/Qualifiers
source                 1..19
                       mol_type = other DNA
                       organism = synthetic construct
SEQUENCE: 47
acgcacctca aagctgttc                                                    19

SEQ ID NO: 48          moltype = DNA   length = 18
FEATURE                Location/Qualifiers
source                 1..18
                       mol_type = other DNA
                       organism = synthetic construct
SEQUENCE: 48
aactgcaccc ttggtctc                                                     18

SEQ ID NO: 49          moltype = DNA   length = 18
FEATURE                Location/Qualifiers
source                 1..18
                       mol_type = other DNA
                       organism = synthetic construct
SEQUENCE: 49
cctccaccgc ttcttgtc                                                     18

SEQ ID NO: 50          moltype = DNA   length = 25
FEATURE                Location/Qualifiers
source                 1..25
                       mol_type = other DNA
                       organism = synthetic construct
SEQUENCE: 50
gaaactttcc acttgataag aggtc                                             25

SEQ ID NO: 51          moltype = DNA   length = 22
FEATURE                Location/Qualifiers
source                 1..22
                       mol_type = other DNA
```

```
                                    -continued organism = synthetic construct
SEQUENCE: 51
tgataagagg tcccaagact ta                                                    22

SEQ ID NO: 52          moltype = DNA   length = 17
FEATURE                Location/Qualifiers
source                 1..17
                       mol_type = other DNA
                       organism = synthetic construct
SEQUENCE: 52
agtagggcca ggaaggg                                                          17

SEQ ID NO: 53          moltype = DNA   length = 17
FEATURE                Location/Qualifiers
source                 1..17
                       mol_type = other DNA
                       organism = synthetic construct
SEQUENCE: 53
gggctgaggt cactcac                                                          17

SEQ ID NO: 54          moltype = DNA   length = 17
FEATURE                Location/Qualifiers
source                 1..17
                       mol_type = other DNA
                       organism = synthetic construct
SEQUENCE: 54
tgggaggctg tcagtgg                                                          17

SEQ ID NO: 55          moltype = DNA   length = 21
FEATURE                Location/Qualifiers
source                 1..21
                       mol_type = other DNA
                       organism = synthetic construct
SEQUENCE: 55
gggaacaaga agtggagaat g                                                     21

SEQ ID NO: 56          moltype = DNA   length = 20
FEATURE                Location/Qualifiers
source                 1..20
                       mol_type = other DNA
                       organism = synthetic construct
SEQUENCE: 56
tgcttaggtc cactctctct                                                       20

SEQ ID NO: 57          moltype = DNA   length = 23
FEATURE                Location/Qualifiers
source                 1..23
                       mol_type = other DNA
                       organism = synthetic construct
SEQUENCE: 57
gtccactctc tctcttttca gca                                                   23

SEQ ID NO: 58          moltype = DNA   length = 22
FEATURE                Location/Qualifiers
source                 1..22
                       mol_type = other DNA
                       organism = synthetic construct
SEQUENCE: 58
acaactgttc aaactgatgg ga                                                    22

SEQ ID NO: 59          moltype = DNA   length = 18
FEATURE                Location/Qualifiers
source                 1..18
                       mol_type = other DNA
                       organism = synthetic construct
SEQUENCE: 59
atgggaccca ctccatcg                                                         18

SEQ ID NO: 60          moltype = DNA   length = 20
FEATURE                Location/Qualifiers
source                 1..20
                       mol_type = other DNA
                       organism = synthetic construct
SEQUENCE: 60
ttagtcactg gcagcaacag                                                       20

SEQ ID NO: 61          moltype = DNA   length = 19
FEATURE                Location/Qualifiers
source                 1..19
```

```
                        mol_type = other DNA
                        organism = synthetic construct
SEQUENCE: 61
ggcagcaaca gtcttacct                                                    19

SEQ ID NO: 62           moltype = DNA   length = 21
FEATURE                 Location/Qualifiers
source                  1..21
                        mol_type = other DNA
                        organism = synthetic construct
SEQUENCE: 62
tagaggaaga agtcccaacc a                                                 21

SEQ ID NO: 63           moltype = DNA   length = 22
FEATURE                 Location/Qualifiers
source                  1..22
                        mol_type = other DNA
                        organism = synthetic construct
SEQUENCE: 63
gaagtcccaa ccatgacaag at                                                22

SEQ ID NO: 64           moltype = DNA   length = 20
FEATURE                 Location/Qualifiers
source                  1..20
                        mol_type = other DNA
                        organism = synthetic construct
SEQUENCE: 64
ctaacaaccc tcctgccatc                                                   20

SEQ ID NO: 65           moltype = DNA   length = 22
FEATURE                 Location/Qualifiers
source                  1..22
                        mol_type = other DNA
                        organism = synthetic construct
SEQUENCE: 65
ccctcctgcc atcatattga ac                                                22

SEQ ID NO: 66           moltype = DNA   length = 20
FEATURE                 Location/Qualifiers
source                  1..20
                        mol_type = other DNA
                        organism = synthetic construct
SEQUENCE: 66
actcctcctt tcttccctct                                                   20

SEQ ID NO: 67           moltype = DNA   length = 21
FEATURE                 Location/Qualifiers
source                  1..21
                        mol_type = other DNA
                        organism = synthetic construct
SEQUENCE: 67
tttcttccct ctctccacca g                                                 21

SEQ ID NO: 68           moltype = DNA   length = 22
FEATURE                 Location/Qualifiers
source                  1..22
                        mol_type = other DNA
                        organism = synthetic construct
SEQUENCE: 68
ggagcgatga cggaatataa gc                                                22

SEQ ID NO: 69           moltype = DNA   length = 22
FEATURE                 Location/Qualifiers
source                  1..22
                        mol_type = other DNA
                        organism = synthetic construct
SEQUENCE: 69
ggaatataag ctggtggtgg tg                                                22

SEQ ID NO: 70           moltype = DNA   length = 22
FEATURE                 Location/Qualifiers
source                  1..22
                        mol_type = other DNA
                        organism = synthetic construct
SEQUENCE: 70
ctcatgtact ggtccctcat tg                                                22

SEQ ID NO: 71           moltype = DNA   length = 21
FEATURE                 Location/Qualifiers
```

```
source                  1..21
                        mol_type = other DNA
                        organism = synthetic construct
SEQUENCE: 71
gtccctcatt gcactgtact c                                              21

SEQ ID NO: 72           moltype = DNA   length = 22
FEATURE                 Location/Qualifiers
source                  1..22
                        mol_type = other DNA
                        organism = synthetic construct
SEQUENCE: 72
gtgaaacctg tttgttggac at                                             22

SEQ ID NO: 73           moltype = DNA   length = 25
FEATURE                 Location/Qualifiers
source                  1..25
                        mol_type = other DNA
                        organism = synthetic construct
SEQUENCE: 73
cctgtttgtt ggacatactg gatac                                          25

SEQ ID NO: 74           moltype = DNA   length = 18
FEATURE                 Location/Qualifiers
source                  1..18
                        mol_type = other DNA
                        organism = synthetic construct
SEQUENCE: 74
cacggttgcc tactggtt                                                  18

SEQ ID NO: 75           moltype = DNA   length = 24
FEATURE                 Location/Qualifiers
source                  1..24
                        mol_type = other DNA
                        organism = synthetic construct
SEQUENCE: 75
gttgcctact ggttcaatta cttt                                           24

SEQ ID NO: 76           moltype = DNA   length = 25
FEATURE                 Location/Qualifiers
source                  1..25
                        mol_type = other DNA
                        organism = synthetic construct
SEQUENCE: 76
gaacagctca aagcaatttc tacac                                          25

SEQ ID NO: 77           moltype = DNA   length = 24
FEATURE                 Location/Qualifiers
source                  1..24
                        mol_type = other DNA
                        organism = synthetic construct
SEQUENCE: 77
aatttctaca cgagatcctc tctc                                           24

SEQ ID NO: 78           moltype = DNA   length = 19
FEATURE                 Location/Qualifiers
source                  1..19
                        mol_type = other DNA
                        organism = synthetic construct
SEQUENCE: 78
cgactcccag gtacttccg                                                 19

SEQ ID NO: 79           moltype = DNA   length = 20
FEATURE                 Location/Qualifiers
source                  1..20
                        mol_type = other DNA
                        organism = synthetic construct
SEQUENCE: 79
tacttccgga acctgtgctc                                                20

SEQ ID NO: 80           moltype = DNA   length = 21
FEATURE                 Location/Qualifiers
source                  1..21
                        mol_type = other DNA
                        organism = synthetic construct
SEQUENCE: 80
catgttgcag caattcactg t                                              21

SEQ ID NO: 81           moltype = DNA   length = 24
```

```
FEATURE                 Location/Qualifiers
source                  1..24
                        mol_type = other DNA
                        organism = synthetic construct
SEQUENCE: 81
caattcactg taaagctgga aagg                                          24

SEQ ID NO: 82           moltype = DNA   length = 21
FEATURE                 Location/Qualifiers
source                  1..21
                        mol_type = other DNA
                        organism = synthetic construct
SEQUENCE: 82
gggacagcat caaatcatcc a                                             21

SEQ ID NO: 83           moltype = DNA   length = 22
FEATURE                 Location/Qualifiers
source                  1..22
                        mol_type = other DNA
                        organism = synthetic construct
SEQUENCE: 83
atcaaatcat ccattgcttg gg                                            22

SEQ ID NO: 84           moltype = DNA   length = 19
FEATURE                 Location/Qualifiers
source                  1..19
                        mol_type = other DNA
                        organism = synthetic construct
SEQUENCE: 84
gtcacagact tggctgtcc                                                19

SEQ ID NO: 85           moltype = DNA   length = 18
FEATURE                 Location/Qualifiers
source                  1..18
                        mol_type = other DNA
                        organism = synthetic construct
SEQUENCE: 85
ttggctgtcc cagaatgc                                                 18

SEQ ID NO: 86           moltype = DNA   length = 18
FEATURE                 Location/Qualifiers
source                  1..18
                        mol_type = other DNA
                        organism = synthetic construct
SEQUENCE: 86
atcaacccac agctgcac                                                 18

SEQ ID NO: 87           moltype = DNA   length = 17
FEATURE                 Location/Qualifiers
source                  1..17
                        mol_type = other DNA
                        organism = synthetic construct
SEQUENCE: 87
tgcacagggc aggtctt                                                  17

SEQ ID NO: 88           moltype = DNA   length = 17
FEATURE                 Location/Qualifiers
source                  1..17
                        mol_type = other DNA
                        organism = synthetic construct
SEQUENCE: 88
ccagctgctc accatcg                                                  17

SEQ ID NO: 89           moltype = DNA   length = 20
FEATURE                 Location/Qualifiers
source                  1..20
                        mol_type = other DNA
                        organism = synthetic construct
SEQUENCE: 89
tcaccatcgc tatctgagca                                               20

SEQ ID NO: 90           moltype = DNA   length = 19
FEATURE                 Location/Qualifiers
source                  1..19
                        mol_type = other DNA
                        organism = synthetic construct
SEQUENCE: 90
tgacaaccac ccttaaccc                                                19
```

```
SEQ ID NO: 91              moltype = DNA   length = 21
FEATURE                    Location/Qualifiers
source                     1..21
                           mol_type = other DNA
                           organism = synthetic construct
SEQUENCE: 91
cagttgcaaa ccagacctca g                                                   21

SEQ ID NO: 92              moltype = DNA   length = 17
FEATURE                    Location/Qualifiers
source                     1..17
                           mol_type = other DNA
                           organism = synthetic construct
SEQUENCE: 92
gtgcagggtg gcaagtg                                                        17

SEQ ID NO: 93              moltype = DNA   length = 17
FEATURE                    Location/Qualifiers
source                     1..17
                           mol_type = other DNA
                           organism = synthetic construct
SEQUENCE: 93
ggcaagtggc tcctgac                                                        17

SEQ ID NO: 94              moltype = DNA   length = 22
FEATURE                    Location/Qualifiers
source                     1..22
                           mol_type = other DNA
                           organism = synthetic construct
SEQUENCE: 94
cctttcttgc ggagattctc tt                                                  22

SEQ ID NO: 95              moltype = DNA   length = 21
FEATURE                    Location/Qualifiers
source                     1..21
                           mol_type = other DNA
                           organism = synthetic construct
SEQUENCE: 95
cggagattct cttcctctgt g                                                   21

SEQ ID NO: 96              moltype = DNA   length = 24
FEATURE                    Location/Qualifiers
source                     1..24
                           mol_type = other DNA
                           organism = synthetic construct
SEQUENCE: 96
aaatattctc catccagtgg tttc                                                24

SEQ ID NO: 97              moltype = DNA   length = 21
FEATURE                    Location/Qualifiers
source                     1..21
                           mol_type = other DNA
                           organism = synthetic construct
SEQUENCE: 97
ccagtggttt cttctttggc t                                                   21

SEQ ID NO: 98              moltype = DNA   length = 19
FEATURE                    Location/Qualifiers
source                     1..19
                           mol_type = other DNA
                           organism = synthetic construct
SEQUENCE: 98
gggcatcctt gagttccaa                                                      19

SEQ ID NO: 99              moltype = DNA   length = 20
FEATURE                    Location/Qualifiers
source                     1..20
                           mol_type = other DNA
                           organism = synthetic construct
SEQUENCE: 99
cttgagttcc aaggcctcat                                                     20

SEQ ID NO: 100             moltype = DNA   length = 20
FEATURE                    Location/Qualifiers
source                     1..20
                           mol_type = other DNA
                           organism = synthetic construct
SEQUENCE: 100
tcaggccctt ctgtcttgaa                                                     20
```

```
SEQ ID NO: 101        moltype = DNA  length = 23
FEATURE               Location/Qualifiers
source                1..23
                      mol_type = other DNA
                      organism = synthetic construct
SEQUENCE: 101
ccttctgtct tgaacatgag ttt                                            23

SEQ ID NO: 102        moltype =      length =
SEQUENCE: 102
000

SEQ ID NO: 103        moltype =      length =
SEQUENCE: 103
000

SEQ ID NO: 104        moltype = DNA  length = 33
FEATURE               Location/Qualifiers
source                1..33
                      mol_type = other DNA
                      organism = synthetic construct
SEQUENCE: 104
acactctttc cctacacgac gctcttccga tct                                 33

SEQ ID NO: 105        moltype = DNA  length = 33
FEATURE               Location/Qualifiers
source                1..33
                      mol_type = other DNA
                      organism = synthetic construct
SEQUENCE: 105
acactctttc cctacacgac gctcttccga tct                                 33

SEQ ID NO: 106        moltype = DNA  length = 32
FEATURE               Location/Qualifiers
source                1..32
                      mol_type = other DNA
                      organism = synthetic construct
SEQUENCE: 106
gactggagtt cagacgtgtg ctcttccgat ct                                  32

SEQ ID NO: 107        moltype =      length =
SEQUENCE: 107
000

SEQ ID NO: 108        moltype = DNA  length = 19
FEATURE               Location/Qualifiers
source                1..19
                      mol_type = other DNA
                      organism = synthetic construct
SEQUENCE: 108
gactggagtt cagacgtgt                                                 19

SEQ ID NO: 109        moltype = DNA  length = 20
FEATURE               Location/Qualifiers
source                1..20
                      mol_type = other DNA
                      organism = synthetic construct
SEQUENCE: 109
acactctttc cctacacgac                                                20

SEQ ID NO: 110        moltype = DNA  length = 58
FEATURE               Location/Qualifiers
source                1..58
                      mol_type = other DNA
                      organism = synthetic construct
SEQUENCE: 110
aatgatacgg cgaccaccga gatctacacn nnnnnnncga cgtaaaacga cggccagt      58

SEQ ID NO: 111        moltype = DNA  length = 57
FEATURE               Location/Qualifiers
source                1..57
                      mol_type = other DNA
                      organism = synthetic construct
SEQUENCE: 111
caagcagaag acggcatacg agatnnnnnn nncacacagg aaacagctat gaccatg       57

SEQ ID NO: 112        moltype = DNA  length = 66
FEATURE               Location/Qualifiers
```

```
source                  1..66
                        mol_type = other DNA
                        organism = synthetic construct
SEQUENCE: 112
caagcagaag acggcatacg agatnnnnnn nngtgactgg agttcagacg tgtgctcttc    60
cgatct                                                              66

SEQ ID NO: 113          moltype = DNA  length = 70
FEATURE                 Location/Qualifiers
source                  1..70
                        mol_type = other DNA
                        organism = synthetic construct
SEQUENCE: 113
aatgatacgg cgaccaccga gatctacacn nnnnnnnaca ctctttccct acacgacgct    60
cttccgatct                                                          70

SEQ ID NO: 114          moltype = DNA  length = 40
FEATURE                 Location/Qualifiers
source                  1..40
                        mol_type = other DNA
                        organism = synthetic construct
SEQUENCE: 114
gagatctaca cnnnnnnnnc gacgtaaaac gacggccagt                          40

SEQ ID NO: 115          moltype = DNA  length = 25
FEATURE                 Location/Qualifiers
source                  1..25
                        mol_type = other DNA
                        organism = synthetic construct
SEQUENCE: 115
catggtcata gctgtttcct gtgtg                                         25

SEQ ID NO: 116          moltype = DNA  length = 45
FEATURE                 Location/Qualifiers
source                  1..45
                        mol_type = other DNA
                        organism = synthetic construct
SEQUENCE: 116
ggcatacgag atnnnnnnnn cacacaggaa acagctatga ccatg                   45

SEQ ID NO: 117          moltype = DNA  length = 13
FEATURE                 Location/Qualifiers
source                  1..13
                        mol_type = other DNA
                        organism = synthetic construct
SEQUENCE: 117
gccgtcgttt tat                                                      13
```